US008831677B2

(12) United States Patent
Villa-Real

(10) Patent No.: US 8,831,677 B2
(45) Date of Patent: Sep. 9, 2014

(54) CUSTOMER-CONTROLLED INSTANT-RESPONSE ANTI-FRAUD/ANTI-IDENTITY THEFT DEVICES (WITH TRUE-PERSONAL IDENTITY VERIFICATION), METHOD AND SYSTEMS FOR SECURED GLOBAL APPLICATIONS IN PERSONAL/BUSINESS E-BANKING, E-COMMERCE, E-MEDICAL/HEALTH INSURANCE CHECKER, E-EDUCATION/RESEARCH/INVENTION, E-DISASTER ADVISOR, E-IMMIGRATION, E-AIRPORT/AIRCRAFT SECURITY, E-MILITARY/E-LAW ENFORCEMENT, WITH OR WITHOUT NFC COMPONENT AND SYSTEM, WITH CELLULAR/SATELLITE PHONE/INTERNET/MULTI-MEDIA FUNCTIONS

(76) Inventor: Antony-Euclid C. Villa-Real, Las Vegas, NV (US)

( * ) Notice: Subject to any disclaimer, the term of this patent is extended or adjusted under 35 U.S.C. 154(b) by 0 days.

(21) Appl. No.: 13/373,368

(22) Filed: Nov. 10, 2011

(65) Prior Publication Data
US 2014/0162598 A1    Jun. 12, 2014

Related U.S. Application Data

(60) Provisional application No. 61/458,076, filed on Nov. 17, 2010.

(51) Int. Cl.
*H04M 1/00*     (2006.01)
(52) U.S. Cl.
USPC ..................................... 455/552.1

(58) Field of Classification Search
CPC .................. H04M 1/00; H04M 11/00
USPC ............. 455/552.1, 556.1, 421, 132, 434; 348/231.99, 14.16; 396/287
See application file for complete search history.

(56) References Cited

U.S. PATENT DOCUMENTS 8,380,243 B2 *   2/2013   Zhang et al. ............... 455/552.1
2013/0155876 A1 * 6/2013  Potra et al. ..................... 370/248

* cited by examiner

*Primary Examiner* — Kiet Doan

(57) ABSTRACT

All-in-one wireless mobile telecommunication devices, methods and systems providing greater customer-control, instant-response anti-fraud/anti-identity theft protections with instant alarm, messaging and secured true-personal identity verifications for numerous registered customers/users, with biometrics and PIN security, operating with manual, touch-screen and/or voice-controlled commands, achieving secured rapid personal/business e-banking, e-commerce, accurate transactional monetary control and management, having interactive audio-visual alarm/reminder preventing fraudulent usage of legitimate physical and/or virtual credit/debit cards, with checks anti-forgery means, curtailing medical/health/insurance frauds/identity thefts, having integrated cellular and/or satellite telephonic/internet and multi-media means, equipped with language translations, GPS navigation with transactions tagging, currency converters, with or without NFC components, minimizing potential airport risks/mishaps, providing instant aid against school bullying, kidnapping, car-napping and other crimes, applicable for secured military/immigration/law enforcements, providing guided warning/rescue during emergencies and disasters.

23 Claims, 39 Drawing Sheets

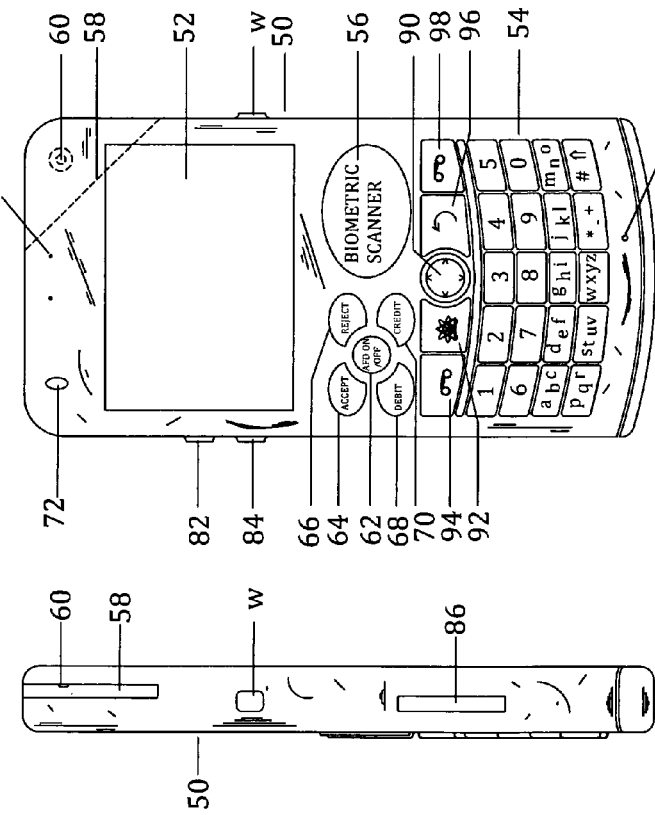

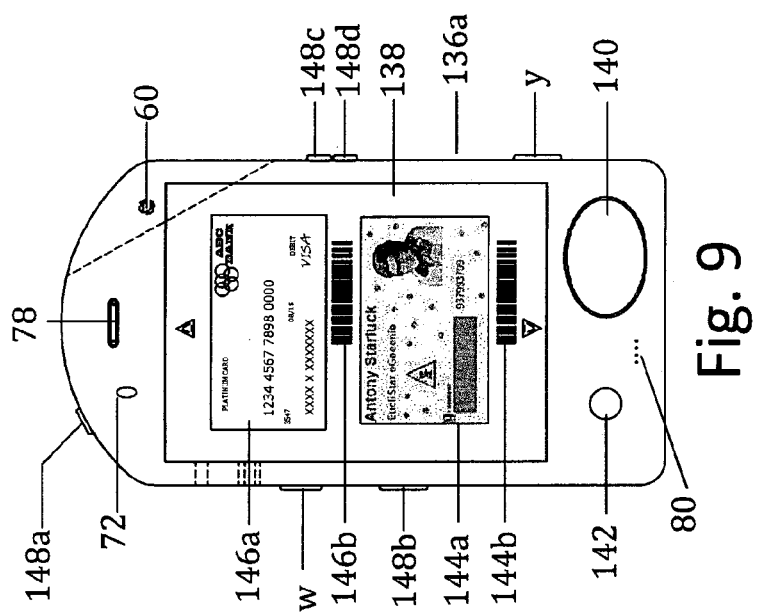

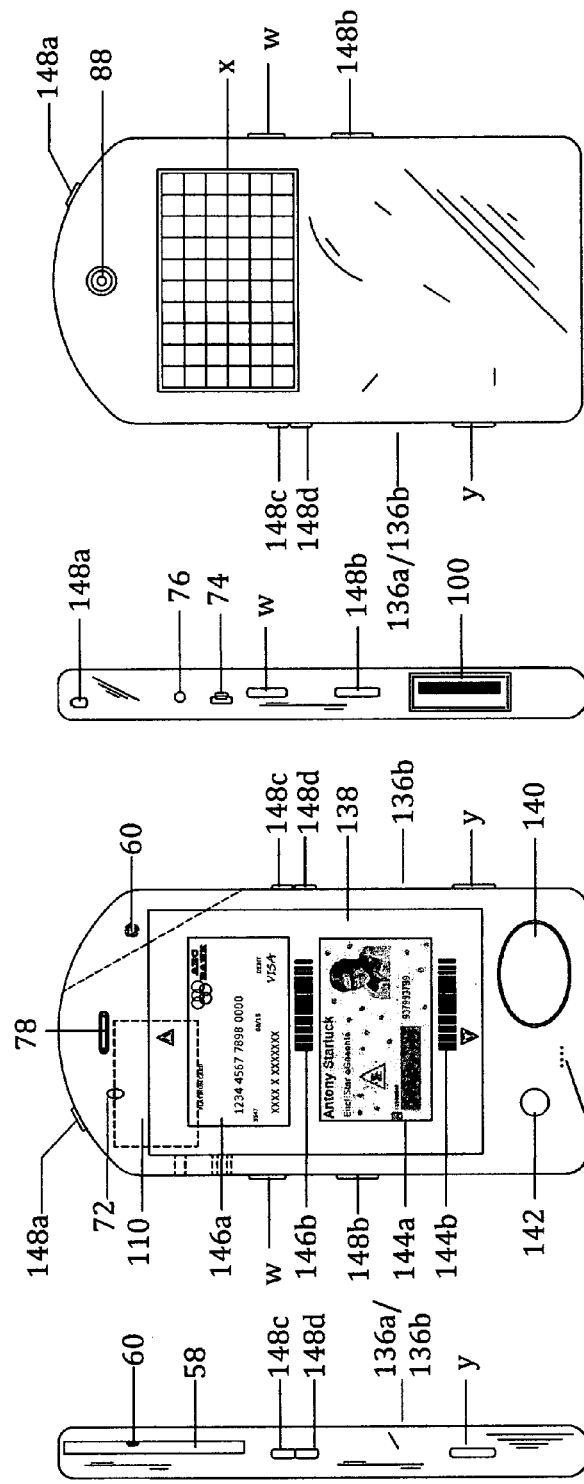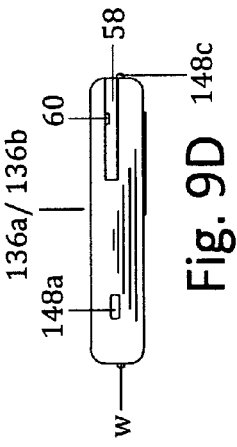

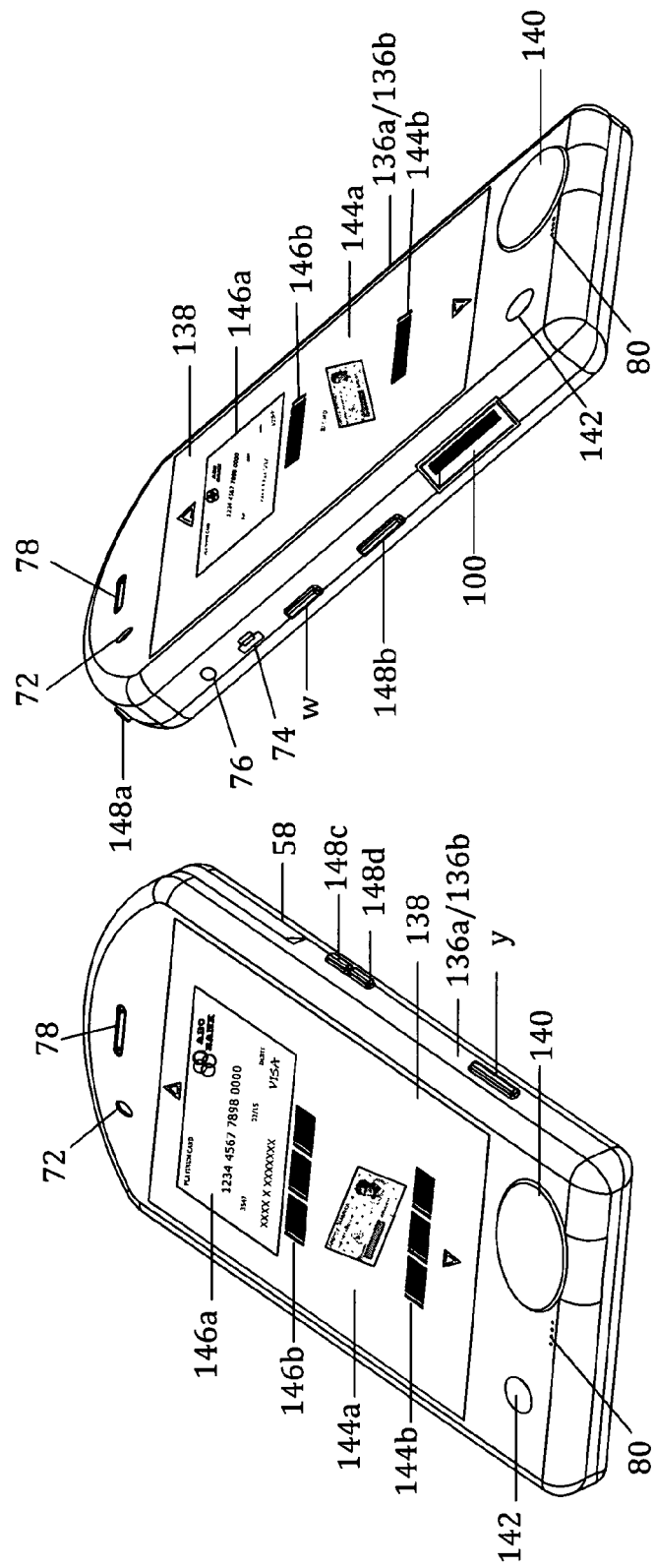

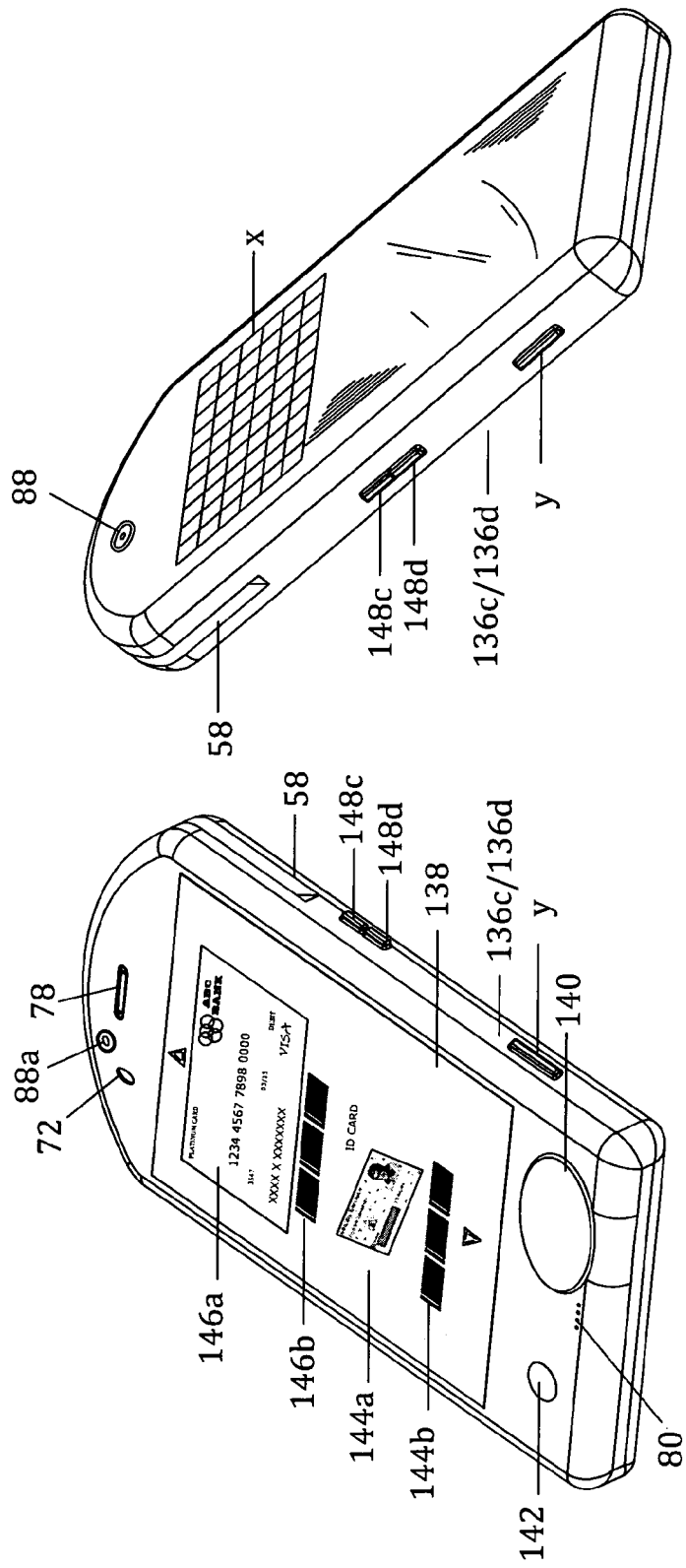

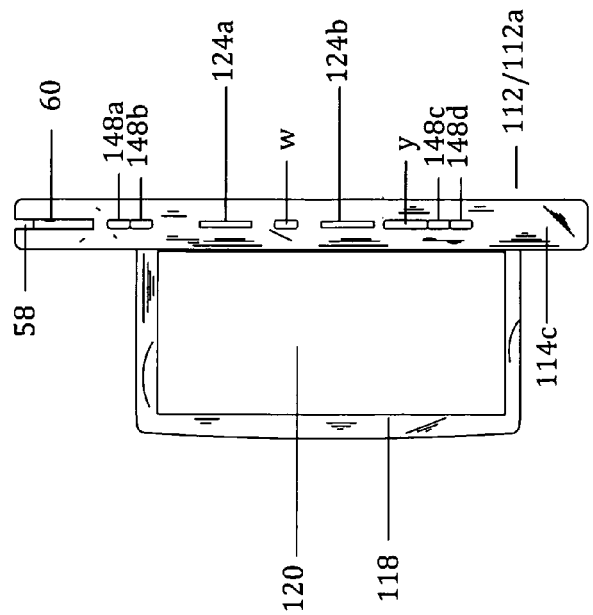
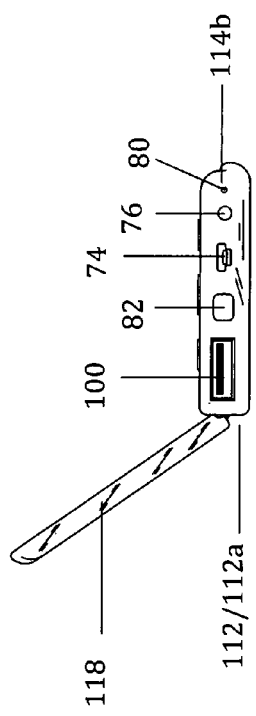
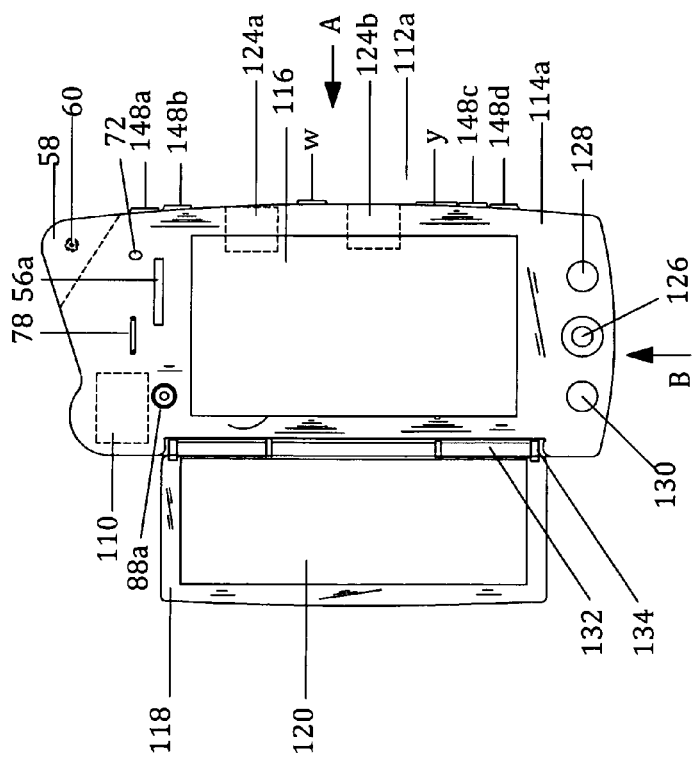

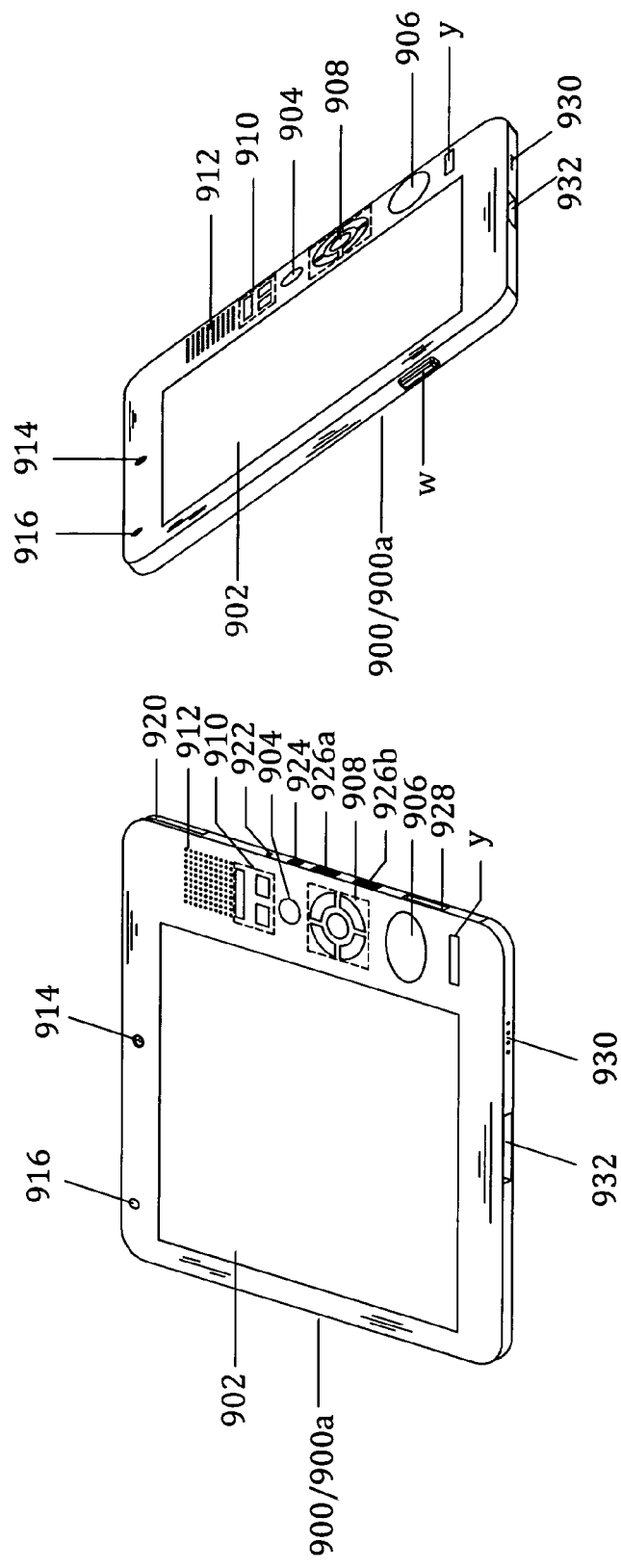

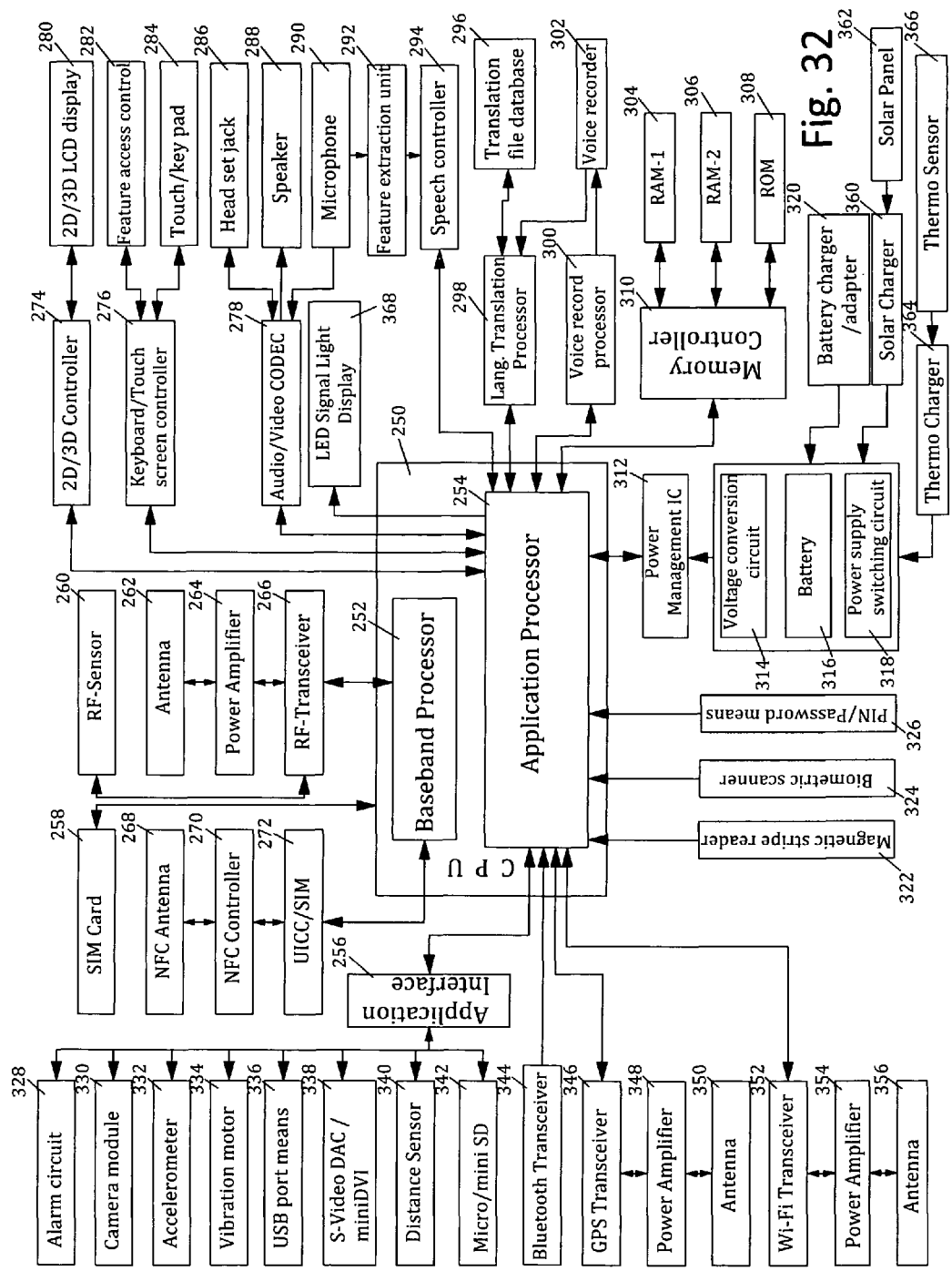

CUSTOMER-CONTROLLED
INSTANT-RESPONSE
ANTI-FRAUD/ANTI-IDENTITY THEFT
DEVICES (WITH TRUE-PERSONAL
IDENTITY VERIFICATION), METHOD AND
SYSTEMS FOR SECURED GLOBAL
APPLICATIONS IN PERSONAL/BUSINESS
E-BANKING, E-COMMERCE,
E-MEDICAL/HEALTH INSURANCE
CHECKER,
E-EDUCATION/RESEARCH/INVENTION,
E-DISASTER ADVISOR, E-IMMIGRATION,
E-AIRPORT/AIRCRAFT SECURITY,
E-MILITARY/E-LAW ENFORCEMENT, WITH
OR WITHOUT NFC COMPONENT AND
SYSTEM, WITH CELLULAR/SATELLITE
PHONE/INTERNET/MULTI-MEDIA
FUNCTIONS

CROSS-REFERENCE TO RELATED
APPLICATION

This non-provisional utility patent application claims the benefit of provisional patent application Ser. No. 61/458,076 filed: 17 Nov. 2010 by the present inventor.

FEDERALLY SPONSORED RESEARCH

Not Applicable

SEQUENCE LISTING OR PROGRAM

Not Applicable

BACKGROUND OF THE INVENTION

A. Field of Invention

The present invention generally pertains to smart phones and tablets, and systems with secured true-personal identity verifications, providing millions of customers and users with effective, comprehensive local, national and global security protections against errors, frauds and identity thefts, as well as providing them with instant security, guidance and safety during travels and during hazardous situations.

B. Prior Art and Current Art-Related Problems and References as Solvable by the Present Invention, Inclusive of the Present Inventive Devices, Methods and Systems According to recent reports gathered from credible sources in financial industry, hundreds of billions of U.S. dollars, including other foreign currencies are wasted and lost, annually, altogether, by hundreds of millions of consumers and authorized customers and authorized users of credit cards, debit cards and cheques or checks, and, also being wasted and lost by numerous legitimate banks, lending companies, vendors and merchants, insurance companies, government agencies and other legitimate organizations, nationally and internationally. These financial wastes and losses are mostly due to direct and indirect results or aftermaths of widespread countless frauds and identity thefts, especially in the fraudulent uses of numerous millions of physical and virtual credit cards and debit cards, cheques (checks) and card-not-present commercial transactions and other related and other relevant means of financial, transactional and operational instruments used by personal, business and other organizational entities. In the present state of the American economy, where enormous medical/health care expenditures have been sky-rocketing, it is very imperative to solve the rampant medical/health care fraud, insurance claim misrepresentations, mismanagements and confusions that, for a long time, have been the primary roots and major causes of tremendous strain and shambles in the medical/health care systems. Widespread medical and health insurance fraud costs a crippling loss of revenues to the American health care arena. Many insurance authorities have reported that medical fraud involving illegal medical/health insurance claims accounts for more than 100 billion USD per year. The National Health Care Anti-Fraud Association (NHCAA) which represents the respective specialized professionals, serving as the first line of defense against the expanding crime of medical/health care fraud has conservatively estimated that about 3 percent of the United States of America's annual expenditures which amounts to $68 billion USD are wasted because of health care fraud. Other estimates made by government and law enforcement agencies, including the FBI places a loss of about 10 percent of our annual health care expenditure, which equates to a waste of $226 billion USD due to health care fraud crimes.

Various types of medical fraud schemes have been identified by medical insurance authorities. These fraudulent medical insurance claims are: multiple billings or fraudulent billings for services that were not in reality provided to patients, unbundling of medical claims, billing separately for medical procedures normally covered by single service, misrepresentations of medical services and devices or providing unnecessary medical services and devices, etc. These crimes and losses alone exacerbate the crippling of our economy that should and must be prevented. The present invention, inclusive of the present inventive devices, methods and systems can enormously solve and prevent these fraudulent medical/health care and economic losses.

Just this Jul. 16, 2010, the U.S. Department of Justice, including other agencies of the government charged 94 people for submitting fraudulent medical claims involving five states, amounting to $251 Million USD. The multi-agency task force of the government reported that busts on medical fraud activities included many professionals in the medical field who, alongside other conniving personnel and medical facilities in Miami, Brooklyn, Detroit, Baton Rouge in Louisiana, and Houston have billed Medicare with fraudulent medical claims amounting to hundreds of millions of U.S. dollars. These are just some important evidences why Medicare and Medicaid are continually losing hundreds of billions of U.S. dollars, thus contributing to the skyrocketing costs incurred in the annual government expenditures of $2 Trillion. The final victims are the patients as well as the legitimate American taxpayers.

The present invention, inclusive of the present inventive devices, methods and systems focuses on directly involving the hundreds of millions of insured medical/health recipients in an unprecedented collective people power towards participating in electronically checking or multi-checking and verifying through portable secured wireless and wired or optically-linked means or devices, in order to help check the real validity of millions of medical/health insurance claims submitted by numerous medical/health care facilities, (tagged with paired GPS and real time-date proximity evidentiary connectivity between the authorized registered insured patient's/user's respective registered mobile devices and the medical/health facility's medical/health insurance claiming devices) before actual payments of medical/health insurance claims are properly processed and paid by the government as well as by legitimate private insurance companies, coordinated in certain vastly coherent methods and systems with direct evidences of secured electronic filings of most and every and all medical/health insurance claim transactions, stored in secured databases for correct and accurate preventative measures against the commitment of fraudulent medical/health care insurance claims, and, for future recall and review purposes to support cases of potential investigations, complaints, law suits and litigations.

This present invention, inclusive of the present inventive devices, methods and systems being dedicated for anti-fraud and identity theft prevention with true-personal identity verification, control and management, therefore, can enormously help in the effective solving, preventing and immensely minimizing the occurrences of medical/health insurance-related frauds and identity-thefts charged to Medicare and Medicaid, as well as charged to private medical/health care insurances, thus, will definitely curtail and prevent the enormous numbers and amounts of wastes and losses of revenues that burden the U.S. government as well as numerous insurance companies in this American country.

Moreover, when the achievable advantages of the present invention, inclusive of the present inventive devices, methods and systems are applied in many other countries, as well as globally, just think of the gigantic savings that can be earned, thereby, immeasurably preventing the great many unwanted wastes and losses that happen due to medical/health care frauds and identity thefts.

In the field of fast-paced travels by numerous millions of people passing through airports and taking flights by airplanes, locally, nationally and globally, it is of utmost importance to effectuate better, broader and more coherent effective true-personal identity verification and screening of persons of interests for the security and safety of millions of passengers, crew members and other personnel, as well as the general public, at-large.

However, currently and in the recent past, on numerous occasions, it has been really very hard to effectively execute precise, coherent security and safety in airports as well as inside the passenger airplanes. Thus, it requires imposing tight and lengthy security screening of passengers that usually results in much time delays, especially in crowded airports, with high frequencies of scheduled airplane departures and arrivals going on.

The present invention, inclusive of the present inventive devices, methods and systems can greatly help solve the above-mentioned security and safety problems by offering mobile instant-responses to verify the true-personal identities of passengers, while also correctly tagging their respective flight tickets and itineraries with their respective boarding cards or passes, and, possibly accurately tagging their respective luggage(s), if applicable, before and during their travels.

In the fast-paced transactions and monetary exchanges in electronic banking and e-commerce, the personal and business assets and credibility of hundreds of millions of relevant authorized customers and authorized users, inclusive of numerous legitimate banks, lending companies, vendors, merchants, government agencies, as well as other good organizational entities, are enormously at stake. Henceforth, there is and will be great public and private demands for superior effective broad-spectrum solutions which are and have been long overdue. These solutions are direly needed now and in the immediate future, to quell and counter what seem to be insurmountable wastes and losses that can possibly downspiral into global personal, commercial and public chaos.

According to a May 15, 2010 internet news report, the Internet Crime Complaint Center has reported that Americans lost about $559 million USD to internet thieves in the year 2009. That is more than twice the amount of $268 million USD lost by Americans in 2008 to online crooks and online hacker attacks. Although numerous banks offer what they claim as secure online banking to protect the accounts of both personal and business customers, the truth is that online crooks and hackers remain a very real serious threat. Multitudes of banks and a great many banking customers worry about accounts safety during accessing bank accounts online, as well as making online transactions. So, despite the great efforts and attempts provided by most banks to protect the bank accounts of millions of customers, their online security still remains such a very major problem. This main security problem becomes further magnified, when the rest of the world doing online banking and electronic personal and business transactions are taken into account.

As reported by Sean Sullivan, a security adviser at F-Secure, which is an internet security firm, in 2009, there were more online bank robberies reported, exceeding actual on-site bank robberies. Banking Trojans are one of the biggest security threats to consumers engaged in online banking. Specifically designed for banking frauds, the malicious code is invisible, capable of stealing multiple types of data, including passwords. Advanced types of Trojans can make fraudulent monetary transfers which can drain the consumers' accounts while they are logged on to their respective accounts online.

The least protected by law are business accounts. They are most vulnerable to online attacks by hackers who are more inclined to take advantage of breaking into numerous accounts of many millions of dollars.

Once the bank can prove that the breach was a result of something done by the customer, then the bank is not held liable to the monetary loss. Most small businesses are at risk when doing monetary wire-transfers with their accounts.

A business owner in Los Angeles lost $50,000 resulting from a hacker who committed fraudulent wire transfer from his Bank of America account to a Croatian Bank. A lawsuit was filed recently by a lawyer on behalf of the business owner against Bank of America, which refused to take responsibility for that online theft, claiming that the bank is not liable for the illegal monetary wire transfer.

With the current banking practices, it is of utmost importance for the bank customers to review their bank accounts statements carefully on a regular basis, and in case of any suspicious activities, the bank customers must immediately report them to their respective banks. When bank customers have been victimized by online theft, they must act swiftly to report the incident to their respective banks, or else, if they don't do the reporting on a timely manner, the banks will not always be held obligated to pay the customers' monetary loss. Bank customers are also vulnerable to potential losses when they have lines of credit accounts or business accounts.

The courts may be the ones to ultimately determine whether the customers' conduct pertaining to following security measures were reasonable and not responsible for the breach, or whether the banks are more at fault.

There is an immense need that vital data/information flow of financial and personal information be specifically and broadly secured and coherently protected, reported, monitored, authenticated and settled with dominant, effective instant-response interactivity, with participative actual individual and broad-based real-time secured transactional speed, tamper-proof storage and tracking of monetary transfers via wireless, wired and optical networks, in combination with other emerging and promising technologies.

The identity-privacy data of so many millions of authorized customers and authorized users, as well as those authorized business owners and their corresponding financial institutions, must be closely and securely safeguarded with wider and better secured alliances of cooperation between them. In numerous situations, however, there are fee-based services by certain third parties who offer to monitor the customers' banking activities and report any potential irregularities or suspicious fraudulent activities pertaining to their specific personal and business accounts. But, there are great risks here on the part of the banking customers, because, for these third parties to be able to monitor and report to the customers' banking activities, the privacy of data/information of the banking customers can be pre-disposed to potential leakages that may later on result into fraudulent and identity theft crimes that can endanger the integrity and financial well-being of legitimate banking customers without them knowing the fraudulent and identity theft crimes being committed against them.

Therefore, it will be much better, safer and more secured to the millions of relevant authorized banking and credit card customers and authorized users, if much greater instant-response control and monitoring are afforded to them by means of using the present invention, inclusive of the present inventive devices, methods and systems so that they can interactively enable themselves to wirelessly electronically and instantly respond in manipulating and controlling their desired relevant lawful manual and electronic transactional financial encrypted inputs and outputs pertaining to their respective financial and other relevant properties, assets, physical or virtual credit cards and debit cards, and card-not-present transactions, and other financial instruments, including the secured applications of the emerging Near-Field Communication (NFC) technology.

In 2009, there were 546 million physical credit cards and 507 million debit cards in circulation in the United States of America, alone, resulting in 11.1 million adults having been victimized by identity fraud, and resulting to an annual loss of 48 Billion USD. There are more physical credit cards and debit cards being used in Great Britain, Continental Europe, Japan, China, Taiwan, South America, Canada, Mexico, India, the Middle Eastern countries, the Caribbean islands, Russia, the Scandinavian countries, Australia, Africa, Indonesia, Philippines, and other oriental countries, combined, with further more adults victimized by identity fraud.

It is projected that about 700 million Near-Field Communication (NFC)-enabled devices will be used by 2013 throughout the world. To date, there are also about 5 billion cell phones being used around the world.

Other great threats and problems, nowadays, are the rampant identity thefts affecting our modern global society by the millions, in all walks of life. The Wall Street Journal poll reported that Americans claimed that their loss of privacy is of a greater threat to them than the risks of terrorism, global warming and overpopulation.

According to a recent Lou Harris poll report, 90% of people were so much concerned about invasion of their privacy, an increase in percentage from 34% since 1970. This geometric increase in privacy intrusion and identity theft is directly due to the explosive increments in private and public information accessibility, plus, the ease of obtaining personal and business credits. These fueled and exacerbated the malignant occurrences of privacy intrusion and identity theft crimes, and even made easier because of the technological inadequacy and inability of the past and current networked systems, methods and means to effectively protect millions and millions of consumers and customers to immediately counter and fight the prevalent rise of access to sensitive private and public data/information, so vital to the privacy-identity of the general public, globally.

There is now a great worldwide interest in the emerging arena of Near-Field-Communication-enabled (NFC) devices for convenient mobile payments for e-ticketing, parking areas, train stations and other fast-track transactions, etc. However, the demands by numerous millions of customers using credit cards and debit cards based on the current payment infrastructures cannot just easily fade away. The reason is because there are still enormous millions of authorized credit/debit card customers and users who are and have been so comfortable and dependent upon the physical credit cards or debit cards, and, most merchants and vendors are already equipped with the current credit/debit card magnetic stripe readers applicable to the physical credit/debit cards at the point-of-sale terminals in the United States of America, and other parts of the world. Also, psychologically, millions upon millions of customers and users are more comfortable and proud, with a feeling of safety in the use and mere physicality-feel of actually holding in their possession the real physical debit cards and credit cards with their names imprinted on them. Moreover, a great number of vendors and merchants still adhere to the security of having actual physical credit cards and debit cards that they can see being swiped through their transaction card readers at the attendant-assisted point-of-sale terminals in numerous locations. Furthermore, many millions of merchants and vendors already possessing the credit card/debit card magnetic stripe readers for the physical credit/debit card payments at the point-of-sale terminals would rather economize, and thereby be more inclined to resist buying or leasing additional equipments for Near-Field Communication-enabled (NFC) payment applications, unless, of course, greater and greater customers' demands for NFC-enabled payment applications become inevitable for them to change.

Currently, enormous problems exist on many issues pertaining to the proper, accurate, coherent and referable verifications and authentications in the secured electronic transmissions of data/information, monitoring and storage of private medical/health histories and activities, personal and public safety of data/information on natural and unforeseen disasters, safety and security in transportation vehicles including safe lanes of travels, private and social dwellings, like hotels, restaurants and other dining places, breaches in conference and meeting places for local, national and global educational, research and inventions, etc. These are also very important priorities to solve, if we, as people of all races are to faster achieve our $21^{st}$ Century's collective quest for a better and greater united world of safety, security, peace and prosperity in global economy, conveniences, positive multi-field productivity, and healthier and happier living conditions on our planet. These need the participation of more coordinated personal and legitimate organizational rapid-response capabilities on the part of hundreds of millions of concerned citizens of the world.

Despite a multitude of prior art and current solutions, practices, attempts, technological developments, advancements and applications, the above-mentioned problems encountered in worldwide fraud and identity theft persist, and, in reality, are still on a geometric rise, globally.

In 2009 alone, statistical surveys reveal there were more than 11 million victims of identity fraud crimes in the U.S. alone. The main reason is because there is a major lack of effective consolidated and coherent methods, systems and devices, with the hundreds of millions of consumers/authorized customers and users that can and should be enabled to participate and help solve these rampant problems in electronic banking, e-commerce and electronic health and medical arenas and activities, etc. Therefore, it will be an enormous leap forward to provide the future hundreds of millions of consumers and authorized customers and authorized users of the general public, at-large, if they are adequately provided with instant-response means and portable wireless devices so that they can effectively and immensely escape the trappings and inadequacies of the prior art and current practices, worldwide.

Many patents and patent publications do not provide the broadness, coherence, and multi-functional capabilities that are required to effectively solve, curtail and prevent these widespread international frauds and identity-thefts. They do not also provide the numerous millions of consumers and customers with the convenience of secured true-personal identity verification protections with instant-response broad-spectrum features and safety functionalities.

There are patents and publications filed in the United States Patent Office such as: U.S. Pat. No. 6,157,825 issued to Max B. Frederick (2000), U.S. Pat. No. 7,747,536 B2 issued to Christopher McGee et al (2010), U.S. Pat. No. 7,908,645 B2 issued to Thomas Emmanuel Varghese et al (2011), patent no. US 2009/0262136 A1 to Xiaofeng Ou (2007), publication no. US 2006/0259425 A1 to Kenneth E. Jennings, Jr. et al (2006), U.S. Pat. No. 5,456,747 issued to Jerome Drexler (1995), U.S. Pat. No. 7,813,822B1 issued to Sleten M. Hafftrey (2010), publication no. US 2006/0269010 A1 to Sudeesh Yezhuveth (2006), publication no. US 2007/0198410 A1 to Mark Labgold (2007), publication no. US 2011/0184866 A1 given to Rajesh G. Shakkarivar (2011), publication no. US 2009/0322477 A1 issued to Victor Manuel Celorio (2009), publication no. US 2008/0306850 A1 to Kris M. Horvath (2008). However, in the analysis of these mentioned other inventions, they vastly differ from the presently applied for invention, and, these enumerated inventions of these enumerated inventors are lacking in broadness, coherence, multi-functionalities, capabilities and features as compared to the global scope of comprehensive, effective and expansive customer-controlled instant-response major people power shift of control in solving the prior and current problems encountered in worldwide identity theft and fraud and privacy intrusions, and other national and international problems in global e-commerce, safety and security in financial, personal, business, educational, professional and organizational affairs and arena for great benefit to the world citizens and businesses and safety in our multi-national society.

Because of the major problems and inadequacies in the prior art and those numerous fragmentary currently practiced and implemented methods, systems and devices, there exists a great demand for more expansive, coherent effective solutions capable of countering and solving the threats, dangers and harms that negatively affect so many millions of consumers and customers and worldwide inhabitants, as well as myriads of commercial, environmental and other private and governmental agencies and institutions.

The present invention, inclusive or the present inventive devices, methods and systems can offer to the needing hundreds of millions of consumers or customers with such instant-response protective features and capabilities to achieve better, greater, broader and safer personal, business, and health/medical care participative securities and control of their own personal transactional and monetary dealings. The effective dedicated instant-response features, capabilities and functionalities of the present invention, inclusive of the present inventive devices, methods and systems provide a comprehensive multi-spectrum electronic mobile secured data/information interactions between the millions of consumers and customers and their respective legitimate banks, lending companies, health and medical insurance providers, and myriads of different vendors and merchants, etc. on a national and internationally scale.

Present Inventor's Humanitarian Goals and Vision

It is with great honor and highly motivated aim that the present inventor named, Antony-Euclid C. Villa-Real, has originally conceived and invented the present invention, inclusive of the present inventive devices, methods and systems which are broad-spectrum in applications, greatly favoring the hundreds of millions of authorized customers/users with more effective, comprehensive and dedicated customer-controlled instant-response anti-fraud and anti-identity theft, with true-personal identity verification wireless mobile inter-activity features, functions and capabilities, in order to better help alleviate our global society from the widespread immense problems and harms encountered in worldwide fraud and identity thefts activities and crimes, and other global safety and security threats and dangers.

The present inventor is truly focused to the above-mentioned honorable cause, so he is now filing for this present non-provisional utility patent application with the required patent specifications, illustrative drawings and broad-spectrum and specific claims, but not limited to such embodiments, descriptions and illustrations and claims as long as they embrace the scope and meaning of the present invention, inclusive of the present inventive devices, methods and sub-methods and systems, which will additionally be followed by international non-provisional utility patent application(s), among a series of other related additional patent applications in order to help to enormously, vastly, and coherently tackle and solve the ongoing and current worldwide threats, dangers and harms to personal, professional, business, security and safety activities and arenas that cause so much losses in global economy, identity privacy and dangers.

It is also, with great faith, belief and ardent hope that the important integrated scientific and technological breakthroughs being unveiled in the present comprehensive invention, inclusive of the present inventive devices, methods and systems can be effectively sponsored, developed, coordinated and implemented for special and general international uses by numerous millions of people, legitimate banks, Medicare/Medicaid and/or other international public and private insurance companies, commercial and government agencies and institutions, and other honest and reliable legitimate organizations, in order to enormously detect, prevent, minimize, monitor and control the extensive occurrence of personal, professional and commercial frauds, identity thefts and other global safety and security threats and harms that are plaguing our global society in our $21^{st}$ Century, so help us, God.

Present Invention, Inclusive of the Present Inventive Devices, Methods and Systems:

Just for Introduction, Some of the Many Important Coordinated Breakthroughs of the Present Invention, Inclusive of the Present Inventive Devices, Methods and Systems are Enumerated, after the Following Clarifying Emphasis:

In order to clearly understand the patent writings, descriptions, explanations and illustrations, and avoid confusion, whenever the phrase or name, such as "present invention" or "EucliBaba" are used or mentioned, they mean the same thing, inclusively, as the new presently applied for invention or inventive methods, systems and devices as described in the present non-provisional utility patent application and specification; they also mean as equivalent to, or meaning the same thing as the "Customer-Controlled Instant-Response Anti-Fraud/Anti-Identity Theft Devices (with True-Personal Identity Verification Application), Methods and Systems for Secured Global Applications in Personal/Business e-Banking, e-Commerce, e-Medical/Health Insurance Checker, e-Education/Research/Invention, e-Disaster Advisor, e-Immigration, e-Airport/Aircraft Security and e-Military/e-Law Enforcement, with or without NFC component and system, with Cellular/Satellite Phone/Internet/Multi-Media Functions."

Accordingly, whenever the names or phrases, such as "present inventive device" or "present inventive devices," or "the present device," or "present inventive device(s)" or "device" or "devices are mentioned or referred to in each of the relevant respective various embodiments, as illustrated and described in the present non-provisional utility patent application and specifications, but not limited to such embodiments in scope, features, modes and applications, they mean interchangeably or alternatively as "CCIRAF/AITD" or "EucliStar eGeeenie" or "Universal eGeeenie" or "eGeeenie" or "Customer-Controlled Instant-Response Anti-Fraud/Anti-Identity Theft Device(s) with True-Personal Identity Verification", each of which means the same thing or equivalent to the same thing as the "present inventive device(s)" or "the device" or "the present device" or "present inventive device", or "device" or "devices" as included, described, explained and illustrated in the present non-provisional utility patent application and specifications, including the discussed background of the present invention, inclusive of the present inventive device(s)).

The preferred embodiments of the present inventive devices or CCIRAF/AITDs or EucliStar eGeeenies or Universal eGeeenies or eGeeenies, incorporate built-in integrated Near-Field Communication (NFC) components and systems. However, some embodiments are without built-in integrated Near-Field Communication (NFC) components and system. The embodiments of the present inventive devices or CCIRAF/AITDs or EucliStar eGeeenies or Universal eGeeenies or eGeeenies can use the interactive LCD displays, which can utilize the regular 2D displays alone, or, can utilize an interactive switchable 2D/3D LCD displays with switchable 2D/3D activation button. The reasons behind these above choices of embodiments are based according to the needed requirements and applications that are desired in the programming of the present inventive devices, and, according to the manufacturers and the demands of the buying public or the needs of the relevant companies, agencies or organizations or institutions that will be using the present inventive devices or CCIRAF/AITDs or EucliStar eGeeenies or Universal eGeeenies or eGeeenies.

Based on the current statistical figures cited in the prior art about the still expanding extensive usage of credit cards and debit cards, and the great demands for the indispensable valued conveniences of cell phones, the internet, and the Near-Field-enabled (NFC) devices, the present invention or EucliBaba, which includes the present inventive device(s) or CCIRAF/AITD or EucliStar eGeeenie or Universal eGeeenie or eGeeenie, being centered and vastly focused upon the important integrated functional features, capabilities and conveniences offered for the general public, plus, providing the most indispensable needed features for effective, coherent and more secured and broad-spectrum national and global instant-response control and monitoring for personal and business secured financial transactions in electronic banking and e-commerce, e-Insurance, etc., with effective tamper-proof anti-fraud and anti-identity theft with true-personal identity verification protections, may, therefore, eventually prove to be one of $21^{st}$ Century's much demanded useful and lucrative inventions to ever hit the global market. Their future uses can become enormously propagated and demanded by the needing hundreds of millions of authorized registered customers and users, as well as by numerous legitimate banks, lending companies, insurance companies, millions of merchants, vendors, advertisers and promoters, various educational/research/inventions entities, and most government agencies, including the military and law enforcement and safety and rescue operations, worldwide.

One foremost logical main reason behind such anticipated projection is that hundreds of millions of future authorized registered customers and/or users of this present invention, including the present inventive devices or CCIRAF/AITDs or EucliStar eGeeenies or Universal eGeeenies, will most likely be united in an unprecedented global private and public movement in demanding for these better effective means, methods and systems to enable them to securely and wirelessly control and implement most of their own e-Banking, e-Commerce, e-Insurance, e-Health/Medical activities, e-Airport and aircraft security and safety of the general public with peace of mind. They will be provided by the present invention, or EucliBaba, including the present inventive devices or CCIRAF/AITDs or EucliStar eGeeenies or Universal eGeeenies, with certain unitary, handy and easy-to-use integrated mobile devices, with major safety and security methods and systems and database networking to achieve major (but not limited) provisions for:

(1) The liberal secured uses of their own personal and/or business physical and/or virtual credit cards and debit cards integrated with instant-response interactive anti-fraud and anti-identity theft with true-personal identity verification security alarm, control, monitoring and memory storage.

(2) The liberal secured uses of mobile wireless convenience of transferring specific and verifiable amounts of money from their chosen physical and/or virtual credit cards or debit cards (both in card-present as well as card-not-present situations) into other specific verifiable bank accounts, with instant-response anti-fraud and anti-identity theft with true-personal identity verification alarm, control, monitoring and memory storage, and/or into their specific registered CCIRAF/AITD's corresponding integrated Near-Field Communication (NFC)-enabled component(s) and system, in order to make fast and convenient secured methods and means of payments through fast-lane transactions for transportation e-ticketing and e-services, for facile identifiable entries and exits into and out of restricted areas, and for fast-lane secured transactions for purchasing of commodities and services, with provable recallable memory extractable from within the digital storage memory of each respective registered CCIRAF/AITDs or EucliStar eGeeenies or Universal eGeeenies or eGeeenies.

(3) The liberal secured uses of mobile wireless convenience of receiving specific verifiable amounts of money from external monetary sources into their chosen physical and/or virtual credit cards or debit cards (both in card-present as well as card-not-present situations), and/or into their corresponding integrated Near-Field Communication (NFC)-enabled component and system, with instant-response anti-fraud and anti-identity theft with true-personal identity verification alarm, control, monitoring and memory storage, in order to make fast and convenient secured methods and means of payments through fast-lane transactions for transportation e-ticketing and e-services, for facile identifiable entries and exits into and out of restricted areas, and for fast-lane secured transactions for purchasing of commodities and services, with provable recallable memory extractable from within the digital storage memory of each respective registered CCIRAF/AITDs or EucliStar eGeeenies or Universal eGeeenies or eGeeenies.

(4) The liberal secured uses of projected virtual images of each specifically chosen non-physical virtual credit cards and/or debit cards, as well as other non-physical virtual organizational membership cards, and security entry cards to and from restricted places and areas. Their capabilities include the effective projecting on the interactive LCD displays of each corresponding registered CCIRAF/AITD or EucliStar eGeeenie or Universal eGeeenie or eGeeenies with secured identifiable, verifiable and authenticable images of the correct authorized customer/user with bar coded data/information and display at point-of-sale (POS) terminals, as well as for fast secured online merchandise and/or service ordering from merchants and vendors and places of services, and for entries to and from secured restricted places and areas, nationally and internationally, with instant-response anti-fraud and anti-identity theft with true-personal identity verification protection, alarm, control, monitoring, memory-storage and recall. The virtual images of virtual credit cards or debit cards and other relevant virtual cards with correct bar code representations at the interactive LCD display of the present inventive device(s) or CCIRAF/AITD(s) or EucliStar eGeeenie(s) or Universal eGeeenie(s) or eGeeenie(s), capable of being readable by corresponding automatic optical reading transaction devices at point-of-sale (POS) terminals, so as to be able to properly carry out or execute safe and secured transactions in the absence of any presented physical credit cards or debit cards or other membership cards; the interactive LCD audio-visual displays and speaker systems of their respective mobile EucliStar eGeeenie or CCIRAF/AITD or Universal eGeeenie or eGeeenies, being utilizable for double or multi-checking purposes.

(5) The liberal uses of secured integrated cellular and/or satellite phones and internet capabilities with numerous multi-media applications equipped with anti-device-loss capability and preventive potential leakage of encrypted private and/or public data/information transmissions, storage and retrieval.

(6) The secured tamper-proof checking, double checking and/or multiple verification, monitoring and authentication of most/or all Medicare/Medicaid insurance claims, and most/or all private and other government-run medical/health insurance claims as filed by the relevant insurance-claiming medical-health facilities. The above can be achieved by using tamper-proof medical insurance cards with encrypted data/information magnetic stripes, and/or using the built-in integrated Near-Field Communication (NFC) component and system, effectively utilizing each corresponding registered CCIRAF/AITD or EucliStar eGeeenie or Universal eGeeenie or eGeeenie of the respective correctly registered insured customer/patient. The anti-fraud/anti-identity theft with true-personal identity verification application of each of the relevant present inventive devices being equipped with alerting means that allow the respective medical/health-insured patient's authenticating anti-fraud instant-response means of acceptance or rejection of the validity of insurance claims by the claiming relevant medical/health facilities as paired with a corresponding NFC-enabled claiming devices of the relevant medical/health facilities, as per specific type or kind of medical/health service(s) rendered, time-frame(s), date(s), duration(s) of stay and frequency of physical presence of the respective insured patients during visits and/or consultations and/or performed diagnostic procedures, and/or laboratory tests made, and/or hospitalization(s), emergency services done, and/or medical/health devices provided, etc. as claimed by the relevant medical/health facilities, having well coordinated GPS proximity correlation matching capabilities. Storage and reviewable retrieval will vastly prevent and curtail medical/health insurance frauds and identity thefts to be committed by fraudulent medical/health facilities that cost enormous wastes and losses, amounting to hundreds of billions of US dollars, annually.

(7) Mobile secured wireless and stationary instant-response interactive reception, verification and authentication of audio-visual warning reports, instructions and real-time follow-ups of emergency situations concerning personal and/or business loss of contact, etc., and, also pertaining to greater security and safety in airports and aircrafts with passengers and crew instant true-personal identity verifications; also instant information of natural disasters and/or other unforeseen personal and public threats and danger, including accurate verifiable information on specific geo-positional identifiable spots or names of places and routes to avoid, and, also with interactive guidance for specific geo-positional identifiable spots or names of places and routes to take for safe refuge, with secured recordable data/information source transmission and device(s) storages for authentic verifiable recall. All of these can be linked to the relevant corresponding organizations and/or agencies with instant-response anti-fraud and anti-identity theft with true-personal identity verification protections and verifiable coded or non-coded true-personal identities and memberships and/or accurate relational identifications.

(8) Mobile secured wireless and stationary instant-response interactive effective faster, more convenient and accurate methods, systems and devices of enabling broader, coordinative and coherent instant-recognition capabilities for authorized airport and aircraft agents and travelers in verifying and authenticating the true-personal identities of each passengers and/or agents and/or employees in conjunction to their authorized and authentic presence in specific airport(s), and, in case of airline passengers, associating them correctly with their corresponding flight tickets and possibly with their respective luggage(s), so as to prevent and minimize airport and aircraft mishaps, and to achieve vastly tighter safety and security monitoring, that can prevent aircraft and airport risks and dangers for the safety of the passengers and innocent civilians, aircraft flight crew members including the pilots.

(9) The secret coded uses of the present invention, inclusive of the present inventive devices for instantly identifying accurately the military personnel, their respective ranks and relevant associative belongingness to specific units, battalions, divisions and branch of military services, so necessary in times of deployments or mix-ups or military personnel scatterings especially in times of confusion during war and battles, day or night, and, thus preventative of friendly fire casualties, as well as so important in definitely distinguishing them from the enemy wherein secret evasive or commanded tactical and strategic confrontations may be secretly, instantly and wirelessly ordered, filtered and controlled.

(10) The liberal secured uses of wireless instant-response alarm, control, monitoring and memory-storage and recall, are coordinated with national and global anti-fraud/anti-identity theft with true-personal identity verification protections and safety providing inter-linked secured networks and databases of future tamper-proof security filters and anti-virus and computerized anti-electronic shock sensors that can automatically stop and prevent any/and all unauthorized intrusions, thus preventing any/or most or all the dangers and calamitous widespread surprise crippling of electronic banking and e-commerce and other vital offensive and defensive infrastructures in mostly any part of the world.

The above-mentioned are only some of the numerous major and/or specific capabilities, features and advantageous functionalities that are and/or can be integrated in each of the hundreds of millions of individual identifiable, authorized correctly registered wireless mobile present inventive device(s) or CCIRAF/AITDs or EucliStar eGeeenies or Universal eGeeenies or eGeeenies, included in the present invention—EucliBaba. They will definitely help to smoothly and coherently accomplish so much more secured, safer and effective wireless communications and inter-linkages with combinations of wired and optical networks and systems with respective national and/or global databases of banks and credit card lending companies, merchants and vendors, insurance companies or agencies, and other relevant legitimate organizations, and, also for secured authorized entries, accesses and services applicable for transportation facilities, accommodation places and various multitude of national and international secured private and governmental monetary data/information enquiries, funds transfers and exchanges, including secured transactional purchases, sales, marketing, advertising and promotions, educational/motivational research and inventions activities, and other special purpose military, law enforcement and rescue operations, etc.

In a capsule, with the unitary, handy mobility of the present invention or EucliBaba, inclusive of the present inventive device(s) or CCIRAF/AITD(s) or EucliStar eGeeenie(s) or Universal eGeeenie(s), as effectively integrated and coordinated with the booming and widespread functionalities of cellular and/or satellite phones and internet services, equipped with various multi-media and NFC-enabled applications, it is, therefore, within reasonable logical scope of projection that great demands of the CCIRAF/AITDs or EucliStar eGeeenies or Universal eGeeenies or eGeeenies by the general population and specialized legitimate organizations will commence into reality, both nationally and internationally. These definite protective, advantageous defensive and offensive strategic features and capabilities will strongly favor a major shift of control and convenience provided to hundreds of millions of authorized correctly registered customers/users around the world, who can extensively use numerous millions of physical and/or virtual credit cards, debit cards, cheques or checks, medical/health insurance cards, educational/motivational research and inventions cards, organizational membership cards, travel cards, both physical and virtual, and NFC-enabled devices and applications for the widespread safety and security of airports and aircrafts and other transportation places and lanes and entry into restricted areas or places or sites, and also, for rendering great benefits to the military during war, law enforcement and rescue organizations, and can be of immense help to the general public at-large in times of need, such as in cases of certain calamities or disasters.

Moreover, the present invention, or EucliBaba, inclusive of the present inventive device(s) or EucliStar eGeeenie(s) or CCIRAF/AITD(s) or Universal eGeeenie(s), have the coherent, broad-spectrum effective provisions for unitary multi-functional user-friendly, mobile instant-response control in effecting excellent anti-fraud and anti-identity-theft with true-personal identity verification featured embodiments, methods and networking systems. Integrated with numerous millions of programmable cellular and/or satellite phone and internet functionalities, the hundreds of millions of future authorized correctly registered customers and/or authorized users of the CCIRAF/AITDs or EucliStar eGeeenies or Universal eGeeenies or eGeeenies, worldwide, will be enabled to wirelessly manage their own personal and business financial, medical/health transactional, interactive security and safeguarding affairs with more coherent solutions that are so necessary to enormously achieve much safer, better and more secured national and global electronic banking and e-commerce, and electronic medical/health insurance claims instant checking, and danger-averting safeguarding and security anti-fraud and anti-identity theft protections with instant true-personal identity verifications, and anti-terroristic operations. These millions and millions of authorized correctly registered customers and users will inevitably be converted to become active, rather than passive participants in a forceful consolidated people power drive against the rampant multi-faceted frauds and identity theft crimes, and other security and safety threats and harms, including military and rescue operations, and e-immigration and e-airport and aircraft security and safety protections that are still remaining incompletely solved in the fragmentary technological applications of the current and prior art.

Expanded Summary of the Present Invention, Inclusive of the Present Inventive Device(s)

Some of the general and specific objects with achievable advantages (but not limited in scope, designs, embodiments and explanations) of the present invention, EucliBaba, inclusive of the present inventive device(s) or CCIRAF/AITD(s) or EucliStar eGeeenie(s) or Universal eGeeenie(s) are:

(1) One major general object with achievable advantages of the present invention, inclusive of the present inventive device(s) is to provide to hundreds of millions of credit card and debit card customers and users around the world with much safer and greater control of immediately preventing and curtailing the occurrence of identity frauds and identity thefts to be committed against them, before financial and personal losses and damages are incurred, with the use of the new high-tech portable, handheld secured wireless mobile anti-fraud and anti-identity theft devices with true-personal identity verification, called or identified as CCIRAF/AITDs or EucliStar eGeeenies or Universal eGeeenies or eGeeenies, each of which is equipped with effective interactive, majorly customer-controlled instant-response capabilities, and having effective integration with either or both cellular and/or satellite telephonic and internet communication links and multi-media applications.

(2) Still another object with achievable advantages of the present invention, inclusive of the present inventive device(s) is to save most, if not all of legitimate banks and lending institutions, vendors and merchants, both nationally and around the world from losing billions and billions of U.S. dollars, and other currencies due to the rising tides of widespread prevalence of identity frauds and identity thefts, still currently remaining unsolved nationally and globally; these numerous banks, lending institutions, vendors and merchants, also being provided with much greater savings by enormously reducing the expensive and time-consuming investigations of identity frauds and identity thefts, as a result of vastly preventing and curtailing so much potential identity frauds and identity thefts from happening in the first place, through the extensive usage of the future millions of properly linked correctly registered authorized CCIRAF/AITDs or EucliStar eGeeenies or Universal eGeeenies or eGeeenies.

(3) Still, a further object with achievable advantages of the present invention, inclusive of the present inventive device(s) is to provide to hundreds of millions of authorized correctly registered customers/users of the present invention, inclusive of the present inventive device(s) with secured wireless instant-response protection to insured individuals as well as legitimate private and government insurance companies from being victimized with fraudulent billings by numerous fraudulent medical/health facilities that make illegal or false medical/health treatment/maintenance claims against Medicare/Medicaid and/or other medical/health insurance companies, thereby, helping the economy by preventing and/or curtailing numerous private and public medical/health insurance companies and/or agencies from being victimized by the skyrocketing false medical/health insurance claims that cause tremendous wasted expenses and losses encountered in untruthful unauthorized medical/health insurance claims.

(4) A yet further object with achievable advantages of the present invention, inclusive of the present inventive device(s) is to provide a wireless effective one-swipe limiting default setting per authorized transaction, to prevent fraudulent multiple swiping by dishonest persons with or without the knowledge and/or consent of the authorized customers/users of credit card/debit cards, through the use of their respective authorized correctly registered CCIRAF/AITDs or EucliStar CCIRAF/AITDs or EucliStar eGeeenies or Universal eGeeenies or eGeeenies.

(5) Still a further object with achievable advantages of the present invention, inclusive of the present inventive device(s) is to provide to the authorized correctly registered CCIRAF/AITDs or EucliStar eGeeenies or Universal eGeeenies or eGeeenies with the capabilities to electronically generate specific LCD-displayable virtual card(s) projection images of the authorized customer's/authorized user's credit cards/debit cards, as well to electronically generate specific LCD-displayable correct virtual personal and/or virtual membership identity (ID) cards, along with the corresponding generated LCD-displayed virtual bar codes, each respectively representing the correct information/data of the respective projected virtual credit cards/debit cards and the correct information/data of the authorized customer's or authorized user's personal and/or membership ID cards; each of the corresponding virtual bar codes capable of being machine-readable by special LCD-projected bar code readers at the POS terminal or entry terminals for carrying out proper business transactions, or for proper entry into places of transportation or places of accommodation or places of work, services or restricted facilities.

(6) Another general object with achievable advantages of the present invention, inclusive of the present inventive device(s) is to provide to hundreds of millions of authorized credit card/debit card authorized customers/users around the world with certain definite programmable advanced secured mobile and/or stationary personal and business instant-response alert and interactive audiovisual LCD display data/information of any and/or all upcoming bill payments, including specific amounts and dates, to be first initiated by them and set-automatically by them, according to their chosen pre-programmed dates and times, respectively, and, activated by each of the authorized credit card/debit card customers/users, through the use of their respective authorized and correctly registered secure mobile or stationary present inventive device(s), independent or without the necessity of using the services of fee-based-party or parties. The pre-authorizing of future transaction is yet another exemplary function and capability of the present invention, inclusive of the present CCIRAFT/AITD or EucliStar eGeeenie or Universal eGeeenie or eGeeenies. The authorized customers/users can initiate one or more transactions in advance at certain pre-set dates and/or times of some upcoming bill payments to various merchants or commercial or public or private utilities companies, or other relevant personal and/or business entities. Thus, these feature and functionality can limit and prevent the authorized credit cards and/or debit cards of the correctly registered authorized customers/users from being charged of preventable late fees, over-the-limit fees and insufficient funds fees. This object also applies to personal and/or business checks or cheques for advance pre-authorization payments.

(7) Yet, a further object with achievable advantages of the present invention, inclusive of the present inventive device(s) is to provide to hundreds of millions of credit card/debit card authorized customers/users around the world, with a highly organized secured means, methods and systems to securely, wirelessly execute, control, monitor and record the systematic and coherent electronic handlings of their own personal and/or business transactions, secured and recordable telephonic/internet orderings of merchandises and services with GPS location tagging (if desired or applicable) for important defensive evidence purposes, as well as the effective carrying out of safe and secured point-of-sale (POS) shopping, accurate electronic monetary managements, through the proper usage of millions of authorized correctly registered CCIRAF/AITDs or EucliStar eGeeenies or Universal eGeeenies or eGeeenies, which are very portable, mobile and user-friendly.

(8) And, a further object with achievable advantages of the present invention, inclusive of the present inventive device(s) is to provide to hundreds of millions of authorized customers/users of credit/debit cards, through the use of their respective correctly registered CCIRAF/AITDs or EucliStar eGeeenies or Universal eGeeenies or eGeeenies, worldwide, with secured wireless automatic electronic computation of gratuity calculations and total payment amounts, as instantly first pre-authorized (according to the programming of application) by the authorized registered customer/user of the correctly registered CCIRAF/AITD or EucliStar eGeeenie or Universal eGeeenie or eGeeenies, as first sent to the relevant legitimate credit/debit bank account or legitimate credit card account, for correct matching purposes, before the actual swiping of the respective credit/debit card is done at the merchant's or restaurant's point-of-sale (POS) terminal, so that secured and accurate matching can be achieved to avoid charging errors and/or fraudulent multiple billing charges.

(9) A yet further object with achievable advantages of the present invention, inclusive of the present inventive device(s) is to provide some effective electronic anti-bounce protection of the correct personal and/or business credit cards and debit cards and cheques (checks) of authorized customers/users, through the secured wireless mobile use of their respective correct registered CCIRAF/AITDs or EucliStar eGeeenies or Universal eGeeenies or eGeeenies.

(10) A still yet further object with achievable advantage of the present invention, inclusive of the present inventive device(s) is to greatly help millions of authorized customers and/or authorized users of numerous authorized correctly registered CCIRAF/AITDs or EucliStar eGeeenies or Universal eGeeenies or eGeeenies to have secured mobile provisions for electronically wirelessly placing a hold or holds to certain credit cards or debit cards of theirs, with accurate time-frames during sought out periods of future specific credit cards or debit cards inactivity or dormancy, and, also with the provision of wireless relevant electronic reactivations of the same respective credit cards or debit cards of theirs, at certain specified dates, correspondingly, according to the desired goals of the authorized customers/users, without closing the relevant credit cards or debit cards accounts with the correct corresponding legitimate banks and/or credit lending companies.

(11) A yet further object with achievable advantages of the present invention, inclusive of the present inventive device(s) is to be able to wirelessly freeze various personal and/or business checking and savings accounts during periods of desired inactivity, so as to prevent fraudulent use of the account(s). The present inventive device(s) will also be able to reactivate wirelessly the relevant personal and/or business frozen account(s) automatically or manually by the authorized registered customer/user at any future time or times chosen by the relevant correct authorized customer/user. These wireless privileges can be done wirelessly without closing the relevant personal and/or business checking and/or savings accounts, with GPS tagging, which contribute to the anti-fraud and anti-identity theft successful application of the present inventive devices.

(12) Another yet further object with achievable advantages of the present invention, inclusive of the present inventive device(s) is to provide some programmable instant-pre-reminder and instant-alert of any/or all changes and/or hikes in rates of credit card fees per transaction or per billing cycle, hikes or changes in late fee charges or other penalty fees and charges of percentage rates hikes and/or changes, including relevant dates, so as to allow the correctly registered authorized customers/users enough allowable favorable adjustment time and remedial activities to avoid being penalized by the above fees within some tolerable pre-agreed upon timely manner.

(13) And, still another object with achievable advantages of the present invention, inclusive of the present inventive device(s) is to provide to hundreds of millions of credit cards/debit cards authorized customers/users, worldwide, with the convenient integration of PIN and/or biometric security provisions, time-saving voice recognition interactive commands, audio-visual reminders, promptings and wireless pre-authorization bank payments alerts and instant messaging, transactional amount matching, multi-secured storage compatibility recording and tracking between hundreds of millions of individual authorized correctly registered customers/users of the CCIRAF/AITDs or eGeeenies or Universal eGeeenies or eGeeenies with the relevant secured databases of one or more different legitimate banks and lending institutions, convenient secured wireless electronic cash availability and expenses tracking and reporting, and real-time recording, storage and proofing of any and/or all telephonic, online internet orderings and point-of-sale transactions, reservations for car rentals, hotels and motels and flights, etc., as well as all other secured usage of card-present physical and/or virtual credit cards and virtual debit cards, and also most or all of card-not-present secured transactions.

(14) Yet, another object with achievable advantages of the present invention, inclusive of the present inventive device(s) is to provide to hundreds of millions of credit cards/debit cards authorized customers, worldwide, with instantaneous secured wireless recorded inter-card monetary transfers with relevant dates and, if desired or applicable, with accurate GPS location tagging for verifiable exact reviewable secured memory-storage, tracking and monitoring purposes.

(15) Still, another further object with achievable advantages of the present invention, inclusive of the present inventive device(s) is to be able to wirelessly effect instant-enquiries, reporting and management of itemized breakdown of either bills or monetary deposits and/or holds, and instant-response reporting and automatic secured wireless electronic reminders of the dates and exact amounts of release of each specific monetary holds and deposits charged or made by merchants, vendors and accommodation places, such as hotels and motels and other lodgings and booking reservations.

(16) Another further object with achievable advantages of the present invention, inclusive of the present inventive device(s) is to provide much convenience to hundreds of millions of authorized consumers or customers/users of instant-response secured wireless automated personal and/or business bank accounts balance enquiries, monitoring and reporting and recording with GPS tag(s), if desired or applicable.

(17) And, still another object with achievable advantages of the present invention, inclusive of the present inventive device(s) is to have provisions for secured wireless instant-response alerts and reminders of when direct bank deposits are made in real time, pertaining to specific checks and salaries, social security benefits, income tax refunds, and/or other relevant monetary rewards or bonuses, with the exact amounts and/or benefits, including the relevant dates and times of availability for effective personal or business uses.

(18) A still further object with achievable advantages of the present invention, inclusive of the present inventive device is to provide wireless secured real-time international currency conversion with accurate GPS tag(s) where monetary exchanges and/or conversions are done, possibly recorded in the memory of the respective authorized correct registered CCIRAF/AITD or EucliStar eGeeenie or Universal eGeeenie or eGeeenie.

(19) Still, another object with achievable advantages of the present invention, inclusive of the present inventive device(s) is to be able to provide secured wireless image and information anti-forgery e-banking reference and authenticating means for protection of written personal and/or business cheques (checks) to prevent numerous cheques (checks) frauds and unauthorized check alterations.

(20) Another yet further object with achievable advantages of the present invention, inclusive of the present inventive device(s) is to provide much conveniences to hundreds of millions of authorized consumers or customers/users around the world, with a dedicated multi-functional integration of both cellular and/or satellite phone and internet capabilities, with the versatility of the CCIRAF/AITDs or EucliStar eGeeenies or Universal eGeeenies or eGeeenies, while also affording some portable electronic mobile secured wireless, multi-media educational enhancement aid, tools and activities, electronic entertainments, as well as appointment scheduling, self-improvement motivators, fast efficient timely multi-tasking aid in personal and financial managements, messaging and transmissions of secured personal and business data/information files, altogether, carried in one trendy, user-friendly handheld mobile secured wireless device.

(21) Yet, a further additional object with achievable advantages of the present invention, inclusive of the present inventive device(s) is to have provisions for correct information of geo-positional locations and automated coordinated names of places with dates where business and personal transactions are made, and where photos or videos are taken, where e-mailed messages are or have been received, and reminders as to when and from whom and from where expected e-mails are to be received, involving the authorized customers/users, and, also regarding definite times and dates, and where and when certain places are visited for accurate evidence and/or souvenir purposes.

(22) And, another additional object with achievable advantages of the present invention, inclusive of the present inventive device(s) (in some embodiments) is to integrate a built-in Near Field Communication (NFC) component and system with the corresponding individual authorized correctly registered CCIRAF/AITD or EucliStar eGeeenie or Universal eGeeenie or eGeeenies for fast and effective non-contact payment(s) with secured data/information transmissions and transactions with many other compatible Near-Field Communication (NFC)-enabled devices with recordable and retrievable GPS location tagging.

(23) And yet another object with achievable advantages of the present invention, inclusive of the present inventive devices or CCIRAF/AITD or EucliStar eGeeenie or Universal eGeeenie or eGeeenie is to be able to securely manage control of remotely locking and unlocking the car door(s) and remotely deactivating and pre-reactivating the ignition system of the cars of the respective authorized registered customers or authorized users of the present inventive devices, during valet parkings at hotels, motels and other places where valet parking services are offered, so as to prevent unauthorized entries and operations of their respective cars or vehicles.

(24) Another yet further object with achievable advantages of the present invention, inclusive of the present inventive device(s) is to provide certain instant-response convenient audio-visual language translations to millions of authorized customers and/or users of CCIRAF/AITDs or EucliStar eGeeenies or Universal eGeeenies or eGeeenie when traveling to different parts of the world, or when talking with specific foreigners to achieve faster and better understandable inter-lingual communications and establish better personal relations.

(25) Still another further object with achievable advantages of the present invention, inclusive of the present inventive devices or CCIRAF/AITDs or EucliStar eGeeenies or Universal eGeeenies or eGeeenie is to be able to transmit and receive convertible 2D images of still photos and/or videos into 3D images, so that the transmitters and recipients of these images, including the general authorized customers/users of the CCIRAF/AITDs or EucliStar eGeeenies or Universal eGeeenies or eGeeenie(s), as well as legitimate law enforcements agencies, immigration, airport/aircraft security and other travel safety organizations (but not limited to those) can use such technological 2D and 3D applications to be of greater boost in the furtherance of better effectiveness in the fight against worldwide fraud and identity thefts by achieving more broader and higher 3D definitions and clarity relevant to the accurate true-personal identity verifications with relevant correct membership cards and identity cards and credit/debit cards (physical and/or virtual) of authorized registered customers/users in better delineating them against fraudulent impersonators, thieves and other criminals. Also, in multi-media applications of such 2D and 3D technological advancements, the customers/users can also have the conveniences of choices to enjoy sending and watching the 3D visual images and effects, especially with video games, movies or specially made or originally made photos or videos shoots.

(26) And, a further object with achievable advantages of the present invention, inclusive of the present inventive device(s) or CCIRAF/AITD(s) or EucliStar eGeeenie(s) or Universal eGeeenie(s) or eGeeenie(s) is to provide to the authorized correctly registered customers/users of the present inventive device(s) with the capabilities of helping them with the secured noting, writing, vocal recording organization, storage and review of their individual educational/research and invention and writing activities, including the secured wireless transmission of encrypted data/information to their respective colleagues, friends, associates and other relevant persons, authorities or agencies or organizations for more secured and efficient ways and means of achieving their goals with timely reminders of important things to do and be motivated with.

(27) Another additional object with achievable advantages of the present invention, inclusive of the present inventive device(s) is to be able to download any publication (books, magazines, newspapers, etc.) in any language, for education, research, entertainment, cultural, artistic, scientific, etc. purposes. The authorized registered customer/user will also be able to publish their own works through their registered CCIRAF/AITD or EucliStar eGeeenie or Universal eGeeenie or eGeeenie and transmit their works to other devices. The authorized registered customer/user will also be able to audio-visually edit, interact, compose, draw graphical illustrations and include vocal recordings for storage, tagging, and transmission.

(28) Another yet further object with achievable advantages of the present invention, inclusive of the present inventive device(s) is to be able to provide a USB connection slot and micro/SD cards interface in the CCIRAF/AITDs or EucliStar eGeeenies or Universal eGeeenies or eGeeenie, in order to enable the authorized customers/users the ability to conveniently and securely copy or transfer certain personal or business financial or monetary transactions and/or other relevant activities, using regular secured convenient "Flash Drives" or "Jump Drives" and/or micro/SD cards, into other secured electronic storage systems or devices and/or for safe printing of hard copy papers as evidences, in case of law suits or legal and/or other financial requirements needed by the respective authorized customers/users, in any part of the world.

(29) Another additional object with achievable advantages of the present invention, inclusive of the present inventive device(s) is to be able to provide for certain convenient secured wireless mobile recordable, editable, recallable and updatable provisions for shopping lists of items to be bought, as well as items being bought, and items having been bought or service items, according to specific dates and times, distinguishing the items already paid for and items yet to be paid, or a combination of both.

(30) And still, a further object with achievable advantages of the present invention, inclusive of the present inventive device(s) is to provide to hundreds of millions of authorized customers or authorized users of the present invention, inclusive of the present inventive device(s) with certain vital capabilities of integrating with each individual respective correctly registered CCIRAF/AITD or EucliStar eGeeenie or Universal eGeeenie or eGeeenie for wireless more secured storage and transmission of most and/or all of vital personal health and medical records, personality profiles, insurances, home mortgages, rentals, and pictorial and audio-video clips recordings, and the likes of family members, close relatives, associates and/or friends for secured accurate true-personal identity purposes, in cases of any and/or most kinds of emergencies or loss of physical contacts due to unforeseen relevant personal disappearances, mishaps, calamities and searches.

(31) A still further object with achievable advantages of the present invention, inclusive of the present inventive devices is to provide a wireless inter-linkage of the CCIRAF/AITD or EucliStar eGeeenie or Universal eGeeenie or eGeeenie with an anti-loss forgetless alarm reminder wrist watch or GreeetWatz (not included in this present patent specification, but belongs to, described and contained in another separate patent application(s)). This synchronization of the devices will prevent any loss by omission of the present inventive devices, as one or several alarm(s) and messages will alert the authorized registered customer/user of the respective registered CCIRAF/AITD or EucliStar eGeeenie or Universal eGeeenie or eGeeenie when he/she is separated from his/her present inventive device past a pre-programmed distance(s).

(32) Another object with achievable advantages of the present invention, inclusive of the present inventive device or CCIRAF/AITD or EucliStar eGeeenie or Universal eGeeenie or eGeeenie is to be able to transmit, receive and store instantly certain preventative messages and alerts to school official and deter potential offenders to prevent and/or minimize the problems in school bullying.

(33) A yet another further object with achievable advantages of the present invention, inclusive of the present inventive device(s) or CCIRAF/AITD(s) or EucliStar eGeeenie(s) or Universal eGeeenie(s) or eGeeenie(s) is to provide for the wider uses in the military for instant personnel identification (with secret codes) during active battles, especially in the frontlines wherein the possibility of random mix-up or scattering of soldiers and commanders can happen day or night, so as to enable the instant secret recognition of the true-personnel military identities and ranks and assigned units or battalions or divisions, and so on, as to distinguish whether some soldiers or officers nearby are friends, allies or foes; if friends or allies to give instant secret orders for rendezvous points; if foe to provide evasive maneuvers or guidance in tactical confrontations and timing; or in case of emergency situations or disasters, to provide the best routes and advices for civilians and/or military and/or law enforcement personnel with real-time guidance toward safety, security and coherent effectiveness with coded rescue assignments.

(34) Still, an additional object with achievable advantages of the present invention, inclusive of the present inventive device(s) or CCIRAF/AITD(s) or EucliStar eGeeenie(s) or Universal eGeeenie(s) or eGeeenie(s) is to provide safety guidance to children, teens, adults and the elderly and the responsible trusted person or persons, relevant agency or organization with a multi-party instant security check and advices to prevent them from being lost or kidnapped by intruding criminals or rapists, on a local, state, national and global basis, using the GPS location tagging system as allied or linked to the respective properly registered CCIRAF/AITDs of EucliStar eGeeenies or Universal eGeeenies or eGeeenies.

(35) Another yet further object with achievable advantages of the present invention, inclusive of the present inventive device(s) is to be able to provide some functions and capabilities allowing the authorized registered customer/user to take, tag and store pictures of important objects or items or documents for quick recovery of such things. This is achieved through the present inventive device's capabilities of taking digital photos of properties, important documents (such as diplomas, loans papers, important receipts, birth and marriage certificates, passport, business cards, etc.) for pertinent organized filings in the memory of respective present inventive devices. The resulting digital pictures can be tagged with specific dates and times and locations through the built-in integrated GPS feature, as well as with the relevant vocal recording and vocal command recall made by the relevant person, which are necessary for future or later fast retrieval and/or backups of these references.

(36) And yet, another further object with achievable advantages of the present invention, inclusive of the present inventive device(s) is to have provisions and program applications with coded protections in the correct registered CCIRAF/AITD or EucliStar eGeeenie or Universal eGeeenie or eGeeenie, for fast retrievals and LCD display of genuine stored photos or videos of important stored personal and business profiles and activities, memberships and other important documents, in order to instantly and favorably prove the respective authorized customer's or user's authenticated real existence with true-personal identity verification, against any identity thieves and impersonators, in cases of some legitimate special investigative inquiries or litigations. This is achieved by voice command or touch screen command to extract from the respective registered CCIRAFT/AITD's digital memory and display on its interactive LCD those relevant documentable proofs of innocence, that may have GPS and date tags. The projections of the required item proofs can be projected via its built-in integrated NFC to a compatible NFC-enabled device capable of projecting larger images of the same in large-screen LCD or Plasma monitors.

(37) Yet, another object of the present invention, inclusive of the present device(s) or CCIRAF/AITD or EucliStar eGeeenie is to provide some effective faster, more convenient and accurate methods, systems and devices of enabling broader, coordinative and coherent instant-recognition and instant-response capabilities to authorized airport and aircraft agents and travelers in quickly verifying and authenticating the true-personal identities of each passengers and/or agents and/or employees in conjunction to their authorized and authentic presence in specific airport(s), and, in case of airline passengers, associating them correctly with their corresponding flight tickets and possibly accompanying luggage, in order to prevent airport and aircraft mishaps, and for the attainment of better and tighter safety and security monitoring, thus effectively preventing and/or thwarting potential aircraft and airport risks and dangers in favor of the general safety of the passengers and innocent civilians, and all aircraft flight crew members including the pilots; these, therefore, are also part of the anti-fraud and anti-identity theft with true-personal identity provisions of the present invention, inclusive of the present inventive device(s), which can also be applied not only to airports, but also to other mass transit systems, and also can be applied (according to the required program applications) to attain faster and safer monitoring, reporting and facilitating the detection of potential criminals when entering hotels, and security areas for the general safety of innocent people, and the prevention of potential criminal destructions of buildings and/or important facilities and other public or private places or sectors.

(38) Yet, a further additional object with achievable advantages of the present invention, inclusive of the present inventive device(s) is to take digital pictures of travel and identification documents and render them on the present inventive device's LCD screen. Thus all the information/data from boarding passes, passport, driver's license, etc. can be retrieved at once by the authorized registered customer/user and be presented to airport/aircraft security, border security agencies, customs officers, immigration agencies, etc. for security clearance and safe travel or entry/re-entry into a country through land, sea and air. The Near-Field Communication (NFC) component and system of the CCIRAF/AITD or EucliStar eGeeenie or Universal eGeeenie or eGeeenie can be used to project the pictures of the relevant documents onto an NFC-enabled monitor or device at these various locations for clearer visibility.

(39) And still, another yet further object with achievable advantages of the present invention, inclusive of the present inventive device(s) is to provide for faster, much greater and vastly wider and effectively coherent automated instant-response anti-identity theft detections, protections and security to hundreds of millions of future registered customers and/or users of millions of registered CCIRAF/AITDs or the EucliStar eGeeenies or Universal eGeeenies or eGeeenie, worldwide, with certain distinctive instant-alarms (audio or visual or a combination of both) for instant-response interactivity with manual or interactive touch-screen and/or voice commands and response capabilities, through the handy, mobile and secured wireless uses of their properly registered CCIRAF/AITD(s) or EucliStar eGeeenie(s) or Universal eGeeenie(s) or eGeeenie(s), whenever the respective authorized customer's and/or authorized user's name, identity data/information, features, profiles, social security identification number, addresses, phone numbers, written notes, mails and e-mails communications, work history, educational and/or any other relevant organizational affiliations, insurances, mortgages, driver's license, residence or vehicle registrations, rentals, ship/flight/land transport reservations, travel itineraries, hotels, motels, cruise ships and other accommodation bookings, and, other financial transactions, researches, inclusive of any/or all other secured wireless and wired internet contacts, and other sensitive data of relevant personal activities, are detected as being used without their respective knowledge and/or consent, which may possibly indicate suspicious fraudulent and/or identity thefts and privacy intrusions that can victimized them with some or a multitude of dangerous unlawful commitments and/or involvements, with which they may be held liable and responsible for, and, of which cases they are, in reality, truly innocent; each properly registered respective CCIRAF/AITD or EucliStar eGeeenie or Universal eGeeenie or eGeeenie can, thereby, be very important evidences for effective defensive proof of innocence on their part, because any/or all of such detected illegal unauthorized identity-privacy intrusions and unauthorized usage of their own aforementioned personal and/or business data, etc. can be automatically and instantly reported and recorded and replayed when actively linked (as a requirement in the near future) to their respective or correspondingly registered CCIRAF/AITD or EucliStar eGeeenie or Universal eGeeenie or eGeeenie, in such securely monitored association of broad-based, legal inter-linked global anti-fraud/anti-identity theft detection and control search engine, such as, but not limited to the present inventor's proposed new specialized comprehensive "EucliStar Global Instant-Response Anti-Fraud/Anti-Identity Theft Detection and Control Search Engine" (which is merely mentioned here, but covered in its entirety in another patent application and specification).

The extensive indispensable features, capabilities and functions of the present invention, inclusive of the present device(s) or CCIRAF/AITD(s) or EucliStar eGeeenie(s) or Universal eGeeenie(s) or eGeeenie(s) will definitely protect the safety, security and integrity of hundreds of millions of future authorized customers and authorized users of inventive device(s), numerous legitimate banks and lending companies, millions of merchants and vendors, and government and private insurance companies, schools and other legitimate agencies, thereby preventing, stopping, thwarting and curtailing any intruding fraudulent criminals and identity thieves and offensive persons from victimizing them. The uses of millions of CCIRAF/AITDs or EucliStar eGeeenies or Universal eGeeenies or eGeeenies will also be of great benefits to most military and law enforcements operations around the world.

Other further additional objects and achievable advantages of the present invention, inclusive of the present inventive device(s) or CCIRAF/AITD or EucliStar eGeeenie(s) or Universal eGeeenie(s) or eGeeenie(s) will be clarified and will become apparent in the detailed descriptions and explanations, allied with the various illustrative figure drawings, and labeled parts, (but not limiting in scope, designs and applications) to the illustrated embodiments, functions and features) included in the following:

BRIEF DESCRIPTIONS AND EXPLANATIONS OF VARIOUS ILLUSTRATIVE FIGURE DRAWINGS AND REPRESENTATIONS

FIG. 1 is the frontal face view of one first embodiment of the CCIRAF/AITD or EucliStar eGeeenie or Universal eGeeenie or eGeeenie, which is equivalent or the same as the Customer-Controlled Instant-Response Anti-Fraud/Anti Identity Theft Device(s) (with true-personal identity verification), integrated with cellular and/or satellite mobile phone/internet applications capabilities and features, but without a built-in Near-Field Communications (NFC) component.

FIG. 2 is the left side view of the same first embodiment of FIG. 1.

FIG. 3 is the right side view of the same first embodiment of FIG. 1.

FIG. 4 is the top view of the same first embodiment of FIG. 1.

FIG. 5 is the bottom view of the same first embodiment of FIG. 1.

Figure 6B:
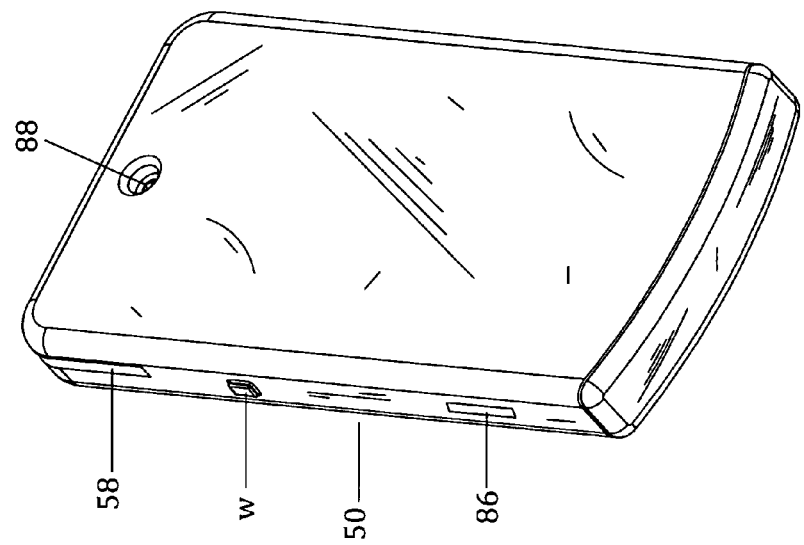
Figure 6A:
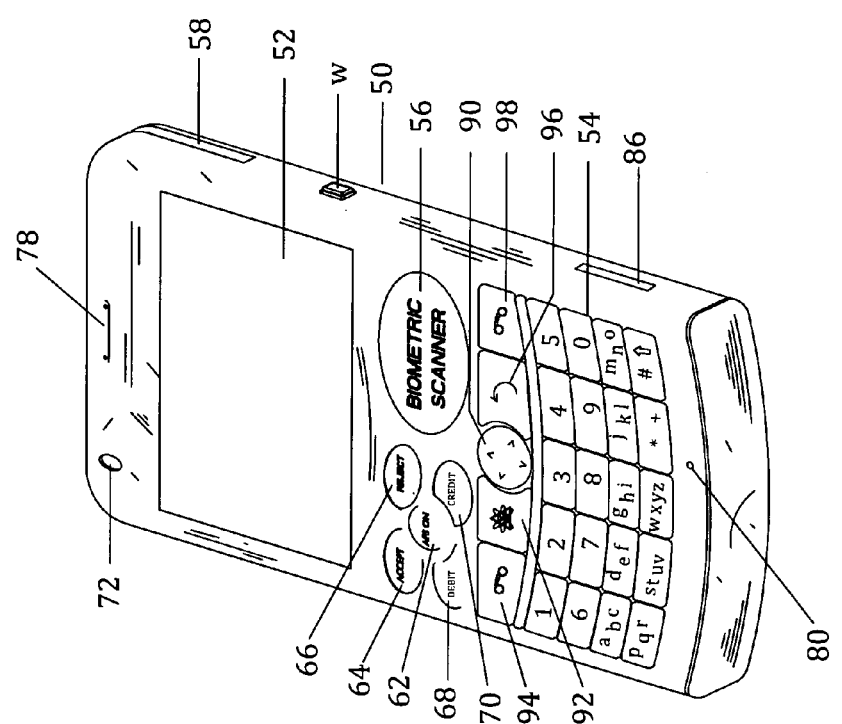

FIG. 6A is a perspective view of the same first embodiment of FIG. 1 of the CIRAF/AITD or Customer-Controlled Instant-Response Anti-Fraud/Anti-Identity Theft Device(s) (with true-personal identity verification) or CCIRAF/AITD or EucliStar eGeeenie or Universal eGeeenie or eGeeenie, integrated with cellular and/or satellite mobile phone and Internet applications capabilities and features; the perspective view illustrates as favoring the frontal face view illustrated in FIG. 1, and, also showing partially the left side view illustrated in FIG. 2, and, also showing partially the bottom view shown in FIG. 5 of the same first embodiment of FIG. 1.

FIG. 6B is a perspective back view of the same first embodiment of FIG. 1 of the CCIRAF/AITD or Customer-Controlled Instant-Response Anti-Fraud/Anti-Identity Theft Device (with true-personal identity verification) or EucliStar eGeeenie or Universal eGeeenie or eGeeenie, integrated with cellular and/or satellite mobile phone and internet applications capabilities and features, showing the back view of the same first embodiment of FIG. 1, and showing partially the left side view illustrated in FIG. 2 and, also showing partially the bottom view illustrated in FIG. 5.

Figure 7:
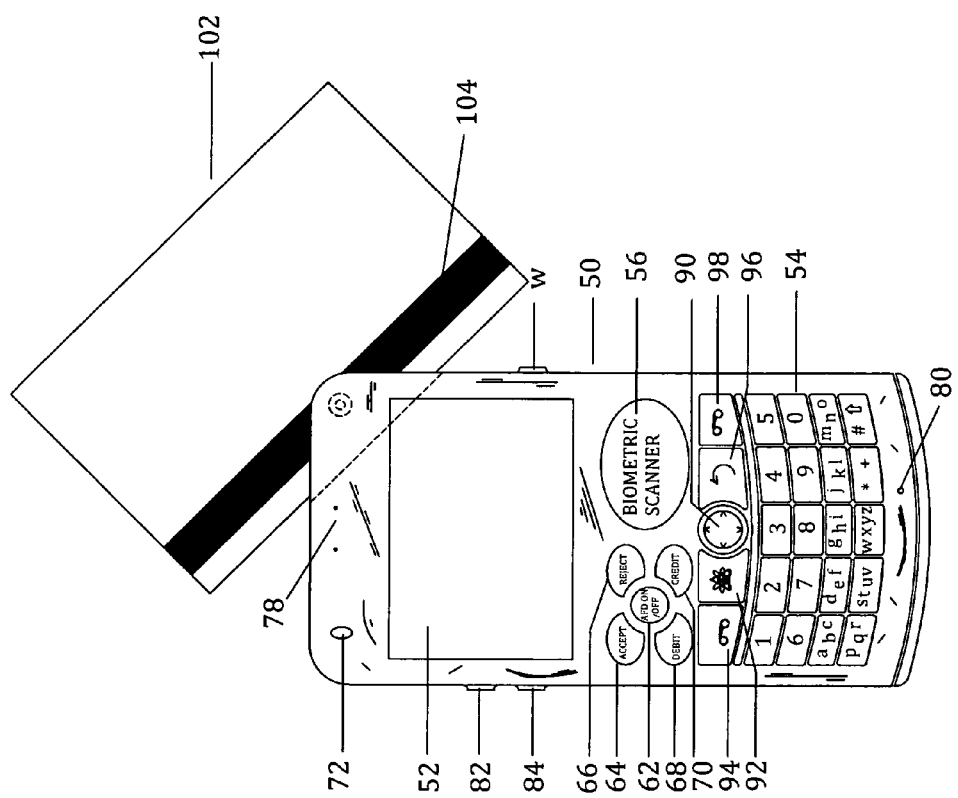

FIG. 7 is a simplified illustrative representation of a physical credit/debit card being swiped through the swiping slot of the same first embodiment of the Customer-Controlled Instant-Response Anti-Fraud/Anti-Identity Theft Device (with true-personal identity verification) or CCIRAF/AITD or EucliStar eGeeenie or Universal eGeeenie or eGeeenie, with cellular and/or satellite mobile phone and Internet applications capabilities and features; the first embodiment illustrated in FIG. 1.

Figure 8:
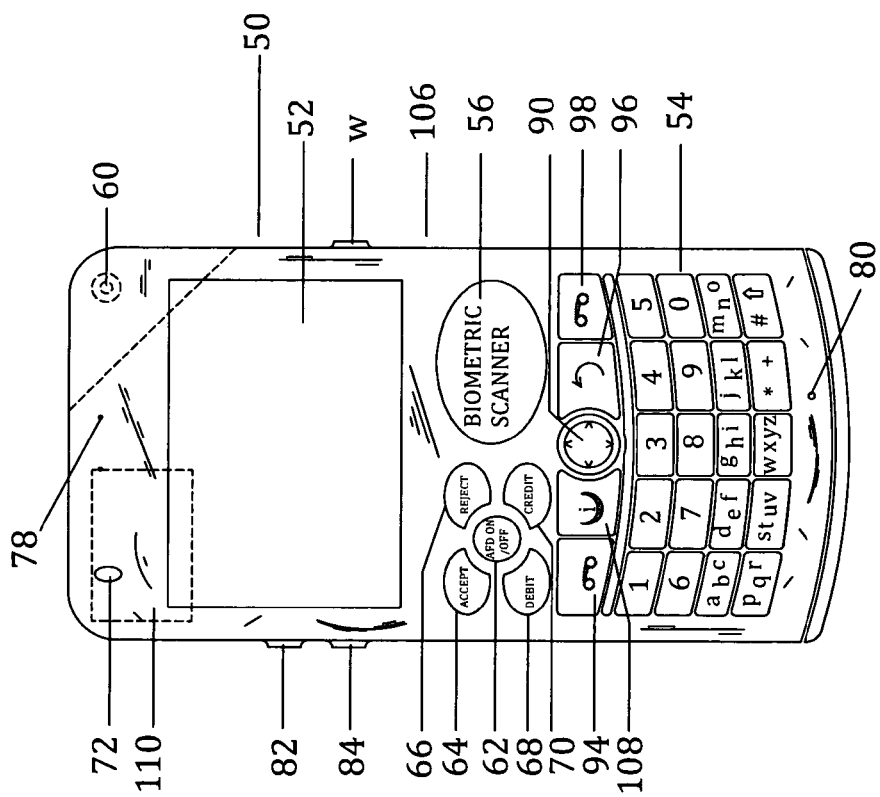

FIG. 8 illustrates a second embodiment of the Customer-Controlled Instant-Response Anti-Fraud/Anti-Identity Theft Device (with true-personal identity verification) or CCIRAF/AITD or EucliStar eGeeenie or Universal eGeeenie or eGeeenie), with cellular and/or satellite mobile phone and internet applications capabilities and features, integrated with the additional features and capabilities of a built-in integrated Near Field Communication (NFC) system and component included therein.

FIG. 9 illustrates a frontal orthographic view of a third embodiment of the CCIRAF/AITD or EucliStar eGeeenie or Universal eGeeenie or eGeeenie, without a built-in Near-Field Communication (NFC) component and system, and without a front camera, but with a back camera (not shown). At the front face showing a display for making a secured transaction using an LCD-projected display of a virtual bank card with a corresponding LCD-projected display of a virtual bar code representing the virtual bank card, and, also showing an LCD display of a virtual ID card of the authorized customer or authorized user with its corresponding LCD-projected display of a bar code representing the virtual ID of the authorized customer or authorized user, and integrated with cellular and/or satellite mobile phone/internet applications capabilities and features.

FIG. 9A illustrates a frontal orthographic view of a fourth embodiment of the CCIRAF/AITD or EucliStar eGeeenie or Universal eGeeenie or eGeeenie, with a built-in integrated Near-Field Communication (NFC) system and component, without a front camera, but with a back camera (not shown), and activation switching button w for selectively displaying either 2D or 3D LCD displays, and also showing a thermo charger activation button represented by letter y and at the front face showing a display for making a secured transaction using an LCD-projected display of a virtual bank card with a corresponding LCD-projected display of a virtual bar code representing the virtual bank card, and, also showing an LCD display of a virtual ID card of the authorized customer or authorized user with its corresponding LCD-projected display of a bar code representing the virtual ID of the authorized customer or authorized user, and integrated with cellular and/or satellite mobile phone/internet applications capabilities and features.

FIG. 9B illustrates the left side view of the fourth embodiment of the CCIRAF/AITD or EucliStar eGeeenie or Universal eGeeenie or eGeeenie.

FIG. 9C illustrates the right side view of the fourth embodiment of the CCIRAF/AITD or EucliStar eGeeenie or Universal eGeeenie or eGeeenie.

FIG. 9D illustrates the top view of the fourth embodiment of the CCIRAF/AITD or EucliStar eGeeenie or Universal eGeeenie or eGeeenie.

FIG. 9E illustrates the bottom view of the fourth embodiment of the CCIRAF/AITD or EucliStar eGeeenie or Universal eGeeenie or eGeeenie.

FIG. 9F illustrates the back view of the third and/or fourth embodiments of the CCIRAF/AITD or EucliStar eGeeenie or Universal eGeeenie or eGeeenie, showing a solar panel x and a back camera 88.

FIGS. 10A and 10B illustrate the perspective views of the third and/or fourth embodiments of the CCIRAF/AITD or EucliStar eGeeenie or Universal eGeeenie, which has the capability for making a transaction using an LCD-projected virtual bank card with a corresponding LCD-projected display of a bar code representing the virtual bank card, and also with an LCD-projected display of a virtual ID card of the authorized customer or authorized user with a corresponding LCD-projected bar code representing the virtual ID card of the authorized customer or authorized user, and, integrated with the cellular and/or satellite mobile phone/internet applications capabilities and features.

In FIG. 10A, the thermo charger activation button is represented by letter y.

In FIG. 10B, letter w represents a 2D/3D activation switching button for selectively displaying either 2D or 3D LCD displays.

Figure 11:
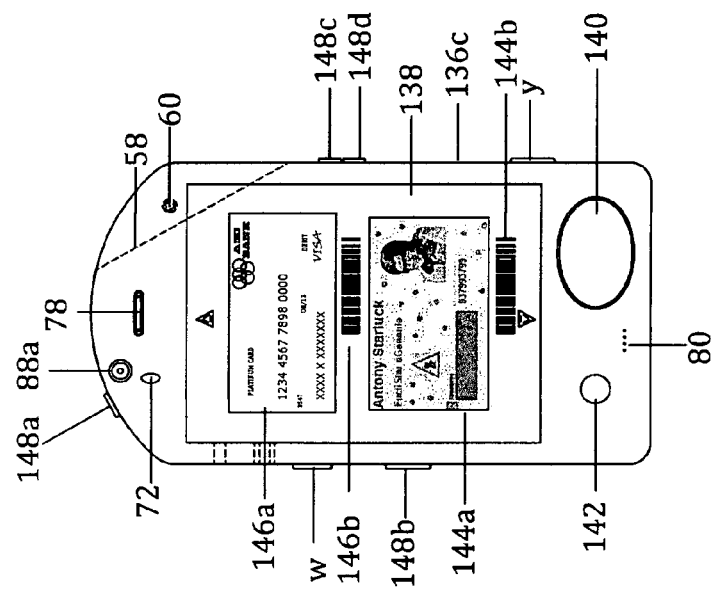

FIG. 11 illustrates the fifth embodiment of the CCIRAF/AITD or EucliStar eGeeenie or Universal eGeeenie or eGeeenie with a front camera 88*a*, with no built-in integrated NFC, and equipped with solar panel (not shown), and with thermo charger activation button represented by letter y, and also equipped with a 2D/3D activation switching button represented by letter w, which is for selectively displaying either 2D or 3D LCD displays. Also illustrates the capability for making a transaction using an LCD-projected virtual bank card with a corresponding LCD-projected display of a bar code representing the virtual bank card, and also with an LCD-projected display of a virtual ID card of the authorized customer or authorized user with a corresponding LCD-projected bar code representing the virtual ID card of the authorized customer or authorized user, and, integrated with the cellular and/or satellite mobile phone/internet applications capabilities and features.

Figure 11B:
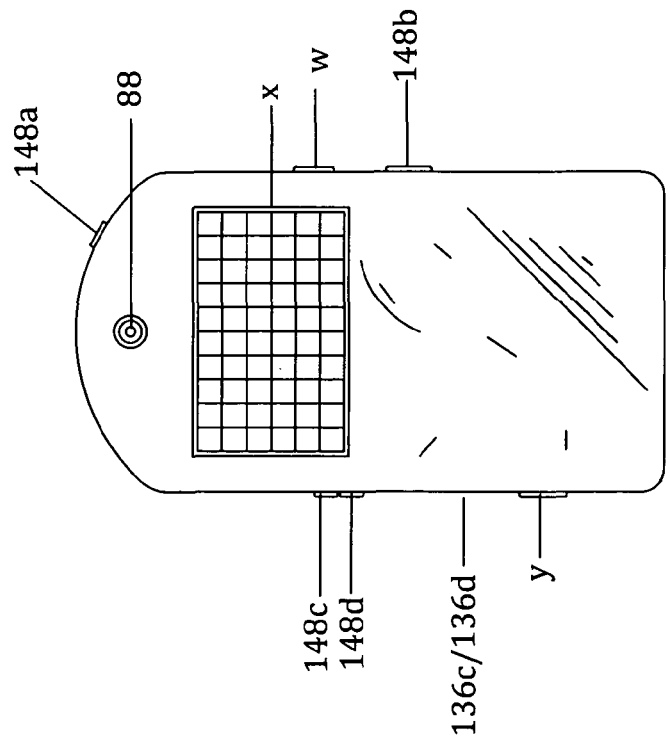
Figure 11A:
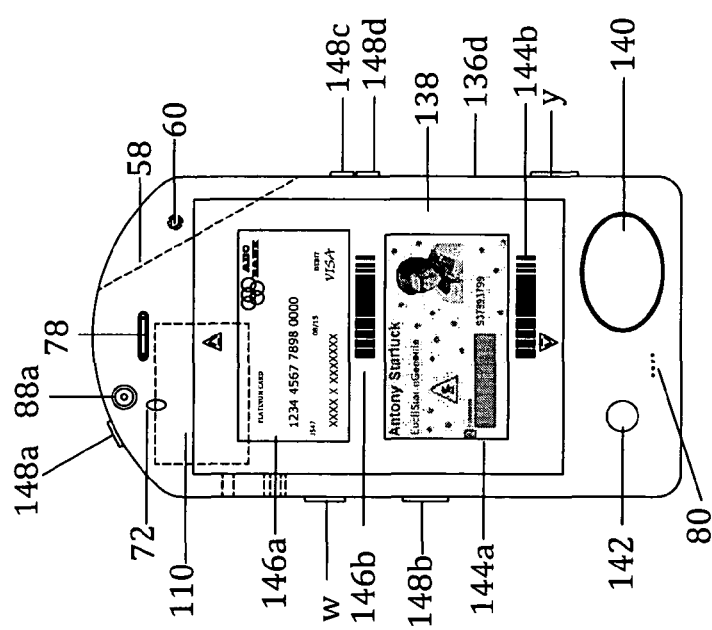

FIG. 11A illustrates the frontal orthographic view of the sixth embodiment of the CCIRAF/AITD or EucliStar eGeeenie or Universal eGeeenie or eGeeenie, equipped with a front camera 88*a*, and equipped with a Near-Field Communication (NFC) system and component 110. (A back camera 88 and solar panel represented by letter x, and equipped with thermo charger activation button represented by letter y, and, also equipped with a 2D/3D activation switching button represented by letter w (which is for selectively displaying either 2D or 3D LCD displays) are also shown in FIG. 11B. It also illustrates the capability for making a transaction using an LCD-projected virtual bank card with a corresponding LCD-projected display of a bar code representing the virtual bank card, and also with an LCD-projected display of a virtual ID card of the authorized customer or authorized user with a corresponding LCD-projected bar code representing the virtual ID card of the authorized customer or authorized user, and, integrated with the cellular and/or satellite mobile phone/internet applications capabilities and features.

FIG. 11B illustrates the back view of the fifth and sixth embodiments of the CCIRAF/ATD or EucliStar eGeeenie or Universal eGeeenie or eGeeenie, showing the back camera, the solar panel X and the thermo charger activation button represented by letter y, and a 2D/3D activation switching button represented by letter w (which is for selectively displaying either 2D or 3D LCD displays).

FIG. 11C illustrates the perspective view, (favoring the combination of partial frontal, partial bottom and partial left side views) of the fifth and sixth embodiments of the CCIRAF/AITD or EucliStar eGeeenie or Universal eGeeenie or eGeeenie, and which also illustrates its capability for making a transaction with an LCD-projected virtual bank card with a corresponding LCD-projected display of a bar code representing the virtual bank card, and, also with an LCD-projected display of a virtual ID card of the authorized customer or authorized user with a corresponding LCD-projected bar code representing the virtual ID card of the authorized customer or authorized user, and, integrated with the cellular and/or satellite mobile phone/internet applications capabilities and features. The front camera 88a, the thermo sensor activation button represented by letter y, are also shown.

FIG. 11D illustrates the perspective view (favoring the combination of partial back, partial bottom and partial left side views) of the fifth and sixth embodiments of the CCIRAF/AITD or EucliStar eGeeenie or Universal eGeeenie or eGeeenie, showing the back camera 88, the solar panel represented by letter x, the thermo charger activation button represented by letter y.

Figure 12:
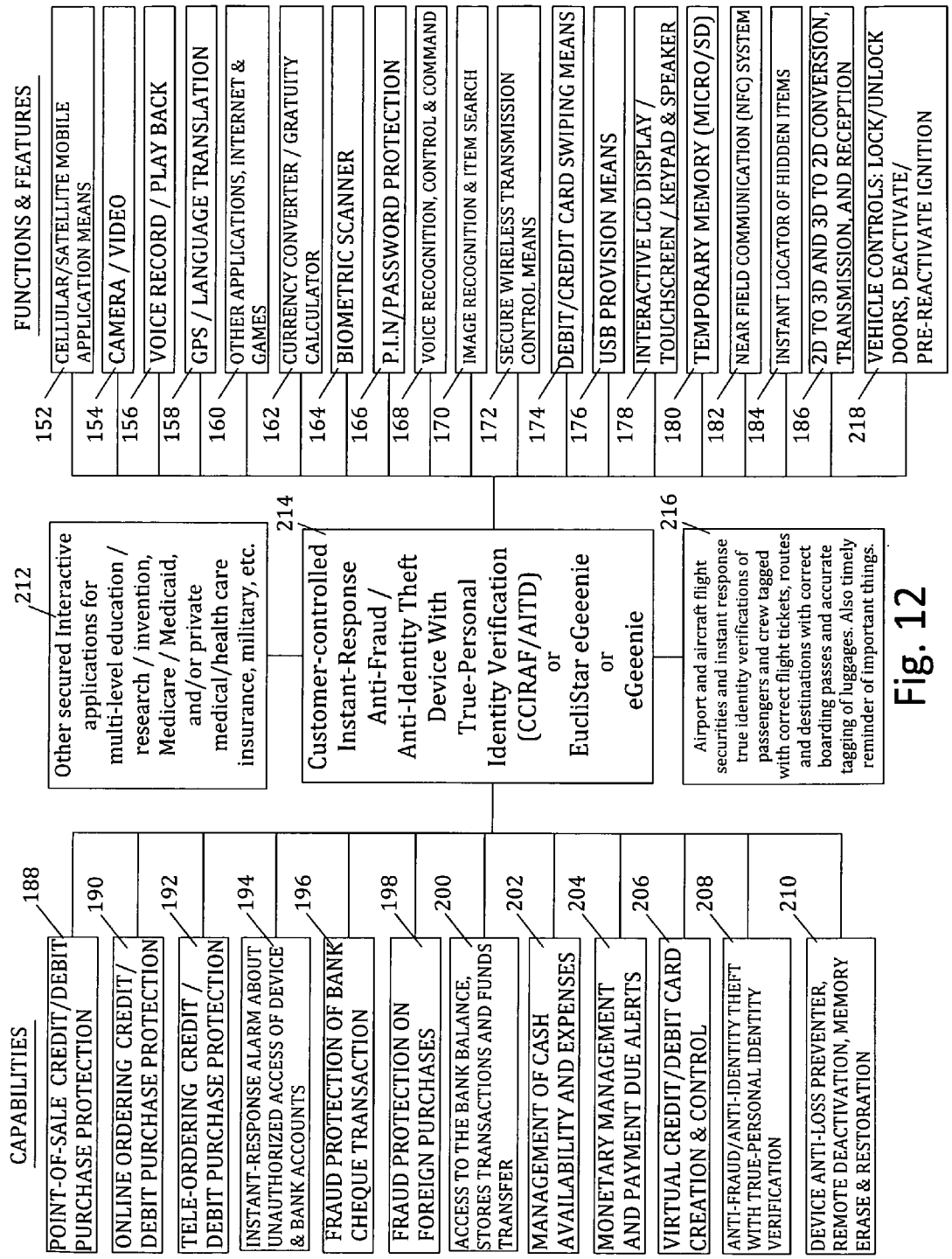

FIG. 12 is a basic (but not limiting) block diagram representing some (but not limiting) functions, features and capabilities of the Customer-Controlled Instant-Response Anti-Fraud/Anti-Identity Theft Device (with true-personal identity verification) or CCIRAF/AITD or EucliStar eGeeenie or Universal eGeeenie or eGeeenie.

Figure 13:
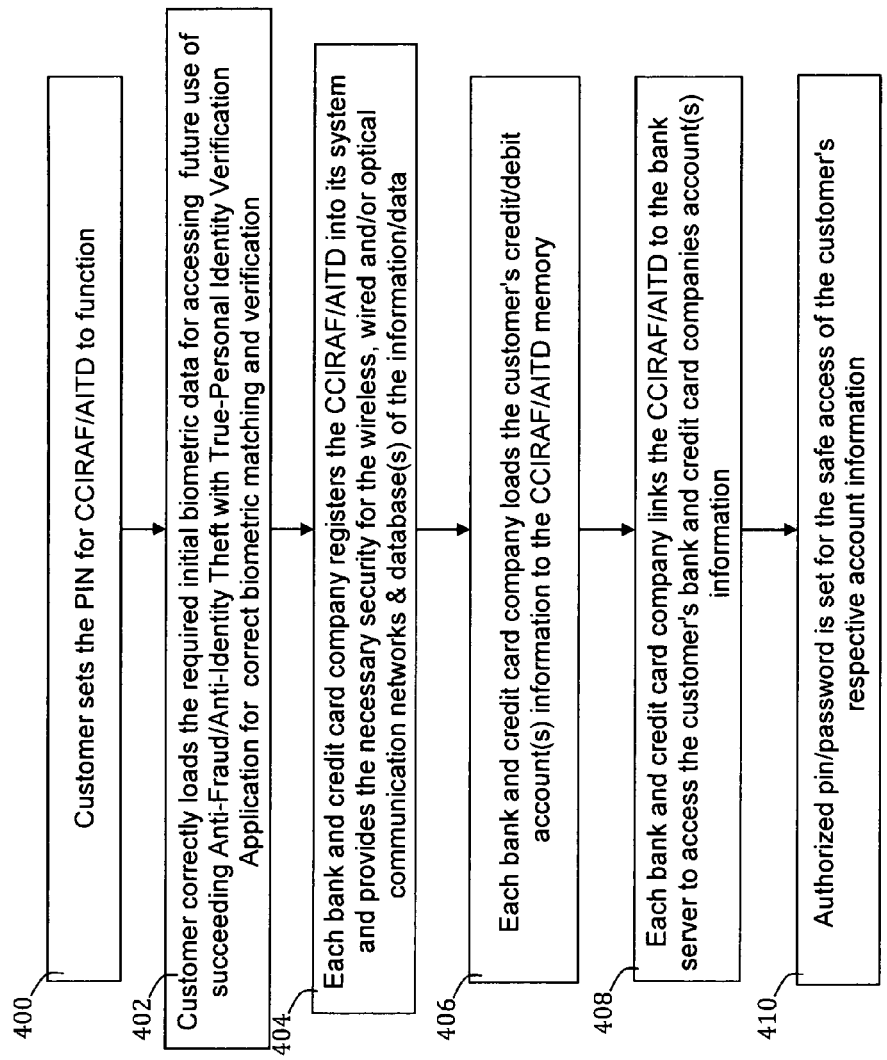

FIG. 13 represents a flow diagram for the preparation phase (before further anti-fraud and anti-identity theft with true-personal verification protective functional use) of the Customer-Controlled Instant-Response Anti-Fraud/Anti-Identity Theft Device (with true-personal identity verification) or CCIRAF/AITD or EucliStar eGeeenie or Universal eGeeenie or eGeeenie for applications for personal and/or business e-banking and e-commerce secured operations.

Figure 14:
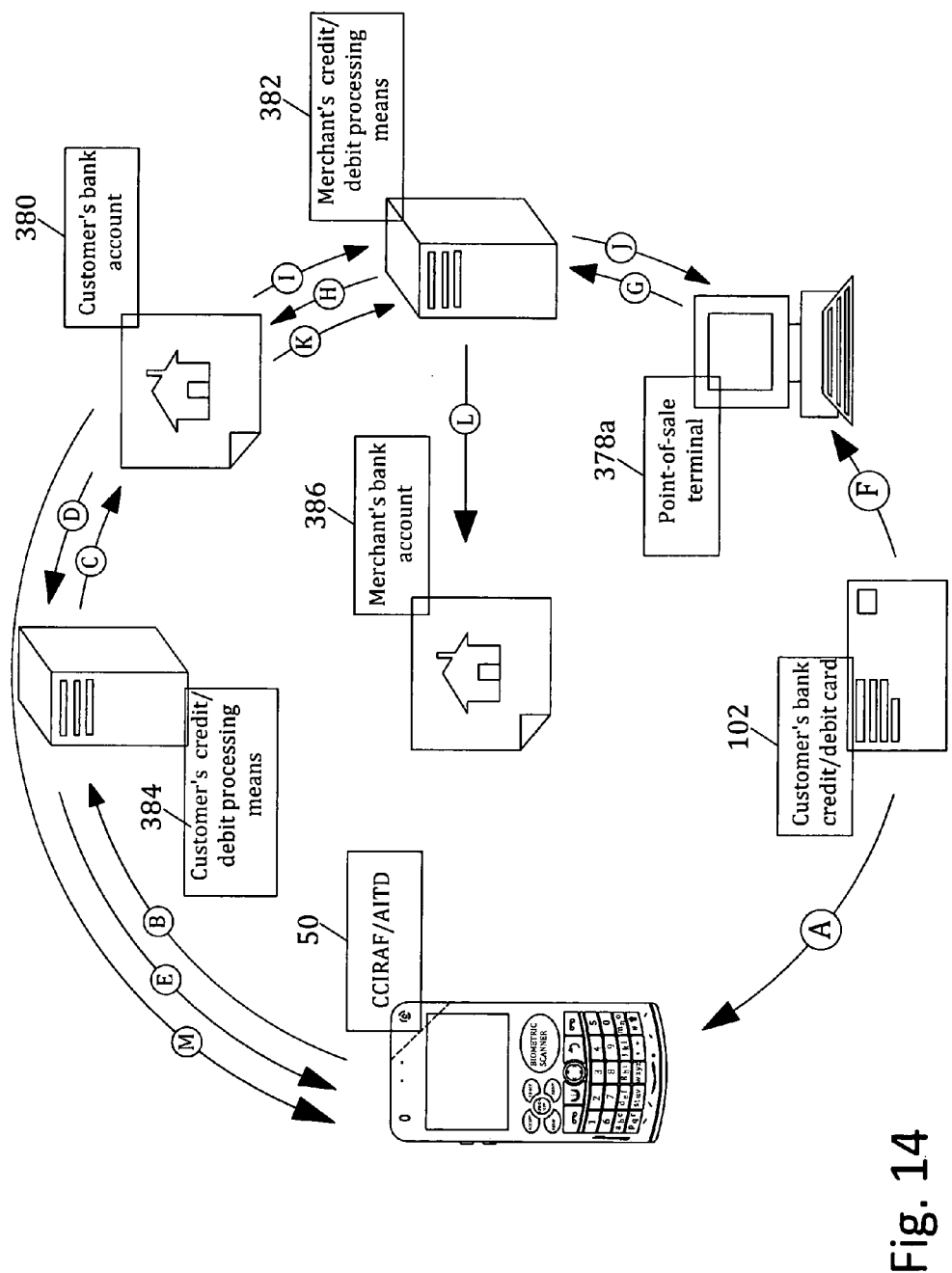

FIG. 14 is a simplified diagrammatic representation of a sample relevant generalized data flow sequence of steps during purchasing at a merchant's point-of-sale (POS) terminal, showing the interactive activities, linking the authorized customer and/or authorized user of the CCIRAF/AFTD or EucliStar eGeeenie or Universal eGeeenie or eGeeenie, and, activating the secured transmission of encrypted data/information between the CCIRAF/AITD or EucliStar eGeeenie or Universal eGeeenie or eGeeenie, and the particular physical credit/debit card to and from the authorized customer's or authorized user's respective specific bank account, for processing a specific transaction that will result in an anti-fraud/anti-identity-theft with true-personal identity verification transaction with the respective relevant processing means for achieving correct identification, authentication, validation and settlement for the exact respective specific monetary funds transfers from the customer's and/or authorized user's specific bank account to the respective specific merchant's bank.

Any other unauthorized or fraudulent transactions or input errors in transactions will be rejected and/or canceled by the respective CCIRAF/AITD or EucliStar eGeeenie or Universal eGeeenie or eGeeenie, either automatically as a default setting, or canceled and rejected by the authorized customers and/or authorized users by manual means or touch-screen means or voice-controlled commands. Authorized correct transactions by the respective authorized customers and/or authorized users of the respective registered CCIRAF/AITD(s) or EucliStar eGeeenie(s) or Universal eGeeenie(s) or eGeeenie(s) with his/her selected physical credit card or debit card can be achieved by mechanical or interactive touch-screen activations and responses or by voice-commands, or a combination of both, according to the interactive audio-visual prompts displayed and/or heard at the interactive LCD display and speaker system of the respective registered CCIRAF/AITD or EucliStar eGeeenie or Universal eGeeenie or eGeeenie, and in relation to his or her specific relevant banking account(s), and the proper demand requirements of the respective specific merchant(s) or vendor(s) at the point-of-sale (POS) terminals.

Figure 15:
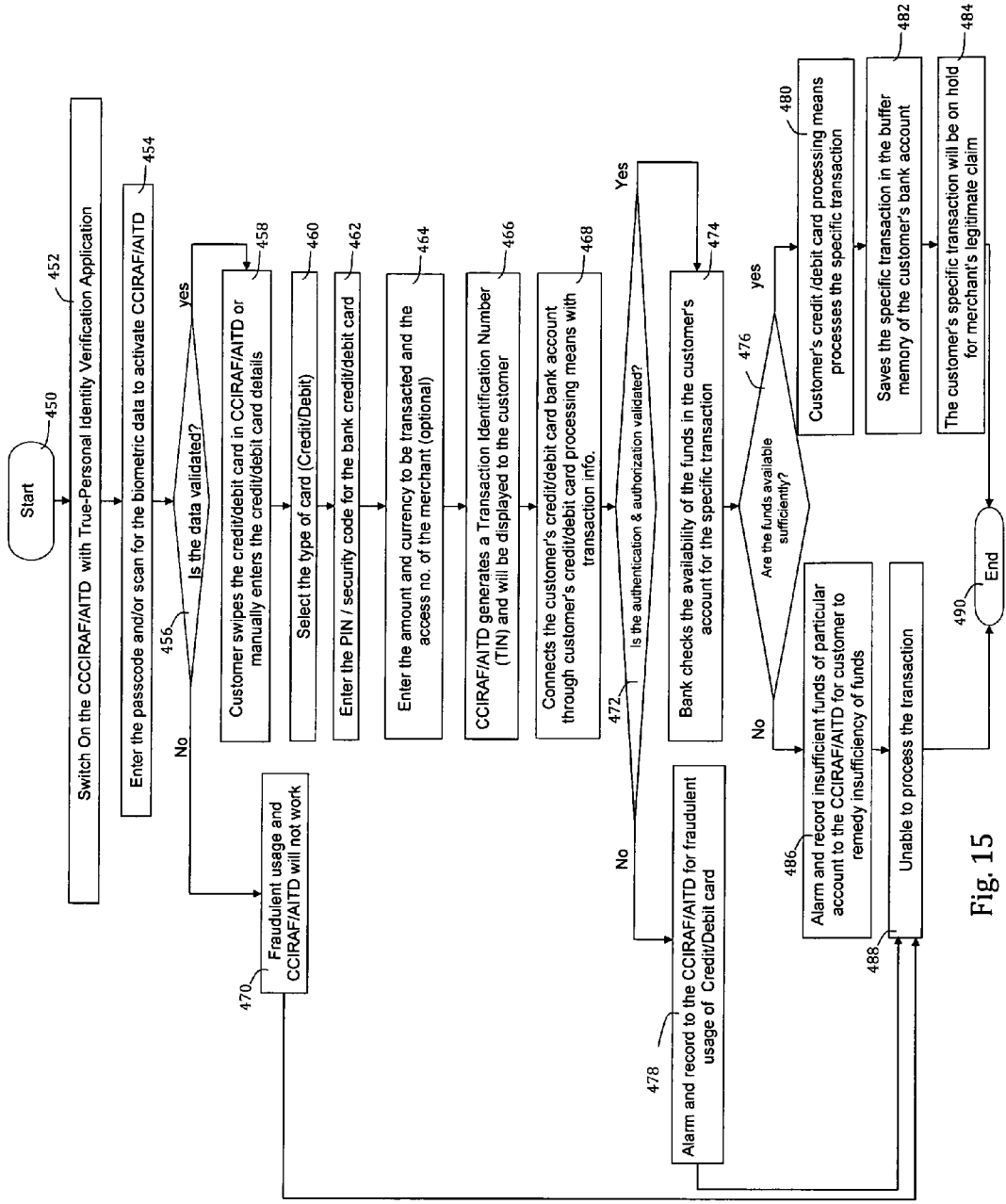

FIG. 15 is a flow diagram representing a sample sequence of steps for processing an authorized customer's or authorized user's physical credit card/debit card for the authorized customer's and/or authorized user's part or side of a transaction, utilizing the respective registered CCIRAF/AITD(s) or EucliStar eGeeenie(s) or Universal eGeeenie(s) or eGeeenie(s).

Figure 16:
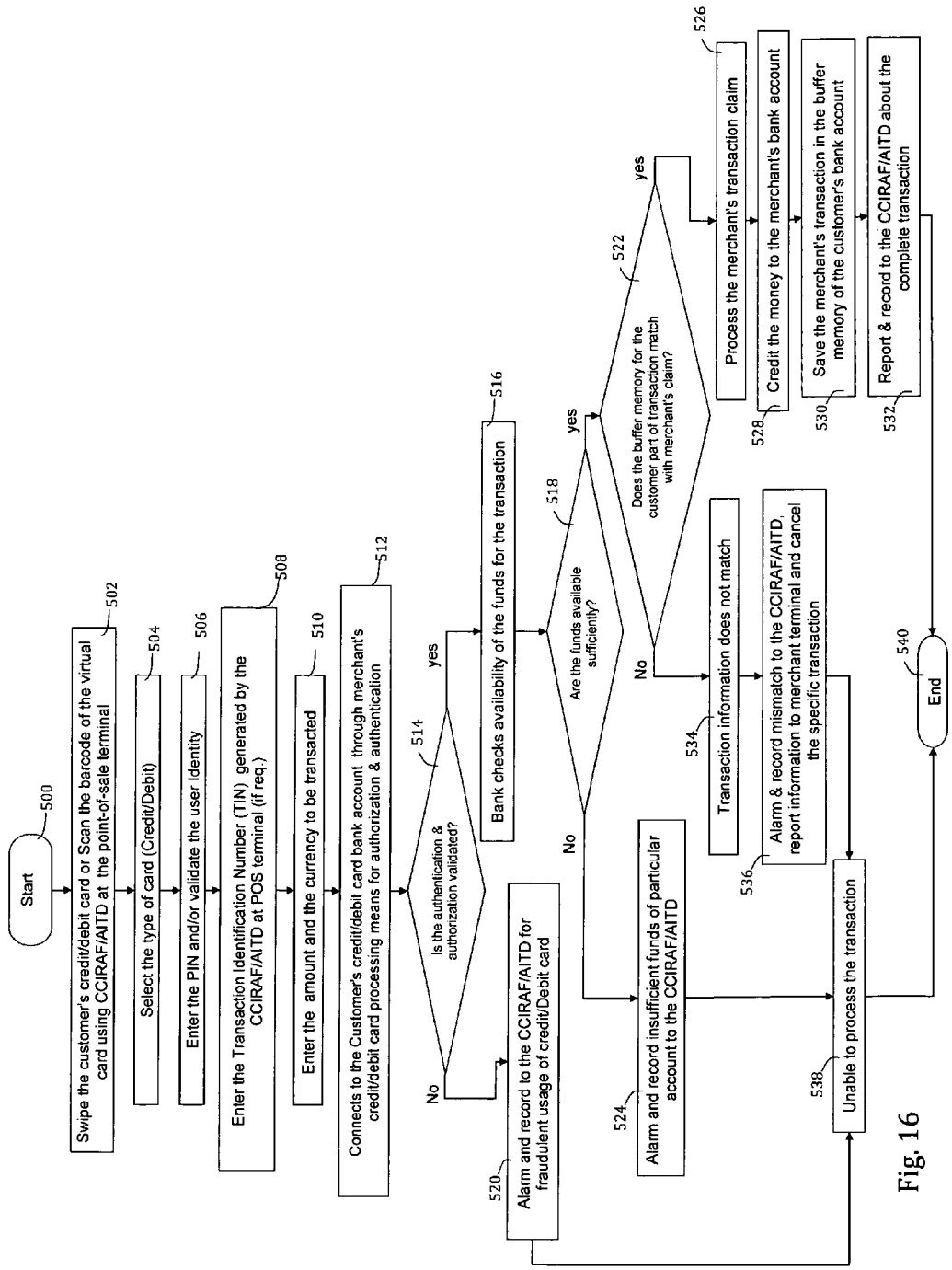

FIG. 16 is a flow diagram of a sample sequence of steps for processing an authorized customer's and/or authorized user's physical credit card/debit card with the merchant's side of a transaction for direct purchase at point-of-sale POS terminal.

Figure 17:
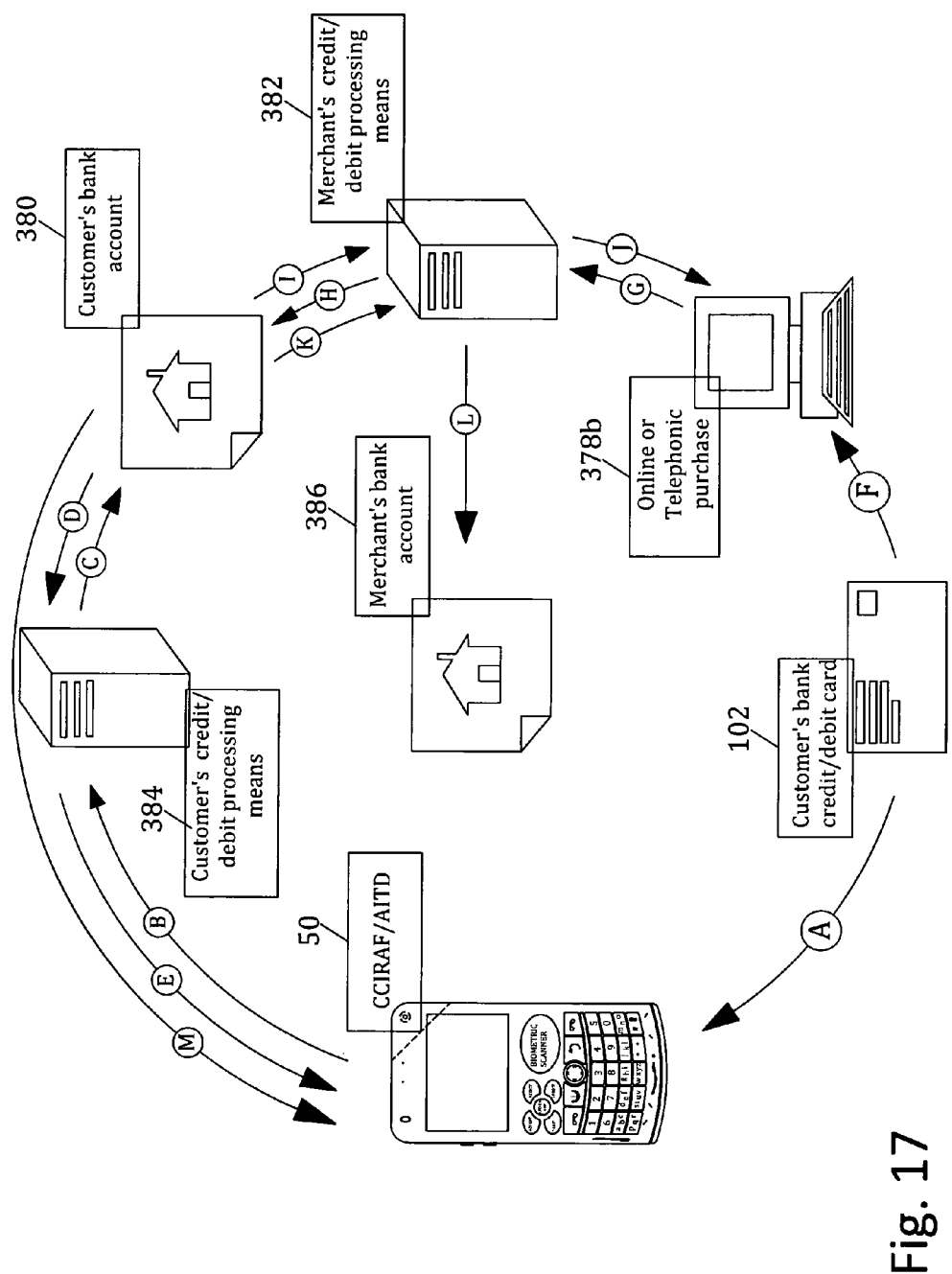

FIG. 17 is a simplified diagrammatic representation of the relevant generalized data flow sequence during online or telephonic purchasing of merchandise or service, showing the interactive activities linking the authorized customers and/or authorized users of the Customer-Controlled Instant-Response Anti-Fraud/Anti-Identity-Theft Device (with true-personal identity verification) or CCIRAF/AITD or EucliStar eGeeenie or Universal eGeeenie or eGeeenie, and, also activating the secured transmission of encrypted data/information between the CCIRAF/AITD or EucliStar eGeeenie or Universal eGeeenie or eGeeenie, and the authorized customer's or authorized user's particular credit card/debit card to and from the authorized customer's and/or authorized user's respective bank account, for processing a particular secured transaction that will result in an anti-fraud/anti-identity theft with true-personal identity verification secured transaction in coordination with the respective processing means for achieving the correct identification, authentication, validation and settlement for the exact respective monetary funds transfers from the authorized customer's and/or authorized user's bank account to the respective merchant's bank account. Any other unauthorized or fraudulent transactions or transaction errors will be rejected and/or canceled by the respective registered CCIRAF/AITD or EucliStar eGeeenie or Universal eGeeenie or eGeeenie, either automatically as a default setting, or, canceled and rejected by the authorized customer and/or authorized user by manual means or voice-controlled commands. Authorized correct secured transactions by the respective authorized customer and/or authorized user of the respective CCIRAF/AITD or EucliStar eGeeenie or Universal eGeeenie or eGeeenie, with his/her selected credit card or debit card can be achieved by mechanical or interactive touch-screen activations and responses or by voice-commands, or in combination of such, according to the interactive audio-visual prompts shown and heard at the interactive audio-visual LCD display and speaker system of the respective CCIRAF/AITD or EucliStar eGeeenie or Universal eGeeenie or eGeeenie, and in relation to his/her specific relevant banking account, and the proper demand requirements of the respective merchant or vendor for online or telephonic transactions.

Figure 18:
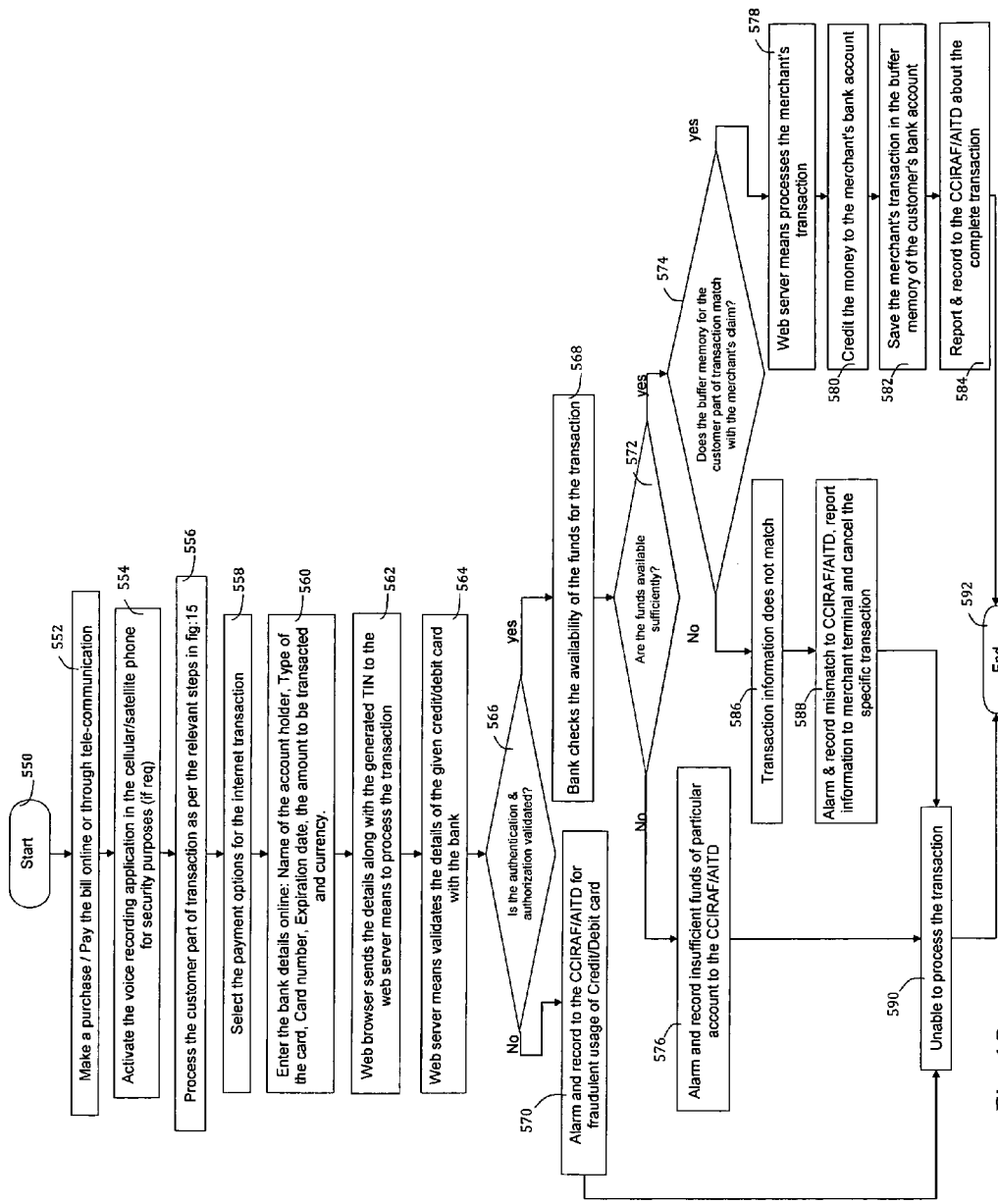

FIG. 18 is a general flow diagram of a sample sequence of steps for processing a particular transaction for telephonic and online purchase.

Figure 19:
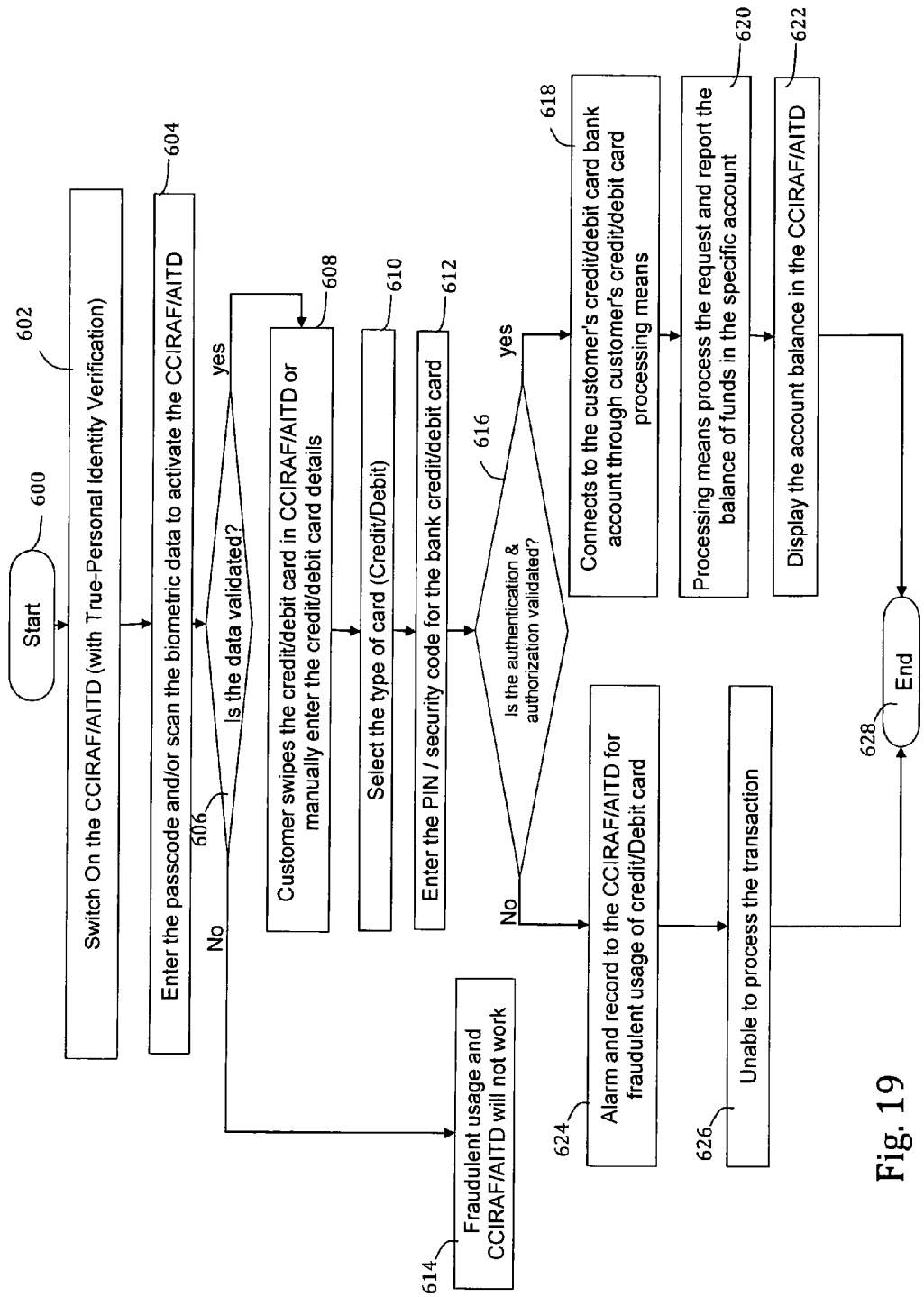

FIG. 19 is a flow diagram of a sample sequence of steps for processing the authorized customer's and/or authorized user's secured account balance of funds check using the respective CCIRAF/AITD or EucliStar eGeeenie or Universal eGeeenie or eGeeenie.

Figure 20:
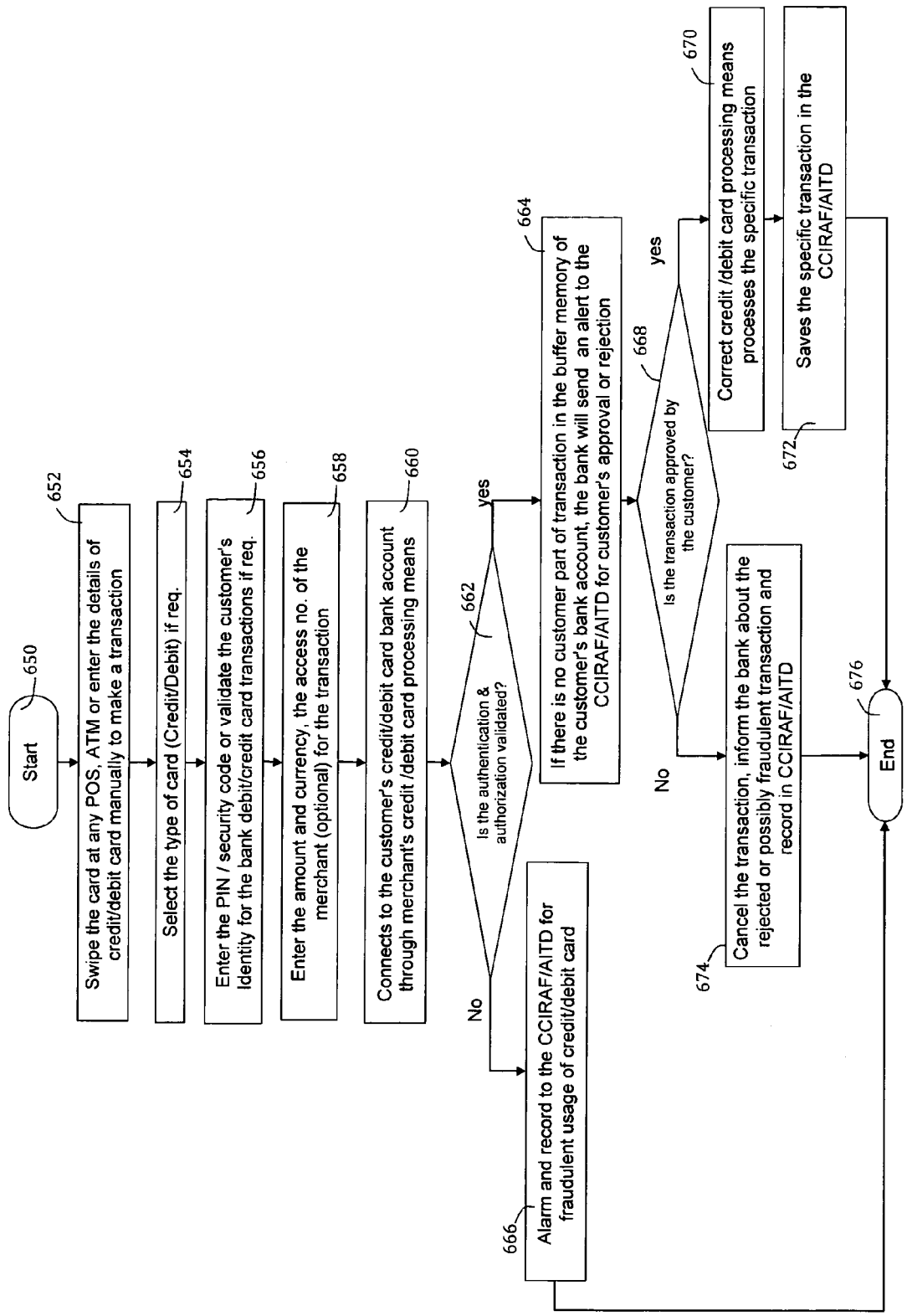

FIG. 20 is a flow diagram of a sample sequence of steps for accepting or rejecting a specific transaction, using the CCIRAF/AITD or EucliStar eGeeenie or Universal eGeeenie or eGeeenie.

Figure 21:
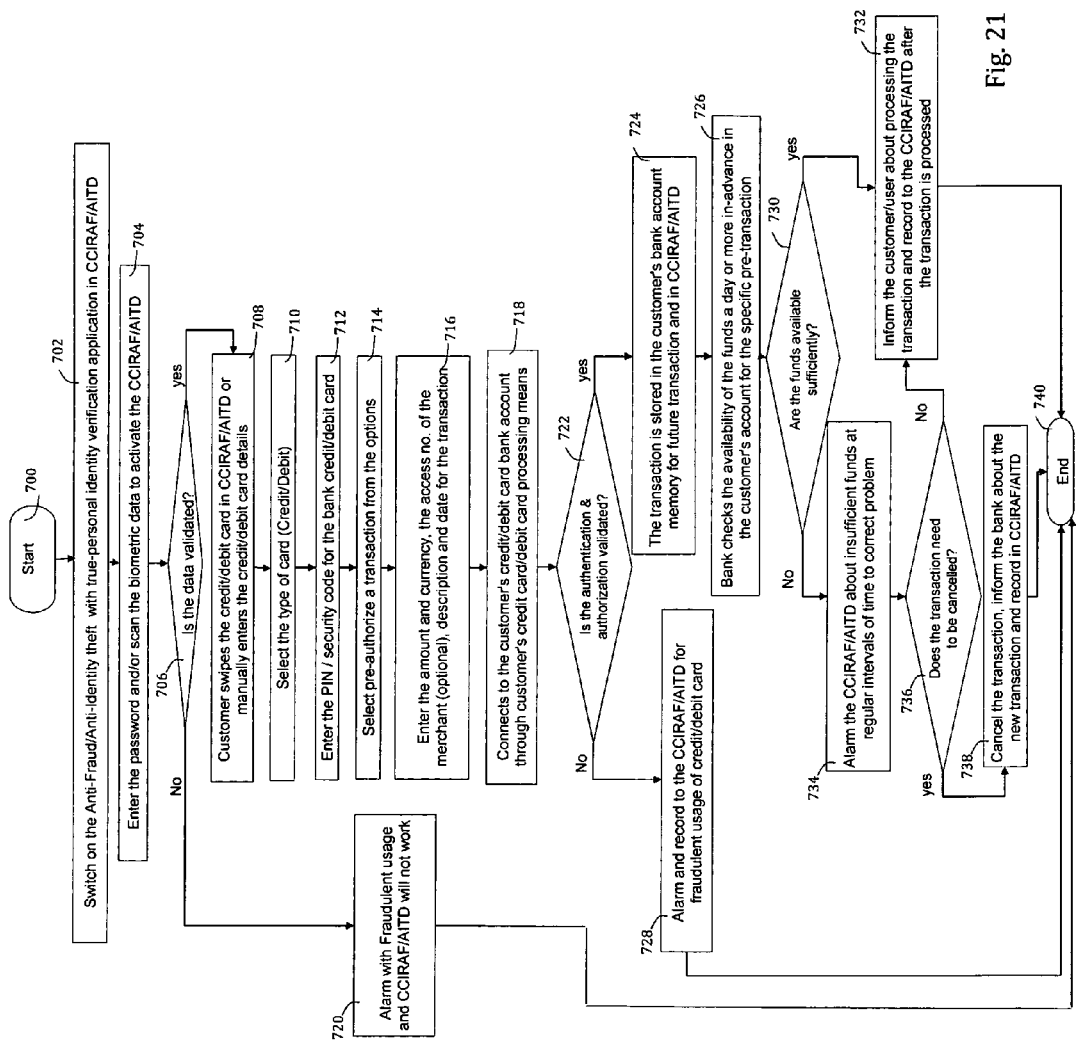

FIG. 21 represents a flow diagram of a sample sequence of steps for pre-authorizing future secured transactions using the respective CCIRAF/AITD or EucliStar eGeeenie, or Universal eGeeenie or eGeeenie.

Figure 22:
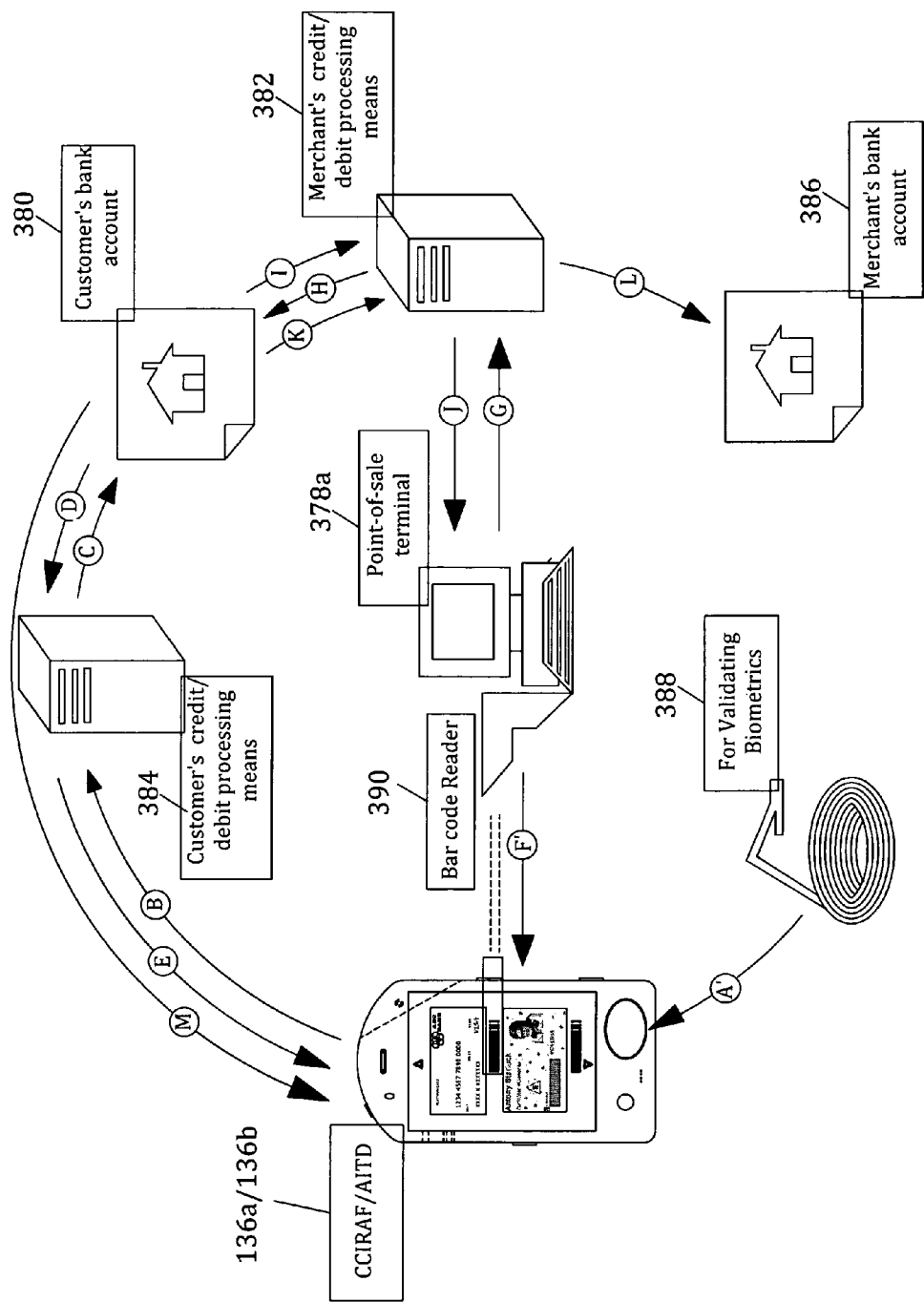

FIG. 22 is a simplified diagrammatic representation of a sample relevant generalized data flow sequence for purchasing merchandize with a registered CCIRAF/AITD or EucliStar eGeeenie or Universal eGeeenie or eGeeenie, and using an LCD-projected virtual bank card with respective LCD-projected virtual bar code and a corresponding LCD-projected virtual identification card with an LCD-projected respective virtual bar code of an authorized customer or authorized user, for paying at the POS terminal, using a virtual bar code reader.

Figure 23:
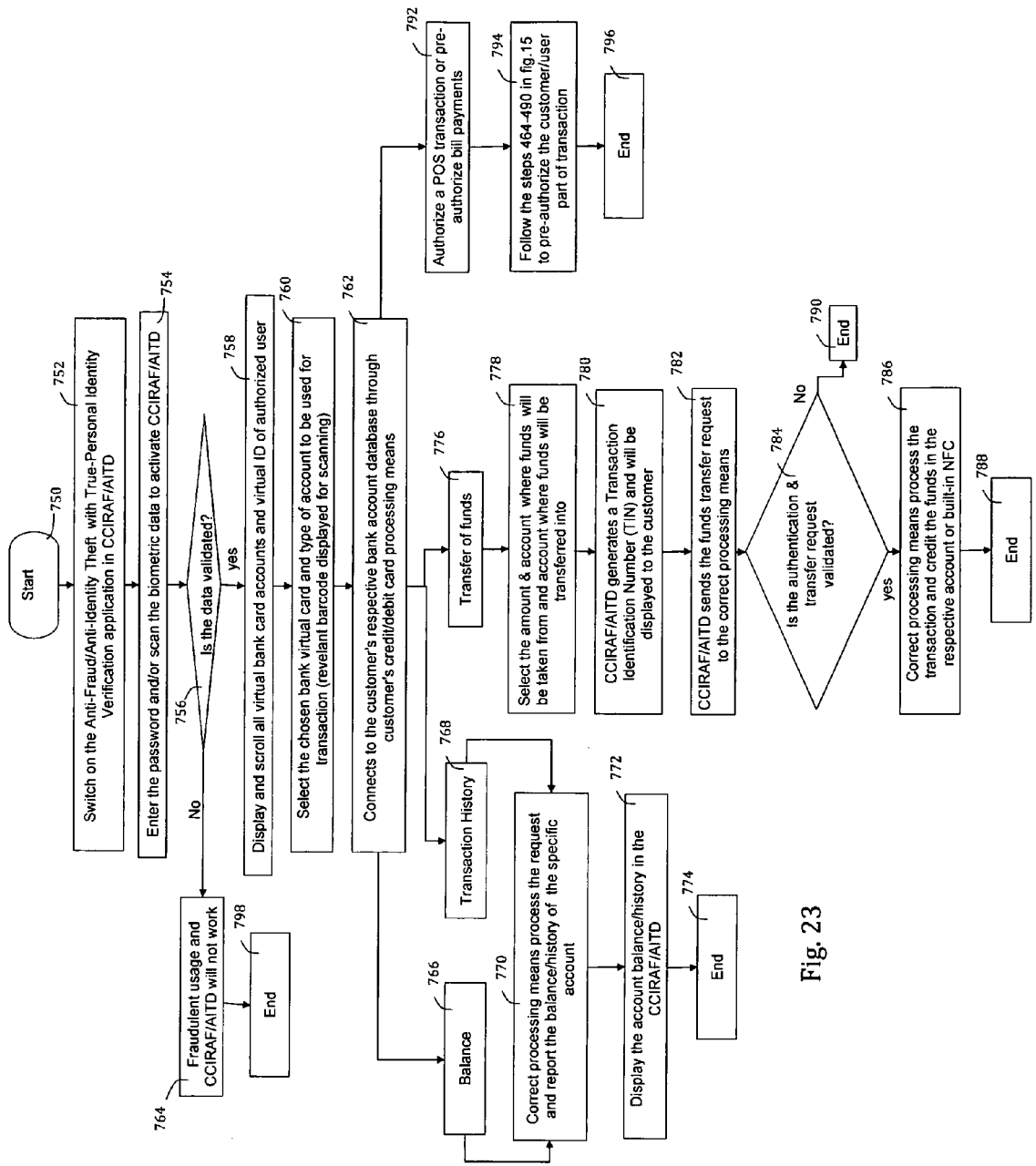

FIG. 23 represents a sample sequential flow of steps for using the CCIRAF/AITD or EucliStar eGeeenie or Universal eGeeenie or eGeeenie, as a substitute for the use of a physical credit card or debit card for point-of-sale (POS) payment(s) with a corresponding LCD-displayed image that represents the corresponding virtual credit card or debit card, and its corresponding electronically readable bar code identification, which is projected to be readable by an upgraded or improved adjustable corresponding optical LCD bar code reader at the point-of-sale (POS) terminal. This FIG. 23 also allows the use of the selected projected virtual credit or debit card and corresponding virtual bar code to be used for checking the particular account balance, transaction history, activating funds transfers from one account to another, and, also allows the provisions to be able to execute authorization or pre-authorization of purchase and/or bill payments.

Figure 24:
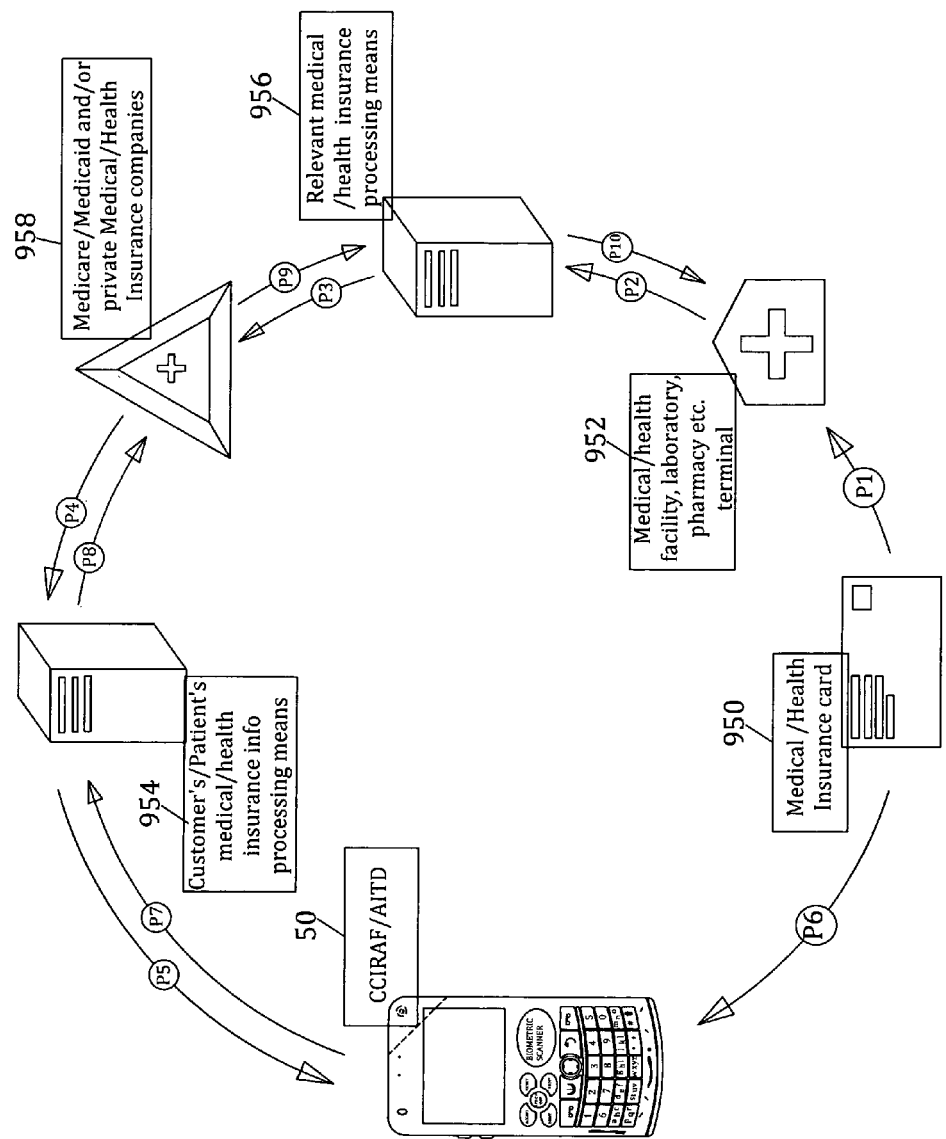

FIG. 24 is a simplified diagrammatic representation of the relevant generalized encrypted data/information flow sequence for verifiably and accurately claiming a Medicare or Medicaid or private medical/health insurance payment from the medical insurance companies by medical/health facility, laboratory, pharmacy, doctor's office, medical clinics, hospitals, etc., using the respective verifiable authentic medical/health insurance card of the correctly registered rightfully insured medical/health patient, and, using the respective properly registered respective CCIRAF/AFTD or EucliStar eGeeenie or Universal eGeeenie or eGeeenie, in order to greatly reduce and/or prevent the commitment of fraudulent claims from Medicare/Medicaid and/or private Medical/Health insurance companies.

Figure 25:
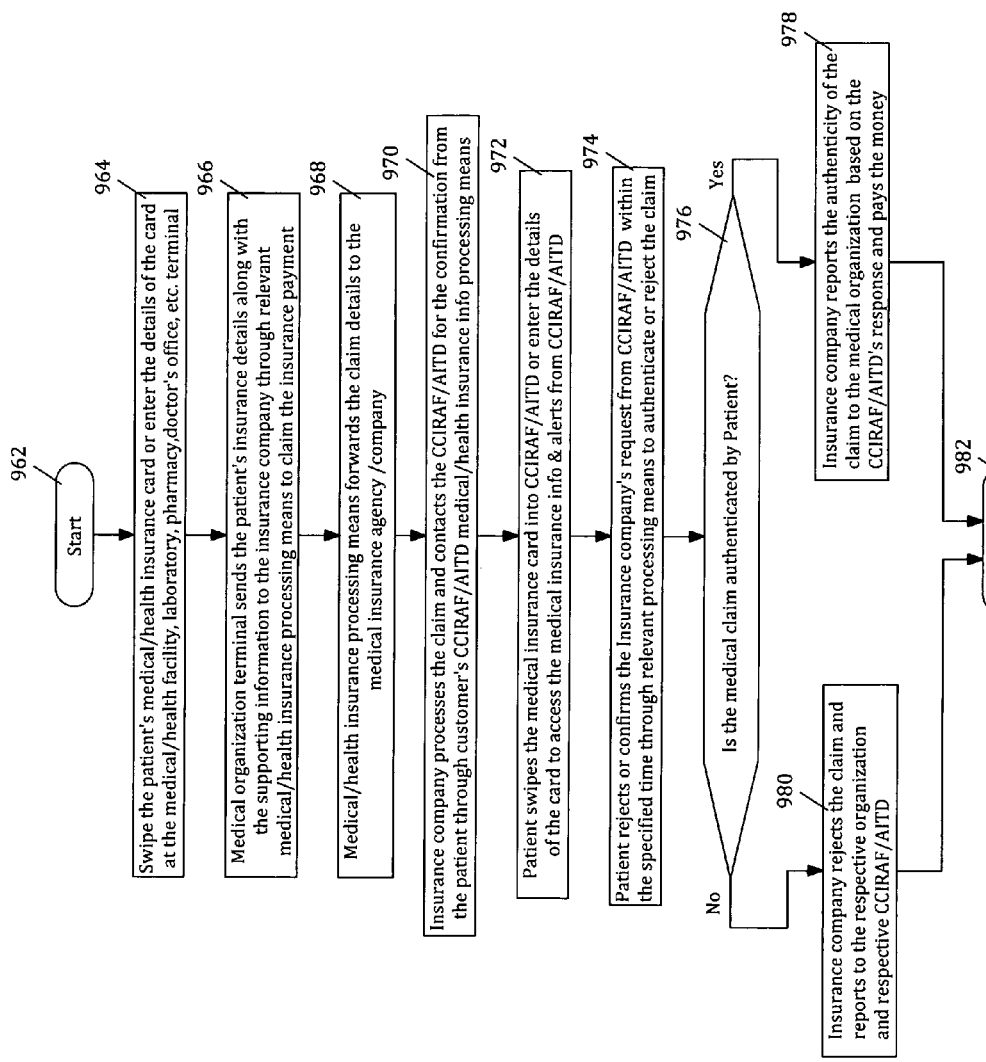

FIG. 25 is a sample flow sequence of steps for the legitimate processing of an authorized customer's or authorized user's Medicare or Medicaid and/or private medical/health insurance as correctly and rightfully claimed from the medical/health insurance companies by medical/health doctors and specialists, medical/health facilities, laboratories, pharmacies, medical clinics, hospitals, etc., and utilizing the interactive instant participation and response of the respective correct registered CCIRAF/AITD or EucliStar eGeeenie or Universal eGeeenie or eGeeenie of the insured authorized customer or patient for ascertaining the validity and correctness of the relevant medical/health insurance claim or claims, so as to prevent the commitment of fraudulent medical/health insurance claim or claims.

Figure 26:
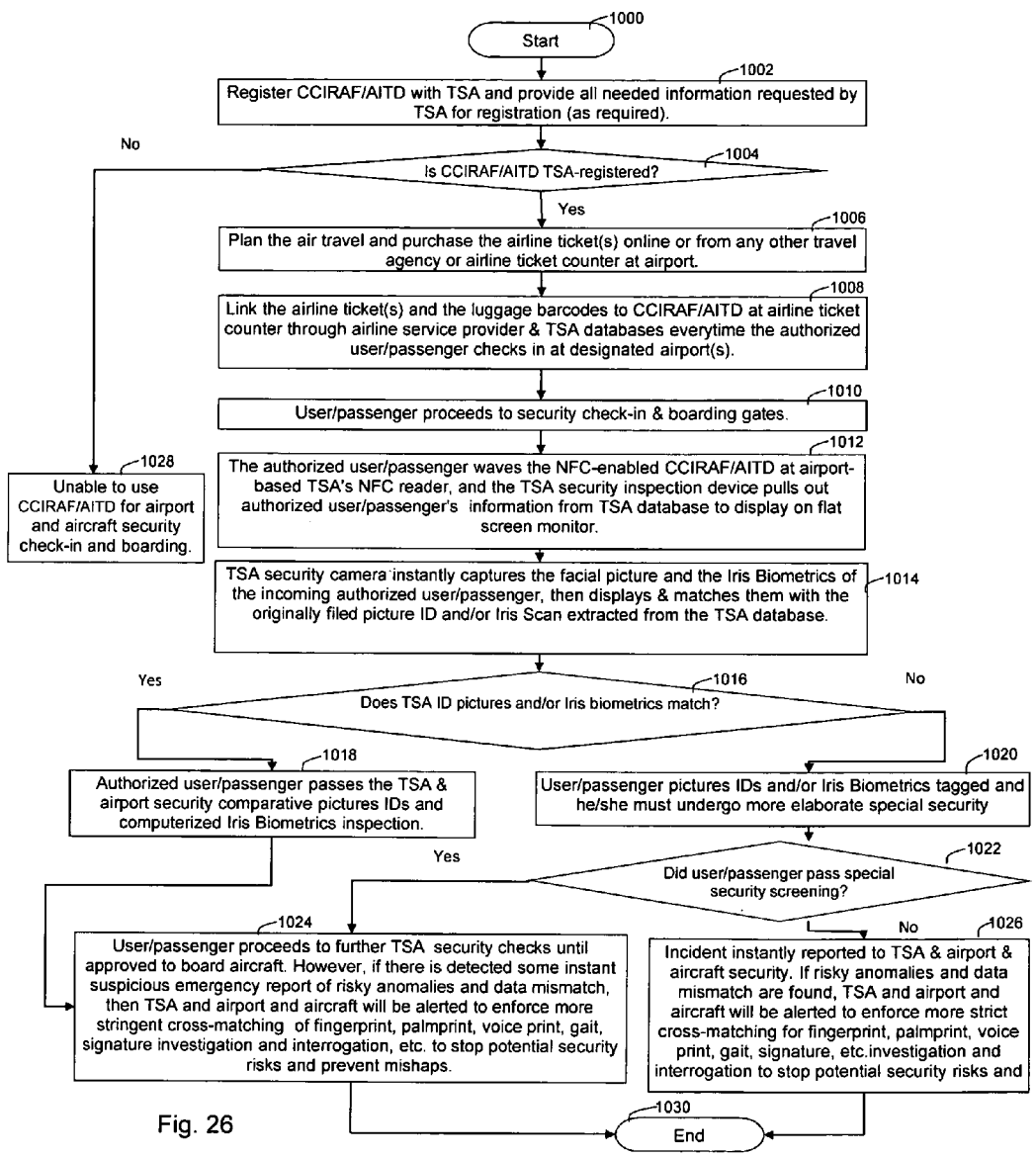

FIG. 26 represents the flow diagram of one sample sequence of events and steps for conducting and attaining much more coherent fast-track processing time of incoming innocent airline real passengers, while achieving greater safety and security in airports and aircrafts and restricted vicinities, through the use of each of their specific correct TSA-registered respective CCIRAF/AITDs or EucliStar eGeeenies or Universal eGeeenies or eGeeenies. This can definitely, accurately and reliably verify the true-personal identities of the incoming real passengers/users at the airport check-in desks, security gates and lanes, and during pre-boarding and boarding of specific real passengers/users to specific airplanes, allowing well coordinated and effective automated comparative checking and cross-matching of real-time data/information at the designated airport(s), with their respective TSA pre-submitted data/information and biometrics, and, also of tagging the respective specific airline ticket or tickets and flight itineraries of the each respective verifiable TSA-registered passengers/users with their corresponding boarding passes and their corresponding verifiable luggage(s) with the use of their respective TSA-registered CCIRAF/AITDs or EucliStar eGeeenies or eGeeenies.

In this FIG. 26, it also illustrates the various emergency security measures to be performed by airport security and law enforcement personnel on suspicious passengers/users, when reported in real-time to have certain suspicious and risky personal identification and biometrics anomalies, or, found in real-time to be linked with fraudulent and criminal activities, or, to have ties with suspicious individuals, groups or organizations, or, found to have suspicious travel histories, delineating and isolating them from innocent incoming passengers/users. With this method of screening and pre-screening, there will for sure greatly minimize, curtail and prevent the potential harms and dangers and mishaps in airports and aircrafts, as well as vastly diminish inter-passenger mistrust and racial profiling.

Figure 27:
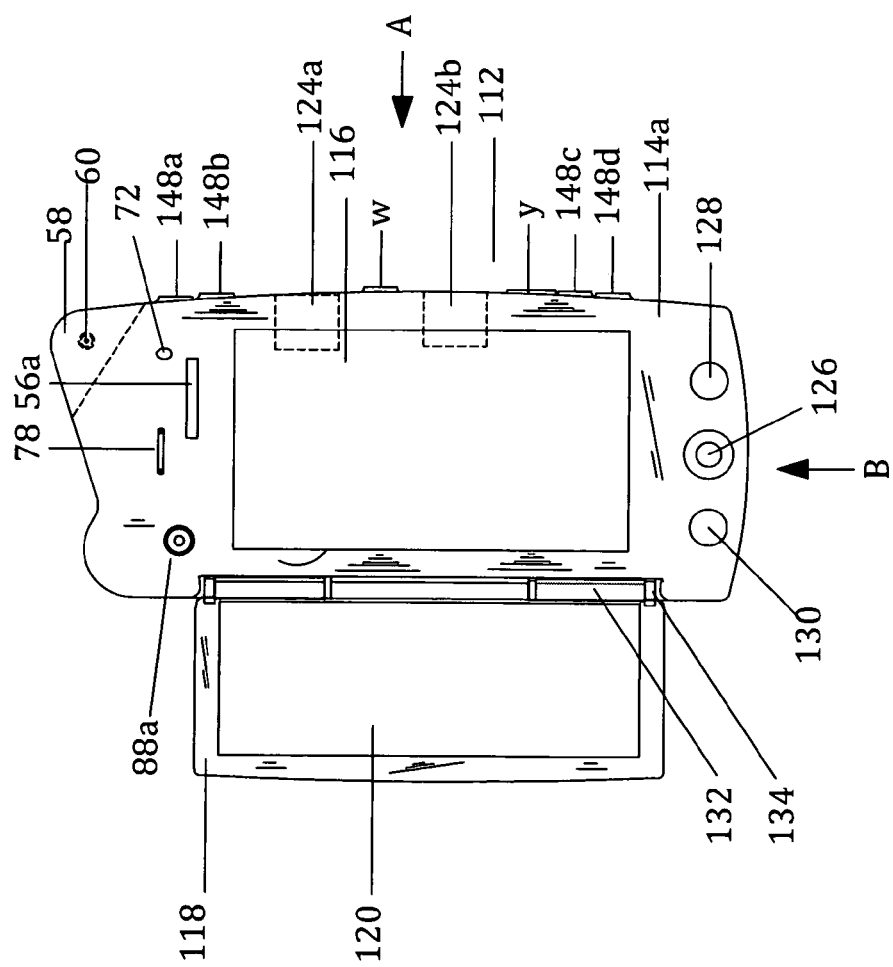

FIG. 27 is an illustrative representation of an open frontal view of a seventh embodiment of the Customer-Controlled Instant-Response Anti-Fraud/Anti-Identity Theft Device (with true-personal identity verification) or CCIRAF/AITD or EucliStar eGeeenie or Universal eGeeenie or eGeeenie, in the form of a mini-notebook type or style or model of the present inventive device, with a cellular and/or satellite mobile phone and internet applications capabilities and features, but without a built-in Near-Field Communication (NFC) system and component.

FIG. 27A is an illustrative representation of an open frontal view of an eighth embodiment of the Customer-Controlled Instant-Response Anti-Fraud/Anti-Identity Theft Device (with true-personal identity verification) or CCIRAF/AITD or EucliStar eGeeenie or Universal eGeeenie or eGeeenie, which takes the form of a mini-notebook type or style or model of the present inventive device, with cellular and/or satellite mobile phone and internet applications capabilities and features, and, also equipped with built-in integrated Near Field Communication (NFC) system and component.

FIG. 27B illustrates the open bottom view, as seen from a direction of view of arrows B of FIGS. 27 and/or 27A of the same seventh and/or eighth embodiment(s) of the CCIRAF/AITD or EucliStar eGeeenie or Universal eGeeenie or eGeeenie, taking the form of a mini-notebook type or style or model shown in FIGS. 27 and/or 27A of the Customer-Controlled Instant-Response Anti-Fraud/Anti-Identity Theft Device (with true-personal identity verification) or CCIRAF/AITD or EucliStar eGeeenie or Universal eGeeenie or eGeeenie, with cellular and/or satellite mobile phone and internet applications capabilities and features.

FIG. 27C illustrates the open left side view of the same seventh and/or eighth embodiment(s) 112 and/or 112a, respectively of the CCIRAF/AITD or EucliStar eGeeenie or Universal eGeeenie or eGeeenie, as seen from the point-of-view along the direction of arrows A of FIGS. 27 and 27A, taking the form of a mini-notebook type or style or model shown in FIGS. 27 and 27A of the Customer-Controlled Instant-Response Anti-Fraud/Anti-Identity Theft Device (with true-personal identity verification) or CCIRAF/AITD or EucliStar eGeeenie or Universal eGeeenie or eGeeenie, with cellular and/or satellite mobile phone and internet applications capabilities and features.

Figure 28B:
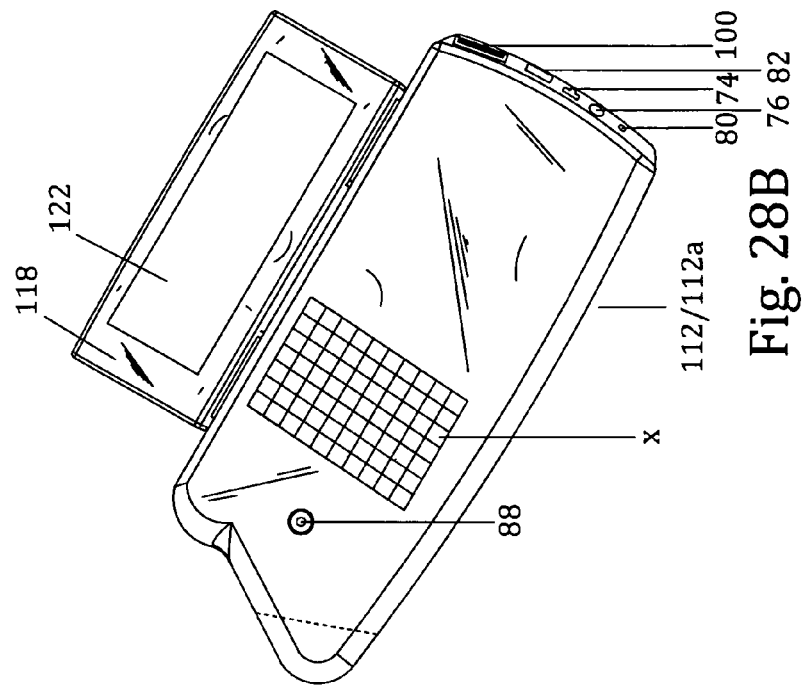
Figure 28A:
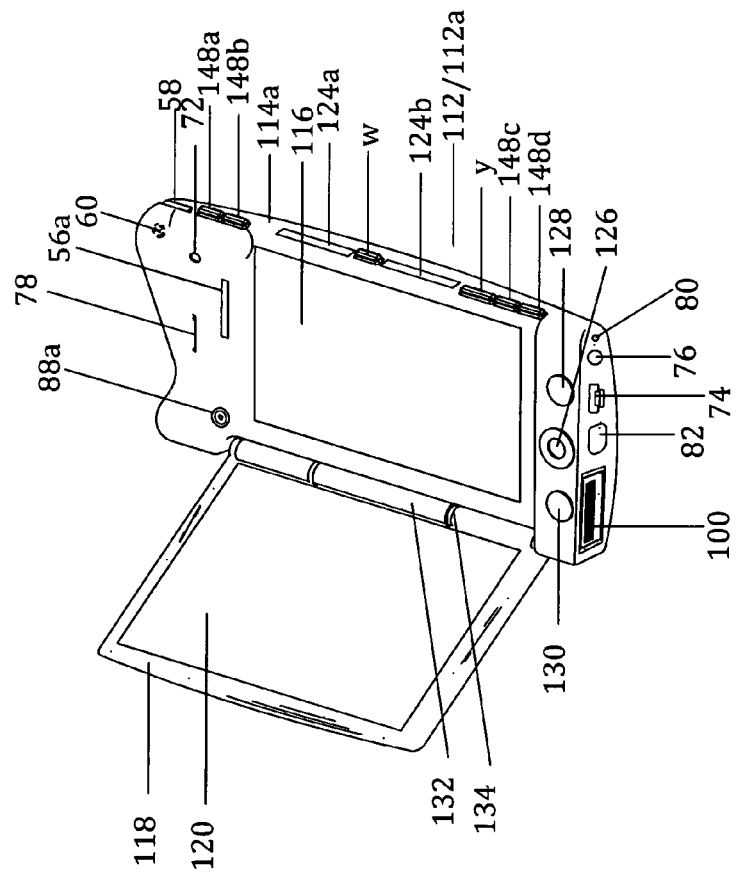

FIG. 28A represents the perspective open view of the same mini-notebook type or style or model of the same seventh and/or eighth embodiment(s) shown in FIGS. 27 and 27A, showing the partial frontal face views of FIGS. 27 and/or 27A, the partial bottom view of FIG. 27B, and the partial left side view of the Customer-Controlled Instant-Response Anti-Fraud/Anti-Identity Theft Device (with true-personal identity verification) or CCIRAF/AIFD or EucliStar eGeeenie or Universal eGeeenie, integrated with cellular and/or satellite mobile phone and internet applications capabilities and features, with or without the built-in Near Field Communication (NFC) system and component. The front camera 88a, the thermo charger activation button represented by letter y, and the switchable 2D/3D activation button represented by letter w are also shown among other correspondingly labeled parts.

FIG. 28B is a perspective backside view in the open position of the same seventh and/or eighth embodiment(s) of FIGS. 27 and/or 27A of the mini-notebook type or style or model of the Customer-Controlled Instant-Response Anti-Fraud/Anti-Identity Theft Device (with true-personal identity verification) or CCIRAF/AITD or EucliStar eGeeenie or Universal eGeeenie or eGeeenie, equipped with or without a built-in integrated Near-Field Communication (NFC) system and components. The back camera 88, and the solar panel x are also shown among other correspondingly labeled parts.

Figure 29:
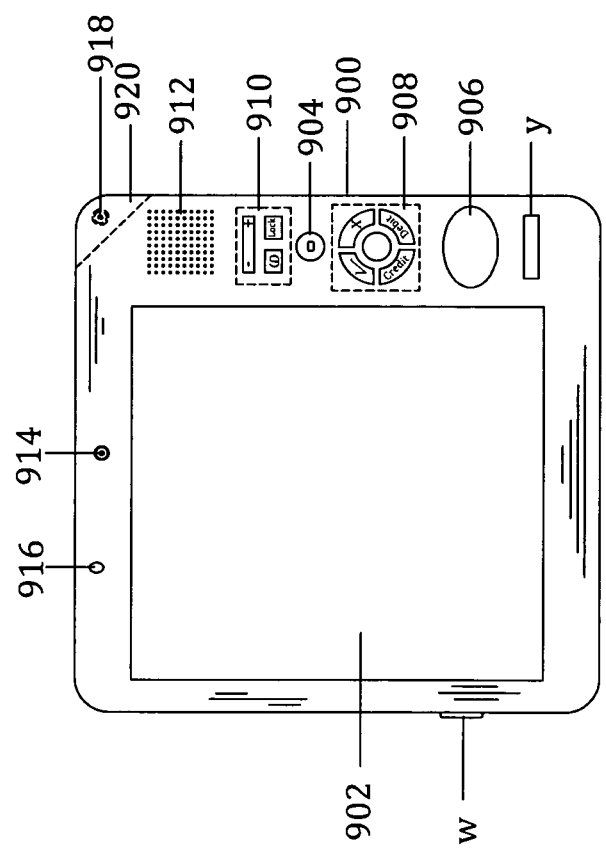

FIG. 29 illustrates a frontal orthographic view of a tablet-type Customer-Controlled Instant-Response Anti-Fraud/Anti-Identity Theft Device with true-personal identity verification or CCIRAF/AITD or eGeeenie or Universal eGeeenie or eGeeenie, without a Near-Field Communications (NFC) system and component.

Figures 29A, 29B, 29C, 29D, 29E:
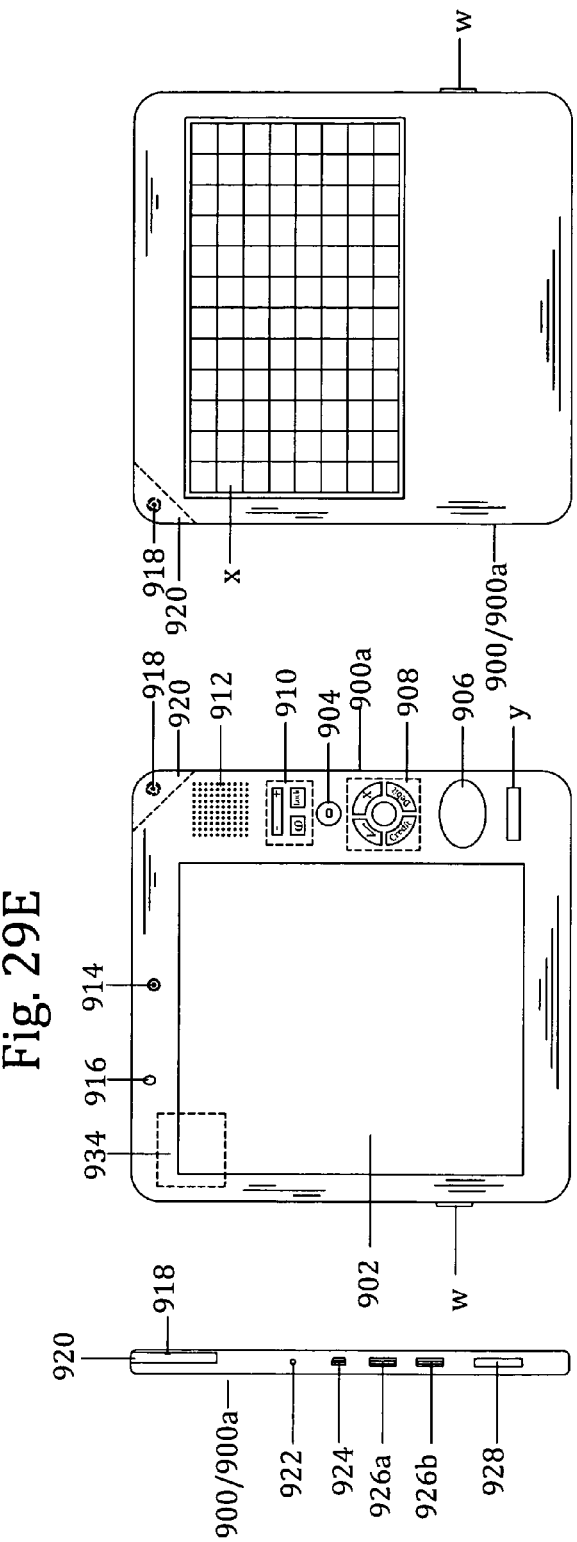

FIG. 29A illustrates a frontal orthographic view of a tablet-type Customer-Controlled Instant-Response Anti-Fraud/Anti-Identity Theft Device (with true-personal identity verification application), or CCIRAF/AITD or EucliStar eGeeenie or Universal eGeeenie or eGeeenie, with a built-in integrated Near-Field Communication (NFC) system and component.

FIGS. 29B-29E—illustrate the orthographic views of the tablet-type Customer-Controlled Instant-Response Anti-Fraud/Anti-Identity-Theft Device (with true-personal identity verification application), or CCIRAF/AITD or EucliStar eGeeenie or Universal eGeeenie or eGeeenie, with a front camera, and with or without built-in integrated Near-Field Communication (NFC) system and component.

FIGS. 30A and 30B illustrate the perspective views of the tablet-type Customer-Controlled Instant-Response Anti-Fraud/Anti-Identity-Theft Device (with true-personal identity verification application) or CCIRAF/AITD or EucliStar eGeeenie or Universal eGeeenie or eGeeenie, with a front camera, with or without a built-in Near Field Communication (NFC) component.

Figure 31:
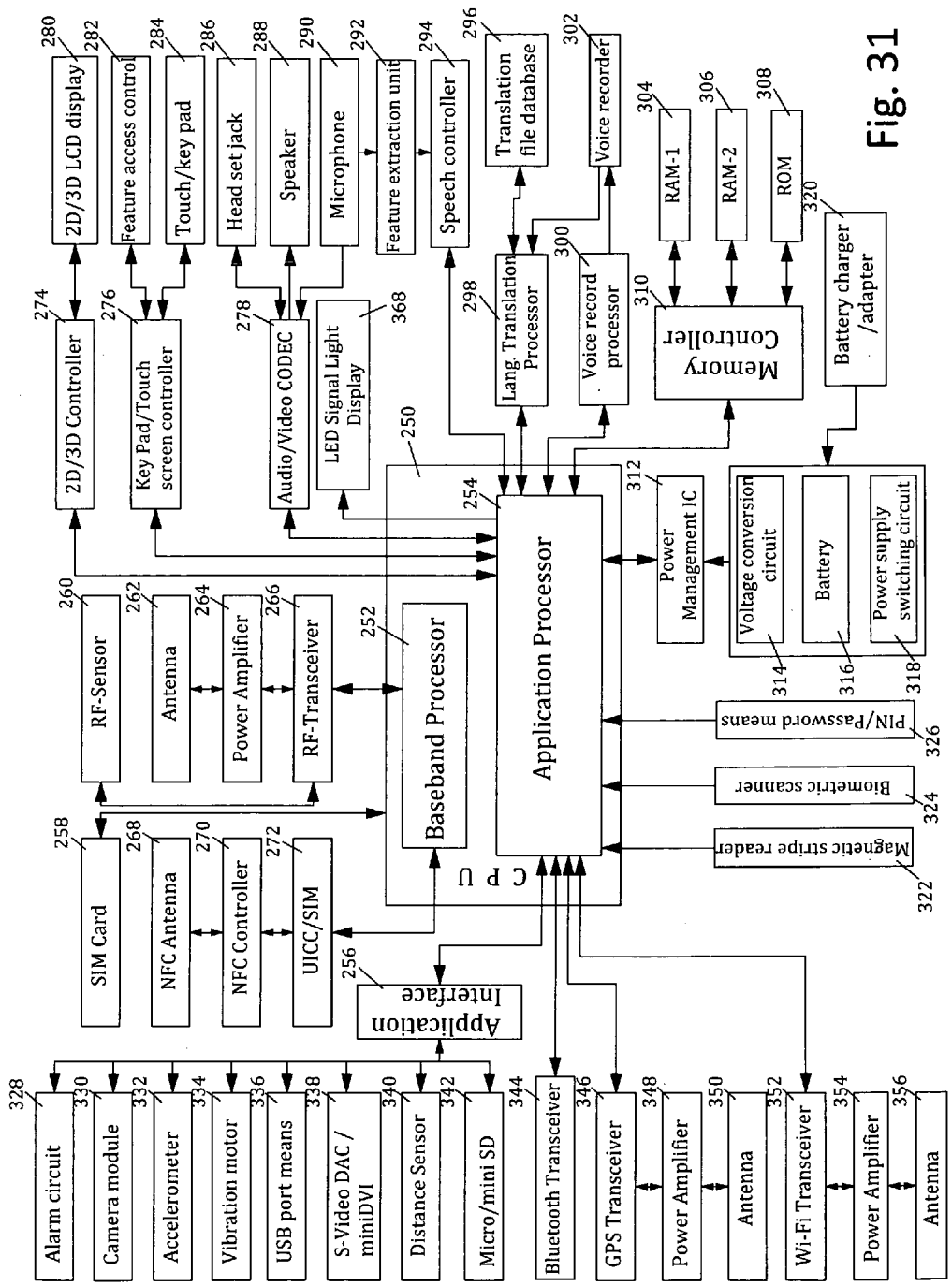

FIG. 31 represents an electronic block diagram showing the inter-linkages of important components for the proper functioning of the Customer-Controlled Instant-Response Anti-Fraud/Anti-Identity-Theft Device (with true-personal identity verification application), or CCIRAF/AITD or EucliStar eGeeenie or Universal eGeeenie or eGeeenie, having integrated built-in Near-Field Communication (NFC) system and component, with a battery charger/adapter 320.

Figure 31A:
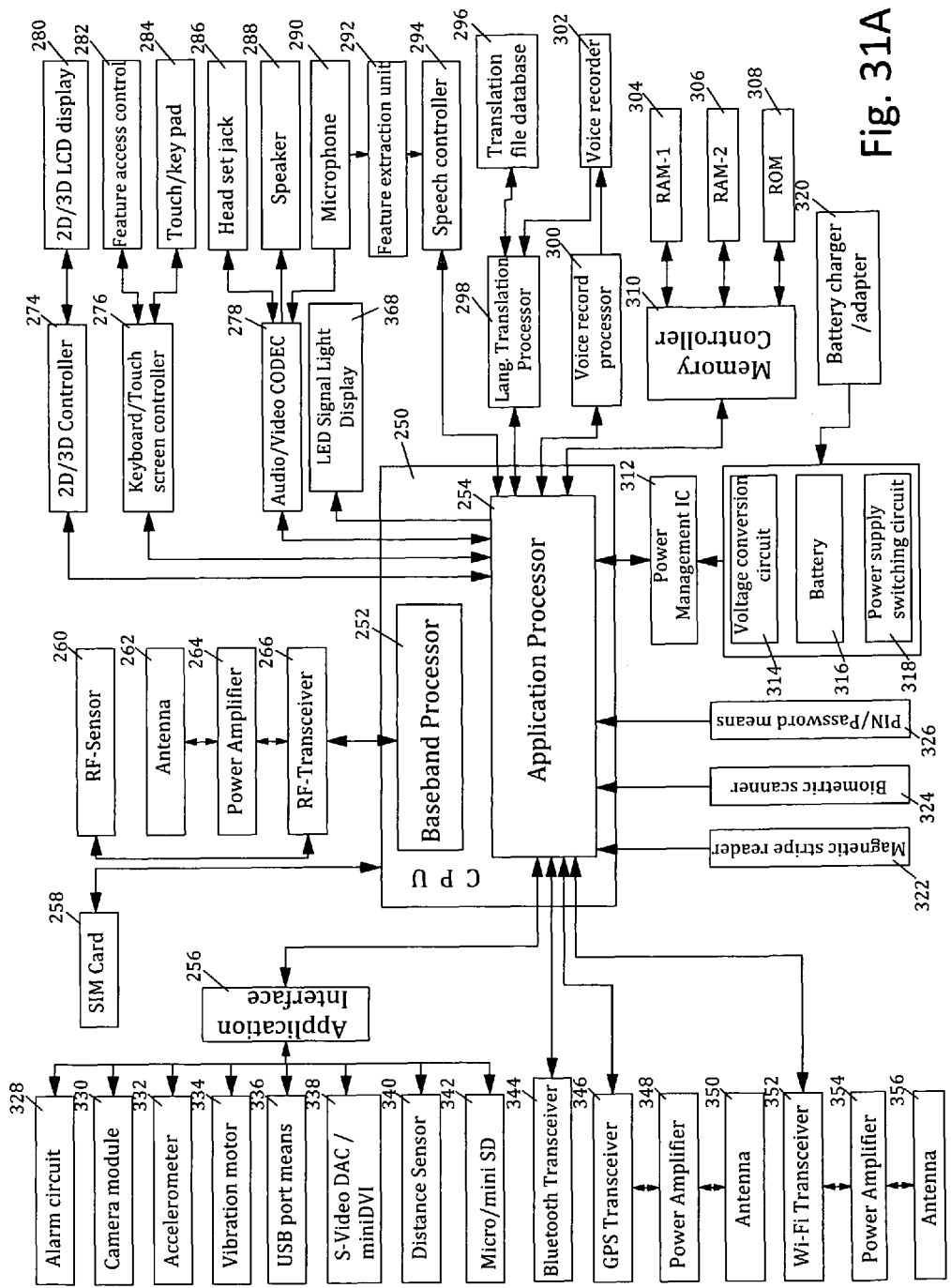

FIG. 31A represents an electronic block diagram showing the inter-linkages of important components for the proper functioning of the Customer-Controlled Instant-Response Anti-Fraud/Anti-Identity-Theft Device (with true-personal identity verification application), or CCIRAF/AITD or EucliStar eGeeenie or Universal eGeeenie or eGeeenie, without an integrated built-in Near-Field Communication (NFC) system and component, and with battery charger/adapter.

FIG. 32 represents an electronic block diagram showing the inter-linkages of important components for the proper functioning of the Customer-Controlled Instant-Response Anti-Fraud/Anti-Identity-Theft Device (with true-personal identity verification application), or CCIRAF/AITD or EucliStar eGeeenie or Universal eGeeenie or eGeeenie, equipped with integrated built-in Near-Field Communication (NFC) system and component, and equipped also with solar panel 362 and solar charger 360, and also equipped with thermo sensor 366 and thermo charger 364, and a battery charger/adapter 320.

Figure 32A:
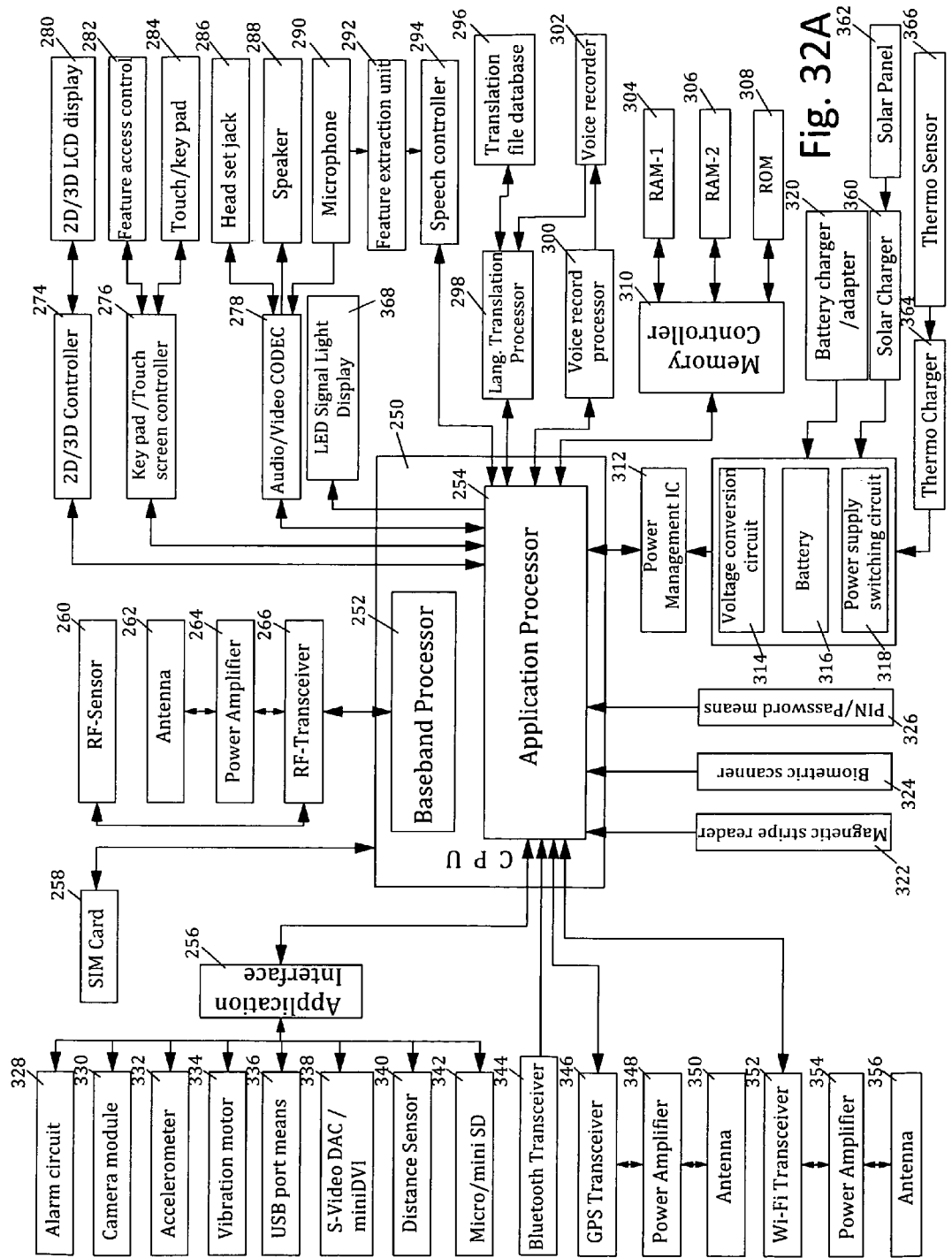

FIG. 32A represents an electronic block diagram showing the inter-linkages of important components for the proper functioning of the Customer-Controlled Instant-Response Anti-Fraud/Anti-Identity-Theft Device (with true-personal identity verification application), or CCIRAF/AITD or EucliStar eGeeenie or Universal eGeeenie or eGeeenie, but without built-in Near-Field Communication (NFC) system and component, but, equipped with solar panel 362 and solar charger 360, and also equipped with thermo sensor 366 and thermo charger 364, and also equipped with battery charger/adapter 320.

Figure 33:
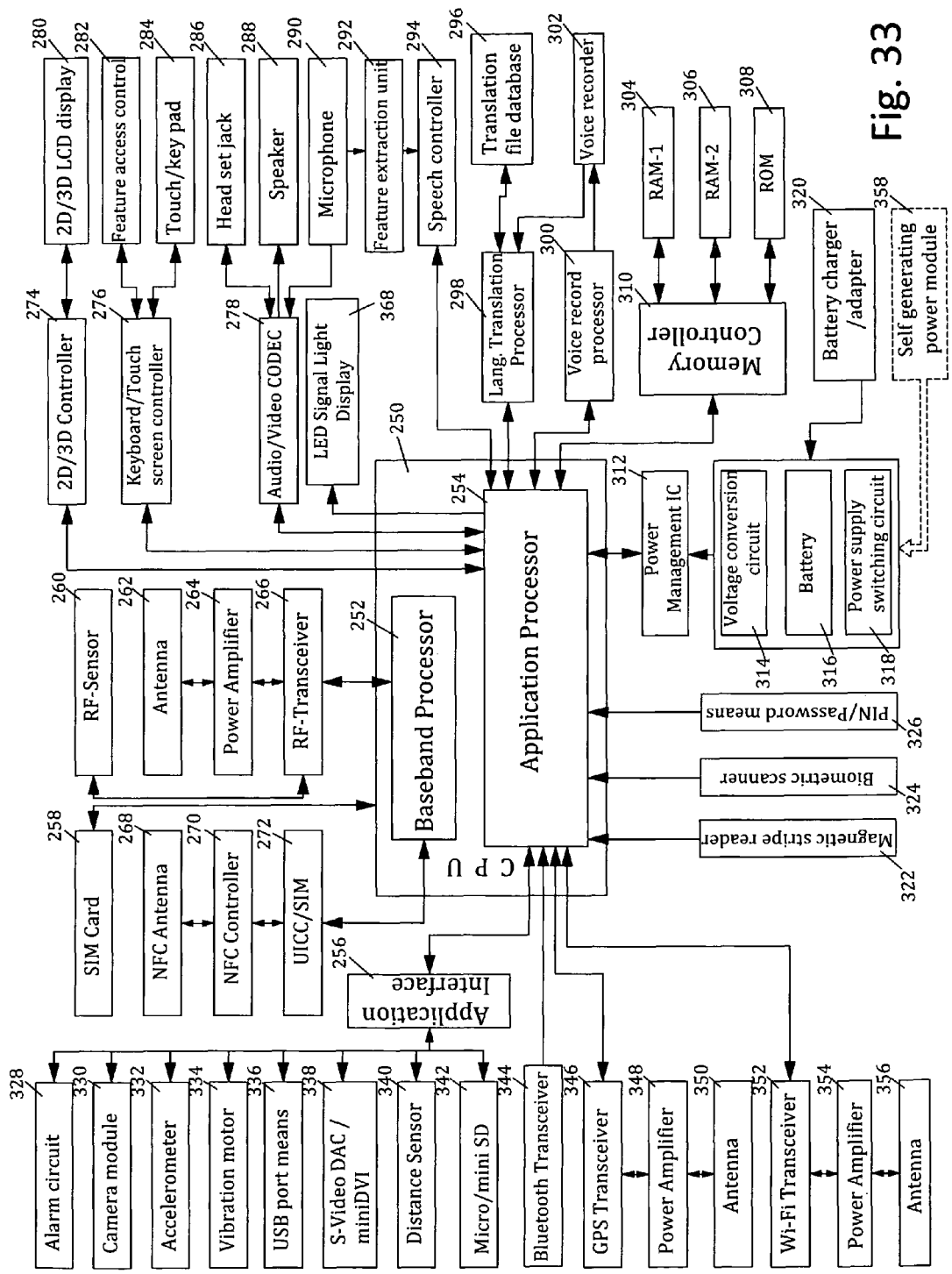

FIG. 33 represents an electronic block diagram showing the inter-linkages of important components for the proper functioning of the Customer-Controlled Instant-Response Anti-Fraud/Anti-Identity-Theft Device (with true-personal identity verification application), or CCIRAF/AITD or EucliStar eGeeenie or Universal eGeeenie or eGeeenie, having integrated built-in Near-Field Communication (NFC) system and component, (with a possible future inter-linkage with a "Self-Generating Power Module" indicated by a broken-line rectangle labeled with numeral 358, which is not applied for in this present patent application, but is separately described and illustrated in details in another one or more other patent applications and specifications). It is also equipped with a battery charger/adapter 320.

Figure 33A:
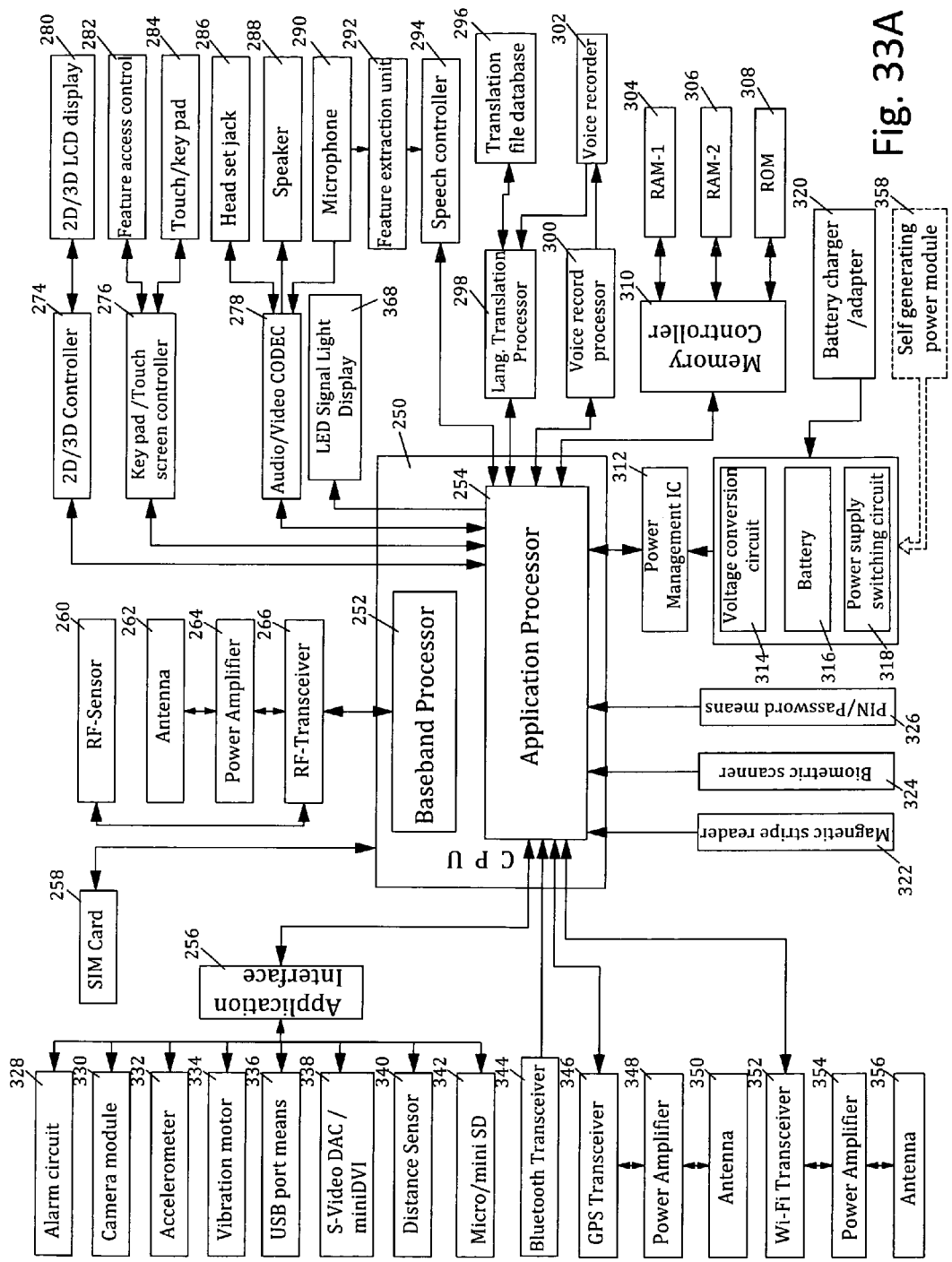

FIG. 33A represents an electronic block diagram showing the inter-linkages of important components for the proper functioning of the Customer-Controlled Instant-Response Anti-Fraud/Anti-Identity-Theft Device (with true-personal identity verification application), or CCIRAF/AITD or EucliStar eGeeenie or Universal eGeeenie or eGeeenie, but without built-in Near-Field Communication (NFC) system and component, (with a possible future inter-linkage with a "Self-Generating Power Module", which is not applied for in this present patent application, but is separately described and illustrated in details in another one or more other patent applications and specifications), and equipped with a battery charger/adapter 320.

Figure 34:
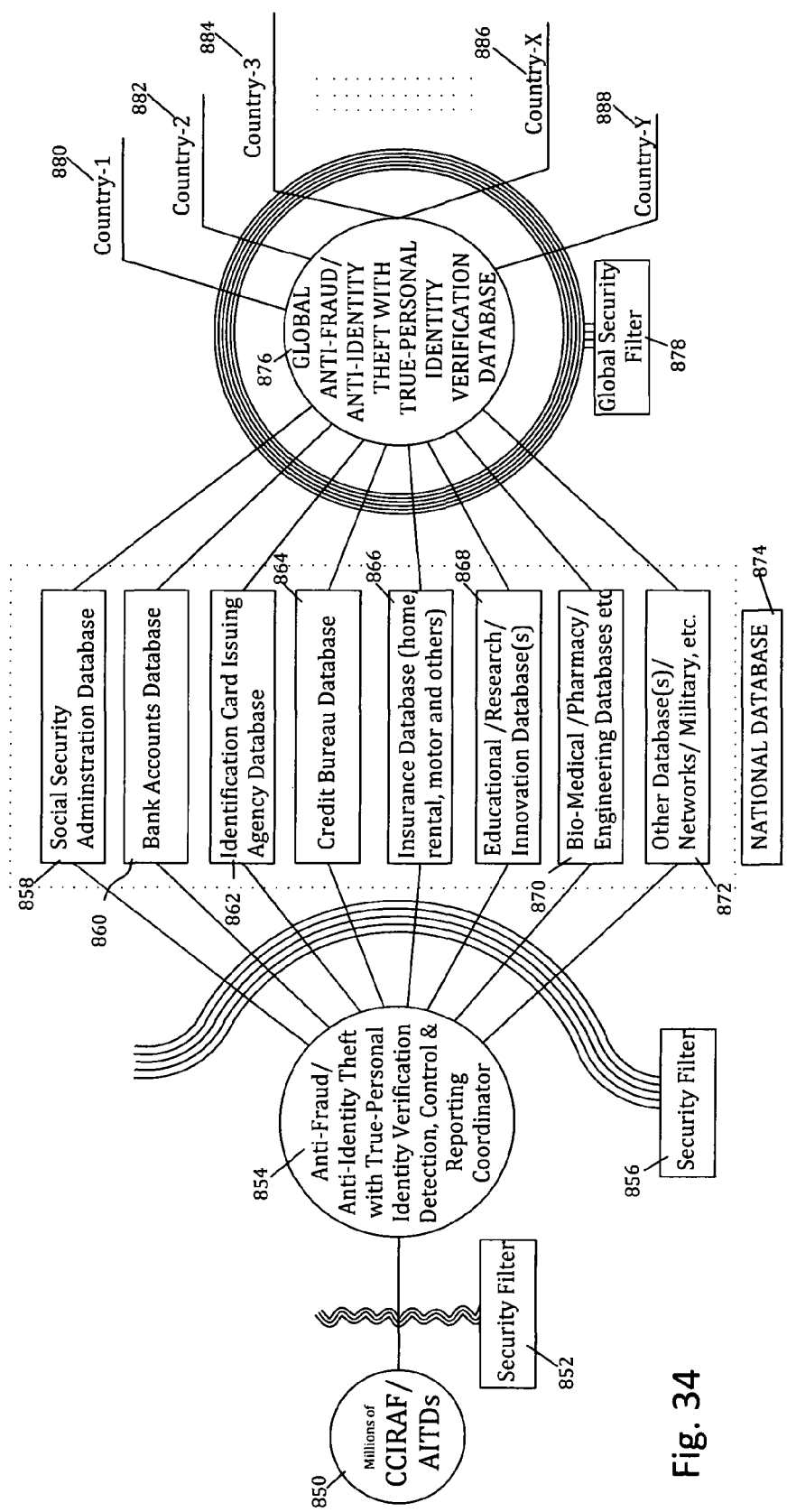

FIG. 34 illustrates a general view representation of the potential inter-linkages, networks and databases and systems with superior detection, monitoring, control of secured data/information transmissions and memory-storage and recall between the respective registered hundreds of millions of future authorized customers and/or authorized users with their respective registered CCIRAF/AITDs or EucliStar eGeeenies or Universal eGeeenies or eGeeenies, as coordinated and inter-linked with a "Tamperproof Anti-Virus and Anti-Shock National and Global Security Filters" (which is not included in this present patent application and specification, but separately described and illustrated in another one or more patent applications and specifications).

Figure 35:
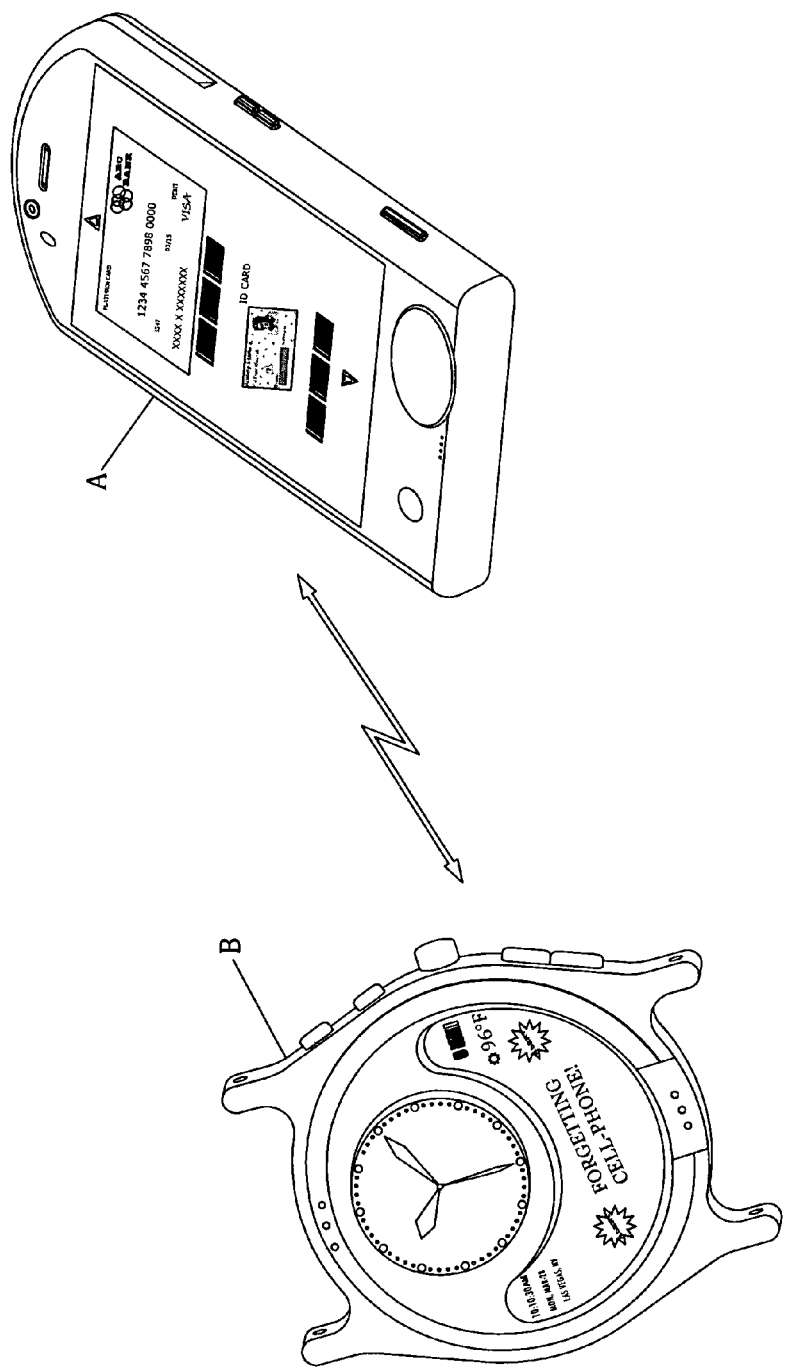

FIG. 35 illustrates the secured wireless inter-linkage of the CCIRAF/AITD or EucliStar eGeeenie or eGeeenie or Universal eGeeenie or eGeeenie with an anti-loss distance-sensitive forgetless alarm reminder wrist watch or GreeetWatz (the anti-loss distance-sensitive forgetless alarm reminder wrist watch or GreeetWatz, which is merely mentioned here for simple illustration only of its possible inter-linking with the CCIRAF/AITD or EucliStar eGeeenie or Universal eGeeenie or eGeeenie, (but the anti-loss distance-sensitive forgetless alarm reminder wrist watch or GreeetWatz is not included in this present patent application and specification, and belongs and included in another separate patent application(s) and specifications).

IN ORDER TO CLEARLY DESCRIBE THE DETAILS OF THE PRESENT INVENTION SPECIFICATIONS, THE FOLLOWING PARTS ARE RESPECTIVELY LABELED WITH THE CORRESPONDING NUMERALS AND ALPHA-NUMERIC REPRESENTATIONS

50—is a first embodiment of the Customer-Controlled Instant-Response Anti-Fraud/Anti-Identity Theft Device (with true-personal identity verification) or CCIRAF/AITD or EucliStar eGeeenie or Universal eGeeenie or eGeeenie, with cellular and/or satellite mobile phone/internet applications capabilities and features, but, without a Near Field Communication (NFC) system and component, as shown in FIGS. 1, 2, 3, 4, 5, 6A, 6B, 7, 8, 14, 17 and 24.

52—is the interactive LCD Display shown in FIGS. 1, 6A, 7 and 8.

54—is the manual keypad shown in FIGS. 1, 6A, 7 and 8 of the first and second embodiments of the present inventive device or CCIRAF/AITD or EucliStar eGeeenie or Universal eGeeenie or eGeeenie, for the cellular and/or satellite mobile phone/internet functions, and, also part of the operating means for anti-fraud/anti-identity-theft with true-personal identity verification functions.

56—is the Biometric scanner shown in FIGS. 1, 6A, 7 and 8 of the first and second embodiments of the CCIRAF/AITD or EucliStar eGeeenie or Universal eGeeenie or eGeeenie.

56a—is the finger-swipe Biometric scanner of the seventh and eighth embodiments 112 and/or 112a, which is/are in the form of mini-notebook type or model of the CCIRAF/AITD or EucliStar eGeeenie or Universal eGeeenie or eGeeenie shown in FIGS. 27, 27A and 28A of the CCIRAF/AITD or EucliStar eGeeenie or Universal eGeeenie or eGeeenie.

58—is the Credit/Debit Card swiping slot shown in FIGS. 1, 2, 4, 6A, 6B, 9B, 9D, 10A, 11, 11A, 11C, 11D, 27, 27A, 27C and 28A.

60—is the Credit/Debit Card magnetic stripe reader shown in FIG. 1 (in dotted double circle), 2, 4, 8, 9 (in dotted circle), 9A (in dotted circle), 9B, 9D, 11 (in dotted circle), 11A (in dotted circle), 27 (in dotted circle), 27A (in dotted circle), 27C and 28A (in dotted circle).

62—is the Anti-Fraud/Anti-Identity-Theft with true-personal identity verification applications On/Off button of the CCIRAF/AITD or EucliStar eGeeenie or Universal eGeeenie or eGeeenie, shown in FIGS. 1, 6A, 7 and 8.

64—is the Accept button of the first and second embodiments of CCIRAF/AITD or EucliStar eGeeenie or Universal eGeeenie or eGeeenie for the anti-fraud and anti-identity-theft with true-personal identity verification applications functions for transactions, shown in FIGS. 1, 6A, 7 and 8.

66—is the Reject button of the first and second embodiments of the CCIRAF/AITD or EucliStar eGeeenie or Universal eGeeenie or eGeeenie for the anti-fraud and anti-identity-theft applications with true-personal identity verification functions for transactions shown in FIGS. 1, 6A, 7 and 8.

68—is the Debit button of the first and second embodiments of the CCIRAF/AITD or EucliStar eGeeenie or Universal eGeeenie or eGeeenie, illustrated in FIGS. 1, 6A, 7, and 8.

70—is the Credit button of the first and second embodiments of the CCIRAF/AITD or EucliStar eGeeenie or Universal eGeeenie or eGeeenie, illustrated in FIGS. 1, 6A, 7, and 8.

72—is the LED signal indicator, illustrated in FIGS. 1, 6A, 7, 8, 9, 9A, 10A, 10B, 11, 11A, 11C, 27, 27A and 28A.

74—is the Mini-USB and charge means, shown FIGS. 3, 9C, 10B, 27B, 28A and 28B.

76—is the Head set provision, illustrated in FIGS. 3, 9C, 10B, 27B, 28A and 28B.

78—is the Speaker, shown in FIGS. 1, 6A, 7, 8, 9, 9A, 10A, 10B, 11, 11A, 11C, 27, 27A and 28A.

80—is the Microphone, shown in FIGS. 1, 6A, 7, 8, 9, 9A, 10A, 10B, 11, 11A, 11C, 27B, 28A and 28B.

82—is the GPS access means, shown in FIGS. 1, 3, 4, 7, 8, 27B, 28A and 28B.

84—is the Voice recording access means, shown in FIGS. 1, 3, 5, 7 and 8.

86—is the Temporary memory (Micro/SD) provision, shown in FIGS. 2, 6A and 6B.

88—is the back Camera, shown in FIGS. 6B, 9F, 11B, 11D and 28B.

8a—is the front camera shown in FIGS. 11, 11A, 11C, 27, 27A and 28A.

90—is the Menu access button, shown in FIGS. 1, 6A, 7 and 8 of the first and second embodiments of the present inventive device or CCIRAF/AITD or EucliStar eGeeenie or Universal eGeeenie or eGeeenie.

92—is the Options button, shown in FIGS. 1, 6A and 7 of the first embodiment of the present inventive device or CCIRAF/AITD or EucliStar eGeeenie or Universal eGeeenie or eGeeenie.

94—is the start talk button or accept and receive call button for the cellular and/or satellite phone functions, and also the Accept and Send button for the internet function of the CCIRAF/AITD or EucliStar eGeeenie or Universal eGeeenie or eGeeenie, shown in FIGS. 1, 6A, 7 and 8 of the first and second embodiments of the present inventive device or CCIRAF/AITD or EucliStar eGeeenie or Universal eGeeenie or eGeeenie.

96—is the One Step Back button shown in FIGS. 1, 6A, 7 and 8 of the first and second embodiments of the present inventive device or CCIRAF/AITD or EucliStar eGeeenie or Universal eGeeenie or eGeeenie. If pressed once, it functions as one step back.

98—is the Hang Up Call button or Call Reject and End Call button for both the cellular and/or satellite phone function, and for Internet Refuse, End, Cancel and Close button function of the first and second embodiments of the CCIRAFD/AITD or EucliStar eGeeenie or Universal eGeeenie or eGeeenie, shown in FIGS. 1, 6A, 7 and 8 of the present inventive device.

100—is the USB port provision shown in FIGS. 3, 9C, 10B, 27B, 28A and 28B.

102—is a physical Credit/Debit card shown in FIGS. 7, 14 and 17.

104—is the Magnetic stripe of a credit/debit card, shown in FIG. 7.

106—is a second embodiment of the Customer-Controlled Instant-Response Anti-Fraud/Anti-Identity Theft Device with true-personal identity verification, or CCIRAF/AITD or EucliStar eGeeenie or Universal eGeeenie or eGeeenie, shown in FIG. 8, and with cellular and/or satellite mobile phone, and with built-in integrated Near Field Communication (NFC) system and components.

108—is the Near Field communication (NFC) access button, shown in FIG. 8 of the second embodiment of the present inventive device or CCIRAF/AITD or EucliStar eGeeenie or Universal eGeeenie or eGeeenie.

110—is the Near Field Communication (NFC) system and components, shown in FIGS. 8, 9A, 11A and 27A.

112—is a Mini-notebook type seventh embodiment of the CCIRAF/AITD or eGeeenie or Universal eGeeenie or eGeeenie, integrated with cellular and/or satellite mobile phone features and functions, shown in FIGS. 27, 27B, 27C, 28A, 28B, without integrated built-in Near Field Communication (NFC) system and component.

112a—is a Mini-notebook type eighth embodiment of the CCIRAF/AITD or eGeeenie or Universal eGeeenie or eGeeenie, integrated with cellular and/or satellite mobile phone features and functions, shown in FIGS. 27A, 27B, 27C, 28A, 28B, with integrated built-in Near-Field communication (NFC) system and component.

114a—is the front of the seventh and eighth embodiments 112 and 112a of the present inventive device or CCIRAF/AITD or eGeeenie or Universal eGeeenie, shown in FIGS. 27, 27A and 28A.

114b—is the bottom side of the same seventh and eighth embodiments 112 and 112a of the present inventive device or CCIRAF/AITD or EucliStar eGeeenie or Universal eGeeenie or EucliStar eGeeenie or Universal eGeeenie or eGeeenie, shown in FIG. 27B.

114c—is the left side of the seventh and eighth embodiments 112 and 112a of the CCIRAF/AITD or EucliStar eGeeenie or Universal eGeeenie or eGeeenie, shown in FIG. 27C.

116—is the Touch-Screen type interactive LCD display area of the seventh and eighth embodiments 112 and 112a of the CCIRAF/AITD or EucliStar eGeeenie or Universal eGeeenie or eGeeenie, shown in FIGS. 27, 27A and 28A.

118—is the Flip top of the seventh and eighth embodiments 112 and 112a of the CCIRAF/AITD or EucliStar eGeeenie or Universal eGeeenie or eGeeenie, shown in FIGS. 27, 27A, 27B, 27C, 28A and 28B.

120—is the Main display (1) of the seventh and eighth embodiments 112 and 112a of the present inventive device or CCIRAF/AITD or EucliStar eGeeenie or Universal eGeeenie or eGeeenie, shown in FIGS. 27, 27A, 27C and 28A.

122—is the Quick access LCD Display (2) of the seventh and eighth embodiments 112 and 112a of the CCIRAF/AITD or EucliStar eGeeenie or Universal eGeeenie or eGeeenie, shown in FIG. 28B.

124a—is the Temporary memory provision-1 of the seventh and eighth embodiments 112 and 112a of the present inventive device, shown in FIGS. 27, 27A, 27C and 28A.

124b—is the Temporary memory provision-2 of the seventh and eighth embodiments 112 and 112a of the present inventive device, shown in FIGS. 27, 27A, 27C and 28A.

126—is the Menu button of the seventh and eighth embodiments 112 and 112a of the present inventive device, shown in FIGS. 27, 27A and 28A.

128—is the Call Accept button of the seventh and eighth embodiments 112 and 112a of the present inventive device, shown in FIGS. 27, 27A and 28A.

130—is the Call Reject button of the seventh and eighth embodiments 112 and 112a of the present inventive device shown in FIGS. 27, 27A and 28A.

132 and 134—are the hinged rod-and-socket structural linking combination connector of the seventh and eighth embodiments 112 and 112a of the present inventive device, shown in FIGS. 27, 27A and 28A.

136a and 136b—represents the third and fourth embodiments, respectively of the CCIRAF/AITD or present inventive device or EucliStar eGeeenie or Universal eGeeenie or eGeeenie, correspondingly shown in FIGS. 9, 9A, 9B, 9D, 9E, 9F, 10A, 10B, and 22.

136c and 136d—represents the fifth and sixth embodiments, respectively of the CCIRAF/AITD or present inventive device or EucliStar eGeeenie or Universal eGeeenie or eGeeenie, correspondingly shown in FIGS. 11, 11A, 11B, 11C, and 11D.

138—is the interactive LCD display of the third, fourth, fifth and sixth embodiments of the present inventive device or CCIRAF/AITD or EucliStar eGeeenie or Universal eGeeenie or eGeeenie, shown in FIGS. 9, 9A, 10A, 10B, 11, 11A, and 11C.

140—is the Biometric Scanner of the third, fourth, fifth and sixth embodiments of the CCIRAF/AITD or EucliStar eGeeenie or Universal eGeeenie or eGeeenie, shown in 9, 9A, 10A, 10B, 11, 11A and 11C.

142—Menu access button of the third, fourth, fifth and sixth embodiments of the CCIRAF/AITD or EucliStar eGeeenie or Universal eGeeenie or eGeeenie, shown in FIGS. 9, 9A, 10A, 10B, 11, 11A and 11C.

144a—is the Virtual ID of the authorized customer or user, projected on the interactive LCD display of the third, fourth, fifth and sixth embodiments of the CCIRAF/AITD or EucliStar eGeeenie or Universal eGeeenie or eGeeenie or eGeeenie, shown in FIGS. 9, 9A, 10A, 10B, 11, 11A and 11C.

144b—is the Virtual bar code that represents the Virtual ID of the authorized customer or user of the CCIRAF/AITD or EucliStar eGeeenie or Universal eGeeenie or eGeeenie, shown in FIGS. 9, 9A, 10A, 10B, 11, 11A and 11C.

146a—is the LCD-displayed virtual image of a virtual credit/debit card representing the corresponding physical credit/debit card; the virtual image of a virtual credit/debit card is shown in FIGS. 9, 9A, 10A, 10B, 11, 11A and 11C.

146*b*—is an LCD-displayed virtual bar code, shown in FIGS. 9, 9A, 10A, 10B, 11, 11A, and 11C, that is recalled prestored from the memory of the third, fourth, fifth and sixth embodiments of the CCIRAF/AITD or EucliStar eGeeenie or Universal eGeeenie or eGeeenie, and, the LCD-displayed virtual bar code represents the exact needed data/information of all relevant data/information about the correspondingly displayed virtual credit/debit card that is a substitute of the actual corresponding correct physical credit/debit card to be used. This specific projected virtual bar code can be accurately read by a corresponding LCD bar code reader at a point-of-sale (POS) terminal.

148*a*, 148*b*, 148*c* and 148*d* are Auxiliary buttons (correspondingly shown) for the third, fourth, fifth, sixth, seventh and eighth embodiments of the present inventive device(s) for the customized usage of the CCIRAF/AITD or EucliStar eGeeenie or Universal eGeeenie, correspondingly shown in FIGS. 9, 9A, 9B, 9C, 9D, 9E, 9F, 10A, 10B, 11, 11A, 11B, 11C, 11D, 27, 27A, 27C and 28A.

378*a*—is the Point-of-Sale (POS) terminal, shown in FIGS. 14 and 22.

378*b*—is the Online or Telephonic Purchase Information terminal, shown in FIG. 17.

380—is the Customer's Bank Account, illustrated in FIGS. 14, 17 and 22.

382—is the Merchant's Credit/Debit Card Processing Means, shown in FIGS. 14, 17 and 22.

384—is the Customer's Credit/Debit Card Processing Means, shown in FIGS. 14, 17 and 22.

386—is the Merchant's Bank Account, illustrated in FIGS. 14, 17 and 22.

388—is for validating Biometrics, shown in FIG. 22.

390—is the electronic bar code reader for reading an LCD-projected Virtual bar code in FIG. 22.

w—is the switchable 2D/3D activation button, shown in FIGS. 1, 2, 4, 5, 6A, 6B, 7, 8, 9, 9A, 9C, 9D, 9F, 10B, 11, 11A, 11B, 27, 27A, 27C, 28A, 29, 29A, 29C, 29D, 29E and 30B, that is capable of activating the 2D mode of the interactive LCD displays ordinarily shown in 2Ds for various anti-fraud and anti-identity theft with true-personal identity applications and sub-applications as well as for other applications and sub-applications, and projecting images, messages, alerts, icons, visual prompts, commands, virtual membership cards, virtual credit/debit cards, still photos or videos ordinarily in 2D for ease of operations; and, also for switching the interactive LCD displays into the 3D mode for displaying clear and exciting 3-dimensional images for viewing especially useful for watching sporting games, video games, movies, videos shoots and still photographs, and also for use in highly meticulous anti-fraud and anti-theft with true-personal identity verification applications, etc.

x—is the solar panel shown in FIGS. 9F, 11B, 11D, 28B and 29C.

y—is the thermo sensor activation switch shown in FIGS. 9, 9A, 9B, 9E, 9F, 10A, 11, 11A, 11B, 11C, 11D, 27, 27A, 27C, 28A, 29, 29A, 30A and 30B.

A—is the present inventive device or CCIRAF/AITD or EucliStar eGeeenie or Universal eGeeenie or eGeeenie, shown in FIG. 35.

B—is the coordinating alerting device that can remind the user of the CCIRAF/AITD or EucliStar eGeeenie or Universal eGeeenie or eGeeenie shown in FIG. 35. The coordinating alerting device is programmed to be distance-sensitive. It is merely mentioned here for illustration purposes, but is not part of the present patent application, but, included in a separate patent application and specification.

Note:

In order not to be confused and become more clarified, the numbered labeled parts of the following are specifically for the tablet-type of embodiments of the present inventive device only, which are different from the numbered labeled parts of the other embodiments, such as the first, second, third, fourth, fifth, sixth, seventh and eighth embodiments of the present inventive device or CCIRAF/AITD or EucliStar eGeeenie or Universal eGeeenie or eGeeenie. However, the exceptions are the labeled parts with labels of letters x, y and w, which represent the same parts in the other previously mentioned and illustrated first, second, third, fourth, fifth, sixth, seventh and eighth embodiments, as the same labeled parts in the tablet-type embodiments.

900—is the Tablet-type embodiment of the CCIRAF/AITD or EucliStar eGeeenie, without a built-in integrated Near-Field Communication (NFC) component and system, found in FIGS. 29, 29B, 29C, 29D, 29E, 30A, and 30B.

900*a*—is the Tablet-type embodiment of the CCIRAF/AITD or EucliStar eGeeenie or Universal eGeeenie or eGeeenie, equipped with built-in integrated Near-Field Communication (NFC) component and system, found in FIGS. 29A, 29B, 29C, 29D, 29E, 30A and 30B.

902—is the interactive Touch-Screen LCD Display, found in FIGS. 29, 29A, 30A and 30B.

904—is the Menu button, found in FIGS. 29, 29A, 30A and 30B.

906—is the Biometric scanner, found in FIGS. 29, 29A, 30A and 30B.

908—is the Options Buttons for Anti-Fraud/Anti-Identity Theft with True-Personal Identity Verification applications, found in FIGS. 29, 29A, 30A and 30B.

910—is the Options Buttons for operating the Tablet-type embodiment of the CCIRAF/AITD or EucliStar eGeeenie or Universal eGeeenie or eGeeenie, found in 29, 29A, 30A and 30B.

912—is the Speaker, found in FIGS. 29, 29A, 30A and 30B.

914—is the camera, found in FIGS. 29, 29A, 30A and 30B.

916—is the LED indicator, found in FIGS. 29, 29A, 30A and 30B.

918—is the Magnetic stripe reader, found in FIGS. 29, 29A, 29B, 29C and 29D.

920—is the swiping slot for the physical Credit/Debit Card, found in FIGS. 29, 29A, 29B, 29C, 29D and 30A.

922—is the Headset provision, found in FIGS. 29B and 30A.

924—is the Mini USB provision/charging port means, found in FIGS. 29B and 30A.

926*a*, 926*b*—are the USB provisions, found in FIGS. 29B and 30A.

928—is the Micro/SD provision, found in FIGS. 29B and 30A.

930—is the Microphone, found in FIGS. 29E, 30A and 30B.

932—is the Connector means, found in FIGS. 29E, 30A and 30B.

934—is the built-in integrated NFC system and component, found in FIG. 29A.

DETAILED DESCRIPTIONS AND EXPLANATIONS (A) Descriptions of Some of the General Operating/Workings of the CCIRAF/AITD or EucliStar eGeeenie or Universal eGeeenie or eGeeenie Note:

It is to be understood that since each of the CCIRAF/AITD or EucliStar eGeeenie or Universal eGeeenie or eGeeenie are equipped with means for accurate electronic time, calendar date, as well as progressive timing functionalities, the authorized customers/users must first make the correct settings of real time and calendar dates, according to the respective geographical locations and time zones where the authorized customers/users will be using each of the CCIRAF/AITDs or EucliStar eGeeenies or Universal eGeeenies. Of course, when traveling with the respective CCIRAF/AITD or EucliStar eGeeenie or Universal eGeeenie, since the present inventive device is also equipped with the GPS functionality, when in the ON position, the times and dates can be programmed to automatically adjust to the current locations, according to the programmed settings. All relevant transactions or activities, therefore, can each be tagged automatically and electronically with the real time and calendar dates, and, possibly with the names of places (if applicable according to the desired programming applications) for accurate transaction secured memory storage, transmission, authentication, verification, validation, acceptance, authorization or rejection between the authorized customer's respective registered CCIRAF/AITD or EucliStar eGeeenie or Universal eGeeenie, as coordinated with the various relevant banks, credit lending institutions, government and private agencies, airports, aircrafts, flight itineraries, destination places, designated entry places, military operations, etc. and other relevant organizations or agencies for verifiable authentic secured information data transmission, storage, memory recall, references for tracking and other desired activities and for evidentiary purposes, according to the desired ongoing active applications being progressively prompted and being operationally continued by the particular authorized customer/user.

All and/or any of the various selected CCIRAF/AITDs or EucliStar eGeeenies or Universal eGeeenies, according to the relevant programming and applications, needs, requirements, rules, policies, laws and necessities, can and must be respectively electronically registered to the required or needed relevant corresponding banks and/or credit card issuing institutions or companies, as well as registered (when required or needed) to other relevant legitimate organizations or agencies, such as medical/health care insurances (if applicable), schools, clubs, or other organizations or agencies, like the Department of Homeland Security, Department of Labor, Department of Transportation, Transportation Security Administration (TSA), Police Department, Department of Education, Department of Health, Immigration and Naturalization Agency, Military/law enforcement, etc.

For the safety and security of traveling airplane passengers, crews and other workers, and the safety of the public, in general, and, in order to achieve more effective and systematic faster, easier and vastly convenient methods and systems of strict electronic security for true-personal identity verification screening and surveillance of passengers, crew members and other relevant workers in various relevant airports, aircrafts and travel routes, the respectively owned correct CCIRAF/AITDs or EucliStar eGeeenies or Universal eGeeenies can be programmed with the correct applications so that the corresponding flight tickets of the respective passengers, along with the relevant authentically verifiable true-personal identity verification security clearance of crew members and relevant workers who are and will be boarding the specific planes/aircrafts with their flights routes, including connecting flights and airport destinations, can be effectively tagged, verified, controlled and managed.

The corresponding flight tickets, itineraries and possibly the checked-in and carry-on luggage (if applicable) of the corresponding passengers can be tagged with and co-related and electronically securely wirelessly inter-linked with the corresponding correct authorized customers/users/passengers who bring along their own respective correctly registered CCIRAF/AITDs or EucliStar eGeeenies or Universal eGeeenies.

The respective authorized customers/users/passengers who owns or own the respective CCIRAF/AITD or EucliStar eGeeenie or Universal eGeeenie, will also be securely and safely protected with their personal and/or business accounts encrypted data and/or verifiable personal identification (ID) and/or membership (ID) data and/or verifiably authenticated as the real passengers tagged with their corresponding luggage (if applicable) for secured transmissions and communication to and from the respective registered CCIRAF/AITD or EucliStar eGeeenie or Universal eGeeenie, and, the relevant corresponding banks and/or credit card issuing institutions or companies and/or other relevant legitimate organizations, such as medical/health insurance companies (if applicable), schools, clubs, or other organizations or agencies, like the Department of Homeland Security, Department of Labor, Department of Transportation, (TSA) Transportation Security Administration, Police Department, Department of Education, Department of Health, Military/Law Enforcement, etc. can be linked to the corresponding correctly registered CCIRAF/AITD or EucliStar eGeeenie or Universal eGeeenie, according to the programming and application requirements necessary to bring about better safety and security. The names and locations of airports, and also for electronic tagging with airline tickets with flights itineraries and aircraft reservations, including luggage of the passengers (if applicable), can also be electronically linked to the correspondingly registered CCIRAF/AITD or EucliStar eGeeenie or Universal eGeeenie of the passengers/customers/users in order to achieve smoother faster and more convenient secured entry and departure to and from various airports involved in each registered passenger/user flights, as well as with airports of connecting flights, until the final flight destinations of the relevant registered passengers/users.

The real serial number of the respective CCIRAF/AITD, or EucliStar eGeeenie or Universal eGeeenie, whether easily readable or coded, can be registered by itself or programmed to reveal representative sub-serial numbers (according to the selected program applications to avoid confusion of registration and conserve segregation of security data/information) to each be properly registered to the relevant correct banks and/or credit card issuing institutions or companies or any other legitimate organizations or agencies, such as medical/health insurance companies (if applicable), schools, clubs or other organizations or agencies, like the Department of Homeland Security, Department of Labor, Department of Transportation, (TSA) Transportation Security Administration, Police Department, Department of Education, Department of Health, Immigration and Naturalization Agency, Military/Law Enforcement, etc, names and locations of Airports, and also for electronic tagging with corresponding airline tickets with flights itineraries and aircraft reservations, including luggage of the passengers, (if applicable), etc. with which each registered authorized customer/user owning the respective registered CCIRAF/AITD or EucliStar eGeeenie or Universal eGeeenie, is dealing with.

Before initial use of each respective registered CCIRAF/AITD or EucliStar eGeeenie or Universal eGeeenie, a special passcode or password or PIN and/or biometric data of the authorized customer/user must first be entered and stored into the memory of the respective CCIRAF/AITD or EucliStar eGeeenie or Universal eGeeenie, so that there is a safe and secured basis of comparison for any other further entry of the relevant required special passcode or password or PIN and/or biometric data, with which proper authentication of the correct authorized customer/user of the respective registered CCIRAF/AITD or EucliStar eGeeenie or Universal eGeeenie can be determined, before any further authorized uses of the respective correctly registered CCIRAF/AITD or EucliStar eGeeenie or Universal eGeeenie can be successfully made fully operational.

All accurate secured accounts and relevant required data/information such as those of relevant legitimate bank accounts, credit cards and/or credit cards, checking and/or savings, or medical insurance identifications (if applicable), membership cards, airport and aircraft flight entry cards or passes for boarding of airline passengers, and for other entry to restricted facilities, military, etc. including selected secret PIN or password or relevant biometrics, other relevant personal and/or business information, etc. of each of the authorized customers/users must be securely entered into the respective registered CCIRAF/AITD or EucliStar eGeeenie or Universal eGeeenie, by the respective banks or credit card companies, medical/health insurance companies, or airline ticketing in coordination with aircraft boarding facilities and relevant agencies, military, etc., either wirelessly or wired, or by optical means, and/or securely entered by the respective authorized customers/users, before successful usage of the respective correctly registered CCIRAF/AITD or EucliStar eGeeenie or Universal eGeeenie can be made correctly and fully operational.

In case of the electronically generated LCD-displayable personal and/or organizational membership virtual identification (ID) cards, and the corresponding virtual bar codes that represent each of the virtual identification (ID) cards of the respective correct authorized customers/users of the corresponding virtual credit cards or debit cards or insurance cards, and other relevant legitimate virtual identification (ID) cards, etc., can also be correctly registered respectively to the relevant organizations. Both virtual IDs and their corresponding bar codes, including various relevant transactions or operations made according to the desired program applications and dates of occurrence can be securely stored in the storage memories of the respective correctly registered CCIRAF/AITD or EucliStar eGeeenie or Universal eGeeenie, and the corresponding secured storage memories of the respective relevant organizations or agencies with whom the registered authorized customer/user is dealing with. In this way, when using displayable LCD-generated virtual credit cards or debit cards or virtual insurance cards, virtual military cards, etc. and other relevant virtual personal ID cards, as well as the corresponding LCD-generated virtual IDs' bar codes representations, there can result into accurate secured verifiable and authenticated anti-fraud and anti-identity theft with true-personal verification protections and true-personal identification on the part of the correctly registered authorized customers/users with their corresponding properly registered CCIRAF/AITDs or EucliStar eGeeenies or Universal eGeeenie, for smooth secured transactional operations using virtual credit cards or debit cards or virtual insurance cards, virtual organizational cards, virtual military cards, etc. and other legitimate virtual ID cards, as means of transactions and security verifications, in the absence of physical credit cards/debit cards/insurance cards, in the absence of the respective physical membership ID cards for various relevant organizations or agencies, or in the absence of the physical military cards, etc.

(B) For any or all (but not Limited to the Following Citations and Applications) the Succeeding Uses of the Respective Correctly Registered and Initially Correctly Prepared CCIRAF/AITD or EucliStar eGeeenie or Universal eGeeenie ARE Enumerated as Follows Power up and switch on the CCIRAF/AITD or EucliStar eGeeenie or Universal eGeeenie. Select the anti-fraud/anti-identity theft with true-personal identity verification program applications in the inventive device. The inventive device or CCIRAF/AITD will then request for the biometrics data and/or PIN. Scan the finger to input the required finger biometrics data of the authorized customer/user and/or enter the PIN. The inventive device then checks to validate the finger biometrics and/or PIN or password with the ones that have been stored in the respective inventive device's memory during the initial preparation phase of the CCIRAF/AITD or EucliStar eGeeenie or Universal eGeeenie. If the respective inventive device or CCIRAF/AITD validates the inputted data for correct authentication for use of the respective CCIRAF/AITD, then the authorized customer/user can access the anti-fraud/anti-identity theft with true-personal verification program applications, applications installed in the CCIRAF/AITD or EucliStar eGeeenie or Universal eGeeenie.

If the authentication is not validated, then, the corresponding inventive device or CCIRAF/AITD or EucliStar eGeeenie or Universal eGeeenie displays and/or announces a message of "Fraudulent Usage" and the CCIRAF/AITD will not work." Then, the authorized customer/user has to select the sub-applications, like transaction, account balance and transaction history enquiries, transfer of funds, pre-authorize a future transactions by credit/debit cards, cheque, virtual cards transactions, medical/health insurance, and other relevant transactions and operations with the relevant organizations or agencies, or according to desired military programming application, or according to the airport/aircraft and TSA programmed applications, etc.

Each respective registered CCIRAF/AITD or EucliStar eGeeenie or Universal eGeeenie must be correctly and wirelessly linked to the corresponding correct banks and/or lending institutions, or other desired relevant organizations or agencies, relevant medical/health insurance companies or military (if applicable), or according to the airport/aircraft and TSA programmed applications, etc. with guaranteed very secured data transmissions, and safely protected databases and networks.

Each respective registered CCIRAF/AITD or EucliStar eGeeenie or Universal eGeeenie is programmed to respond to sequentially guided prompts, either visual or audio or audio-visual combination, and, can effectively and conveniently interact with manual means or touch-screen interactive scrolling and other manipulative means or interactive voice-commands and instant-response means or a combination of interactive audio-visual manual or touch-screen scrolling and tapping means or other manipulative means, with numeric or alphabetic or iconic image representation means, according to the desired applications and operations demanded or required by the respective authorized customers or authorized users, and according to the programmed applications and sub-applications being made actively and securely operational.

While using the internet or the mobile telephone, either or both cellular or satellite functionalities of the CCIRAF/AITD or EucliStar eGeeenie or Universal eGeeenie, whenever there is any anti-fraud and/or anti-identity theft with true-personal identity verification alarm(s), alert(s) or warning(s), if the authorized customers or authorized users desire to immediately respond to the respective alarm(s), alert(s) or warning(s), he or she can immediately answer or respond to such alarm(s) or alert(s), and the ongoing internet and/or cellular or satellite phone functionalities can be put on hold, or can be interrupted or canceled. There are definitive selective programmable differences in the ring tones or selected audio-visual messages or alarm vibrations between the anti-fraud and identity theft with true-personal identity verification functionalities, definitely differing from those of the internet or gaming or telephonic or other functionalities, all according to the programming of the relevant applications and sub-applications and required operations.

Also, the severity or degrees of importance for responding to the anti-fraud and anti-identity theft with true-personal identity verification alarm(s), alert(s) or warning(s) can be programmed to the various graded degrees of importance by distinguishable ring tones and audio-visual alarm(s) or reminder(s) or vibration alarm(s), which can be selected or set or programmed by the authorized customers or authorized users or factory set (if desired or programmed). Similarly, the graded or degrees of importance for responding to the cellular and/or satellite phone and internet messages can also be graded according to the importance with various distinguishable ring tones or vibration alarms, which can also be set or programmed by the authorized customers or authorized users or factory-set (if desired or programmed). The important thing is the definite identifiable and distinct alarms or ring tones or vibration alarms for anti-fraud and anti-identity theft with true-personal identity verification, must be very distinguishable from the ring tones or vibration alarms of the cellular and satellite phone and other functionalities. Synthesized speech with iconic or graphical visual alarms can also be pre-programmed settings for the applications and operations of the respective CCIRAF/AITD or EucliStar eGeeenie or Universal eGeeenie.

Note:

According to the programming of the Menu, and icon representations, some of the following may be included under major sub-applications or sub-sub applications under the activated Anti-Fraud and Anti-Identity Theft with True-Personal Identity Verification Applications, yet the respective correct authorized customer or authorized user will be guided and prompted sequentially during the interactive processes with the audio or visual or audio-visual interactive LCD displays and speaker system of the respective correct CCIRAF/AITD or EucliStar eGeeenie or Universal eGeeenie.

Transactions Using Physical and/or Virtual Bank Cards or Credit Cards

If the authorized customer/user selects the transaction sub-application, he or she is enabled to make purchases of merchandise or order services. Then, the authorized customer/user has to select the type of transaction, i.e. POS merchandize, online or telephonic transaction. The inventive device then prompts the authorized customer/user to select the particular bank account to make a transaction using a virtual credit/debit card or swipe a physical credit/debit card or manually enters the credit/debit card details to make the transaction using physical credit card or debit card, and the customer/user then selects the type of card (if required). Since each bank account has its own PIN/password to be used for transactions, the authorized customer/user has to enter the specific PIN/password. The inventive device then requests for the amount and currency (if not yet set) to be transacted, date and time of transaction (if the system does not automatically generate them) and the access number of the merchant (optional). The authorized customer/user selects "next" to proceed with the transaction.

The present inventive device or CCIRAF/AITD or EucliStar eGeeenie or Universal eGeeenie or eGeeenie generates a random number, which in this present invention is called as Transaction Identification Number (TIN) and, is displayed on the inventive device's interactive LCD display. If correct authentication does not validate, the inventive device or CCIRAF/AITD or EucliStar eGeeenie or Universal eGeeenie or eGeeenie is set to alarm and record for the fraudulent usage of the particular credit/debit card. If correct authentication is validated, the CIRAF/AITD or EucliStar eGeeenie or Universal eGeeenie or eGeeenie is instantly notified about the success of the transaction. In certain cases, if the funds determined by the relevant processing means are not sufficient, then the relevant processing means sends an alarm signal or message back to the respective CCIRAF/AITD or EucliStar eGeeenie or Universal eGeeenie or eGeeenie, and records the insufficient funds in the particular account in the inventive device's memory for reference, and the transaction is not processed further.

The authorized customer or authorized user, can then decide whether to cancel the particular transaction or correct the insufficiency of funds in that particular account by wirelessly transferring enough funds into the particular account with insufficient funds, to be deducted from another selected account that has sufficiently enough funds to cover the insufficient account, or, if he or she wants to use another account with sufficient credit/debit funds for use to be able to proceed further with the transaction, until he or she is satisfied with the instant wireless message of confirmation that the selected credit/debit card account has sufficient enough funds to cover a particular transaction to be made with the particular merchant. After the merchant part of transaction is accomplished successfully, a completed transaction message will be sent back to the respective registered CCIRAF/AITD or EucliStar eGeeenie or Universal eGeeenie of the authorized customer/user.

If the GPS is on the ON mode, then the actual location or name of place can be tagged with the specific credit/debit card transactions with relevant activities for accurate storage in the memory of the authorized registered customer/user of the respective CCIRAF/AITD or EucliStar eGeeenie or Universal eGeeenie for dependable future memory retrieval.

Balance Enquiries from Banks or Credit Institutions Using Physical or Virtual Credit/Debit Cards Upon selecting for the balance enquiry, the inventive device or EucliStar eGeeenie or Universal eGeeenie then prompts the authorized customer/user to select the bank account to make a transaction using a virtual credit/debit card or swipe a physical credit/debit card or manually enters the credit/debit card details to make the transaction, and then selects the type of card (if required). Since each bank account has its own PIN/password for transaction, the authorized customer/user has to enter the transaction PIN/password for the particular account. The inventive device will display the balance of funds of the particular bank account in the interactive LCD display. If the GPS is on the ON mode, then the actual location or name of place can be tagged with the specific account balance enquiry for storage in the memory of the authorized registered customer/user of the respective CCIRAF/AITD or EucliStar eGeeenie or Universal eGeeenie for future accurate recall.

Bank or Credit Card Transaction History Enquiry Using Physical or Virtual Credit/Debit Card Upon selecting the transaction history, the inventive device or CCIRAF/AITD then prompts the authorized customer/user to select the bank account using a virtual credit/debit card or swipe the physical credit/debit card or manually enters the credit/debit bank card details to make the transaction using physical bank card or a virtual bank card, and then select the type of card (if required). Since each bank account has its own PIN/password to make transaction(s), the authorized customer/user has to enter the transaction PIN/password for the particular account. In addition, the authorized customer/user has to select the time-frame of transaction history requested. The inventive device or CCIRAF/AITD will instantly display the requested transaction history on the interactive LCD display of the inventive device or CCIRAF/AITD, according to the requested time frame.

Funds Transfer Using Physical or Virtual Credit/Debit Card

The authorized customer/user has to select the account and enter the amount from which the funds will be taken, then enter the account into which funds is to be transferred, which may be just another bank account or into the built-in NFC account of the inventive device or CCIRAF/AITD (if desired according to the relevant situation). The inventive device will send the request through the relevant processing means, and the relevant processing means process the transaction and credit the funds into the respective account similar to the above cases.

Pre-Authorization of Transaction Using Physical or VIrtual Credit/Debit Card

Upon selecting pre-authorize a transaction, the inventive device or CCIRAF/AITD then prompts the authorized customer/user to select the bank account to make a transaction using a virtual credit/debit bank card or swipe the physical credit/debit bank card into the built-in swiping slot of the respective CCIRAF/AITD, or manually enters the credit/debit bank card details to make the transaction, using physical credit/debit bank card or virtual bank card (if desired or equipped depending upon the relevant situation), and then selects the type of card (if required). Since each bank account has its own PIN/password for executing transaction(s), the authorized customer/user has to enter the transaction PIN/password for the particular account. To enable secure transaction, the user has to enter Set, and enter the transaction password to accomplish any pre-authorized transaction. If the GPS is on the ON mode, then the actual location or name of place can be tagged with the specific pre-authorization activity for storage in the memory of the authorized registered customer/user of the respective CCIRAF/AITD or EucliStar eGeeenie or Universal eGeeenie for future accurate recall.

The authorized customer/user has to enter the correct transaction password. If the password is validated, the authorized customer/user then, has to enter the amount, currency, date on which the transaction must be initiated, name of the merchant and any other information that the inventive device or CCIRAF/AITD prompts. If correct authentication does not validate, the inventive device or CCIRAF/AITD is alarmed and records for fraudulent usage of the particular credit/debit bank card. If the correct authentication gets validated, the respective CCIRAF/AITD is instantly notified of the success of executing the specific pre-authorized future transaction according to the set pre-authorized date or dates.

Cheque (Check) Transaction

The authorized customer/user has to select the sub-application for cheque (check) transaction from the anti-fraud/anti-identity theft and true-personal identity applications of the CCIRAF/AITD or Universal eGeeenie. The authorized customer/user does need to enter the details of the cheque, like the routing number, cheque number, the amount for the cheque, the date and the intended person's name or business name to whom the particular check is written for cashing the cheque, and may also include the entering of the purpose of the particular cheque (check) transaction. The inventive device or CCIRAF/AITD or eGeeenie then requests the authorized customer/use to take the picture of the particular written cheque (check), using its built-in digital camera. The authorized customer/user has to finish the photo capture and then select "next" and sends the particular cheque image and details to the respective bank's database of the particular bank account. When the actual written check is presented for cashing at a legitimate bank that is connected within the network of anti-fraud/anti-identity theft and true-personal identity verification system, the particular bank runs the particular actual written cheque (check) for validation. The actual check's information and/or image is/are matched with the information and/or image of the pre-sent data that was wirelessly sent earlier by the respective registered CCIRAF/AITD. The electronic matching can accurately determine any alteration or forgery regarding amount, date of the cheque (check), etc. If there is an exact match between them, then the actual cheque (check) can be properly authenticated and authorized for cashing, then credited to the targeted recipient's account. If there is no exact match between the data previously pre-sent and the data of the presented cheque (check), then, the actual cheque (check) is automatically rejected for cashing or deposit. Whether, the actual written cheque (check) has been rejected for cashing or depositing or approved for cashing and depositing, the respective correct registered CCIRAF/AITD is instantly informed about the situation for instant recording in the memory of the correct respective registered CCIRAF/AITD. The CCIRAF/AITD will automatically shut down the anti-fraud/anti-identity theft and true-personal identity verification application and/or Near-Field communication (NFC) system, after the specified amount of idle time for security purposes.

Auxiliary Buttons or Feature Access Buttons or Quick Access Buttons

The CCIRAF/AITD or Universal eGeeenie is equipped with auxiliary buttons for quickly accessing the available features or applications from the inventive device. In the present invention, the embodiments show 5 auxiliary buttons or switches, including the thermo charger activation switch. The different embodiments can have more auxiliary buttons or switches if desired or needed according to more applications. The number of auxiliary buttons can vary depending on the compatibility requirements of the inventive device. The authorized customer/user has the provision to customize the quick access buttons for different applications, such as for anti-fraud/anti-identity theft, volume up & down, mute, address book, camera, etc. The inventive device must be switched on before using these auxiliary buttons.

Important Note:

The CCIRAF/AITD or eGeeenie, as pre-programmed should always receive the alerts, alarms, warnings and messages, and any other relevant information instantly and the authorized customers/users can instantly respond to such alerts, warnings and messages if they so desire or they can respond later according to their conveniences with or without setting a timed re-alarm or re-alert or re-warning, which is also depending upon the programming of the applications and sub-applications of the anti-fraud and anti-identity theft functionalities and capabilities.

The CCIRAFD or Universal eGeeenie has the customized options for setting different definitive alarming alerts and displays for all important activities, such as bill payments and other relevant applications corresponding to the relevant alerting organizations or agencies, etc. and is provided with the options for setting the different ring tones. The authorized customers or authorized users have the choice of selecting a definite distinction that will differentiate between the incoming phone calls and the anti-fraud and anti-identity theft alarms and messages, announcements and/or alerts, etc.

The CCIRAF/AITD or Universal eGeeenie can be programmed to interact to audio or visual or audio-visual output and input messages and/or alarms and any other relevant data, and their corresponding receptions, transmissions, storages and displays, in order to enable the respective authorized customers or authorized users to correctly and conveniently receive, evaluate, send and respond accordingly to audio or visual or a combination of audio-visual prompts made by each of their respective registered CCIRAF/AITD, by manual keypad means or by scrolling and tapping means or other manipulative means through the interactive LCD display and/or speaker system or by voice-command means, or in combination of these means, with icons and audio or visual or audio-visual interactive guides, messages and prompts, so as to effect the accurate functions, features and capabilities of the various embodiments of the CCIRAF/AITD or EucliStar eGeeenie or Universal eGeeenie.

It is very important to note and understand, before making any financial banking transaction using the respective registered CCIRAF/AITD or EucliStar eGeeenie or Universal eGeeenie, that each authorized customer or authorized user has to first place and authorize sufficient funds in each of his/her respective bank accounts through the function of the inventive device to be issued to the respective merchant for each transaction or group transaction or groups of transactions, within a certain time frame. The merchant then, has to validate and authenticate the customer's specific bank account for the availability of funds and the amount(s) that the authorized customer or authorized user has pre-authorized for the respective merchant in order to complete each specific transaction. In the event that there is no specific amount for any specific transaction that is pre-authorized by the authorized customer or authorized user, then the respective customer's specific credit card or debit card can be merely swiped at the merchant's point-of-sale (POS) terminal card reader with the correct entry of the authorized customer's or authorized user's PIN, and other relevant identity information, and then, the merchant side of the transaction checks for the availability of funds in the customer's respective specific bank account for the specific credit card or debit card or check being used. When there is sufficient funds available, then, through the appropriate processing means, the exact amount of money for the particular transaction will be sent and displayed on the interactive LCD display of the respective registered CCIRAF/AITD or EucliStar eGeeenie or Universal eGeeenie, with alarm sounded through the speaker system of inventive device, at which time, the specific transaction can be accepted or rejected by the respective authorized customer/user who is making a purchase or ordering some service. Each acceptance or rejection of any specific transaction requested at the merchant's side of the transaction will be recorded in the memory of the correct registered CCIRAF/AITD. Also, any insufficiency of funds to cover the amount will instantly alarm the respective registered CCIRAF/AITD, with audio-visual display on the interactive LCD display and speaker system of CCIRAF/AITD, and will be automatically rejected by the EucliStar eGeeenie (if set on automatic reject of any insufficiency of funds report) and then recorded into the memory of the respective registered CCIRAF/AITD. This way, the authorized customer/user cannot be penalized by any fee due to insufficiency of funds during the use of his/her particular credit card or debit card or check that is being used as the means of transaction payment(s). This feature is a good functionality of the anti-bounce capabilities of the inventive device or CCIRAF/AITD or EucliStar eGeeenie or Universal eGeeenie.

The inventive device or CCIRAF/AITD or EucliStar eGeeenie or Universal eGeeenie can be formulated by integrating different technologies, like the anti-fraud/anti-identity theft with true-personal identity verification applications, the cellular and/satellite wireless mobile phone and internet applications, and Near Field (NFC) Communications (if desired by the customers or users or if chosen to be integrated by the manufacturers).

For information, Near-Field Communication (NFC) is another kind of wireless communication technology. It is also called as short distance radio communication which allows the transfer of small amounts of data within short distances. Its benefit is that it requires little energy to effectuate radio transmitters to work, coming via the magnetic field which makes the operation less expensive. The transmission of data is only made across short distances (about a few centimeters). Therefore, sniffing—known in WLAN or Bluetooth networks becomes almost impossible. Like known from Bluetooth peer-to-peer communication (NFC) devices can detect each other automatically and substantially faster.

Devices that support NFC can operate in both passive and active modes. No energy is needed in the passive mode operation in reading out stored, which makes the device work even if it is switched off. NFC devices can, therefore be used for contactless smart card applications and relevant others.

Near-Field Communication (NFC) technology gains transfer speeds between 106 up to 424 Kbit per second. Extension to 1 Mbit per second is in the state of preparation. The data transfer is based on an inductive coupling at 13.56 MHz. A transaction between two parties is accomplished with an Initiator sending the data and a Target which receives the information.

In the operation of NFC, transfer speed of 106, 212 or 424 Kbit per second is negotiated between the Initiator device and the Target device. The data transfer is half-duplex, which means that at one time one device is only in sending mode, while the other is only in receiving mode. The device that is in the receiving mode powers off its RF field, and only listens to data sent over the RF field by the device that is sending the data/information.

(C) Detailed Descriptions of Illustrative Drawings of the Present Invention (EucliBaba) and the Present Inventive Device CCIRAF/AITD or EucliStar eGeeenie or Universal eGeeenie or eGeeenie FIGS. 1-5, illustrate the orthographic views of one first embodiment of the CCIRAF/AITD or EucliStar eGeeenie or Universal eGeeenie or eGeeenie, indicated by numeral 50, showing different views with cellular and/or satellite phone/internet functions, but, without the Near Field Communications (NFC) system and components.

In FIG. 1 the first embodiment of the present inventive device consists of interactive LCD display 52 (2D/3D), cellular and/or satellite mobile phone/internet access keyboard buttons 54, biometric scanner 56, the internally located credit/debit card swiping slot 58 (within the slanted dotted line), the internally located credit/debit card magnetic stripe reader 60 (in dotted double circle), anti-fraud and anti-identity-theft with true-personal identity verification applications On/Off button 62, accept button 64, reject button 66, debit button 68, credit button 70, LED signal light indicator 72, the speaker 78, the microphone 80, the GPS access button means 82, the voice recording access button means 84, the Menu button 90, the Options button 92, the start talk/accept call/receive call button 94, the one step back button means 96, the hang up/reject/end call button 98, and the button w, used for switching between 2D mode and 3D mode.

In FIG. 2 which is the left side view of the present inventive device's first embodiment are shown the swiping slot 58 for swiping the physical credit/debit card and other relevant physical ID and membership cards (not shown), the magnetic stripe reader 60 for reading the relevant data/information cards with magnetic stripe of the authorized customer/user, w which is the activation button for switching between 2D mode to 3D mode and vice versa for the relevant 2D or 3D LCD display, and the temporary memory (Micro/SD) provision 86.

In FIG. 3 which is the right side view of the present inventive device's first embodiment, are shown the mini USB and charge means 74, head set provision 76, the GPS access button means 82, voice recording access button means 84 and the USB slot provision is represented by 100.

In FIG. 4, which is the top view of the present inventive device's first embodiment are shown w which represents the activation button for switching between 2D mode to 3D mode and vice versa for the relevant 2D or 3D LCD display and 82 which is the GPS access button means. Also shown are the swiping slot 58 for swiping the physical credit/debit card and other relevant physical ID and membership cards (not shown) and the magnetic strip reader 60 for reading the relevant data/information cards with magnetic strip of the authorized customer/user.

In FIG. 5 which is the bottom view of the present inventive device's first embodiment are shown 84 which is voice recording access button means and w which is the activation button for switching between 2D mode to 3D mode and vice versa for the relevant 2D or 3D LCD display.

FIG. 6A is the perspective view of the same first embodiment of FIG. 1 of the present inventive device or CCIRAF/AITD or Customer-Controlled Instant-Response Anti-Fraud/Anti-Identity Theft Device(s) (with true-personal identity verification) or CCIRAF/AITD or EucliStar eGeeenie or Universal eGeeenie, integrated with cellular and/or satellite mobile phone and internet applications capabilities and features; the perspective view illustrates as favoring the frontal face view illustrated in FIG. 1, and, also showing partially the left side view illustrated in FIG. 2, and, also showing partially the bottom view shown in FIG. 5 of the same first embodiment of FIG. 1.

FIG. 6B is a perspective back view of the same first embodiment of FIG. 1 of the CCIRAF/AITD or Customer-Controlled Instant-Response Anti-Fraud/Anti-Identity Theft Device (with true-personal identity verification) or EucliStar eGeeenie or Universal eGeeenie, integrated with cellular and/or satellite mobile phone and internet applications capabilities and features, showing the back view of the same first embodiment of FIG. 1, and showing partially the left side view illustrated in FIG. 2 and, also showing partially the bottom view illustrated in FIG. 5. As shown in this FIG. 6B, the back of first embodiment 50 has a camera 88 capable of photo taking and video recording.

FIG. 7 shows how a credit card or debit card 102 with its magnetic stripe 104 is being swiped through the credit/debit card swiping slot (not shown) for reading the credit/debit card magnetic stripe's data information by the credit/debit card reader 60 (not shown) of the first embodiment 50 of the CCIRAF/AITD or EucliStar eGeeenie or Universal eGeeenie, which is shown in FIG. 1. All other parts of the same first embodiment 50 are the same as in FIG. 1, except that a credit card or a debit card is being shown to be in the swiping position with the same embodiment 50.

In FIG. 8, there is shown a second embodiment 106 of the present inventive device or EucliStar eGeeenie or Universal eGeeenie, wherein there is an integrated built-in Near-Field Communication (NFC) system and component 110, represented by a rectangular dotted line, and, shown as imbedded within the upper housing of the second embodiment 106 of the CCIRAF/AITD or EucliStar eGeeenie or Universal eGeeenie.

In this FIG. 8 frontal face view of second embodiment 106 of the present inventive device, both the head set provision slot and the USB/charge slot are not shown. All the other parts labeled and described in the first embodiment 50 of FIG. 1, are the same in this second embodiment 106, except, that there is represented the integrated Near-Field Communication (NFC) system and component 110, imbedded in this second embodiment 106 of the present inventive device or CCIRAF/AITD or EucliStar eGeeenie or Universal eGeeenie, and, instead of the options button 92 shown in the first embodiment 50 of FIG. 1, there is the Near-Field Communication (NFC) button 108 in this second embodiment 106 of the present inventive device or CCIRAF/AITD or EucliStar eGeeenie or Universal eGeeenie.

FIG. 9 illustrates a frontal orthographic view of the third embodiment of the CCIRAF/AITD or Universal eGeeenie 136a, without a Near-Field communication (NFC) system and component, but, which has the capability for making a transaction using a virtual bank card and/or maintaining a virtual ID card of the authorized customer or authorized user. The built-in credit/debit card swiping slot indicated by a dotted line is internally located, as well as the internally located magnetic card reader 60 for entering and reading the magnetic stripe of physical credit/debit cards. This third embodiment is also equipped with cellular and/or satellite mobile phone and internet applications capabilities and features, and equipped with a camera 88 (not shown in this FIG. 9), but located and shown at the backside as in FIG. 9F.

FIG. 9A illustrates the orthographic view of a fourth embodiment of the CCIRAF/AITD or EucliStar eGeeenie, which has the capability for making a transaction using a virtual bank card and/or maintaining a virtual ID card of the authorized customer or authorized user, integrated with an internally located built-in credit/debit card swiping slot indicated by dotted lines, and equipped with an internally located magnetic card reader 60 for entering and reading the magnetic stripe of physical credit/debit cards, and having cellular and/or satellite mobile phone and internet applications capabilities and features, and, also having a built-in associative Near-Field Communication (NFC) component and system 110 incorporated therein, and, equipped with a back camera 88 located at the backside view shown in FIG. 9F.

In FIGS. 9, 9A, 9B, 9C, 9D, 9E, 9F, 10A, 10B, 11, 11A, 11B, 11C and 11D, illustrate the different views of the third, fourth, fifth and/or sixth embodiments, respectively 136a 136b, 136c and/or 136d, of the present inventive device or CCIRAF/AITD or EucliStar eGeeenie. According to the various views from FIGS. 9, 9A, 10A, 10B, 11, 11A and 11C, the following parts are shown: 138 is the interactive LCD display window, which exposes a projected image of a virtual credit/debit card 146a; below it is the projected image of a bar code 146b which represents the information data about the virtual credit/debit card; the image of a virtual bar code 146b is capable of being scanned and read by a corresponding special optical bar code reader at the point-of-sale (POS) terminal of a merchant (as shown in FIG. 22); the special optical bar code reader when actively pointed at the virtual credit/debit card, capable of extracting the required information about the virtual credit/debit card (also shown in FIG. 22). Also shown at the interactive LCD display window 138 is a projected image 144a which is the authorized customer's or authorized user's virtual identity card, and, below the projected image 144a is the projected image 144b of the virtual bar code representing the true-personal identity information data of the authorized customer's or authorized user's virtual identity card 144a; the virtual bar code capable of being scanned and read by a special virtual bar code reader at the point-of-sale (POS) terminal (not shown here) to extract the correct identity information data of the respective customer/user for identity matching with the correct interlinked database for security purposes.

Also, shown selectively or correspondingly in FIGS. 9, 9A, 10A, 10B, 11, 11A and 11C are: Menu button 142, microphone 80, LED signal indicator 72, built-in magnetic card stripe reader 60 located within the swiping slot 58 for swiping the physical credit/debit cards, speaker 78, built-in internally located Near-Field Communication (NFC) component 110, biometric scanner 140, auxiliary buttons 148a, 148b, 148c, 148d, and, also showing the mini-USB and charge means 74, and head set provision 76, and USB slot provision 100. Camera 88 is shown being located at the backside of the third and/or fourth embodiments 136a and 136b, and also at the backside of the fifth and sixth embodiments 136c and 136d, along with a front-facing camera 88a as shown in FIGS. 11, 11A, and 11C.

In FIG. 9B is shown the thermo sensor activation button as represented by letter y. In FIG. 9F is shown the solar panel as represented by letter X. FIGS. 11C and 11D illustrate the isometric views of the fifth and sixth embodiments of the Customer Controlled Instant-Response Anti-Fraud/Anti-Identity Theft Device with true-personal identity verification or CCIRAF/AITD or EucliStar eGeeenie, which has the capability for making a transaction using a virtual bank card and/or maintaining a virtual ID card of the authorized customer or authorized user, integrated with a built-in credit/debit card swiping slot 58 (shown in FIG. 10A), with a magnetic card reader (not seen here), but, within the swiping slot 58 for entering and reading the magnetic stripe of physical credit/debit cards. The third, fourth, fifth, and sixth embodiments are also equipped with cellular and/or satellite mobile phone and internet applications capabilities and features. The built-in integrated Near-Field Communication (NFC) system and component in these fourth and sixth embodiments is internally located (shown in FIGS. 9A and 11A). The front camera 88a of the fifth and sixth embodiments is seen in FIGS. 11, 11A, and 11C and the back camera 88 is seen in the backside views in FIGS. 9F, 11B, and 11D.

FIG. 12 illustrates in this block diagram that the CCIRAF/AITD or EucliStar eGeeenie or Universal eGeeenie or eGeeenie 214 (represented within the centrally located rectangle) has certain capabilities, functions and features (but not limited to those). The term instant-response alarm 194 signifies that the present inventive device has the programmed capability of alarming the authorized customers and/or authorized users instantaneously of any and/or all unauthorized transaction accesses to their respective accounts without their knowledge or consent. The authorized customers or authorized users, then have the immediate opportunity to accept or reject each specific transaction, accordingly. The present inventive device or CCIRAF/AITD or EucliStar eGeeenie or Universal eGeeenie or eGeeenie is generally and mostly wirelessly controlled (according to the programming) by each of the correct legitimate authorized customers or authorized users for making any and/or all legitimate transaction(s) with their corresponding bank accounts.

The present inventive device can be pre-programmed with capabilities of locally and internationally shielding or protecting each credit card and/or debit card transaction for point-of-sale (POS) credit/debit purchase protection in 188, for online ordering credit/debit card purchase protection of merchandise or service in 190, for tele-ordering credit/debit purchase protection in 192, as well the already mentioned instant-response alarm about any and/all unauthorized accesses of the authorized customer's/user's bank accounts in 194, fraud protection of bank cheque (check) transactions in 196, and fraud protection on foreign purchases in 198. The present inventive device or CCIRAF/AITD or EucliStar eGeeenie or Universal eGeeenie or eGeeenie can be made capable, also, of allowing each authorized customer/user to the access of each of the respective bank account balances and storing each transaction and funds transfers in 200, at anytime, depending on its secured wireless communication with the respective bank and/or lending institution. The present inventive device or CCIRAF/AITD or EucliStar eGeeenie or Universal eGeeenie or eGeeenie can save each of the transactions, access bank balance and fund transfers in 200 that are made by each respective authorized customer or authorized user into the present inventive device's memory, so that each authorized customer or authorized user can maintain a track record of his/her expenses in each particular credit card or debit card account used. In addition to the above capabilities, the present inventive device can hold good for the management of cash availability and expenses in 202, and, monetary management and payment due alerts in 204. The present inventive device or EucliStar eGeeenie or Universal eGeeenie or eGeeenie can also be made capable of creating and controlling derivative virtual cards from each account maintained by each authorized customer or authorized user in 206, with the respective bank or lending institution, and made capable of having provisions for anti-identity theft protection with true-personal identity verification in 208, and provisions for device anti-loss preventer, remote deactivation, memory erase and restoration in 210.

Also in FIG. 12 are shown that each of the respective registered CCIRAF/AITD or EucliStar eGeeenie or Universal eGeeenie or eGeeenie has the features and functions of cellular and/or satellite mobile phone and internet applications means in 152, camera/video in 154, voice recording and play back in 156, GPS/Language Translation in 158, other applications, internet input/output transactions and searches and data exchanges and games in 160, currency converter/gratuity calculator in 162, biometric scanner functionality in 164, PIN or password protection in 166, voice recognition, control and command functions in 168, image recognition and items search in 170, secure wireless transmission and control means in 172, debit/credit card swiping means functions in 174, USB provision means in 176, interactive LCD display/touch screen/keypad and speaker in 178, Temporary Memory (Micro/SD) function in 180, Near-Field Communication (NFC) function in 182, instant locator of hidden items in 184, 2D to 3D and 3D to 2D conversion, transmission and reception in 186, as well as Vehicle Control in 218. The Vehicle Control block 218 allows the present inventive device to securely manage control of remotely locking and unlocking the authorized registered customer's/user's vehicle door(s) and remotely deactivating and pre-reactivating the ignition system of the vehicle of the respective authorized registered customers or authorized users of the present inventive devices, during valet parkings at hotels, motels and other places where valet parking services are offered, so as to prevent unauthorized entries and operations of their respective cars or vehicles. This is achieved by inserting a chip provided by the car manufacturers into the CCIRAF/AITD or EucliStar eGeeenie or Universal eGeeenie or eGeeenie to be able to control the authorized registered customer's/user's vehicle.

Other secured interactive applications for multi-level education/research/innovation or invention, Medicare/Medicaid or private medical/health care insurance, military, etc. in 212; and airport and aircraft flight securities and instant-response with true-personal identity verifications of passengers and crew, with boarding passengers tagged with correct flight tickets, routes and destinations with correct boarding passes and accurate tagging of luggage, and crew (if applicable), and, timely reminder of important things in 216. In 214 represents the Customer-Controlled Instant-Response Anti-Fraud/Anti-Identity Theft Device with True-Personal Identity Verification or CCIRAF/AITD or EucliStar eGeeenie or Universal eGeeenie or eGeeenie. In this FIG. 12 are enumerated the abridged (but not limiting in scope and numbers) of the various capabilities, functions and features of the present invention, inclusive of the present inventive device or CCIRAF/AITD or EucliStar eGeeenie or Universal eGeeenie or eGeeenie.

In FIG. 13, the preparation of the CCIRAF/AITD involves the authorized customer or authorized user to set his/her selected PIN or pass code at step 400 for the CCIRAF/AITD to access the respective application, and then scan his/her selected finger to input the correct finger biometrics data, and load it for storage in the inventive device's memory at step 402 for comparative or matching purposes for accessing the anti-fraud/anti-identity theft and true-personal identity verification applications, so that any succeeding future use of the CCIRAF/AITD can be matched and authenticated properly. This means that every progressive time of usage of the CCIRAF/AITD and/or the Near-Field communication (NFC) system and components, thereafter, the authorized customer or authorized user has to provide both the PIN or pass code and/or the required finger biometrics data to the inventive device or CCIRAF/AITD; the applications will be activated when the required finger biometrics data and/or the pass code authorization data validates. This will greatly help the authorized customer or authorized user to securely protect the CCIRAF/AITD from any/or all unauthorized usage, in case it is misplaced or finally lost.

Each of the CCIRAF/AITD has a device identification number (DIN), and, at step 404, each bank or credit card company has to register each correct CCIRAF/AITD's Device Identification Number (DIN) into its system, and provides the necessary security for the wireless, wired and optical communications networks and databases for the security of the encrypted information/data. At step 406 each bank and credit card company loads each one of the correct authorized customer's or authorized user's credit/debit card account information into the correct CCIRAF/AITD's memory. At step 408, each bank and/or credit card company links the respective correct CCIRAF/AITD to the associated bank server for the proper access of the respective correct authorized customer's or authorized user's bank and/or credit card company account(s) encrypted information. At step 410, the authorized PIN/password is set for the safe access of the respective correct authorized customer's or authorized user's respective correct account(s) encrypted information. This means that whenever a particular debit card's or credit card's magnetic stripe is swiped into the respective swiping slot of the correct registered CCIRAF/AITD, as shown in FIG. 7, the corresponding correct account information will be read by the corresponding correct registered CCIRAF/AITD's magnetic stripe reader, and, the read data will be compared with the corresponding correct account information that is pre-stored in the correct CCIRAF/AITD's memory before any particular transaction can be properly activated for secured data communication with the respective bank or credit card company, and for use to make purchases by means of the particular just-swiped credit card or debit card into the correct CCIRAF/AITD.

However, though FIG. 13 does not illustrate in this flow chart, the authorized customer and/or authorized user has the option to skip the reentry of the succeeding finger biometrics data and/or password and/or PIN, in case of quick non-critical enquiries like just recalling and reviewing from the stored memory within the CCIRAF/AITD certain past transactions or transaction histories, or other non-critical information that do not necessitate any wireless transmission(s) of data to and from the respective bank or lending companies, merchant or vendors or any third party or other remote databases. A choice can be made to enable him/her to skip the process of succeeding reentry of finger biometrics and/or password or PIN data by a default setting in the corresponding CCIRAF/AITD, by activating an icon representing "skip reentry mode for finger biometrics and/or password." This can be accomplished manually through tapping the corresponding correct icon displayed on the interactive LCD display, or through voice-command deactivation means when prompted by the interactive LCD display and speaker system of corresponding CCIRAF/AITD or EucliStar eGeeenie to skip reentry of PIN or password and/or finger biometrics requirements, if the authorized customer or authorized user elects or desires to do so, for faster "within the inventive device's settings or adjustments" or for "quick non-critical enquiries."

Yet, at sometime in the future, also, the corresponding CCIRAF/AITD can again be restored to the "enable mode of reentry requirements of finger biometrics and/or password or PIN data, if so desired, respectively and selectively, by either through tapping the corresponding correct interactive touch-screen icon prompting the "enable mode of reentry requirement of finger biometrics and/or password or PIN data," or through voice-command by uttering "enable reentry of finger biometrics and/or password or PIN data."

Optionally, because each individual registered CCIRAF/AITD has the functionality of voice recognition capabilities indicated as numeral 168 of FIG. 12, as an added feature to achieve greater security for the accurate usage of each registered CCIRAF/AITD, the inventive device or CCIRAF/AITD can be switched to activate the voice recognition mode.

Although not shown in FIG. 13, like any advanced voice recognition application, the authorized customer or authorized user can first train the CCIRAF/AITD or EucliStar eGeeenie or Universal eGeeenie to correctly recognize his or her speech patterns, by speaking to the sensitive built-in microphone 80, and keep on training the matching inputs and outputs of his or her speech utterances, until the audio-visual displays at both the interactive LCD display and the speaker system can correctly recognize his or her speech patterns, and accurately interpret the correct words and phrases of his or her voice commands, and, interactively and correctly respond to the specific respective prompts and audio-visual LCD displays and speaker outputs of inventive device. Once the interactive LCD displays and the speaker announces "Voice Recognition System Ready To Go," this means that the corresponding registered CCIRAF/AITD is correctly interacting to the voice commands, indicating that the voice recognition system has been trained, and duly matches with the entered voice utterance data stored in the memory of inventive device or CCIRAF/AITD, and, thereby can authentically recognize the speech patterns of the respective correct authorized customer or authorized user, and that the proper voice commands composed of specific intuitive words and phrases are and will be understood by the corresponding correct registered CCIRAF/AITD. In this way, in any future use of the voice recognition applications functions of the corresponding correct registered CCIRAF/AITD, which will be able to correctly authenticate and interpret the voice patterns of the corresponding respective correct authorized customer or authorized user, and, thus giving him or her the capability to accurately utilize the specific intuitive words and phrases as voice commands or responses to interact with the audiovisual speech and display prompts as uttered and displayed in the interactive LCD display and speaker system of corresponding correct registered CCIRAF/AITD, ready for the sequential step by step or group of steps shortcut operations, data transmission, storage and respective iconic and speech file functions of corresponding correct registered CCIRAF/AITD.

The corresponding correct registered device's voice recognition functionalities will in turn enable him or her to achieve faster convenience of the user-friendly smooth operations of corresponding correct registered CCIRAF/AITD; the voice recognition capabilities enable the right authorized customer or authorized user in utilizing his or her voice in interactively commanding and responding in coordination with the required operations desired by the respective authorized customer or authorized user of the corresponding correct registered CCIRAF/AITD to achieve the needed accurate operations faster, instead of manipulating a series of more complicated sets of manual activations of physical keypads or touch-sensitive LCD visual keypads and icons. Also, the authentication of the voice utterances of the respective authorized customers and/or authorized users can be another useful anti-fraud/anti-identity theft and true-personal identity verification feature that will reinforce the secured use of the respectively registered CCIRAF/AITD by the true registered owner/user of the respective registered CCIRAF/AITD or EucliStar eGeeenie, and, which can also be used as another biometric identifier of the rightful authorized customer and/or authorized user of correct registered CCIRAF/AITD or EucliStar eGeeenie or Universal eGeeenie, and can be used as an additional voice biometric tool, or a substitute instead of using the entry of finger biometrics data through the biometric scanner 56 of the corresponding correct registered CCIRAF/AITD.

FIGS. 14 and 17 illustrate two simplified diagrammatic representation of data flow sequences for processing transaction at the point-of-sale (POS) terminal, and online and telephonic purchase transactions, respectively, using the Customer Controlled Instant-Response Anti-Fraud/Anti Identity Theft Device (CCIRAF/AITD) or EucliStar eGeeenie or Universal eGeeenie. It is important to note and made clear here in these general diagrammatic representations that both the Customer's Credit/Debit Card Processing Means 384, and the Merchant's Credit/Debit Card Processing Means 382, shall include, (though all not shown here in these FIGS. 14 and 17) the necessary relevant corresponding networks, systems, means and secured transmissions and safely protected databases in order to accomplish accurate verification, authentication, authorization, security and settlement and other necessary relevant means and methods, aimed to securely check, verify, match, control, record and consummate the safe and legal transactions and transfers of the correct amount(s) of funds according to the relevant accurate names, dates, and other identifying means for both the authorized customers and/or authorized users and the correct merchants and/or vendors, including the correct corresponding respective legitimate banks and/or lending institutions or companies concerned, with the aim of curtailing, preventing and/or minimizing the risks and dangers of frauds and identity thefts derogatory activities, while doing personal and/or business electronic transactions in e-banking and e-commerce.

In FIGS. 14 and 17, the respectively chosen or selected correct physical credit card or debit card to be used in any specific transaction or transactions must first be swiped through the active swiping slot of the correct registered CCIRAF/AITD or EucliStar eGeeenie, in order to recall all relevant information about the specific swiped credit card or debit card from the previously stored memory of the correct registered CCIRAF/AITD, before proceeding further with any or all single or multiple transactions (as a requirement in these two illustrative drawings).

The Basic (but not Limiting) Flow of Lettered Steps Using Physical Credit/Debit Bank Cards that can Generally be Followed as Illustrated in FIGS. 14 and 17 is:

Step A: The authorized customer or authorized user has to swipe his/her chosen physical credit/debit card 102 through the magnetic stripe reader of his/her registered CCIRAF/AITD, so that the correct credit/debit card data/information can be read by the CCIRAF/AITD. In case the magnetic stripe reader of the inventive device is not working properly, then, the authorized customer or authorized user has to manually enter the correct credit/debit card information to access the particular respective bank account through the CCIRAF/AITD. Within the CCIRAF/AITD, the just swiped particular physical credit/debit card data/information is compared or is matched with the previously entered credit/debit card information stored in the CCIRAF/AITD's memory. The image and the card number and other data/information of the just swiped physical credit/debit card, and the image and the number and other relevant information of the previously stored respective credit/debit card may both appear side by side at the interactive LCD display of the device, if the programming is set this way as a default, so as to accomplish a double check match with the selected card to be used. If there is an exact match between them, then further transaction can commence. However, if there are no comparative images and data/information matching side by side, this suggests that the just swiped physical credit/debit card has not been previously stored in the memory of the respective CCIRAF/AITD. If there is any mismatch between the displayed images and other respective relevant data/information on the interactive LCD display, an audio-visual alarm will be instantly triggered, and will prevent the further use of the just swiped physical credit/debit card, meaning that the just swiped physical credit/debit card has not been previously stored in the memory of the present inventive device. By this means, there is no way that the wrong card can be used for the particular transaction. The CCIRAF/AITD also validates the PIN entered by user to be sure that he/she is really the authentic authorized customer or authorized user of the credit/debit card. Also, the PIN or passcode and/or finger biometrics of the customer/user must be validated to be sure that the user of the CCIRAF/AITD is really the authorized customer or authorized user of the CCIRAF/AITD, before proceeding furthermore with the particular transaction, unless the authorized customer or authorized user has set a default in the device to omit or skip the process of reentry of validating the PIN and/or biometrics in proceeding further with the transaction in cases of non-critical enquiries within the respective CCIRAF/AITD that does not require any wireless external transmission.

However, because of the limitation in the viewing area allotted by the interactive LCD display window of the CCIRAF/AITD or Universal eGeeenie, it is also possible to program the anti-fraud/anti-identity theft with true-personal identity verification application to show or display on the interactive LCD display, only one image representation of the just swiped physical credit/debit card, including the relevant data/information about it. The authorized customer or authorized user can now just visually compare the larger image of the LCD-displayed credit/debit card with the just swiped physical credit/debit card in order to be sure about his/her transaction activities using his/her chosen selected physical credit/debit card as distinguishable from the other physical credit/debit cards in his/her possession.

Step B: The authorized customer or authorized user, then, wirelessly sends or submits the particular credit/debit card transaction with relevant data/information for proper identification, authentication, validation and pre-authorization, to the Customer's Credit Card Processing Means 384, through his/her respective registered CCIRAF/AITD, via secured wireless and wired and optical (if applicable) connections.

Step C: The Customer's Credit Card Processing Means 384 through its correctly linked network routes the transaction with relevant proper identification, authentication, validation and pre-authorization data/information to the specific Customer's Bank Account 380 or Credit Card Issuing Bank.

Step D: The Customer's Bank account 380 or Credit Card Issuing Bank approves or declines the transaction based on the authorized customer's or authorized user's available funds with relevant identified, validated, authenticated and pre-authorized information data, and, then passes the transaction results back to the Customer's Credit Card Processing Means 384. The specific transaction processed as such is recorded into the buffer memory of the Customer's Bank Account's database, and the specific transaction amount is placed on hold in the authorized customer's or authorized user's specific bank account's buffer memory, until the whole specific transaction is completed.

Step E: The Customer's Credit/Debit Card Processing Means 384 sends/notifies the pre-processed transaction to the respective authorized customer's or authorized user's registered CCIRAF/AITD. This completes the major pre-authorization activity of the authorized customer's or authorized user's part for the specific transaction.

Step F: The merchant or the authorized customer or authorized user has to swipe the particular selected physical credit/debit card 102 through the magnetic stripe reader of the merchant's Point-of-Sale (POS) terminal 378*a* (in FIG. 14), or, manually enter the credit/debit card information at the point-of-sale (POS) terminal 378*a* (in FIG. 14) in order to proceed further in effectuating or carrying out later on in the transfer of specific amount of funds to pay for a direct point-of-sale merchandise purchase or service ordered in FIG. 14. Or, the authorized customer or authorized user has to enter the credit/debit card information to proceed further in effectuating later on the specific transfer of funds for the specific transaction amount(s) for online and telephonic purchase 378*b*, (as in step F of FIG. 17). Or, the authorized customer or authorized user has to verbally give the credit/debit card information to the merchant through telephone for the specific transaction amount for the telephonic merchandise purchase or service order (as in step F of FIG. 17). Then, also for both telephonic and online transactions, the customer's credit/debit card information and specific amounts in the transaction can be given and processed by the respective machine or the web server, and, combined with other specific relevant transaction data/information, such as the transaction identification number (TIN) if generated by the respective CCIRAF/AITD, the secret PIN, specific amounts plus tax, shipping charges and surcharges, any funds holds or deposits in case of advanced or on-arrival bookings for hotels, motels or vacation cabins or other lodgings, reservations for plane tickets or travel cruise ship reservations or for show reservations, rentals for cars, SUVs, boats or equipments, currency/money exchange rate fees, and merchant identification (optional), etc, are recorded securely for privacy anti-fraud and anti-identity-theft with true-personal identity verification tamperproof protection, which are so essential and necessary for secured processing, memory storage and retrieval of corresponding correct relevant data/information.

Important Note:

In case of funds holds or deposits, and other transactions requiring itemized costs breakdown, and the itemized monetary amounts are also sent to the authorized customer's or authorized user's respective correct registered CCIRAF/AITD for review, either to be accepted/approved or rejected by the correct authorized customer or authorized user, before consummating the deal or transaction, and, also for storage in the memory of the respective correct registered CCIRAF/AITD. Any monetary amounts of holds or deposits that are being held by the respective merchant or vendor or place of accommodations or rentals or by relevant others, must be released back to the correct authorized customer's or authorized user's respective bank account or credit card account within certain specified agreed-upon time and date set, after all the respective relevant deals have been completed and reported to the respective correct registered CCIRAF/AITD. Or else, failure to release such monetary amounts of holds or deposits will alert the respective correct registered CCIRAF/AITD, and, the appropriate actions can be taken up by the correct registered authorized customer or authorized user until the respective relevant deposits or holds are completely released back to the specific bank account or credit/debit card account(s) of the respective correct authorized customer or authorized user.

Step G: The merchant submits the selected credit/debit card data/information for the relevant specific transaction through the point-of-sale (POS) terminal 378*a* (in FIG. 14) to be transmitted to the Merchant's Credit/Debit Card Processing Means 382, (on behalf of the authorized customer or authorized user as executed in step F of FIG. 14), via secure e-commerce connections, or, in the case of online or telephonic specific purchase 378*b* of FIG. 17 (on behalf of the authorized customer or authorized user as executed in step F of FIG. 17); the respective merchant also submits the selected credit/debit card data/information for the relevant specific transaction through the correct Merchant's Credit/Debit Card Processing Means 382, on behalf of the authorized customer or authorized user via secure e-commerce connections.

STEP H: The Merchant's Credit/Debit Processing Means 382 and its networks route the specific transaction to the Customer's Bank Account 380 for proper transaction matching with the customer's data/information tied with the specific amount(s) allocated and saved in the customer's bank account's buffer memory for identification, authentication, verification, and validation.

STEP I: The Customer's Bank Account 380 linked to its correct authentication and authorization channels either approves or declines the specific transaction based on the customer's available funds and the corresponding customer's or user's pre-authorization part of the transaction being reserved in buffer memory of the Customer's Bank Account 380, and, pass the transaction results back to the Merchant's Credit/Debit Card Processing Means 382. The criterion for approving the transaction is the exact approvable result of the comparative cross-matching of the amounts, date, time, TIN (if applicable) and the currency that the authorized customer/user pre-authorized, and those relevant data/information sent by merchant pertaining to the particular transaction, along with the Merchant's Identification Number (if required). But, the Merchant's Identification number can be made optional, depending upon the requirements involved.

STEP J: After the Merchant's Credit/Debit Card Processing Means 382 stores the authenticated and validated transaction results, the relevant data/information is then sent to the merchant's terminal. This step completes the final authorization process—all in about three seconds or less!

STEP K: The Customer's Bank Account 380 with its correct decision-making channels send the appropriate funds for the transaction to the Merchant's Credit/Debit Card Processing Means 382.

STEP L: The Merchant's Credit/Debit Card Processing Means 382 passes the exact approved amount of funds for the specific transaction to the Merchant's Bank Account 386 for deposit. This completes the settlement process of the specific transaction.

STEP M: The Customer's Bank Account 380, via its proper database and channels communicate back to the correct CCIRAF/AITD regarding the processed transaction. The exact funds taken from the authorized customer's or authorized user's specific bank account that has been transferred and deposited to the Merchant's Bank Account 386, is saved in the correct CCIRAF/AITD's memory for future retrieval, reference, and monitoring as part of all relevant specific bank accounts transactions made by the authorized customer or authorized user.

Although the various steps A-L and M have been described in FIGS. 14 and 17, there may be some other modified routing steps within the general scope of the present invention, inclusive of the present inventive device, according to the existing and future infrastructures and transactional means and instruments to be used and implemented for the optimal operations of the different embodiments of CCIRAF/AITD or EucliStar eGeeenie or Universal eGeeenie or eGeeenie, inclusive of the relevant methods and systems within the scope of the present invention or EucliBaba.

Important Note:

A particular point-of-sale (POS) transaction can generally be completed and settled if the proper identification, authentication, validation and authorization active networked systems have successfully compared the customer part of the respective transaction, and the corresponding merchant part of the same respective transaction with a resultant perfect data match in the respective correct customer's specific bank account's buffer memory reserved for the same respective transaction. Afterwards, the resulting complete settlement of the same respective transaction is reported instantly to and stored in the correct authorized customer's correct registered CCIRAF/AITD or EucliStar eGeeenie or Universal eGeeenie or eGeeenie.

However, if there is no pre-authorization for a particular transaction made by the authorized customer or his/her authorized user(s) that is pre-stored in the buffer memory of a specific account of the customer's bank or lending company, a particular transaction with a corresponding particular merchant or vendor can still be processed electronically for proper identification, authorization and authentication and validation, but, the transaction will first be routed instantly to the respective correct authorized customer's correct registered CCIRAF/AITD, and displayed and heard in the interactive audio-visual LCD display and speaker of the respective customer's correct registered CCIRAF/AITD, and then, subject to the approval or rejection of the respective correct authorized customer or authorized user who is the right registered owner of the respective correct registered CCIRAF/AITD, or, subject to the approval or rejection of the respective correct customer's authorized user or users, before the settlement of the same respective transaction can be completed. When required, the proper physical identification should be done first by the merchant at the point-of-sale (POS) terminal, before processing with any or all transactions.

Also, in the above-mentioned case, the respective data/information of the same respective transaction and its settlement with all the relevant data/information are automatically stored in the storage memories of both the respective correct bank or lending company, and the respective customer's correct registered CCIRAF/AITD.

In FIG. 15 are shown the important steps and procedures for the true-personal identity verification (authentication) of the authorized customer/user to properly operate the correctly registered CCIRAF/AITD, and the use of the present inventive device in initiating the customer part of the transaction using a particular physical credit card or debit card for processing each particular transaction for validation, authentication, authorization and settlement of specific payment.

Start at step 450.

The authorized customer or authorized user first switches On the CCIRAF/AITD with true-personal identity verification application at step 452, and then, enters the required proper password or pass code and/or scan the required selected finger to input the required finger biometrics data to activate the inventive device at step 454. If the data is validated at step 456, then, the present inventive device and relevant applications will be activated.

However, if at step 456, there is no validation of the just entered data, then at step 470, an alarm from the speaker system and message at the LCD interactive display of present inventive device will automatically indicate a possible fraudulent use of the respective CCIRAF/AITD, and the present inventive device will not work any further, or, it may just be a data entry error made by the authorized customer or authorized user, in which case he or she can just repeat step 454.

The present inventive device's memory, having been preloaded with the selected password or pass code and/or selected finger biometrics data during the preparation phase of present inventive device, will then compare the newly inputted password or pass code and/or finger biometrics data with what have been previously stored into the present inventive device's memory. If the newly inputted password or pass code and/or the finger biometrics data match with each other at step 456, there is then a confirmation of validity for the use of the present inventive device; the present inventive device and its relevant applications will become operative for the authorized customer and/or authorized user. The authorized customer or authorized user can now swipe his/her credit/debit card through his/her CCIRAF/AITD's swiping slot and card reader, or else, if the card reader of present inventive device does not work, he or she can manually enter his/her particular credit/debit card details at step 458. Then, the authorized customer or authorized user of the present respective transaction and its settlement with all the relevant data/information are automatically stored in the storage memories of both the respective correct bank or lending company, and the respective customer's correct registered CCIRAF/AITD.

In FIG. 15 are shown the important steps and procedures for the true-personal identity verification (authentication) of the authorized customer/user to properly operate the correctly registered CCIRAF/AITD, and the use of the present inventive device in initiating the customer part of the transaction using a particular physical credit card or debit card for processing each particular transaction for validation, authentication, authorization and settlement of specific payment.

Start at step 450.

The authorized customer or authorized user first switches On the CCIRAF/AITD with true-personal identity verification application at step 452, and then, enters the required proper password or pass code and/or scan the required selected finger to input the required finger biometrics data to activate the inventive device at step 454. If the data is validated at step 456, then, the present inventive device and relevant applications will be activated.

However, if at step 456, there is no validation of the just entered data, then at step 470, an alarm from the speaker system and message at the LCD interactive display of present inventive device will automatically indicate a possible fraudulent use of the respective CCIRAF/AITD, and the present inventive device will not work any further, or, it may just be a data entry error made by the authorized customer or authorized user, in which case he or she can just repeat step 454.

The present inventive device's memory, having been preloaded with the selected password or pass code and/or selected finger biometrics data during the preparation phase of present inventive device, will then compare the newly inputted password or pass code and/or finger biometrics data with what have been previously stored into the present inventive device's memory. If the newly inputted password or pass code and/or the finger biometrics data match with each other at step 456, there is then a confirmation of validity for the use of the present inventive device; the present inventive device and its relevant applications will become operative for the authorized customer and/or authorized user. The authorized customer or authorized user can now swipe his/her credit/debit card through his/her CCIRAF/AITD's swiping slot and card reader, or else, if the card reader of present inventive device does not work, he or she can manually enter his/her particular credit/debit card details at step 458. Then, the authorized customer or authorized user of the present inventive device has to select the type of card at step 460, whether credit or debit, and then enter the PIN/security code for the selected correct bank credit/debit card at step 462. Additionally, at step 464, the authorized customer or authorized user has to enter the amount and currency to be transacted. (The currency can be switched on to the selected currency default setting according to which country it pertains depending upon the origin of transaction). The actual date and time of the specific transaction can automatically be registered by the present inventive device, if programmed and correctly synchronized to the time and date of the transaction's origin. If the present inventive device's system does not automatically generate the correct time and date of the specific transaction, then he or she has the option to enter the time and date for security purposes, if chosen. The access number of the merchant can be optional at step 464 (depending upon the requirement). After entering the required transaction details, the present inventive device generates a random number which in this present invention, inclusive of the CCIRAF/AITD, is considered as the Transaction Identification Number (TIN) at step 466. The TIN, along with the other details of the particular transaction are displayed on the interactive LCD display window of present inventive device, so that the authorized customer or authorized user will know and may be able to automatically record the details of the particular transaction at step 466. At step 468, the Customer's credit/debit card bank account can be connected through the Customer's Credit/Debit card processing means with the transaction information, and the present inventive device extracts the card data/information, amount, currency, TIN, PIN and other relevant information for the particular transaction. However, these data may remain on hold in the present inventive device until the authorized customer or authorized user sends these data/information, and the relevant other requirements with a guaranteed signal of proper secured communication with the particular authorized bank's database through a secured processing means for validation, authentication and authorization.

If at step 472 there is no proper validation and authentication, the present inventive device gets an alarm signal and message about the mismatch, and the mismatch gets automatically recorded into the present inventive device's memory for possible fraudulent usage of the particular credit/debit card at step 478.

The CCIRAF/AITD then displays an "Unable to process the transaction" message on the present device's interactive LCD display at step 488.

If there is validation in authentication and authorization at step 472, then at step 474, the respective bank checks the availability and amount of funds in the authorized customer's or authorized user's particular account if the funds are enough to cover the specific transaction. The present inventive device gets a proper signal and displays at the present inventive device's interactive LCD display the available funds, and also the sufficiency or insufficiency of funds to cover the specific transaction. If the funds available are sufficient to cover the specific transaction in step 476, the authorized customer's or authorized user's Credit/Debit Card Processing Means processes the specific transaction at step 480, and saves the specific transaction data/information in the buffer memory of the authorized customer's or authorized user's bank account at step 482. The exact transaction amount and details in the buffer memory of the particular bank's or lending institution's customer's account remains on hold at step 484, for the merchant's legitimate claim and until the specific transaction is completed. In any case, if the funds determined by the correct Processing Means are not sufficient, then, the correct Processing Means sends an alarm signal back to the correct registered CCIRAF/AITD and records the insufficiency of funds of the particular account in the registered present inventive device for the authorized customer/user to remedy the insufficiency of funds at step 486. If the insufficiency of funds is not corrected, then, at step 488, a report of "Unable to process the transaction" will be displayed on the interactive LCD display, and, if the present inventive device's speaker is switched On, then the "Unable to process the transaction" report will also be heard by the authorized customer/user at step 488. The report on the insufficiency of funds and whatever relevant recordable remedy is done to correct the insufficiency of funds will be stored in the correct registered present inventive device's memory storage for future reference. Step 490 is the end.

The unauthorized usage of each registered present inventive device or CCIRAF/AITD or EucliStar eGeeenie or Universal eGeeenie is strictly prevented in this present invention, inclusive of the present inventive device or CCIRRAF/AITD or EucliStar eGeeenie or Universal eGeeenie, because, in order to logon to the proper anti-fraud and anti-identity theft device with true-personal identity verification applications in the registered correct CCIRAF/AITD or EucliStar eGeeenie or Universal eGeeenie, the registered CCIRAF/AITD or EucliStar eGeeenie or Universal eGeeenie needs the authorized customer's or authorized user's finger biometrics and/or correct password information (if not defaulted to skip the finger biometrics and/or correct password reentry process).

Without the proper correct password and/or the proper inputted biometric data/information exactly matching with the previously stored relevant correct password and/or previously stored biometric data/information, the EucliStar eGeeenie or CCIRAF/AITD or Universal eGeeenie will not work at all at step 470.

If the authentication and authorization are not validated in step 472, then at step 478 an alarm will be heard and displayed in the CCIRAF/AITD about the fraudulent usage of the particular credit/debit card and will be recorded in the CCIRAF/AITD's memory storage.

In FIG. 16, there are shown the important steps and procedures for the merchant part of a particular transaction to complete a payment transaction at the point-of-sale (POS) terminal.

Start at step 500.

As soon as the authorized customer's or authorized user's part of transaction is finished, the merchant needs to swipe the customer's respective physical credit card or debit card (shown in FIG. 7) or scan the bar code of the respective projected virtual card displayed at the LCD of the correct registered CCIRAF/AITD (shown in F' in FIG. 22), at the merchant's point-of-sale (POS) terminal at step 502. As requested by the merchant, the authorized customer or authorized user needs to select the type of the card (credit or debit) at step 504, and then enter the PIN at step 506 for true-personal identity verification or validation, then enter the TIN generated by the CCIRAF/AITD (if required) for the specific transaction at step 508. In addition, the merchant has to enter the amount and currency to be transacted at step 510 (if currency is not yet set on default for the currently used monetary currency). At step 512, the authorized customer's or authorized user's credit/debit card bank account will be connected through the Merchant's Credit/Debit Card Processing Means to request for transaction authorization and authentication with all the relevant entered data/information. If the transaction is validated as authenticated and authorized at step 514, the authorized customer's or authorized user's specific bank then checks the availability of funds for the relevant transaction at step 516. If there is no authentication and authorization in step 514, then at step 520, there will be an alarm set off and will be recorded into the corresponding registered CCIRAF/AITD about the possible fraudulent usage of the particular credit card or debit card. The CCIRAF/AITD then displays an "Unable to process the transaction" message on the present device's interactive LCD display at step 538. Step 540 is the end.

If the funds are not available sufficiently at step 518, there will be an alarm sent by the correct authorized bank, and then, an alarm regarding the insufficiency of funds in the specific account for the requested transaction will be sent to the corresponding registered CCIRAF/AITD at step 524. The CCIRAF/AITD then displays an "Unable to process the transaction" message on the present device's interactive LCD display at step 538. Step 540 is the end.

Also, in FIG. 16, if the funds are sufficiently available at step 518, then the specific correct bank checks and matches the data/information pre-stored in the authorized customer's or authorized user's particular bank account's buffer memory for validation with the customer part of the transaction and matches the relevant authorized customer's data/information with the merchant's claim at step 522. The validation should be in a perfect match with the customer's name, credit card number, PIN, TIN (if included), and the exact amount in the particular bank account's buffer memory and the merchant's claim. When validation occurs, the particular correct bank allows the processing of the merchant's transaction claim for relevant transaction at step 526, and, through the respective authorization and authentication network and correct databases, responds back to the right Merchant's Credit/Debit Card Processing Means, thereby, allowing the exact amount of money being transacted to be credited to the correct merchant's bank account at step 528.

The Merchant's Credit/Debit Card Processing Means routes the detailed data/information report to the merchant's terminal. This finishes the merchant part of the particular transaction. Finally the particular bank saves the merchant's transaction in the buffer memory of the customer's bank account at step 530, and reports & records to the respective correct registered CCIRAF/AITD about the complete transaction at step 532. Step 540 is the end.

However, if there is no perfect match at step 534 of the required data/information with the authorized customer's or authorized user's specific bank account's buffer memory and the merchant's claim for the specific transaction at step 522, an alarm signal or mismatch information will be routed to the merchant's terminal at step 536, and the particular transaction will be canceled at the merchant's terminal, and, there will also be an alarm sent to the respective correct registered CCIRAF/AITD at step 536 that will be recorded in correct registered CCIRAF/AITD's memory, and the particular specific transaction will be canceled at step 536. At step 538, there will be a report of "Unable to process the transaction" at the respective correct registered CCIRAF/AITD. Step 540 is the end.

In FIG. 17, the present invention (EucliBaba), inclusive of the present inventive device or CCIRAF/AITD or EucliStar eGeeenie can achieve the benefiting advantage over the current problems encountered during telephonic and online purchasing of merchandise. Sample scenarios are cited pertaining to the achievable advantages as follows:

Example Scenario:

Current problems encountered during telephonic orders of merchandise or services and the achievable advantages of the present invention—EucliBaba, and present inventive device—EucliStar eGeeenie.

When a customer makes a purchase of merchandise or service by telephone, he/she does not know for sure if his/her credit card or debit card information may somehow become vulnerable to potential fraudulent leakage; the credit card or debit card information may later on be used for further unauthorized usage by others, known or not even known to the customer; or the credit card or debit card information may even be used at multiple random times for various fraudulent transactions of equal or different amounts in many other various merchant locations. These may really amount to exorbitant charges and penalty fees of which the customer may be held liable to pay.

Later on, the customer gets a letter or a phone call to verify those charges. The legitimate bank may alert the customer by phone, e-mail message or letter about possible suspicious fraudulent charges done by someone else. But, since these alert methods are generally delivered soon enough, the customer is not completely off the hook. Although the other charges may have been committed by others, either known or not even known to the customer, the only thing he/she can do is to file a dispute against those charges, if they are indeed fraudulent, in order to defend himself/herself against the liability. But, in their very nature, fraud investigations take time, and the customer has yet to prove that he/she did not, in reality, make all those other telephonic purchase or service orders.

The present invention provides a direct recorded proof, because each of present inventive device, "Customer Controlled Instant-Response Anti-Fraud/Anti-Identity Theft Device" or CCIRAF/AITD or EucliStar eGeeenie or Universal eGeeenie has the capability of recording and replaying back the actual legitimate telephonic order of the particular transaction, including the real time, date, the exact amount, the transaction number and the nearest GPS location of the point-of-origin of the telephonic purchase of merchandise or service order involved in the specific telephonic transaction. Moreover, since there is a direct link between his/her registered Customer-Controlled Instant-Response Anti-Fraud/Anti-Identity Theft Device or CCIRAF/AITD or EucliStar eGeeenie with the respective bank or lending company with whom the customer is dealing, the specific telephonic recording can be referred to easily as evidence of what really transpired in support of the authorized telephonic order, versus the other fraudulent charges that are not supported by a properly linked and registered authorized CCIRAF/AITD or EucliStar eGeeenie that specifically belongs only to the rightful authorized customer or authorized user.

In FIG. 18, there is shown the flow diagram of one sample sequence of important steps that the authorized customer or authorized user has to follow in order to complete a safe telephonic or online purchase of merchandise or service or bill payment. During each online or telephonic purchase order or bill payment, a validated transaction can be achieved by means of secured data/information interchange or exchange between the authorized customer and the merchant for each particular transaction of merchandise or service order or bill payment.

Start at step 550.

At step 552, a particular transaction is first initiated by the authorized customer or authorized user to make a purchase order of merchandise or service, or to make bill payment(s) online or through telephonic communication.

At step 554, the authorized customer or authorized user can activate the voice recording application in his/her registered CCIRAF/AITD as integrated with the built-in cellular and/or satellite phone application, or, must activate the internet application, in case of online transactions. The respective correct registered CCIRAF/AITD has this option to record and play back the exact contents of voice conversation between the authorized customer or authorized user and the merchant's agent or merchant's programmed synthesized interactive speech recording for the particular telephonic purchase order, or, for a particular bill payment, so as to ensure a real time and date event reference of any and/or all particular telephonic transaction or transactions or bill payment(s) for security purposes.

At step 556, the relevant processing means processes the authorized customer's or authorized user's initiated transaction as per the relevant steps in FIG. 15. The relevant transaction data/information is saved in the authorized customer's or authorized user's particular bank account's buffer memory for the upcoming matching during the settlement phase of the specific transaction(s), to prevent any fraudulent charging.

The payment options for internet transaction must be entered by the authorized customer or authorized user at step 558. At step 560, the customer/user enters the bank details, such as correct name of the account holder, type of card, card number, card expiration date, the amount to be transacted and the currency for the specific transaction(s), etc., in the web browser. Web browser sends the transaction details along with the random TIN generated by the CCIRAF/AITD to the web server means to process the transaction at step 562. Web server means validates the details of the given credit card or debit card with the correct authorized customer's bank at step 564. The web server processing means will also send an electronic request to the authorized customer's bank with all the transaction data/information at step 564.

At step 566, if the transaction is found to be correctly validated for authentication and authorization, then the correct authorized customer's bank checks the availability of funds for the specific transaction in the correct account used at step 568. If at step 566, there is no validation for authentication and authorization, then an alarm at step 570 will sound and a message will be visually displayed on the interactive LCD display of the correct registered CCIRAF/AITD, and recorded also in the correct registered CCIRAF/AITD, warning against possible fraudulent usage of the specific credit/debit card also at step 570. Then, at step 590, a message is displayed on the interactive LCD display of the correct registered CCIRAF/AITD, stating, "Unable to process the transaction." Step 592 is the end.

At step 572, if the funds are not available sufficiently, then at step 576, there will be an alarm and LCD display report sent through by the relevant bank through its correct authorized bank's networks about the insufficiency of funds for the specific transaction, and recorded into the correct registered CCIRAF/AITD, thereby enabling the correct authorized customer or authorized user to decide what measures to use to prevent him or her from falling victim of penalty fees as a result of the insufficiency of funds in his/her correct particular bank account. In step 590, an alarm will sound and a display message will appear on the interactive LCD display stating, "Unable to process the transaction." Step 592 is the end.

If at step 572, the funds available are found to be sufficient, then, the relevant bank checks and validates in its buffer memory if there is a perfect match between the authorized customer's part of the transaction and the merchant's payment claim at step 574. The validation can be accomplished only if there is a perfect match of the relevant data/information such as credit/debit card number, and amount with the pre-stored buffer memory of authorized customer's or authorized user's specific bank account and accurately matching with the merchant's claim for the specific transaction. If there is validation, the particular web server means will allow the processing of the merchant's part of transaction at step 578, and sends an instant-response back to the requesting means i.e. web server processing means, and then the exact monetary amount of the specific transaction is credited to the merchant's bank account at step 580. This finishes the merchant part of transaction.

However, if there is found a mismatch at step 586 of the data/information between the specific bank account's buffer memory for the authorized customer's part of the transaction with the merchant's claim at step 574, the respective correct bank will send an alarm and message about the mismatch to the correct registered CCIRAF/AITD, and also reports the mismatch of data/information to the merchant's terminal and cancels the specific transaction at step 588, The mismatch alarm or message is heard and displayed on the interactive LCD display of the respective correct registered CCIRAF/AITD which automatically records the mismatch and canceled transaction into memory of the respective correctly registered CCIRAF/AITD (if programmed that way). At step 590, an LCD display and/or an alarm at the correct registered CCIRAF/AITD will state, "Unable to process the transaction." Step 592 is the end.

Finally, for approved, matched and merchant-credited transaction, the specific issuing bank saves the merchant's transaction in the buffer memory of the correct customer's bank account at step 582, and reports & records to the respective correct registered CCIRAF/AITD about the complete transaction at step 584. Step 592 is the end.

In FIG. 19, one more important function of the present inventive device or CCIRAF/AITD or EucliStar eGeeenie or Universal eGeeenie is to check the balance of a particular debit card or credit card prior for any transaction to be made. This function can help prevent any and/or all overdraft charges by the relevant banks and/or lending institutions. The anti-fraud/anti-identity theft with true-personal identity verification applications will lead the authorized customers and/or authorized users for the balance check with specified interactive prompts and instructions.

At step 600 is the start. At step 602, the correct registered CCIRAF/AITD with true-personal identity verification is switched on. At step 604, the authorized customer/user enters the pass code and/or scans his or her required finger to input the finger biometrics data for finger biometrics matching check in order to activate his/her registered CCIRAF/AITD. If the entered data is validated at step 606, the authorized customer/user swipes his or her chosen physical credit card or debit card through the card reader of his/her correct registered CCIRAF/AITD (shown in FIG. 7), or if the card reader of his/her registered CCIRAF/AITD is not working properly, he/she manually enters the details of his/her credit/debit card at step 608.

If there is no validation of entered data at step 606, there will be an alarm and report of possible fraudulent usage of the registered CCIRAF/AITD at step 614, and the registered CCIRAF/AITD will not work.

If in step 606, there is validation, then the correct registered CCIRAF/AITD will work, and the registered CCIRAF/AITD will proceed through steps 608, 610, 612, and, at step 616, if authentication and authorization is validated, then the registered CCIRAF/AITD connects to the authorized customer's or authorized user's specific credit/debit card bank account through the Customer's Credit/Debit Card Processing Means at step 618, and the processing means will process the request and report the specific balance of funds or credit line in the specific account at step 620. The registered CCIRAF/AITD displays the exact account balance on its interactive LCD display at step 622. Step 628 is the end.

However, at step 616, if authentication and authorization are not validated, there is an alarm and report at step 624, and records into the memory of the registered CCIRAF/AITD of possible fraudulent usage of the credit/debit card, and at step 626 there is a display on the interactive LCD display window of the registered CCIRAF/AITD stating "Unable to process the transaction." Step 628 is the end.

FIG. 20 illustrates that the present invention also reveals one more way of processing a complete authorized transaction without first swiping the authorized customer's or authorized user's credit/debit card through the respective registered CCIRAF/AITD, for accepting or rejecting a transaction controlled by the authorized customer/user. In this functional means and method, the initiation of the particular transaction can be achieved through the merchant.

Start at step 650.

At step 652, a correct credit card or debit card of the preauthorized customer or authorized user is to be swiped into the credit/debit card reader device of the merchant at the point-of-sale (POS) terminal or ATM, or the details of the credit/debit card can be manually entered at the merchant's point-of-sale (POS) terminal or ATM (if applicable) at step 652 to make a transaction. Then the customer/user selects the type of card (credit or debit) at step 654 (if required), enters the PIN/Security code or validates the customer's true-personal Identity at step 656 for the specific card transaction, and enters the amount, currency (can be set as automatic) and the access number of the merchant (optional) at the POS terminal or ATM (if applicable) at step 658 to initiate a specific transaction. The system connects to the customer's correct credit/debit card bank account through Merchant's Credit/Debit Card Processing Means at step 660 for processing the transaction. The relevant bank extracts the needed data/information of the respective customer's or user's credit card or debit card, and the relevant transaction data/information and be processed for validation for authentication and authorization. If the specific card data/information for the particular transaction does not match or validate for authentication and authorization with the account database at step 662, then the specific transaction is considered invalid and the transaction will not be able to proceed further at step 666, while an alarm and LCD display will instantly be initiated in the correct registered CCIRAF/AITD, and will be recorded into the memory of the respective correct registered CCIRAF/AITD for fraudulent usage of the swiped credit card or debit card at step 666. Step 676 is the end.

If the specific transaction at step 662 is validated for authentication and authorization, then, the respective networked systems checks for the respective bank's buffer memory for the customer part of the transaction. If there is no customer pre-input data at the respective correct bank for the particular sought for transaction that was pre-sent to register at the buffer memory of the customer's specific bank account, the respective correct bank will send an alert to the respective registered CCIRAF/AITD for the customer's approval or rejection for that particular transaction at step 664.

The present invention, inclusive of the CCIRAF/AITD is not limited to any particular alert method like ring tones, voice or text message. The authorized customer or authorized user does need to respond to the alert within a specified time. If the transaction is approved by the authorized customer or authorized user within the set specified time at step 668, the corresponding Credit/Debit Card Processing Means will continue to process the specific transaction at step 670, and the specific transaction information will be sent and saved in the respective correct registered CCIRAF/AITD at step 672. The end is step 676.

However, if the specific transaction is not approved by the authorized customer or authorized user within the specified time frame in step 668, the authorization and authentication system automatically cancels the specific transaction, and informs the respective correct bank or lending company about the rejected and possible fraudulent transaction and canceled transaction, and records the relevant information in the respective correct registered CCIRAF/AITD at step 674. Or, if the authorized customer or authorized user did not know about the swiping of his/her credit card or debit card, he/she can reject the specific transaction at step 668, and a potential fraudulent use of his/her credit card or debit card is automatically displayed and recorded in his/her registered CCIRAF/AITD, and the potential fraudulent incident is instantly reported to his/her respective correct bank account at step 674. Step 676 is the end.

FIG. 21 illustrates the flow chart pertaining to the preauthorizing of future transactions as another exemplary function and capability of the present invention, inclusive of the CCIRAF/AITD or Universal eGeeenie or eGeeeenie. The authorized customer or authorized user can initiate one or more transactions in advance at certain pre-set dates and/or times.

Start at 700, and at step 702, switch on the anti-fraud/anti-identity theft with true-personal identity verification applications in the correct registered CCIRAF/AITD. Enter the password and/or scan the selected finger to enter the required finger biometrics data at step 704 to activate the correct registered CCIRAF/AITD. At step 706, the correct registered CCIRAF/AITD determines if the data entered is validated. If the entered data is not validated at step 706, an alarm will sound and a display will show on the interactive LCD display of the respective correct registered CCIRAF/AITD about the possible fraudulent usage of the correct registered CCIRAF/

AITD, and the correct registered CCIRAF/AITD will not work at step 720. Or, there may be a mistake of data entry by the authorized customer or authorized user, so he/she must repeat the required data entry again at step 704, until corrected. Step 740 is the end.

At step 708, the authorized customer or authorized user swipes a legitimate physical credit/debit card into the registered CCIRAF/AITD's card reader, or the required details of the credit/debit card can be manually entered into the registered CCIRAF/AITD through the keypad or interactive touch-screen at step 708. The type of card (credit or debit) is selected at step 710, and the PIN/Security code for the respective correct bank is entered at step 712. At step 714, select "pre-authorize a transaction" from the options. The amount, currency, the access no. of the merchant (optional), and the brief description (if needed) and date of the transaction are entered at step 716. The registered CCIRAF/AITD connects to the specific customer's credit/debit card bank account through Customer's Credit/Debit Card Processing Means at step 718. The bank extracts the specific credit/debit card and transaction information for of the specific transaction for authentication and authorization. If the card information for the specific transaction does not match with the specific bank account database, then, the transaction is considered invalid, and the specific transaction will not be processed; rather an alarm will sound and an LCD display will instantly appear at the interactive LCD display window of the respective correct registered CCIRAF/AITD and recorded as evidence of the possible fraudulent usage of the specific credit/debit card at step 728. Step 740 is the end.

At step 722, the authentication and authorization is checked for validation of the pre-transaction. If at step 722 there is validation, then at step 724, the pre-transaction is stored in the authorized customer's or authorized user's bank account's buffer memory with the set date or dates for the pre-set future transaction(s), and, also recorded in the corresponding specific CCIRAF/AITD at step 724. The respective bank or lending company will determine the availability of the funds one or more days in-advance in the authorized customer's or authorized user's specific bank account for the specific pre-transaction at step 726, and sends the report of the availability and amount of funds one or more days in advance of the date of pre-authorized transaction deduction to the corresponding correct registered CCIRAF/AITD belonging to the correct authorized customer or authorized user.

If the funds are available sufficiently at step 730, the relevant networked system informs the authorized customer or authorized user about the future processing of the specific pre-transaction and record into the CCIRAF/AITD after the specific transaction is processed at step 732, and the process ends at step 740. If the bank determines the insufficiency of the specific funds in the customer's respective correct bank account, the bank's or lending institution's authorization network will send an alarm and LCD display to the respective correct registered CCIRAF/AITD about the insufficient funds at whatever set regular intervals of time at step 734, so that the authorized customer or authorized user can correct the problem of insufficient funds. The authorized customer or authorized user has the option to either cancel the transaction, or not at step 736. If the scheduled transaction is not cancelled, due to solved sufficient funds availability in the correct account at that scheduled debiting date and time, then, at step 732, the authorized customer or authorized user is informed about processing the specific scheduled transaction, and record to the correct registered CCIRAF/AITD after the transaction is processed and completed at step 732. Step 740 is the end.

If, at step 736, the authorized customer or authorized user decides to cancel the specified scheduled transaction, and he or she cancels the transaction, at step 738, he or she can wirelessly inform the respective correct bank about any new transaction or any change of transaction, which can be recorded also in the respective correct registered CCIRAF/AITD. Although not shown in this flow chart, he or she can transfer additional substantial funds to the required bank account from another credit/debit card or cheque (check) to fill in the insufficiency of account funds, before processing the transaction. When a new specified date of bill payment is set, after solving the insufficiency of funds, before the scheduled date of bill payment will be consummated, a report to the respective correct registered CCIRAF/AITD will also be instantly received and recorded in the correct CCIRAF/AITD. In this way, the penalty fee for the insufficiency of funds in the particular specific bank account can be prevented, while maintaining evidence that proves that a solution of covering the insufficiency of funds in the particular account has been properly covered by the authorized customer or authorized user before the actual bill payment date, thus favoring the authorized customer or authorized user by avoiding payment(s) of penalty fees.

After the scheduled transaction is properly processed and completed at step 732, a completed satisfactory report is also received in the respective correct registered CCIRAF/AITD owned by the correct authorized customer or authorized user.

Step 740 is the end.

In FIG. 22, the diagrammatic representation illustrates that the use of any physical card(s) is not required to make a monetary or commercial transaction. Rather, it requires an LCD-projected virtual card in order to proceed or carry out or accomplish a completed transaction.

Step A': The authorized customer/user switches on the anti-fraud and anti-identity theft with true-personal identity verification applications in the CCIRAFD/AITD or EucliStar eGeeenie. Since the present inventive device or CCIRAF/AITD 136a/136b is pre-loaded with the relevant correct bank account(s) information, the pre-loaded information can be accessed, using either the biometrics data and/or PIN as set in the respective CCIRAF/AITD 136a/136b. For validating the biometrics input data 388, the authorized customer/user scans for the biometrics data and/or enters the PIN. The present inventive device, when prompted, can display all the available projected virtual bank accounts cards that have been pre-loaded into the CCIRAF/AITD or Universal eGeeenie. The authorized customer/user, then, has the chance to select by scrolling on the interactive touch-screen LCD display to choose which virtual credit/debit card bank account that he or she wants to use, before proceeding further with any transaction(s). It is important to remember that the present inventive device has a provision to set different PINs (if desired) for different applications with same biometrics.

Step B: The authorized customer/user, then, needs to enter the required transaction information like card details, PIN, amount, currency and any other data/information required to process the transaction, and submit the chosen virtual credit/debit card transaction details to the Customer's Credit Card Processing means 384 via secured/connections.

Step C: The customer's Credit Card Processing Network routes the transaction data/information to the Customer's Bank Account 380 with correct authorization.

Step D: The Customer's Bank Account 380 approves or declines the transaction based on the validation details of the virtual bank card, PIN and customer's available funds and passes the transaction results back to the Customer's Credit Card Processing means 384. The transaction approval or decline or denial made by the Customer's Bank Account 380, is left recorded into the Customer's Bank Account's buffer memory of the respective Credit/Debit Card Bank account's database.

Step E: The customer's credit/debit card processing means 384 notifies the transaction result approval or decline or denial to the respective registered CCIRAF/AITD 136a/136b. This completes the customer part of the transaction. The bank and/or the correct respective CCIRAF/AITD generates a Transaction Identification Number (TIN) and will be displayed to the authorized customer/user on the authorized customer's/user's respective registered CCIRAF/AITD or Universal eGeeenie. The generated TIN signifies that the customer or the user part of the transaction has been processed.

Step F': The merchant has to scan the authorized user's virtual credit/debit card bar code displayed on the interactive touch-screen LCD display of the respective authorized customer's/user's CCIRAF/AITD 136a/136b, by means of the bar code reader 390 at the Point-of-Sale (POS) terminal 378a for a direct purchase, so that the authorized customer's/user's credit/debit card data/information is read by the POS terminal's scanner, and is combined with other transaction data/information, such as PIN, the transaction amount, currency and TIN.

Step G: The merchant submits the particular credit/debit card transaction through the point-of-sale (POS) terminal 378a to the authorized Merchant's credit/debit card processing means 382 on behalf of the customer/user via secure electronic connections and networks.

Step H: The Merchant's credit/debit card processing means 382 routes the transaction to the Customer's Bank Account 380 for authentication, validation, approval and authorization.

Step I: The Customer's bank account 380 with the Credit/Debit Card Issuing Bank approves or declines the transaction based on the customer's available funds, and the corresponding customer part of the transaction stored in the buffer memory, and pass the transaction results back to the Merchant's credit/debit card processing means 382. The criterion for approving the transaction is the comparison of the card data/information, PIN, Transaction Identification Number (TIN), amounts, currency that the authorized customer or authorized user had sent and authorized, including all relevant data/information sent or requested by the Merchant's credit/debit card processing means 382, and the exact amount requested by the merchant for the transaction along with the merchant Identification number. But, the merchant Identification number can be made optional depending upon the merchant's convenience or needed transaction requirements to expose the ID for the customers. The transaction is considered to be valid if all the data/information are perfectly matched.

Step J: The Merchant's credit/debit card processing means 382 stores the transaction results and send them to the Merchant's POS terminal 378a. This step completes the authorization process—all in about three seconds or less!

Step K The Customer's Bank Account 380, with its correct decision-making channels, sends the appropriate funds for the transaction to the Merchant's credit/debit card processing means 382.

Step L: The Merchant's credit/debit card processing means 382 passes the exact approved amount of funds for the specific transaction to the Merchant's bank account 386 for deposit. This completes the settlement process of the specific transaction.

Step M: The Customer's bank account 380, with its proper networked connections communicate back to the authorized customer's or authorized user's registered CCIRAF/AITD or EucliStar eGeeenie 136a/136b, regarding the processed transaction, and funds taken from the authorized customer's or authorized user's specific bank account. The CCIRAF/AITD or EucliStar eGeeenie 136a or 136b saves the transaction into the present inventive device's or EucliStar eGeeenie's memory.

FIG. 23 represents a flow diagram of the sequence of steps for using the registered CCIRAF/AITD or EucliStar eGeeenie as a substitute for the use of a physical credit card or debit card for point-of-sale (POS) payments with a corresponding LCD-displayed image of a corresponding virtual card and an electronically readable bar code identification that represents the corresponding displayed virtual credit/debit card.

With these features, therefore, the present inventive device or CCIRAF/AITD or EucliStar eGeeenie or Universal eGeeenie also allows the authorized customers or authorized users to proceed with specific transaction or transactions even in the absence of any physical debit/credit card. In this case, the authorized customer/user has to follow certain measures such as entering the required PIN, password and/or biometrics data, etc. to avoid the possibilities of fraud. Since each respective relevant bank and/or lending company has registered each corresponding CCIRAF/AITD or EucliStar eGeeenie in their correct protected database(s), the registered CCIRAF/AITD or EucliStar eGeeenie or Universal eGeeenie has the provision to access the correct authorized customer's or authorized user's bank account(s) database through the correct registered CCIRAF/AITD or EucliStar eGeeenie.

Start at step 750.

In order to access the correct bank account(s), the authorized customer or authorized user has to first switch ON the anti-fraud/anti-identity theft (with true-personal identity verification) applications in the correct registered CCIRAF/AITD in step 752. At step 754, the authorized customer or authorized user is prompted to enter the right password/PIN and/or scan the required correct finger for proper biometrics data check in order to activate the correct present inventive device or CCIRAF/AITD or EucliStar eGeeenie. At step 756, the CCIRAF/AITD or EucliStar eGeeenie verifies that the inputted data validates with the corresponding data available in the correct CCIRAF/AITD's or EucliStar eGeeenie's memory. If the biometrics data and PIN are not validated at step 756, then at step 764, the correct CCIRAF/AITD or Universal eGeeenie alerts with a report of fraudulent usage of correct CCIRAF/AITD, and, thereby, the correct CCIRAF/AITD will not work and cannot operate any further at step 764, and ends at step 798.

In case the biometrics data and PIN are validated at step 756, the correct CCIRAF/AITD displays some or all the available virtual credit/debit card accounts, one after another, as the authorized customer or authorized user scrolls on the interactive touch-screen LCD display of the correct CCIRAF/AITD at step 758, until he or she finally selects and decides the virtual bank card and type of account (credit/debit/checking/savings) to be used in a particular transaction at step 760. At step 758, the virtual ID of the authorized customer/user can also be displayed (if required or desired). Then, at 762, the correct CCIRAF/AITD connects to the authorized customer's/user's correct bank account database for processing through the customer's credit/debit card processing means. The correct CCIRAF/AITD is now connected to the correct bank database. The authorized customer or authorized user can now proceed further with his or her desired kind or type of transaction.

The present invention or EucliBaba, inclusive of the use of the present inventive device or CCIRAF/AITD or EucliStar eGeeenie here provides (not only limited to), four, five, six different kinds of transactions, such as: for balance enquiry at step 766, for checking the transaction history at step 768, for transfer of funds from one personal or business account to another personal or business account, or to transfer funds to the built-in Near Field Communication (NFC) account or to another account at step 776, and, for authorizing a POS transaction or for pre-authorizing specific amount or amounts of funds for processing a future transaction or transactions at specific dates and times within specified time-frames for purchase or bill payments at step 792. The authorized customer or authorized user has the option of selecting the required sub-applications using the correct CCIRAF/AITD or EucliStar eGeeenie.

Upon selection of the specific account balance at step 766, the correct CCIRAF/AITD sends the request to the customer's credit/debit processing means through secured wireless communication. The processing means receives the request and forwards it to the correct bank. The correct bank responds to the request and replies back to the correct processing means, which processes and forwards the processed request and reports the balance information of the specific account to the corresponding correct requesting CCIRAF/AITD at step 770. The correct CCIRAF/AITD displays the requested account balance on the interactive touch-screen LCD display at step 772. In case the transaction history is requested at step 768, then at step 770 the correct processing means process the request and report the transaction history of the specific account, and the corresponding correct specific account history is displayed also at step 772. The authorized customer or authorized user can view the requested transaction information for a programmed period of time for each corresponding correct selected bank account. Step 774 is the end.

776 is the option for transfer of funds. At step 778, the authorized customer or authorized user will select the amount and the account where funds will be taken from and the account where funds will be transferred into. The CCIRAF/AITD will automatically generate a random Transaction Identification Number (TIN) at step 780 and will display the TIN on the CCIRAF/AITD. At the same time, the CCIRAF/AITD will send the transfer of funds request to the correct processing means at step 782. If the authentication and transfer request are validated at step 784, the correct processing means will process the transaction at step 786 and will credit the funds in the respective bank accounts or in the account in the built-in NFC of the correct CCIRAF/AITD. Step 788 is the end.

However, if the authentication and transfer request are not validated at step 784, then step 790 is the end. If authorizing a POS transaction or pre-authorizing a transaction for purchase and bill payments is selected at step 792, then at step 794, follow the relevant steps from steps 464 till 490 of FIG. 15 to pre-authorize the customer/user part of the transaction.

All the details of each transaction are saved in the authorized customer's/user's particular account's memory of the respective bank indicating that the pre-authorized transaction has been executed without the physical swiping of the corresponding physical credit/debit card, but, with the use of a corresponding substitute virtual credit/debit card.

Step 796 is the end.

FIG. 24 is a simplified diagrammatic representation of the relevant generalized data flow, for executing various Medicare/Medicaid and/or private medical/health insurance legitimate claims by relevant medical/health facility, medical laboratory, physical therapy, doctor's office, pharmacy, etc., involving the proper verification, authenticity and accuracy of the relevant claims by the properly insured patients or patients' representative, using the interactivity and instant-response functionality of the respective registered CCIRAF/AFTDs or EucliStar eGeeenies or Universal eGeeenies, in order to prevent the commitment of false or fraudulent medical/health insurance claim or claims.

Step P1: The authorized insured customer/patient presents his/her Medical/Health Insurance card 950 (preferably with magnetic stripe for swiping and reading) at the medical/health facility, such as hospital or doctor's office, or medical laboratory or pharmacy, etc. terminal 952, for medical diagnosis, treatment or medical check-up or for any other related health or medical issues or reasons (if the customer/patient still has proper and effective insurance coverage). The proper medical paperwork or electronic questionnaire has to be filled by the insured customer/patient or his/her representative (if he or she has not yet done this).

Step P2: The relevant medical/health facility, such as the doctor's office or medical laboratory or pharmacy or physical therapy, etc. terminal 952 submits the medical/health insurance claim details to the relevant medical/health insurance processing means 956 via secured electronic transmission and connections.

Step P3: The relevant medical/health insurance processing means 956 routes the processed medical/health insurance claim to the correct Medicare/Medicaid and/or private Medical/Health Insurance companies 958. The relevant medical/health insurance processing means 956 may be third party insurance agencies that process the insurance claims. The processing includes checking the insurance claim as per the terms and conditions of the insurance policy, confirming and paying amounts to medical/health professionals and hospitals, medical facility, medical laboratory, physical therapy, pharmacy, etc.

Step P4: The Medicare/Medicaid and/or private Medical/Health Insurance companies 958 then sends a request to the correct Customer's/Patient's medical/health insurance info processing means 954 to confirm the authenticity and accuracy of the medical/health insurance transaction claim.

Step P5: The Customer's/Patient's medical/health insurance info processing means 954 forwards the request to the correct registered CCIRAF/AITD 50 as an alert/message. The authorized insured customer/patient has to respond to the alert/message within a certain specified time to legalize or verify/accept or reject the accuracy and authenticity of the medical/health insurance claim being processed. Because of some reasons, if the authorized insured customer/patient is not able to respond back instantly, the alert/message is saved in the medical insurance-related application in the respective correct registered CCIRAF/AITD 50 of the authorized insured customer/patient for relevant future response.

Step P6: In order to access the insurance alert/message from the present inventive device or CCIRAF/AITD 50, the authorized insured customer/patient has to either swipe his/her medical/health insurance card 950 in CCIRAF/AITD 50, or manually enter therein the details and validate the biometrics or password of the authorized customer/patient of the correct registered CCIRAF/AITD 50 (if required).

Step P7: The authorized insured customer/patient has to respond to the insurance's request through his/her correct registered CCIRAF/AITD 50, and has to send the response to the Customer's/Patient's medical/health insurance info processing means 954.

Step P8: The Customer's/Patient's medical/health insurance info processing means 954 sends back the authorized customer/patient's correct registered CCIRAF/AITD's response to the Medicare/Medicaid and/or private Medical/Health Insurance companies 958 to analyze the authorized insured customer/patient's response.

Steps P9 & P10: The Medicare/Medicaid and/or private Medical/Health Insurance companies 958 reports the authenticity and accuracy of the medical/health insurance claim to the medical organization through relevant medical/health insurance processing means 956. If the medical/health insurance claim is authentic, accurate and correct, then Medicare/Medicaid and/or private Medical/Health Insurance companies 958, through the relevant medical/health insurance processing means 956 pays the insurance money to the relevant correct Medical/Health facility, such as hospital, doctor's office, medical laboratory, physical therapy, pharmacy, etc. terminal 952.

In this present invention, inclusive of the present inventive device or CCIRAF/AITD or EucliStar eGeeenie or Universal eGeeenie, it is highly recommended that the medical/health insurance card(s) be provided with magnetic stripe for easier, convenient and reliable swiping purposes, in order for the insurance company as well as the respective authorized insured customer/patient to be protected by the anti-fraud and anti-identity theft with true-personal identity verification and medical/health privacy functionalities.

Since the CCIRAF/AITD or EucliStar eGeeenie or Universal eGeeenie or eGeeenie is provided with GPS feature, functionality, and capability, it can be tagged within acceptable proximity range with the device that is present at the relevant medical facility, so as to establish the physical presence of the insured customer/patient at that particular relevant medical facility at that specific time and date. This establishes a reinforcing factor of another acceptable tie-in of authenticity that the insured customer/patient has been physically present at that particular medical/health facility at that specific time and date.

Through the use of the correctly registered CCIRAF/AITD or EucliStar eGeeenie or Universal eGeeenie, the relevant correct medical/health insurance card can be swiped into the swiping slot and read by the magnetic stripe reader of the respective correct registered CCIRAF/AITD or EucliStar eGeeenie or Universal eGeeenie, and properly respond to the alert/message made or sent by the requesting medical/health insurance companies to verify the authenticity, accuracy and correctness of the medical/health insurance claim with all the necessary secured information on behalf of the authorized insured customer/patient. The relevant correct medical/health insurance card of the authorized insured customer/patient can also be swiped at the terminal of the relevant medical/health facilities, such as hospital, doctor's office, medical laboratory, physical therapy, pharmacy, etc. or by using the built-in integrated interactive NFC component and system of the correct registered CCIRAF/AITD or EucliStar eGeeenie or Universal eGeeenie in order to instantly interact/communicate and exchange the relevant secured information/data with a corresponding relevant NFC-enabled device at the terminal of the relevant correct medical/health facilities, such as hospital, doctor's office, medical laboratory, physical therapy, pharmacy, etc.

Although not shown in this flow chart, the authorized insured customer's/patient's correct registered CCIRAF/AITD 50 will be informed about the completed medical/health insurance claim payment or rejection of payment if programmed that way.

FIG. 25 is a flow diagram representing a sample flow sequence of steps for processing an authorized insured customer's/user's medical/health insurance card from the medical/health insurance companies, such as Medicare/Medicaid and/or the respective private medical/health insurance(s), and as claimed by relevant medical/health facility, such as hospital, doctor's office, medical laboratory, physical therapy, pharmacy, etc., and, utilizing the respective correct registered CCIRAF/AITD or EucliStar eGeeenie or Universal eGeeenie of the correct authorized insured customer/patient.

Start at step 962.

In step 964, the authorized insured customer/patient swipes the customer's/patient's correct medical/health insurance card or enters the details of the insurance card manually at the medical/health facility, such as hospital, doctor's office, medical laboratory, physical therapy pharmacy, etc. terminal. The relevant medical organization terminal sends the authorized insured patient's medical/health insurance details along with the supporting data/information to the relevant medical/health insurance company through relevant medical/health insurance processing means to claim for the medical/health insurance payment in step 966. Medical/health insurance processing means forwards the medical/health insurance claim details to the relevant insurance agency/company at step 968. Insurance company processes the medical/health insurance claim and contacts the correct registered CCIRAF/AITD for confirmation from the authorized insured/customer/patient through the Customer's/Patient's medical/health insurance info processing means at step 970. Authorized insured customer/patient swipes the medical/health insurance card into the correct registered CCIRAF/AITD or enters the details of the card manually to access the medical/health insurance info and alerts from the correct registered CCIRAF/AITD in step 972. At step 974, the authorized insured customer/patient rejects or authenticates/confirms the accuracy and correctness of the insurance company's request from the correct registered CCIRAF/AITD within a specified time through relevant processing means to authenticate the correctness and accuracy of the medical/health insurance claim. If the medical/health insurance claim is authentic, accurate and correct in step 976, then at step 978, the insurance company reports the authenticity, accuracy and correctness of the medical/health insurance claim to the medical organization based on the correct registered CCIRAF/AITD's response. If the report is authenticated and confirmed as correct and accurate by the authorized registered insured customer/patient, then the medical/health insurance company pays the money also in step 978. If the medical/health insurance claim is confirmed as not authentic, not accurate and incorrect, then at step 980, the medical/health insurance company rejects the insurance claim and reports to the respective relevant organization and the correct registered CCIRAF/AITD about the rejected insurance claim. Step 982 is the end.

In FIG. 26, the uses of millions of individual specific registered CCIRAF/AITDs or EucliStar eGeeenies or Universal eGeeenies can immensely aid in facilitating the faster and efficient pre-screening and screening of the true-personal identities of millions of innocent airline passengers, and delineating or isolating them from certain suspicious and potentially risky persons, thereby, cutting the numerous long delays in airport waiting time of airline passengers before being allowed to enter into various restricted airport gates and restricted lanes for specific aircraft boarding.

Start at step 1000.

At step 1002, the authorized user of a specific CCIRAF/AITD must register his/her CCIRAF/AITD with the TSA (Transportation Security Administration) and provide all needed or requested data/information requested by TSA.

Note:

According to the programmed detection sensitivity and capability of the TSA software, once there is a secured wireless communication made by a specific CCIRAF/AITD to the TSA, the TSA can instantly detect its DIN (Device Identification Number), and even its current and changing GPS location(s). It is also possible to register the specific CCIRAF/AITD to the TSA through proper paperwork mailing or through fax or through computer-prompted telephonic or internet means. The TSA will verify the authenticity, accuracy, correctness, risk, safety and security factors or nature of the specific CCIRAF/AITD, and, also of the relevant data/information submitted for registration by the applying user, before approving the registration of the specific CCIRAF/AITD. If the TSA has a secured inter-link data sharing with any/and every mobile phone/internet provider(s) database(s), the TSA can instantly know to whom the specific CCIRAF/AITD is registered.

If approved by the TSA, the specific CCIRAF/AITD will instantly ring, and a message of approval from the TSA will be received by the specific CCIRAF/AITD, and automatically stored in the built-in digital memory of the specific CCIRAF/AITD. During the registration process, the TSA will also require the applying user of the specific CCIRAF/AITD to submit all or some relevant evidences of important items, such as the most recent personal picture ID, personal biometrics (finger and/or iris biometrics) driver's license, permanent address, telephone, social security number, birth certificate, gender, current age, citizenship, passport and visas, places traveled, name of nearest relatives and emergency contact phone number(s) and e-mail(s), etc. in order to establish a more defined true-personal identity profile of the applying user to be stored in the secured database of the TSA.

The required items can be photographed by the built-in digital camera of the specific CCIRAF/AITD and stored therein, then instantly submitted wirelessly through the specific CCIRAF/AITD to the TSA registration center for storage and comparative recall to and from the database of the TSA with associated security links with national and global networks and affiliated cooperating secured databases. TSA verifies all the information about the specific CCIRAF/AITD and the personal data/information provided by the applying user and registers the user's specific CCIRAF/AITD tagged with the specific personal data/information of the applying user, and electronically determines their authenticity, accuracy and correctness based on TSA's updatable database and associated national and global databases and networks.

As a part of the TSA registration, both the relevant mobile phone/internet provider and the TSA must ensure the safe and secure means of encrypted data/information and communication transmission, storage and data/information retrieval from and to the correct registered user's specific CCIRAF/AITD.

At step 1004, if the specific CCIRAF/AITD is already properly registered with the TSA, then in step 1006, the approved user can plan his/her flight travel and purchase the airline ticket(s) online or from any other travel agency by phone or in person or purchase the airline ticket(s) personally from the airline ticket counter at the airport.

However, if the TSA registration has been declined or disapproved by the TSA based on suspicious grounds or incomplete relevant data/information submitted, then at step 1028, the specific CCIRAF/AITD cannot be used for airport and aircraft security check-in and entry at any airport restricted gates and restricted lanes, and cannot also be used for proper aircraft boarding.

At step 1008, at the time of check-in at the airline ticket counter, the airline ticket(s) and flight itinerary are electronically linked to the specific registered CCIRAF/AITD through the airline service provider and the TSA database(s) every time the authorized passenger/user checks-in at designated airport(s) and aircraft(s). The check-in luggage bar codes of the authorized registered passenger/user can also be linked to the registered CCIRAF/AITD at the airline ticket counter through the airline service provider and TSA databases, every time the authorized registered passenger/user checks-in at designated airport(s).

At step 1010, the authorized registered passenger/user can proceed to the designated security check-in and boarding gate(s).

At step 1012, the authorized registered passenger/user waves the NFC-enabled CCIRAF/AITD at the corresponding airport-based TSA's NFC-enabled reader, and the TSA security inspection device there, instantly pulls out or extracts the authorized registered passenger/user's data/information and the DIN of the specific CCIRAF/AITD from the TSA database to display on the adjacent or nearby flat screen monitor (if programmed that way). The data/information may include the airline and aircraft boarding details of the authorized registered passenger/user, including the personal picture ID, Biometrics, Passport and Visas, Driver's License, etc. according to TSA's relevant requirements.

However, there may be some important exceptions wherein the instant display of the relevant facial images and other relevant personal data/information at the flat screen monitor may be omitted. These may be applied to such important passengers/users like for example, special investigating agents of law enforcements, police and/or certain high officials of specific governments and/or important military personnel, and/or other important personalities, wherein total anonymity of special personal privacy are of great or of utmost importance as required. In these cases, some variety of special codes can be flashed on the adjacent flat-screen monitor so that the bonded airport security agents assigned in the specific airport gates and aircraft boarding areas can decipher and understand, and be informed by the display of the respective codes and their importance to be qualified as exceptions. But, to be able to practice this special privilege, the important exempted passenger/user must first obtain some kind of bonded security clearance from the TSA. The assigned bonded airport security agents can also be instantaneously alerted in their special carry-along devices (if applicable) that the important passenger/user has a special security clearance that is why their personal facial image can be blanked off from being displayed at the adjacent flat screen monitor there, and thereby allow the specific exempted passenger/user to be okayed for entry into the specific airport gates and lanes, and also be allowed to board the particular specified aircraft. However, the TSA and other relevant airport and aircraft security agents are always in the state of constant alert in monitoring these special cases, in case there may be suspicious fraudulent use or abuse of this particular special clearance privilege, in order to also guard against any/and all potential impersonators. All these are included in the special programming of the specific applications set forth in full secured protective and defensive stealth operations.

At step 1014, the TSA camera instantly captures the specific incoming authorized passenger/user's facial picture and the iris biometrics, then displays and matches them with the original previously filed facial picture ID and/or Iris Scan extracted from the TSA database. The new facial image and iris biometrics of the specific incoming authorized registered passenger/user are also recorded by the TSA security device. At the adjacent flat screen monitor, the displayed personal facial image ID of the passenger/user is pulled from the TSA database and matched with the displayed instantly scanned or taken facial picture of the specific incoming user/passenger for both electronic evaluation, and, also for the on-the-spot visual check by the assigned bonded security officer right at the check-point entry gate (if programmed that way). The comparative facial image ID pictures and biometrics and all other relevant data/information about the specific incoming passenger/user and the specific CCIRAF/AITD and the corresponding ticket(s) and current flight itinerary of the specific authorized registered passenger/user that have been extracted from the specific registered CCIRAF/AITD and from the relevant current updated information/data from the TSA database are instantly electronically matched by computerized means. If they all match together within acceptable safety and security range, then a Message of "OK FOR GATE ENTRY" is instantly displayed and heard at the adjacent flat screen monitor and speaker for the assigned bonded airport security officer on the spot to see and hear, so that the specific authorized registered passenger/user can be allowed safe entry into the respective restricted airport security gate(s) and lanes. All these activities are also recorded into the TSA database and the airport database, and, also instantly recorded in the specific CCIRAF/AITD being carried and used by the specific authorized registered passenger/user.

At step 1016, if the specific passenger/user's TSA ID pictures and/or iris biometrics match within tolerable range for airport and aircraft safety and security, then at step 1018 the specific authorized registered passenger/user passes comparative pictures IDs and computerized iris biometrics requirements. So, at step 1024 the authorized registered passenger/user proceeds to other further TSA security checks (if still needed) until final approval before being allowed for the designated specific aircraft boarding.

However, also at step 1024, if there is/are detected any or some instant real-time risky anomalies and/or real-time suspicious emergency report or updated data mismatch(s) regarding the current inputted information/data pertaining the specific authorized registered passenger/user, flight ticket(s) and destination itinerary, and most instant real-time updated current TSA and developing airport and aircraft security reports that pertain to and involve the specific authorized registered user/passenger, then instantly, the TSA and the airport security Main Disaster/Mishap Prevention Center and associated networks and affiliates are instantly alerted so that ready-measures of safety and security enforcements can commence to subject the authorized registered user/passenger with polite, but very strict investigations, and, when needed, possibly isolation procedures may be undertaken to prevent potential security risks and prevent mishaps, not only in the current airport, but to other destination airport(s) within the flight itinerary of the authorized registered passenger/user, and, also to prevent potential mishaps to the aircraft and succeeding aircraft(s) within the flight itinerary of the specific authorized registered passenger/user, and also to prevent mishap to the civilians within the airport and destination airports and civilians and crew-members of the aircraft and succeeding aircraft(s) within the flight itinerary of the specific authorized registered passenger/user, and for the protection of the general public. Enforcements of further investigations can be any/or all combination of stringent cross-matching of fingerprint, palm print, voice print, gait and signature and electronic or physical and psychological interrogation of any relevant suspicious associations or relations to known suspicious organizations or suspicious individuals.

Also, at step 1016, the TSA security device has software installed that can instantly compare and match the pictures IDs and/iris biometrics or other biometrics data/information of the specific passenger/user that has been currently taken at the airport, with the specific authorized registered passenger/user's picture stored previously at the TSA database and associated national and global databases. If there is a previously stored iris biometrics and other biometrics data of the specific authorized registered passenger/user at the TSA, then the current iris biometrics data and other biometrics data taken at the airport, are all instantly compared and matched by the TSA computerized analytical center database, and associated national and global databases for instant computerized cross-matching analysis in order to give up-to-the-second conclusive reports.

At step 1016, if the TSA ID pictures and/or iris biometrics do not match, then at step 1020, the specific authorized registered passengers/users IDs and/or iris biometrics are tagged, and he/she has to undergo more elaborate special security screening. If at step 1022, the specific authorized registered passenger/user passes the special security screening, then, at step 1024 the specific authorized registered passenger/user may still be required to proceed to further TSA security checks, until final approval before finally being allowed for the designated specific aircraft boarding.

However, if at step 1024, there is detected some other instant suspicious emergency report or risky anomalies and data mismatch, then the TSA and airport and aircraft will be more alerted to enforce a higher degree of broader stringent cross-matching of any/or all combination of fingerprint, palm print, voiceprint, gait and signature investigation, analysis and interrogation, etc. to stop potential security risks and prevent mishaps.

At step 1024, any risky anomalies and/or mismatch(s) regarding the current inputted information/data pertaining the authorized registered user/passenger, flight ticket(s) and destination itinerary, and updated current TSA and developing airport and aircraft security reports that pertains to and/or involves the specific authorized registered user/passenger, then instantly, the TSA and the airport security Main Disaster/Mishap Prevention Center and associated networks and affiliates are alerted so that ready-measures of enforcements to subject the authorized registered passenger/user with polite, but very strict investigations, and possibly isolated to prevent potential security risks and prevent mishaps, not only in the current airport, but also to other destination airport(s) within the flight itinerary of the authorized registered passenger/user, and, also to prevent potential mishaps to the specific aircraft and succeeding aircraft(s) within the flight itinerary of the specific authorized registered user/passenger, and, also to prevent mishap to civilians within the airport and destination airports, and civilian and crew-members of the aircraft and succeeding aircraft(s) within the flight itinerary of the specific authorized registered user/passenger, and for the protection of the general public.

If at step 1022, the authorized registered passenger/user did not pass the special security screening, then at step 1026, the incident is instantly reported to the TSA and airport and aircraft security. More and broader stringent investigation and interrogations are enforced on the part of the suspected specific authorized registered passenger/user, and so, more strict and broader cross-matching and investigation for whatever available fingerprints, palm prints, voice prints, gait, signatures, flight history, membership associations, etc. are conducted to stop potential security risks and prevent mishaps.

Also, any risky anomalies and/or mismatch(s) regarding the current inputted information/data pertaining the suspected specific registered passenger/user, flight ticket(s) and destination itinerary, and updated current TSA and developing airport and aircraft security reports that pertains to or involves the specific suspected authorized registered passenger/user, then instantly, the TSA and the airport security Main Disaster/Mishap Prevention Center and associated networks and affiliates are alerted so that ready-measures of enforcements to subject the suspected authorized registered user/passenger with polite, but very strict investigations, and, possibly isolated to prevent potential security risks and prevent mishaps, not only in the current specific airport, but also to other destination airport(s) within the flight itinerary of the suspected authorized registered passenger/user, and also to prevent potential mishaps to the specific aircraft and succeeding aircraft(s) within the flight itinerary of the suspected authorized registered passenger/user, and also to prevent mishap to civilians within the specific airport and destination airports, and civilians and crew-members of the aircraft and succeeding aircraft(s) within the flight itinerary of the suspected authorized registered passenger/user, and, for the protection of the general public. Step 1030 is the end.

Important Note:

Since hundreds of millions of teenagers and adults of all ages are so fond of using cell phones with internet capabilities, due to the devices' small-size, handy portability, mobility and convenience, the integration of the built-in NFC components and systems in these devices, can all the more greatly add usefulness in fast-track and fast-lane passenger entries and outgoings into and out of airports during flight travels.

In the case of the present invention or EucliBaba, inclusive of the CCIRAF/AITD or EucliStar eGeeenie or Universal eGeeenie or eGeeenie, the integrated built-in Near-Field (NFC) component and system in them, and the truly dedicated programs applications for multi-party interactive secured and safety instant-messaging, alerts, secured data/information transmission, storage and recall capabilities installed in them, are very important features that offer more customer-controlled anti-fraud and anti-identity theft with instant true-personal identity verification capabilities on the part of each one of the hundreds of millions of specific individual authorized registered customers/passengers/owners/users. Therefore, these present inventive devices or CCIRAF/AITDs or EucliStar eGeeenies or Universal eGeeenies or eGeeenies can enormously benefit them during their flight travels, especially in instantly verifying them as the truly identifiable real passengers during their commercial airplane travels and fast-lane instant verifiability of their true-personal identities, thus, the hundreds of millions of innocent passengers who use them, can avoid frustratingly long delays and unnecessary security scrutiny by bonded airport officials when entering restricted airport gates and lanes, and prior to boarding their correctly pre-assigned aircrafts, as well as during connecting flights and proper faster instant checking in and claiming of their respective correctly checked-in luggage at the security check-points and also just before they can bring their corresponding checked-in luggage out of the relevant airport during final flight destination arrivals. The proper implementation of the respective CCIRAF/AITDs or EucliStar eGeeenies or Universal eGeeenies or eGeeenies can also prevent fraudulent individuals or thieves from walking away with their checked-in luggage, unchecked and validated.

The present inventive device or CCIRAF/AITD or EucliStar eGeeenie or Universal eGeeenie or eGeeenie is also provided with GPS component and functionality, which can be programmed and used by the TSA for tracking down the location of each of the respective registered present inventive device or CCIRAF/AITD, and, when certain important questions are wanted by the TSA, it can instantly communicate with the specific registered inventive device and talk with the respective authorized registered customer/passenger/owner/user, thus, the TSA can possibly and immediately know and detect the locations of the real registered customer/passenger/owner/user when he/she answers with the specific registered CCIRAF/AITD or EucliStar eGeeenie or Universal eGeeenie or eGeeenie that are correctly registered to him/her.

Note:

For more clarity and expanded explanations of the important factors and/or requirements and/or capabilities in the effective and coherent implementation of the present invention, EucliBaba, inclusive of the present inventive devices or CCIAF/AITDs or EucliStar eGeeenies or Universal eGeeenies, for the airport and aircraft safety and securities, the following are enumerated and described.

Factor 1—Each customer/owner/user with relevant verifiable, correct true-personal identifications can/or must be registered to the main database of the relevant mobile phone/internet provider, to confirm that he/she is the true and legitimate authorized customer/owner/user of the specific identifiable dedicated CCRAF/AITD or EucliStar eGeeenie or Universal eGeeenie or eGeeenie, which he/she intends to use with the installed anti-fraud/anti-identity theft with true-personal identity verification applications program(s). A clear personal frontal face view (and other personal photo views, if required) based on acceptable digital photograph(s) of himself/herself who qualifies to be the legitimate specific registered authorized customer/owner/user of the specific identifiable dedicated CCIRAF/AITD or EucliStar eGeeenie or Universal eGeeenie or eGeeenie, can be taken by the built-in integrated digital camera of his/her own CCIRAF/AITD or EucliStar eGeeenie or Universal eGeeenie or eGeeenie. In case the programming is set for the iris biometrics to be included, the program can be set to automatically zoom in to get the instant enlarged image of the iris from the facial digital photo of the customer/owner/user. Then these images are transmitted by him/her (if he/she desires or is required, according to the specific relevant programmed application) to the relevant mobile phone/internet service provider that he/she is to officially use, through a safe and secured transmission means provided by the relevant mobile phone/internet provider. In this way, therefore, the properly registered customer/owner/user of the specific registered identifiable CCIRAF/AITD or EucliStar eGeeenie or Universal eGeeenie or eGeeenie, with his/her correct personal ID photo and iris biometrics, can be linked together in order to correctly and accurately establish his/her true-personal identity as the real true legitimate registered customer/owner/user of the specific registered CCIRAF/AITD or EucliStar eGeeenie or Universal eGeeenie or eGeeenie that he/she is to rightfully continue to use.

Factor 2—If he/she intends to use his/her specific registered CCIRAF/AITD EucliStar eGeeenie or Universal eGeeenie or eGeeenie for accelerating his/her airline(s) flight travels, with the aim of easing himself/herself from the burden of encountering much airport and flight travel delays, and for security and safety reasons, he/she must accurately, wirelessly submit an application to register himself/herself (with secured links and encrypted data/information transmissions) through his/her specific properly registered CCIRAF/AITD or EucliStar eGeeenie or Universal eGeeenie or eGeeenie, to the TSA (Transportation Security Administration, which is a division of Homeland Security).

Factor 3—The TSA will require him/her to send certain personal security information data requirements, such as accurate evidence of birth certificate, nationality, passport with corresponding number, driver's license with corresponding number, with his/her coded or non-coded verifiable true-personal identity digital photograph(s) with zoomed-in detailed iris image biometrics (if programmed that way), student ID with the corresponding number, organization membership with the corresponding number, social security card with the corresponding number, (including the required relevant dates, place(s) of issue, and time frames of effectiveness, (if applicable and needed), and, (if applicable, including certain other verifiable personal biometrics data), according to the relevant requirements of the TSA). These information can be transmitted by first photographing the various documents with the built-in digital camera of his/her specific registered CCIRAF/AITD or EucliStar eGeeenie or Universal eGeeenie or eGeeenie, and, storing them into the storage memory of his/her specific registered CCIRAF/AITD or EucliStar eGeeenie or Universal eGeeenie, and then sending each of the needed digital photographs of the required items (through secured encrypted transmission, using the secured mobile phone/internet features of his/her specific registered CCIRAF/AITD or EucliStar eGeeenie or Universal eGeeenie or eGeeenie) to the TSA. The secured relevant data transmissions, storage and retrieval should be guaranteed by both the relevant mobile phone/internet service provider and the TSA, so as not to endanger exposing his/her required transmitted relevant personal data/information to any undesired party or parties, and in order to preserve the security, safety and privacy of his/her true-personal identity and properties, and other TSA-related communications, storages and retrievals, as well as those non-TSA-related personal and business data/information communications, storages and retrievals that are, have been and will be done through his/her specific registered CCIRAF/AITD or EucliStar eGeeenie or Universal eGeeenie or eGeeenie, and through other relevant means. All secured data/information communications, storages and retrievals during his/her TSA registration process, as well as any other succeeding relevant TSA data/information communications, storages and retrievals pertaining to his/her relevant individual case, must be automatically programmed to maintain definite securely segregated, separated, and/or compartmentalized from any other of his/her non-TSA-related data/information communications, storages and retrievals activities done, currently being made, and will be done through his/her specific registered CCIRAF/AITD or EucliStar eGeeenie or Universal eGeeenie or eGeeenie, and other relevant means. In effect, any other unrelated non-TSA data/information transmissions, storages and retrievals that are stored and/or are used or have been used and will be used for whatever legitimate cases or activities pertaining to his/her e-banking, e-Commerce, e-Medical/Health Insurance, and others of his/her unrelated non-TSA personal and business data/information communications, storages and retrievals by and for him/her who is the specific registered authorized customer/owner/user of his/her specific registered CCIRAF/AITD or EucliStar eGeeenie or Universal eGeeenie or eGeeenie, are programmed to be operationally separated, segregated and compartmentalized from all TSA-related data/information communications, storages and retrievals, and maintained as confidentially fully tamperproof.

Factor 4—Based on the secured transmitted information submitted by him/her to the TSA, through his/her specific identifiable registered CCIRAF/AITD or EucliStar eGeeenie or Universal eGeeenie or eGeeenie, the TSA will match all of his/her pertinent submitted and transmitted data/information and required items with all updatable gathered intelligence reports and information/data and photographs and other items that the TSA have received, collected, classified and stored in its main database, including all of TSA's interconnecting affiliated networks with relevant national and global security databases.

Factor 5—If the TSA finds no anomaly or misrepresentation or other unlawful activities or illegal misconduct on his/her true personal identification, activities and associations, based on his/her submitted information and required items as sent by him/her through his/her identifiable specific registered CCIRAF/AITD or EucliStar eGeeenie or Universal eGeeenie or eGeeenie, and, based upon the updatable TSA database and its interlinked affiliated national and global networks and databases, then he/she is given an instant preliminary clearance to be able to purchase airline(s) flight tickets or tickets, according to some current approved safe regional flight zone(s) categories, within the progressive updatable current safe and secured geo-political or geo-health-wise situations. He/she, through his/her specific registered CCIRAF/AITD or EucliStar eGeeenie or Universal eGeeenie or eGeeenie, will also be informed, from time to time pertaining to the progressively current filtered messages for his/her security and safety assurance, delineating what safe airline(s) and aircraft flights to take, and delineating from those unsafe airlines and aircraft flights, within certain designated parts of the world, and he/she will also be advised instantly of the progressive updatable degrees of risky conditions that will be helpful for him/her during his/her flight(s) and touring travels. Additionally, in essence, his/her specific registered CCIRAF/AITD or EucliStar eGeeenie or Universal eGeeenie or eGeeenie, will immensely become his/her reliable safety and security means for any of his/her current and future flight plans and travels, and, also, can act as an indispensable aid, as potential substitute to his/her real passport or driver's license or social security card, and other relevant membership or true-personal identity means (in case of loss or misplacement of any of these pertinent items), because his/her authenticated specific registered CCIRAF/AITD or EucliStar eGeeenie or Universal eGeeenie or eGeeenie can produce and project from its built-in respective memory storage, the desired needed data/information and true-personal photo image data and/or authentic biometrics data required, to be instantly displayed on its LCD screen, including all relevant virtual IDs and all relevant true-identity items (according to the prompted display requirements); and, also any or all of these can be transmitted securely through his/her built-in integrated NFC component and system of his/her registered specific CCIRAF/AITD or EucliStar eGeeenie or Universal eGeeenie or eGeeenie, to be collaboratively transmitted to any or all required safe and secure checkpoints that are equipped with NFC-enabled devices, regarding him/her as representing as possible substitute of his/her actual physical relevant IDs, and other relevant required correct items, which he/she commands and prompts to be displayed through voice commands and/or scrolling and tapping means through the proper use of representative icons and prompts, according to the programmed applications in operation.

If the TSA has found any anomaly or misrepresentation of true-personal identity or potential flight risks due to questionable association with suspected illegitimate or illegal group(s) or criminal activities, the TSA will flag the particular person or persons under watchful eyes, and will share certain category risk factors to any inquiring airline(s) or legitimate organizations or agencies or ministries in the United States of America and other trusted partners in any part of the world.

Factor 6—So, after his/her TSA registration as the true-personal identified customer/owner/user of his/her specific registered CCIRAF/AITD or EucliStar eGeeenie or Universal eGeeenie or eGeeenie, any further use of it, by him/her that pertains to his/her true-personal identity concerning the TSA, then, the TSA can instantly verify his/her true-personal identity because of his/her registered file(s) with the secured database and affiliated networks maintained by the TSA. The TSA will be enabled to electronically match them with its secured database and relevant TSA-related networked national and/ global databases, any legitimate data/information inquiry input coming from any legitimate agency or ministry or organization about his/her registered identifiable true-personal identity, and, then, instantly report to his/her specific registered CCIRAFT/AITD or EucliStar eGeeenie or Universal eGeeenie or eGeeenie about any such inquiry about him/her.

Factor 7—When he/she tries to purchase a particular airline flight ticket or tickets that include the flight itineraries with airline(s) flight numbers, scheduled dates and times of flight departures, and all relevant aircraft(s), estimated arrival dates and times, including connecting flights (if applicable), he/she can be pre-checked by the airline(s) and/or travel agency (if applicable) through programmed computerized communications with the TSA, and, according to the security report of the TSA, it can be pre-determined instantly in the succeeding phases of pre-screening and screening, whether or not he/she will be a security risk in the restricted areas of the relevant airport or airports and relevant airline(s) and particular aircrafts that he/she will be boarding in as a passenger when he/she is allowed to purchase specific airline ticket or tickets. His/her verified true-personal identity can also be instantly authenticated and communicated as a message to both the inquiring relevant airline(s), airport(s) and/or travel agency, and instantly communicated also to his/her specific registered CCIRAF/AITD or EucliStar eGeeenie or Universal eGeeenie or eGeeenie, to let him/her know about whatever relevant status he/she is in, and, also for automatically recording into the digital storage memory of his/her specific registered CCIRAF/AITD or EucliStar eGeeenie or Universal eGeeenie or eGeeenie, for future secure data/information recall or retrieval and/or for other relevant evidentiary purposes.

Accordingly, this pre-screening means, system and method will immensely help as a succeeding basic phase of pre-screening procedures favorable for him/her as a potential airline passenger, thus helping in ascertaining more to the particular airline or airlines or airport that he/she, as the flight-ticket purchasing customer is the true-person authenticated passenger-to-be who can be allowed to buy the airline flight ticket or tickets, and, thereby greatly mitigating the risk factors to the airport(s) and airline(s) and aircraft(s) in which he/she, as passenger, will be passing through and boarding in. This will really allow an electronically effective basic phase pre-screening of millions of innocent TSA-registered passengers in avoiding time delays and unnecessary security scrutiny for achieving more coherent airport security and safety, thus further assuring him/her to qualify in this basic phase of pre-screening toward the progressive faster legitimate entries through airport security gates and lanes and relevant aircraft boarding.

Factor 8—Once he/she has been given clearance by the TSA as passing the above pre-screening procedures, because the TSA did not find any anomaly or misrepresentation or misconduct on his/her true-personal identity, then the inquiring airline(s) or travel agent(s), upon receiving such instant clearance report from the TSA, allows him/her to purchase for the relevant flight ticket or tickets, with the correct flight itineraries, from the point-of-origin to the final destination, whether one way or round trip, inclusive of all requested and available flight departure dates, times and routes and estimated arrival dates and times, airline(s), aircraft(s), as well as those for connecting flights, airline(s) and aircraft(s).

Factor 9—Upon reaching the relevant particular airline ticketing desk at the airport of origin, he/she can effectively check in for departure. He/she will be checked by the airline official to verify him/her for his/her true-personal identity as the real-person passenger for a specific scheduled flight with connecting flight or flights according to his/her destinations and routes of flight travels. If he/she is carrying along his/her specific registered CCIRAF/AITD/AITD or EucliStar eGeeenie or Universal eGeeenie or eGeeenie, then he/she can just wave the built-in integrated Near-Field Communication (NFC) component and system of his/her specific registered CCIRAF/AITD or eGeeenie or Universal eGeeenie (which contains the TSA-approved clearance verifying his/her true-personal identity, qualifying him/her as a non-risk potential passenger). His/her TSA-approved clearance data/information is then interactively communicated to the nearby compatible corresponding NFC-enabled device at the airline/airport desk for the airline official to check. The required relevant transmitted data/information and true-personal identity photo ID about him/her (including but not limited to his/her personal virtual passport, driver's license, official residence address, age, sex, birth date, birthplace, nationality, citizenship, inclusive of a clear identifiable correct and legitimate personal photograph of himself/herself) will be automatically matched with the airline(s) TSA-affiliated database, and a clearance message will be given instantly about his/her true-personal identity as a booked or can be booked passenger for his/her desired particular flight or flights, with point-of-origin departure dates and times, with connecting flights and routes and final destination, (either for one-way ticket(s) or round-trip tickets). If there is a flat-screen monitor in front of the particular relevant airline official, his/her personal true likeness photograph(s) will be flashed on the monitor's LCD or plasma screen for official visual checking by an authorized airport security checker, and with a clearance message alongside his/her personal ID photo verifying furthermore that he/she is the true-person passenger and holder or will be holder of the particular purchase or will be purchased ticket or tickets.

Factor 10—While at the ticketing area of the airline(s), the corresponding cleared passenger with the correct flight ticket or tickets can now check in his/her luggage(s), and, the relevant identifiable luggage claim tickets with corresponding numbers and bar codes are given to him/her, and, which are linked automatically with the corresponding passenger ticket(s), and, can be tagged into his/her registered CCIRAF/AITD or EucliStar eGeeenie or Universal eGeeenie or eGeeenie, by automatic entry into his/her registered CCIRAF/AITD or EucliStar eGeeenie or Universal eGeeenie or eGeeenie, through the use of the integrated built-in NFC-enabled component and system of his/her specific registered CCIRAF/AITD or EucliStar eGeeenie or Universal eGeeenie or eGeeenie (if the airline ticketing area is equipped with a corresponding NFC-enabled device). The luggage claim tickets can also be given to him/her, who, with the use of the built-in camera of his/her registered specific CCIRAF/AITD or EucliStar eGeeenie or Universal eGeeenie or eGeeenie, can photograph the luggage claim tickets, airline ticket(s), including the boarding passes, and enter them into his/her specific registered CCIRAF/AITD or EucliStar eGeeenie or Universal eGeeenie or eGeeenie, for storage and future image retrieval of the relevant checked in items (in case any or all of such items are misplaced).

Factor 11—His/her checked-in luggage are now ready for the upcoming X-ray, scanning or other inspections by other luggage-content checking machines or by human inspectors. All other carry-on bags and equipments, such as recorders, mobile phones, laptops, e-Tablets, cameras, videos, etc. are subject for inspections at the airport/airline entry gates.

Factor 12—At the airport/airline entry gates, ideally, if there is a TSA-installed camera there, the passenger's facial picture is instantly taken and his/her iris biometrics is also instantly taken and are matched with his/her previously sent personal facial photo and iris biometrics data maintained at the TSA database to determine instantly if there is no mismatch within certain allowable range of acceptability. If there is any detected mismatch outside of tolerable range of acceptability, then the passenger/user will be subjected to more stringent inspection and interrogation.

If at the entry gate(s) there is an airport/TSA-security NFC-enabled device, his/her specific registered CCIRAF/AITD can also be waved adjacent to the NFC-enabled device for true-passenger identity verification. If all relevant comparative true-personal identity requirements match and verified with the TSA database, then, will be flashed on the widescreen monitor installed nearby an "OK TRUE PASSENGER ENTRY" message can be seen and heard by the inspectors. The verifiable true-personal ID photo(s) and/or the cross-matched iris biometrics data between the instantly just taken iris biometrics data of him/her and the previously stored personal facial feature, including the previously submitted analyzed and stored iris biometrics data at the TSA database will also be confirmed as verified match. His/her specific registered CCIRAF/AITD will ring and display a message of "OK TRUE-PASSENGER ENTRY ALLOWED." His/her photo(s) at the entry gate's widescreen monitor can also be matched by the watchful eyes of the attending airport-bonded inspector(s) with his/her true-personal identity likeness of him/her as the true passenger, for more one-to-one stringent observations.

Factor 13—A similar process as in Factor 12 can be done also, right at the passenger boarding area of each flight before he/she can board the assigned aircraft while his/her aircraft boarding pass is being processed, before final entry into the specific assigned aircraft, to be sure that he/she is boarding the right assigned aircraft.

Factor 14—In case of connecting flights, he/she can again use his/her specific registered CCIRAF/AITD or EucliStar eGeeenie or Universal eGeeenie or eGeeenie, using its built-in integrated NFC component and system, where all the relevant data/information about his/her connecting flights and particular assigned connecting aircraft, are stored as tagged to him/her as the true-person identifiable passenger, which can again be checked by means of other corresponding NFC-enabled devices at specified spots in the relevant succeeding transfer-point airport(s). Similarly, his/her verifiable ID photo(s) and other relevant data/information and instant iris biometrics comparison (if applicable) about his/her true-personal identity, and connecting flight data/information can be checked again and detected instantly and flashed on the flat screen monitor at the correct gates and boarding areas to be checked by a bonded attending airport security official before his/her entry into the specified aircraft with corresponding connecting flight number and boarding pass as included in his/her itinerary and destination(s).

Factor 15—Upon arrival at his/her final destination, his/her specific registered CCIRAF/AITD or EucliStar eGeeenie or Universal eGeeenie or eGeeenie, with its built-in Near-Field Communication (NFC) component and system, can again correctly verify that he/she is claiming his/her correct luggage(s) as can be instantly electronically identified through the use of a corresponding NFC-enabled device, and for verification by airport security officer(s) that he/she is claiming the correct checked-in luggage before he/she can be allowed to bring them out of the airport of his/her final destination.

These present inventive process, system and method or EucliBaba, inclusive of millions of coordinated specific registered CCIRAF/AITDs or EucliStar eGeeenies or Universal eGeeenies or eGeeenie, can, therefore, help immensely in a more effective, thorough and faster pre-screening and screening of the millions of airline passengers while affording broader safety and security for the airports and aircrafts, and, at the same time providing peace of mind to millions of airline passengers, thus also avoiding inter-passenger racial and behavioral profiling, and helping greatly minimize passenger worries and anxieties about his/her safety and securities with boarding and boarded fellow passengers.

Important Notes:

All of the transaction steps will be recorded in the storage memory of each of the coordinated CCIRAF/AITDs or EucliStar eGeeenies or Universal eGeeenies or eGeeenies, for referential retrieval and anti-fraud and anti-identity theft with true personal identity verification protections, safety and security of hundreds of millions of innocent passengers on a local, national or international scope.

If the buyer of the ticket or tickets have accompanying passengers, who will be and are scheduled to fly with him/her, and, he/she is using only one common registered CCIRAF/AITD or EucliStar eGeeenie or Universal eGeeenie or eGeeenie, those other accompanying passengers should likewise be registered with the TSA (with all the pertinent required documents and verifiable true-personal identity photographs, and iris biometrics if applicable and required) and will also undergo pre-screening procedures as set by the stringent rules of the TSA, and the relevant required documents can be sent through secured transmission means using the properly registered specific CCIRAF/AITD or EucliStar eGeeenie or Universal eGeeenie or eGeeenie.

All of the submitted documents and verifiable true-personal identity photographs and iris biometrics and other biometrics data, (if required and applicable) of each of the accompanying persons to qualify as passengers will be matched for pre-screening by the TSA with all the updatable intelligence reports received, classified and stored at the main database of the TSA and its affiliated networks of national and global databases.

All approved pre-screening reports by the TSA will be shared (via secured transmission means) to any enquiring legitimate airline or airline(s) and/or travel agencies, or ministries, or government organizations or agencies that are checked to be in good and unblemished standing and reputations. The different airline(s), upon receiving pre-screening clearance from the TSA can also apply all relevant pre-screening and screening of the different passengers, as have already been previously mentioned.

If the one particular person or organization who is buying the airline ticket or tickets for specific potential passengers, and is not riding or flying with the specific potential passengers, such person or organization will also be subject to thorough pre-screening by the TSA, as well as those potential airline(s) passengers for whom the one particular person or organization is buying airline(s) ticket or tickets. The TSA will thoroughly check for any suspicious anomalies or ties or associations with each one of the potential passengers, based on the security and intelligence reports received, updated, classified and evaluated by the TSA through its national and global security databases, before allowing the potential airline(s) passengers for any airport presence and flights. The relevant airline(s), after communicating with the TSA, will also determine if the potential passengers can be allowed to purchase airline(s) ticket or tickets. And, when finally cleared to be allowed as passengers, the passengers will each be pre-screened and screened at each relevant airport or transfer-point airport connecting flights airport(s) gates and restricted areas before being allowed to board specific aircraft(s) as have already been described above. Similar procedures as afore-mentioned, can be used utilizing the dedicated specific registered CCIRAF/AITDs or EucliStar eGeeenies or Universal eGeeenies or eGeeenies, with built-in integrated NFC component and system that can communicate with the corresponding nearby NFC-enabled devices, and connected to and coordinated with the adjacent flat screen monitors for true-personal identity visual verifications by the airport security agents.

These present inventive system, method and devices, EucliBaba, inclusive of the present inventive devices or CCIRAF/AITDs or EucliStar eGeeenies or Universal eGeeenies or eGeeenies can be successfully implemented not only in the U.S.A., but also in other countries outside the United States for more effective, broader and coherent security and safety purposes on a national and global scope.

Because the CCIRAF/AITDs or EucliStar eGeeenies or Universal eGeeenies are also equipped with Bluetooth capabilities, other functional implementations of the inventive devices can be accomplished, according to the needs and applicability for anti-fraud and anti-identity theft with true-personal identity verifications programming applications.

In FIG. 27 there is shown the frontal face view of the seventh embodiment of the present inventive device, which is the mini-notebook type or style, but without a built-in integrated Near-Field communication (NFC) system and component.

In FIG. 27A there is shown the frontal face view of the eighth embodiment of the present inventive device, which is the mini-notebook type or style, but equipped with built-in integrated Near-Field communication (NFC) system and component.

In FIGS. 27B, 27C, 28A and 28B there are shown the different views of the seventh and eighth embodiments 112 and 112*a* of the present inventive device or EucliStar eGeeenie or Universal eGeeenie or eGeeenie, designed as a mini-notebook style or type of embodiment.

FIGS. 27 and 27A are the open frontal face views of the seventh and eighth embodiments 112 and 112*a*, respectively, showing the finger-swipe biometric scanner 56*a*, the hinged rod-and-socket structural linking connector combination 132 and 134, the flip top 118 (attached to the main housing structure of the seventh embodiment 112 and eighth embodiment 112*a* by means of hinged rod-and-socket structural linking connector combination 132 and 134; the flip top 118 which is swung open, exposes the main interactive LCD display 120, and the touch-screen keypad area 116). The swiping slot 58, speaker 78, the LED light signal display 72, the front camera 88*a*, the Near-Field Communication (NFC) system and component 110 (represented by the rectangular dotted line located at the upper portion of the eighth embodiment 112*a* in FIG. 27A), the temporary memory 1 provision 124*a*, and temporary memory 2 provision 124*b* are both represented by rectangular dotted lines, respectively, and are located at the 114*a* front portion of the seventh and eighth embodiments 112 and 112*a*.

At the lower portion of seventh and eighth embodiments 112 and 112*a* are shown the call reject button 130, the menu button 126 and the call accept button 128, shown in FIGS. 27, 27A and 28A.

In FIG. 27B, there is shown the bottom end view 114*b* of the seventh and eighth embodiments 112 and 112*a*, as seen from Arrow B of FIG. 27A. This view shows the flip top structure 118, in the hinged open position; in the bottom end view 114*b*, are shown the GPS button 82, the USB/charge means 74, the head set slot provision 76, the microphone 80 and the USB port provision 100.

Arrow A in FIG. 27A represents the viewing direction to reveal FIG. 27C, which shows the LCD display 120, the flip top 118 in the open hinged position, the swiping slot 58 for sliding a physical credit/debit card for reading the magnetic stripe data/information of a physical credit/debit card by means of a magnetic stripe card reader 60. The 114*c* left side view of seventh and eighth embodiments 112 and 112*a* is also shown.

In FIG. 28A, the open perspective view of seventh and eighth embodiments 112 and 112*a*, is illustrated, exposing the combination of the partial frontal face view 114*a*, the 114*c* partial left side view and the partial bottom end view 114*b*, and, revealing the following parts: 56*a* is the swipe-slot biometric scanner, the flip top 118 in the open hinged position showing the main interactive LCD display 120, a touch-screen LCD keypad 116, and the hinged rod-and-socket structural linking connector combination 132 and 134, the internally located swiping slot 58 within the upper portion of the seventh and eighth embodiments 112 and 112*a*; the internally located magnetic stripe card reader 60 (in dotted representation) located within the swiping slot 58, the speaker 78, the LED light signal indicator 72, the call reject or call hang-up or call end button 130, the menu button 126, the call accept or start talk button 128, the GPS button 82, the USB/charging provision 74, the head set provision 76, the microphone 80 and the USB provision 100. At the 114*a* left side of seventh and eighth embodiments 112 and 112*a*, there are shown 124*a* which represents the temporary memory provision 1 slot for accommodating a micro/SD memory card, and 124*b* which is the temporary memory provision 2 slot for accommodating another micro/SD memory card. 88*a* is the front camera is shown.

In FIG. 28B, which is a perspective view of the same seventh and eighth embodiments of the present inventive device, exposes mainly the back view and partial bottom view, which shows back camera 88, and the open position of the flip top portion 118, which shows the quick access interactive LCD display 122 of the seventh and eighth embodiments of the present inventive device or CCIRAF/AITD or EucliStar eGeeenie or Universal eGeeenie or eGeeenie. Solar panel represented by letter x is also shown. Labeled parts 74, 76, 80, 82 and 100 as already named are also shown.

FIG. 29 illustrates the orthographic view of a tablet-type Customer-Controlled Instant-Response Anti-Fraud/Anti-Identity-Theft Device or CCIRAF/AITD or EucliStar eGeeenie, with a front camera, but without a NFC system and component.

FIG. 29A illustrates the frontal orthographic view of a tablet-type Customer-Controlled Instant-Response Anti-Fraud/Anti-Identity-Theft Device or CCIRAF/AITD or EucliStar eGeeenie or eGeeenie, with a front camera and a built-in integrated Near-Field Communication (NFC) component and system.

FIG. 29B illustrates the left side view; FIG. 29C illustrates the back view; FIG. 29D illustrates the top view; and FIG.

29E illustrates the bottom view. FIGS. 29B-29E illustrate the other orthographic view of the tablet-type embodiments 900 and 900a.

FIGS. 30A and 30 B illustrate the perspective views of a tablet-type Customer-Controlled Instant-Response Anti-Fraud/Anti-Identity-Theft Device or CCIRAF/AITD or EucliStar eGeeenie or eGeeenie, with a front camera, with or without the NFC system and component as in FIGS. 29A and 29, respectively.

FIG. 31 illustrates the Electronic Block Diagram of the registered CCIRAF/AITD or EucliStar eGeeenie or Universal eGeeenie (Quad Band), equipped with built-in integrated Near-Field Communication (NFC) system and component.

The CCIRAF/AITD or EucliStar eGeeenie or Universal eGeeenie consists of a Central Processing Unit (CPU) 250, which includes the applications processor 254 and base band processor 252, that together perform the required operations. The base band processor 252 performs signal processing and processes communication functions, whereas the applications processor 254 is an LSI (Large Scale Integration) that manages applications operations in the present inventive device or CCIRAF/AITD. Application processor 254 controls the interactive LCD Display 280 (2D/3D), Touch/Key pad 284 and multimedia applications, and runs the software stack that interacts with the user, including various applications and sub-applications. Applications and sub-applications in the present invention, inclusive of the CCIRAF/AITD involve Anti-Fraud/Anti-Identity Theft with True-Personal Identity Verification, Near-Field Communication (NFC) system and components, speech pattern recognition, camera, alarm, accelerometer, Bluetooth, Wi-Fi network, GPS, S-video DAC/Mini DVI, Distance Sensor, Micro/mini SD slot, user authentication system like magnetic stripe reader, biometric scanner and PIN/password means, etc.

The RF transceiver 266 is connected to the antenna 262 through power amplifier 264, and to the base band signal processor 252. The RF transceiver 266 receives and transmits Radio Frequency (RF) signals from and through the antenna 262. The power amplifier 264 amplifies the signals received from the antenna 262 and outputs the signals through the RF transceiver 266. The base band processor 252 processes the signals received from the RF Transceiver 266. The present inventive device or CCIRAF/AITD also has three other transceivers for wireless data communications. They are the Bluetooth transceiver 344, Wi-Fi transceiver 352 and GPS transceiver 346. It is to be understood that the Bluetooth transceiver 344 receives and transmits data/information signals through an antenna (not shown in this simple block diagram).

Antenna 356 is connected to power amplifier 354 and connected to Wi-Fi transceiver 352 which is connected to the application processor 254 of CPU 250. The antenna 350 is connected to power amplifier 348 which is connected to GPS transceiver 346 which is connected to application processor 254. The RF sensor 260 communicates with the RF transceiver 266 which communicates with the base band processor 252 of CPU 250.

This CCIRAF/AITD or EucliStar eGeeenie or Universal eGeeenie is integrated with the Near-Field Communication (NFC) system and component. The hardware includes an NFC controller chip 270, NFC antenna 268, and typically some secure element containing the bank account information. This secure element may be the phone's Universal Integrated Circuit Card (UICC) or a separate SIM card 272. The NFC controller 270 and NFC antenna 268 perform all of the rudimentary functions required to communicate with a compatible NFC-equipped device. Analog signals from smart card chip are transmitted through the NEC antenna 268 through the NEC controller 270, and the analog signals received by the antenna 268 are transmitted to the smart card chip through the NEC controller 270. NFC controller 270 communicates with the mobile base band processor 252 and communicates with the outside terminal for transaction via non-contact NFC. The smart card 272 communicates with NFC controller 270. The antenna 268 is configured such that the NFC controller 270 transmits/receives the signals via non-contact NFC. Although the NFC Controller 270 can perform the required rudimentary communications functions, the controller requires a fair amount of intelligent control in the form of initialization, configuration, and supervision to find a tag, place it into an acceptable state, and exchange data with it. These functions are generally relegated to the base band processor 252.

SIM card 258 for mobile cell phone application is connected to the CPU 250. Memory module for storing the program information and transaction information consists of ROM and Random Access Memory (RAM). ROM 308 stores all the programs required for processing by the CPU 250. The application processor 254 is connected to the memory controller 310 which controls the memory requirements for the present inventive device or CCIRAF/AITD or EucliStar eGeeenie or Universal eGeeenie.

The present inventive device or CCIRAF/AITD or EucliStar eGeeenie or Universal eGeeenie or eGeeenie should have dedicated memory RAM-1 304, RAM-2 306, and so on for the anti-fraud application/anti-identity theft with true-personal identity verification applications, cellular/satellite applications, and the NFC applications. The NFC application technology is fully established and can be used for the present inventive device or CCIRAF/AITD or EucliStar eGeeenie or Universal eGeeenie or eGeeenie. However, the anti-fraud/anti-identity theft with true-personal identity verification applications should have a dedicated memory which requires the user's biometrics authentication, either for entering or editing the account data/information or other relevant data/information for secured encrypted transmission input and output and storage of all required relevant data/information.

The applications processor is connected with different I/O interface controllers to interact with the variety of interface protocols. The I/O controllers include 2D/3D LCD controller 274 to control the 2D/3D LCD display 280, Key pad/touch-screen controller 276 to have interface with touch/key pad 284, and, feature access control buttons 282, AudioNideo CODEC 278 to control or interface with the input or the output audio/video signals through speaker 288, microphone 290 and head set jack 286, and, the video signals with routed communication to 2D/3D LCD Display 280 through application processor 254 and 2D/3D LCD controller 274. The application processor 254 is connected to the LED Signal Light Display 368 for displaying various states and active operations of the CCIRAF/AITD or EucliStar eGeeenie or Universal eGeeenie or eGeeenie. A continuous signal from the LED Signal Light Display indicates that there is an active operation being processed. A blinking light of the LED Signal Light Display means that there is an active reception of signal by the present inventive device. In the absence of any light from the LED Signal Light Display, the present inventive device does not receive any signal or not in any active operation, or is deactivated.

The application interface 256 connects the applications processor 254 with different modules like alarm circuit 328, camera module 330, accelerometer 332, vibration motor module 334, Multi-USB port means (Mini and Micro) 336, S-video DAC/Mini DVI 338, Distance Sensor 340 and Micro/Mini SD/Slot 342.

The present inventive device or CCIRAF/AITD or EucliStar eGeeenie or Universal eGeeenie or eGeeenie has a biometric scanner in block 324 for scanning the selected finger for fingerprint biometrics data of the authorized customer or his or her assigned authorized user to be initially stored in the memory of the present inventive device, and also for scanning further the respective selected finger for fingerprint biometrics data of the same authorized customer or his or her assigned authorized user for matching authentication before properly accessing the anti-fraud and anti-identity theft with true-personal identity verification applications in the present inventive device or CCIRAF/AITD or EucliStar eGeeenie or Universal eGeeenie or eGeeenie. The present inventive device can also be accessed through the PIN/Password means in block 326. This would be achieved in the programming of the controller. The magnetic card stripe reader 322 of the CCIRAF/AITD reads the encrypted data/information on the credit/debit or any other relevant card's magnetic card track. The card reader includes its own controller that can read the encrypted data/information from a magnetic stripe, and sends the decoded data/information over the serial interface. A magnetic card is passed through a card reader and the encrypted data/information from the magnetic stripe of the magnetic card is read by the card reader. Certain portions or all of the encrypted data/information are transmitted over a communication line, serially through an RF transceiver 266 to a remote credit/debit verification location or the bank server in this case, etc. Communication link can take the form of a cellular communication and/or satellite system(s). The CPU 250 controls the input and output through serial communication channel.

The CCIRAF/AITD or EucliStar eGeeenie or Universal eGeeenie or eGeeenie is also provided with an integral GPS transceiver 346, power amplifier 348 and antenna 350. The GPS transceiver 346 receives the signal waves from the satellite through the antenna 350 and power amplifier 348. The signals received from the satellite are processed through a signal processing means in the applications processor 254. The signal processing means could either be a frequency calculator, orbit information calculator, or the like. The signal processor sends the processed signals to the CPU 250. The CPU 250 then calculates the longitude and latitude of any particular place and saves the location and time of the respective place along with the transaction information.

The main objective of the voice/speech recognition functions and capabilities of the anti-fraud and anti-identity theft with true-personal identity verification applications of the CCIRAF/AITD or EucliStar eGeeenie or Universal eGeeenie or eGeeenie is to understand the input speech of the respective authorized customer or authorized user, and to respond to the respective input speech of the respective customer or his/her authorized user, and make the changes in the system settings as per the respective customer's or his/her authorized user's requirements. The input speech from the respective customer or his/her authorized user is fed to the system in the form of a keyword or keywords or phrases rather than whole sentences for simplified commands, instead of activating a complex series of physical buttons or touch-screen keypads. The system with voice recognition capabilities consists of a microphone 290, feature extraction unit 292 and speech controller 294. The microphone 290 accepts the respective customer's or his/her authorized user's speech utterances, amplifies the signals and converts them into analog electrical signals. The feature extraction unit 292 converts the electrical analog signals into digital information, and extracts the features which characterize the input utterances in order to facilitate speech recognition. The speech controller 294 recognizes the spoken utterances based on the features extracted by feature extraction unit 292. This pattern recognition system should be trained and tested for each different respective customer's or his/her authorized user's utterances. The utterances may come in response to a prompt or prompts conveyed to the respective customer or his/her authorized user through the interface system via loud speaker 288 and 2D/3D LCD display 280.

The CCIRAF/AITD or EucliStar eGeeenie or Universal eGeeenie or eGeeenie has a provision to connect to the database of different languages that supports the language translation application. As the language translation application is activated, the device prompts the user to select the language to be translated into the language to be outputted as a translation of contents and requests the user to enter the input utterances of the speech through microphone 290. The input speech though microphone 290 is processed through voice record processor 300 and will be recorded in the voice recorder 302. The recorded voice is then inputted to the language translation processor 298 to convert the speech into the desired output language. The language translation processor 298 is connected to the language translation file database 296 which provides the necessary information for the language translation. The translation processor 298 gets the data from the translation file database 296 and translates the input speech into the desired language output speech. The translated language is outputted through either the speaker 288 or the head set 286.

The Translation File Database 296 provides the various languages, such as English, French, Spanish, Italian, German, Russian, Chinese, Japanese, etc. to the Language Translation Processor 298. If the requirement needs the language translation to be converted from English to French and vice versa, the customer/user simply must prompt the present inventive device or CCIRAF/AITD to select English to French and vice versa, so that the selected language translation can be made between the two selected languages through the Language Translation Processor 298 as supplied from the Translation File Database 296.

If the vocal recorded utterances into the voice recorder 302 are in English, the equivalent output translation will be outputted in translated French and heard in French at speaker 288 or through head set 286. If the input vocal utterances fed into the voice recorder 302 is in French, the Language Translation Processor 298 will output the English translation equivalent, and will be heard in English at speaker 288 or through head set 286.

There is another way of inputting and outputting the language translation. As the language translation application is activated, the present inventive device or CCIRAF/AITD prompts the user to select the desired input language to be for translated and the desired language to be outputted and requests the user to enter the input text through touch/keypad 284. The input text is sent to the language translation processor 298 through keypad/touch screen controller 276 and application processor 254. The translation processor 298 gets the data from the translation file database 296 and translates the input text of one language into the desired text output language. The translated language text is then outputted to the interactive 2D/3D LCD display 280 through the 2D/3D LCD controller 274.

The Translation File Database 296 provides the various languages, such as English, French, Spanish, Italian, German, Russian, Chinese, Japanese, etc. to the Language Translation Processor 298. If the requirement needs the language translation text to be converted from English to French and vice versa, the customer/user simply must prompt the device to select English to French and vice versa, so that the selected text language translation can be made between the two selected languages as supplied from the Translation File Database 296.

The power supply system consists of power supply switching circuit 318, battery 316, and voltage conversion circuit 314. The battery is a LI-ion or equivalent or higher capability rechargeable battery or batteries, and a battery charger/adapter 320 for battery charging. Optionally, (although not shown in the electronics block diagram) additional rechargeable batteries can be installed and linked with the CCIRAF/AITD to automatically take over to effect a seamless continuous operation required by the CCIRAF/AITD, in case the being-used rechargeable battery is critically running low in power, and thus the additional rechargeable batteries can support the proper operations of the CCIRAF/AITD. A battery charger can be connected to the CCIRAF/AITD to recharge the rechargeable battery that is getting low in electrical power, or the CCIRAF/AITD can be connected to a compatible working AC outlet with provisions to properly manage the correct recharging requirements of the particular rechargeable battery in the CCIRAF/AITD to be recharged.

Diversity in functionality of numerous components in the CCIRAF/AITD requires different power rail voltages, with each rail having growing power demands and application-specific requirements. Multi-channel power management ICs 312 integrates the various components, including the anti-fraud/anti-identity theft device with true-personal identity verification application to meet the voltage requirements, so as to maximize battery life. Various components includes Base band processor 252, and application processor 254, key pad/touch screen controller 276, 2D/3D LCD controller 274, Vibrator motor module 334, audio/video codec 278, memory controller 310, application interface 256, and etc.

In FIG. 31A, the electronic block diagram of the CCIRAF/AITD is without a built-in integrated Near-Field Communication (NFC) system and component. Excepting the NFC Antenna 268, NFC controller 270 and UICC/SIM 272 which are shown in FIG. 31, all the other relevant components and parts and electronic connections and functionalities are the same as shown in FIG. 31.

In FIG. 32, all of the electronic connections and components and functions are the same as in FIG. 31, as already described, except that there are the addition of solar panel 362 and solar charger 360, and also, the addition of thermo sensor 366 and thermo charger 364 for accentuating and effectuating for a much more longer functioning time of effective operating usage of the CCIRAF/AITD or eGeeenie or Universal eGeeenie or eGeeenie. In this FIG. 32 electronic block diagram, a built-in integrated Near-Field Communication (NFC) system and component are also included. With the integration of the solar panel in this embodiment, when light passes through the solar cells, the light is converted into electrical power, and stored in special titanium lithium-ion battery. With this type of battery, there results no degradation of the battery by repeated charge and discharge cycles. Once the cell phone charge is gone, and there is no other way or method or process of charging available, the cell phone can just be exposed to light again for about one or two hours of exposure time, and the cell phone becomes activated again, and can restart operationally active again. In this embodiment, this also becomes a thermo cell phone which additionally makes power through the difference in temperatures between ambient air and the body of the cell phone. Thus, by integrating the thermo sensor, the difference in temperature between the ambient air and the body of the cell phone, through or via the Seebeck effect, would create power and would charge the battery.

In FIG. 32A, all of the electronic connections and components and functions are the same as in FIG. 32, excepting that there is no built-in integrated Near-Field Communication (NFC) component and system, but, as already described there are included the solar panel 362 and solar charger 360, and, also there are the thermo sensor 366 and thermo charger 364 included, for accentuating and effectuating for a much more longer functioning time of effective operating usage of the CCIRAF/AITD or eGeeenie or Universal eGeeenie or eGeeenie. All the other relevant components and parts and electronic connections are the same as in FIG. 31.

FIG. 33 represents an electronic block diagram showing the inter-linkages of major components for the proper functioning of the Customer Controlled Instant-Response Anti-Fraud/Anti-Identity-Theft Device or CCIRAF/AITD (with true-personal identity verification) or EucliStar eGeeenie or Universal eGeeenie or eGeeenie, with a possible future inter-linkage with a "Self-Generating Power Module" indicated by a broken-line rectangle labeled with numeral 358 (which is not included in this present patent application, but separately described and illustrated in another one or more patent applications and specifications, as invented by the present inventor). All the other relevant components and parts and electronic connections are the same as in FIG. 31, and, also equipped with a built-in integrated Near-Field Communication (NFC) component and system.

However, this self-generating power module 358 is just being mentioned and partly briefly shown here to forecast that there is a future electrical source being developed by the present inventor to help the CCIRAF/AITD or EucliStar eGeeenie or Universal eGeeenie or eGeeenie towards achieving, accentuating and effectuating for a much more longer functioning time of effective operating usage of the CCIRAF/AITD or eGeeenie or Universal eGeeenie or eGeeenie, and for applications to other hand-held mobile wireless devices. In this FIG. 33 electronic block diagram, a built-in integrated Near-Field Communication (NFC) system and component are included.

In FIG. 33A, all of the electronic connections and components and functions are the same as in FIG. 33, as already described, with the additional "Self-generating power module 358" (represented by a dotted or broken lined rectangle). This module is not part of this patent application, but included in a separate patent application and specification, as invented by the present inventor. However, this module is just being shown here to show that there is a future help to the CCIRAF/AITD or EucliStar eGeeenie or Universal eGeeenie or eGeeenie, being developed by the present inventor for separate patenting in order to better accentuate and effectuate for a much longer functioning time of effective operational usage of the CCIRAF/AITD or EucliStar eGeeenie or Universal eGeeenie or eGeeenie, and applicable for other hand-held wireless mobile devices. However, in this FIG. 33A, there is no built-in integrated Near-Field Communication (NFC) system and component, but all the other relevant components and parts and electronic connections are the same as in FIG. 31.

FIG. 34 illustrates a general view representation of the potential inter-linkages or networks and databases and systems to achieve superior detection, monitoring and control of secured data/information transmissions and memory-storage and retrieval between the respective hundreds of millions of future authorized correctly registered customers/users of the CCIRAF/AITDs or EucliStar eGeeenies or Universal eGeeenies or eGeeenies, inter-connected with a "Tamper-proof Anti-Virus and Anti-Shock National and Global Security Filters" and, using the present invention—EucliBaba, inclusive of the present inventive devices or CCIRAF/AITDs or EucliStar eGeeenies or Universal eGeeenies or eGeeenies. It is one possible way of interlinking the hundreds of millions of authorized correctly registered CCITAF/AITDs or EucliStar eGeeenies or Universal eGeeenies or eGeeenies with national and global databases for effective centralized national and international anti-fraud/anti-identity theft with true-personal identity verification detection, monitoring, and top security control and management.

The future major objective of the present invention, inclusive of numerous millions of CCIRAF/AITDs or EucliStar eGeeenies or Universal eGeeenies or eGeeenies is to centralize the database for anti-fraud/anti-identity theft with true-personal identity verification control, monitoring, management and maintenance. If it happens so, then hundreds of millions of CCIRAF/AITDs or EucliStar eGeeenies or Universal eGeeenies or eGeeenies will be directly connected to the national and global databases. Since the present inventive devices are intended to detect, prevent, monitor, control and immensely minimize or stop the occurrences of countless frauds and identity thefts, and also medical/health insurance fraud, and for achieving more coordinated, coherent and effective airport/airline/aircraft security, their great necessity of connecting and securely inter-linking hundreds of millions of the CCIRAF/AITDs or EucliStar eGeeenies or Universal eGeeenies or eGeeenies to the closely guarded important banking and commercial databases, including all other relevant government and private security and safety databases and networking that will greatly aid these highly essential mobile devices to accomplish the required excellent objectives.

In FIG. 34 also shows how different databases are connected to the organized millions of CCIRAF/AITDs represented by numeral 850, are connected to the anti-fraud/anti-identity theft with true-personal identity verification detection, control and reporting coordinator 854, which is further connected to various national databases. Each national database may include, but not only limited to, social security administration database 858, bank accounts database 860, Identification card issuing agency database 862, credit bureau database 864, insurance database 866, educational/research/innovation or invention database 868, Bio-Medical/Pharmacy/Engineering, etc database 870 (including medical units, hospitals, doctors offices, ambulances, diagnostic clinics, laboratories and research databases), and other relevant financial, commercial and military/law enforcement databases 872 that share related secured data/information with the millions of CCIRAF/AITDs with security filters 852, 856, 874, and Global Security Filter 878, which are provided to filter the virus attacks and/or other unwanted or criminal identity-fraud/identity theft data/information accesses.

The national database 874 is again connected to Global anti-fraud/anti-identity theft with true-personal identity verification database 876, so that different countries can have the authorized controlled and monitored accesses to the centralized information databases for a much greater and broader coherent worldwide people power drive against the vast private and public losses and wastes, and victims and casualties due to frauds and identity thefts, as well those of military and law enforcement confusion that overwhelmingly victimize numerous millions of legitimate customers and users, banks, and myriads of government agencies, merchants and vendors and threatening the economies and safety and security of countries around the world.

The Global Anti-Fraud/Anti-Identity Theft with true-personal identity verification Database is connected to the various databases of various countries 880, 882, 884, 886 and 888.

The present invention, inclusive of the extensive future uses of hundreds of millions of CCIRAF/AITDs or EucliStar eGeeenies or Universal eGeeenies or eGeeenies by the general public and special sectors and security operations throughout the civilized world, can immensely help thwart, prevent and curtail the incidences of frauds and identity thefts and illegal privacy intrusion crimes to be committed against them. This can be accomplished when the hundreds of millions of CCIRAF/AITDs or EucliStar eGeeenies or Universal eGeeenies or eGeeenies are properly and respectively linked to some super global warning and control systems, associated with intricate technological secured wireless, wired and optical linkages, through cellular and satellite inter-connectivity with certain super-fast and broad-based search and detection engines, like a possible specialized future use of the present inventor's envisioned "EucliStar Global Anti-Fraud/Anti-Identity Theft with True-Personal Identity Verification Detection and Control Search Engine," (which is just mentioned here, but is the subject of another series of patent specifications and patent applications, and, which are being planned and proposed by the present inventor of the present invention, inclusive of the present device(s) or CCIRAF/AITD(s) or EucliStar eGeeenie(s) or Universal eGeeenie(s) or eGeeenie(s).

In FIG. 35, it is illustrated that the wireless inter-linkage of the CCIRAF/AITD or EucliStar eGeeenie or Universal eGeeenie or eGeeenie is linked with an anti-loss forgetless alarm reminder wrist watch or GreeetWatz (not included in this present patent specification, but belongs to another separate patent application(s)) and this link will prevent the millions of authorized correctly registered customers/users of the CCIRAF/AITDs or EucliStar eGeeenies or Universal eGeeenies from being ever forgotten because there will be an alert/message that will automatically be triggered to ring and be announced as soon as the respectively owned and correctly registered CCIRAF/AITDs or EucliStar eGeeenies or Universal eGeeenies will be separated away from the pre-programmed range of proximity distance away from the forgetless alarm reminder wrist watch of GreeetWatz, because of the set pre-programmed range of proximity distance pre-programmed in the respective CPUs of both the corresponding anti-loss forgetless alarm reminder wrist watch or GreeetWatz paired with the corresponding correctly registered CCIRAF/AITD or EucliStar eGeeenie or Universal eGeeenie, so that when the distance sensor detects a break away from the optimal range of proximity distance, an alarm or alert/message, such as for example, "Forgetting Cell phone" or "Forgetting Your Universal eGeeenie," will be emitted from the speaker systems of both the forgetless GreeetWatz and the corresponding registered CCIRAF/AITD or EucliStar Universal eGeeenie, in order to remind the respective owners of the corresponding CCIRAF/AITDs or EucliStar eGeeenies or Universal eGeeenies not to forget their respective devices. The alarm or alert/message can be through synthesized voice or through a uniquely sounding alert or alarm audio signals. It is important to note, though, that the mentioned anti-loss forgetless reminder watch or GreeetWatz is not covered by the present patent application and specification, but, only mentioned here for the purpose of illustrating the interactivity between the two items.

(D) More Explanations and Descriptions and (in Some Cases with Sample Scenarios) of Relevant Features, Functions and Capabilities as Well as Other Specific Features and capabilities of the CCIRAF/AITD or EucliStar eGeeenie or Universal eGeeenie or eGeeenie:

These are further explained or discussed in various sectors of the patent specifications, and that which can overcome the current problems of illegal abuses victimizing the authorized customers or authorized users who utilize their respective correct registered personal or business credit cards or debit cards and check (cheques) or other true-personal identity cards or membership cards (physical or virtual) and for other specific relevant legal and rightful and correct transactions, communications and other operational activities.

Note:

According to the programming of the Menu and icon representations, some of the following may be included under major sub-applications or sub-sub applications under the activated Anti-Fraud and Anti-Identity Theft with True-Personal Identity Verification Applications, and yet, the respective correct authorized customer or authorized user will be guided and prompted sequentially during the interactive process with the audio or visual or audio-visual interactive LCD displays and speaker system of the respective correct registered CCIRAF/AITD or EucliStar eGeeenie or Universal eGeeenie or eGeeenie.

Adding Bank Card's Image on the Storage Memory of Each Registered CCIRAF/AITD

Now-a-days, hundreds of millions of people are using physical credit cards or physical debit cards from different banks and lending companies, and, various banks issue different physical bank cards that are linked together, such as for primary checking, primary savings, secondary checking, secondary savings, as well as many other credit cards, etc. In numerous cases, the different physical credit cards and physical debit cards issued for the different linked accounts may look very similar to each other, yet not exactly alike. The above-mentioned, oftentimes lead the respective authorized customers or authorized users to be greatly confused during usage of such physical credit/debit cards. By adding the corresponding image to be stored in the memory of each respective correct CCIRAF/AITD or EucliStar eGeeenie, every time a particular chosen physical credit card or physical debit card is swiped through the credit/debit card swiping slot 58, and read by the magnetic stripe reader 60 of the correct CCIRAF/AITD, the corresponding correct stored information data and the corresponding correct image of the linked bank card is displayed on the interactive LCD display of the correct registered CCIRAF/AITD. So, the authorized customer/user can compare and double check the images and relevant information data between the physical credit/debit card and the projected image and information data extracted from the memory of the correct CCIRAF/AITD or EucliStar eGeeenie, and by following the required prompts, he/she can proceed further with any transaction with more clarity and peace of mind. Anyway, any transaction with the correct virtual image and information relevant to each transaction will be stored in the correct CCIRAF/AITD or EucliStar eGeeenie or Universal eGeeenie.

One more important function and capability of the present CCIRAF/AITD is to avail a pre-set program sub-application to enable the CCIRAF/AITD to assign and pre-record in its memory the correct exact picture or image of each of the respective credit card or debit card pertaining to the respective bank accounts. The image of the correct credit card or debit card has to be electronically sent to the respective registered correct CCIRAF/AITD by the respective bank or lending company, and automatically stored in the memory of the inventive device. As soon as the authorized customers or authorized users swipe any of the respectively selected physical credit card or debit card that is inter-linked to the respective bank accounts, the respective magnetic stripe information of the just-swiped physical credit card or debit card activates a comparative image check with the previously pre-loaded information and image already pre-stored in the respective registered CCIRAF/AITD or EucliStar eGeeenie or Universal eGeeenie, owned by the respective authorized customer or authorized user, and, the respective credit card's or debit card's picture or image and the details of each of the respectively just-swiped physical credit card or debit card, such as the type of the card, bank name and card number, etc. will be displayed in the respective registered CCIRAF/AITD's interactive LCD display, with the pre-stored picture or image and data/information previously stored in the memory of the respective CCIRAF/AITD. The respective picture or image of the respective credit card or debit card shown on the LCD display of the respective CCIRAF/AITD will enable the authorized customer or authorized user to cross-match and check the particular just swiped physical credit card or debit card before proceeding with any desired transaction.

There can also be certain default settings that can be programmed in the CCIRAF/AITD to automatically set off an alarm, either audio or visual, or audio-visual to automatically alert or alarm the respective authorized customer/user in cases where there is/are mismatch(es) between the image of the swiped physical credit card or debit card and the recalled picture or image of the relevant credit card or debit card and other relevant other card and information, so that misuse of the wrong credit card or debit card or other relevant other card can be avoided or prevented before any desired correct transaction will be made. The projected image of the credit card or debit card or other relevant other card displayed on the interactive LCD display of the CCIRAF/AITD along with the card information of the authorized customer's or authorized user's name, account number and description of the card and other relevant other card and needed information should exactly match.

Alarm Set Provision for the CCIRAF/AITD or EucliStar eGeeenie

As in capability 204 of FIG. 12, the respective registered CCIRAF/AITD or EucliStar eGeeenie has alarm set provision to alert the authorized customer/user for any and/or all pre-programmed regular bill payments. The respective registered CCIRAF/AITD or EucliStar eGeeenie can be pre-set to remind or alarm the authorized customer/user the exact due date of the pre-set automatic bill payment, one or more days before the actual automatic bill payment (with set timed intervals of alarms), so that the respective authorized customer/user can have the knowledge or be reminded of the succeeding scheduled bill payments. Moreover, as another feature of the device, it will also help the authorized customers/users to automatically receive a display of the actual amount of the succeeding automatic bill payment to make sure that there will be sufficient funds in the respective bank accounts assigned for the succeeding bill payment(s) in order to prevent overdraft charges.

The authorized customer/user has to set the details of the payments, the ring tone, times, frequency of the alert/alarm for the each bill payment that is intended to be paid by the respective authorized customer/user on a regular basis, and, the respective bank account from which the money will be deducted. The alert/alarm can be set to ring and be activated on the audio-visual LCD display and speaker system of the CCIRAF/AITD at one or more days before each pre-set bill payment becomes due. In this way, in case of possible insufficiency of funds on a particular account from which the automatic bill payment(s) will be taken or deducted, the authorized customer/user can either go to the bank and deposit enough money to any of the respective account from which the scheduled payment will be deducted, or else he/she can just use the respective registered CCIRAF/AITD or EucliStar eGeeenie or Universal eGeeenie to wirelessly transfer certain substantial amounts of funds from any other of his/her credit/debit card that has sufficient amounts of money to be credited to the respective credit/debit card with the respective account that has insufficient funds or will become insufficient at the time and date of the scheduled automatic bill payment in order to sufficiently cover the particular scheduled bill payments.

As soon as the money gets debited from the respective authorized customer's/user's account for any of the scheduled bill payment, the respective registered CCIRAF/AITD will receive the instant relevant alert/alarm and report of the consummated transaction from the respective bank, and, such consummated bill payment transaction can be automatically recorded in the authorized customer's user's registered CCIRAF/AITD's memory for future reference. This is considered to be one of the strong programmed features of the present invention, EucliBaba, inclusive of the present inventive device, CCIRAF/AITD or EucliStar eGeeenie or Universal eGeeenie for enabling better and more efficient execution, tracking and monitoring of debit and credit monetary management and bill payments.

Mentioned in capability 202 of FIG. 12, as part of the money management programming, the authorized customer/user of the respective registered CCIRAF/AITD can input the amount of cash he/she has available at certain time-frames, and every time he/she uses cash, within the set time-frame, the amount of cash used will instantly be deducted from the total cash he/she has originally inputted, and every time he/she adds more cash, such amount is instantly added to the available cash he/she has, so that progressive electronic monitoring of updatable available cash, expenses and additions can be monitored and stored in his/her respective registered CCIRAF/AITD.

One Swipe Allowed Per Transaction as a Set Default

The respective registered CCIRAF/AITD has a sub-application program that detects and restricts any/or all merchants for multiple swipes for a single authorized customer's or authorized user's approved or pre-approved transaction. Even if any merchant swipes the authorized customer's or authorized user's credit card or debit card multiple times for a single transaction, only one specific transaction will be processed because of a programmed default setting of "one swipe only per specific transaction" in the programming of the CCIRAF/AITD. The absence of the authorized customer's or authorized user's part for the pre-authorization or authorization for any other succeeding swipes not only for the particular transaction, but in other unauthorized future transactions in the bank's or credit card's company's buffer memory, prevents future fraudulent use of the authorized customer's/user's credit/debit card without his/her knowledge and consent. In this way, the banks and lending companies can enormously reduce the expenditures on the enquiries for any fraudulent activities that are not authorized or pre-authorized by the authorized customers and/or authorized users.

Example of Some Problem Scenarios that are Currently Encountered in Restaurants and Bars and Online and Telephonic Purchases and Achievable Advantage and Solution Offered by the Present Invention and Present Inventive Device In numerous restaurants and bars, wherein a customer chooses to pay the presented bill by means of a credit card or debit card, he/she checks the bill and usually adds the tip or gratuity amount to the bill (if not yet included in the bill) and just openly hands to the waiter or waitress the chosen credit card or debit card for payment. Afterwards, the customer is given a receipt of the total amount, signs his/her signature and his/her credit card or debit card is returned. The customer then leaves, believing that he/she was charged correctly, because the receipt shows the exact amount of what the total bill stated. However, there are some potential dangers lurking behind this method of payment, because he/does not really know for sure how many times his/her credit card or debit card has been swiped, and, for what other amounts. His or her signature also exposes some possibilities of being copied for forgery purposes.

It is also possible that there may be other hidden credit card or debit card readers or skimmers used to copy the vital information from the magnetic stripe of the customer's credit card or debit card; the vital information, when copied by dishonest persons, may later on be used for fraudulent sale of important personal identity and asset data, or for cloning the customer's credit card or debit card for future fraudulent use or sale to others, in order to commit illegal charging activities, elsewhere. The unknowing innocent customer may then become another victim of more frauds and identity thefts among millions of other legitimate credit card and debit card owners around the world.

Weeks or months may pass, until the customer is notified by the respective bank or lending company about the fraudulent charges made. If the victimized customer has insufficient funds in the particular account, in case of a debit card, or, if his/her credit card crosses over the line of allowed credit limit, then, stiff penalty fees can automatically be imposed against the customer's credit card or debit card account.

After a complaint from the authorized customer, the respective bank or lending company may send some physical printed form for the customer to fill in and sign to dispute the alleged fraud. Inconveniently, fraud investigations take more time. Meanwhile, the customer is left worrying; possibly losing money in case of some unfavorable decisions against him or her that may result, which is really beyond his/her control. This kind of fraud may happen several times at different locations with various fraudulent transactions, thus putting more burden to the customer, as well as extending more efforts and expenses for the investigating legitimate banks or lending companies.

The present invention, inclusive of the CCIRAF/AITD or EucliStar eGeeenie or Universal eGeeenie prevents these problems from happening by instantly alerting or alarming the customer to reject any and/or all suspected actual fraudulent uses of his/her credit/debit card, by a default setting of limiting charging to only one swipe per authorized transaction, and, thereby, these potential fraudulent activities are averted immediately, before damage can be done.

Another Example Scenario

As in capability 190 of FIG. 12, the authorized customers/users are protected in cases when numerous merchants or vendors advertising products on televisions, newspapers and magazines take advantage of numerous customers by continuing to send additional products to customers even though the respective customers merely ordered a specific product or products for only once. These tricky merchants continue to charge the credit cards or debit cards of the respective unmindful customers, who, oftentimes become so irritated by having to call back these particular merchants or vendors to stop sending additional products and stop charging their specific credit card or debit card. To stop those fraudulent additional charges, or, in order to reverse the fraudulent charges, the respective customer is inconveniently obliged to return the product or products by mail. Many times, if they are busy or fed up of the situation, they simply do not bother to mail back the product(s), and thereby get stuck with those fraudulent charges.

The present invention and present inventive device prevent these inconveniences and irritations to be experienced by any and/all of the individual authorized customers or authorized users who own(s) the properly registered CCIRAF/AITD or EucliStar eGeeenie, by setting an "automatic reject default" on his/her respective registered CCIRAF/AITD or eGeeenie to reject any merchant or vendor from charging again his/her particular credit/debit card he/she has used before, without his/her pre-authorization of any other additional charges.

Anti-Bounce Protection of any Written Cheques (Checks)

As in 194 of FIG. 12, for both personal and business cheques (checks), the anti-fraud protection of the authorized customer's cheques (checks) is one more major functional capability of the present inventive device, CCIRAF/AITD. The best way to protect the cheques (checks) is to pre-authorize the required amount of money for any cheque (check) transaction. The responsibility of the authorized customer or his/her authorized user is to enter the details of each cheque (check), like routing number, cheque (check) number, the amount for the cheque (check), to whom it is issued, the date for cashing the cheque (check), and the purpose of the transaction—all of these information can be sent along with the image of the cheque as a secured digital data representing the particular cheque (check) after having been photographed by the digital camera of the CCIRAF/AITD, and, sent via wireless secured transmission to the respectively linked database of the specific bank or lending institution by the respectively linked CCIRAF/AITD. The digital image and all relevant data of the particular cheque (check) is stored in the respective bank's database, as well as in the CCIRAF/AITD, and, the inventive device must ensure that there will be enough amounts of funds available in the respective account for the specific cheque (check) transaction at the time of scheduled cashing or depositing of the specific cheque(s) or checks. In this way, the authorized customer/user can avoid any cheque (check) bounce problems.

As soon as any of the specific cheque(s) or check(s) is processed, it will be reported instantly to the respective registered CCIRAF/AITD. In any case, if the customer did not write the recorded details of the cheque (check) manually, or, if no image of the particular cheque (check) has been sent wirelessly by the authorized customer or authorized user, through his/her CCIRAF/AITD, irrespective of the user, the particular cheque (check) will still be instantly reported to the CCIRAF/AITD, but subject to the approval or rejection of the rightful authorized customer/user before consummating the final cashing or depositing.

The bank information should be stored in the permanent memory of the respective registered CCIRAF/AITD device, so that the bank account information will be protected from hackers or thieves. The permanent memory should be compartmented for the anti-fraud/anti-identity theft section, separated from the regular use of cellular/satellite phone and internet section, and NFC applications for future references and reviews with top security protections.

Anti-Forgery Benefiting Personal or Business Cheques (Checks) Transactions: Photographing and Wirelessly Transmitting of Encrypted Images of Sent Cheques (Checks)

There are still hundreds of millions of personal and business cheques (checks) being written by immense numbers of customers around the world for mailing payments and others for gift-giving purposes, etc.

Another exemplary functional capability of the present invention, inclusive of the present inventive device(s) is to be able to compile the photographs of the written cheques (checks) in the respective bank's database, as well the storing of images or photographs of written cheques in the memory of the registered respective CCIRAF/AITD for evidentiary and review purposes. (In capability 194 of FIG. 12 the authorized customer/user is protected). As soon as the authorized customer or his/her authorized user finishes writing a specific cheque (check), it can be photographed by the digital camera of the CCIRAF/AITD, and, can be sent wirelessly via secured transmission to the specific bank for authorized transaction.

When the bank receives each of the individual respective cheques (checks), the image or photograph of the respective cheque can be used by the respective bank to be automatically compared and matched with the routing number, cheque number, name of the authorized customer and signature of the authorized customer or his/her authorized user, original amount written in the each individual respective cheque, (check), name to whom the particular cheque (check) was written for, amount for cashing or depositing, and the date that the cheque (check) was originally written.

If there is any mismatch found during the electronic comparison of the images and data, then the respective bank can refuse cashing or depositing the particular cheque (check), and, can cancel the transaction, and instantly send an alarm message to the corresponding CCIRAF/AITD for the authorized customer to see, thus preventing any cheque (check) forgery by fraudulent individuals or organized criminals. This important feature is new and innovative in the present invention or the EucliBaba, inclusive of the CCIRAF/AITD or EucliStar eGeeenie, and, can immediately prevent any fraudulent alteration in the original cheques (checks) thus, favoring a better financial transactional protection for many millions of authorized customer or his/her authorized user, as well giving such solid protection for the respective bank in monitoring and tracking countless cheques (checks) fraud. The respective customer will also be able to store in his/her CCIRAF/AITD the evidences of the attempted cheques (checks) fraud, as well as all legitimate cheques (checks) transactions for the authorized customer's or authorized user's files and reviews.

Capability for Checking Specific Account Balance of Authorized Customer's Credit Cards/Debit Cards After undergoing through steps 602, 604, 606, 608, 610, 612, 614 and 616 as illustrated in FIG. 19, when the authorized customer's credit card/debit card has been authenticated, the data is wirelessly sent via secured transmission to the Customer's Credit/Debit Card Processing Means and gets connected to the authorized customer's credit/debit card specific bank account at step 618.

As in FIG. 19, the respective bank or lending company, through its associated networked processing means process the request and reports instantly the specific exact requested balance of funds in the specific bank account of the authorized customer/user at step 620. And, at step 622, a display of that requested account balance is flashed at the audio-visual interactive LCD display of the authorized customer's/user's registered CCIRAF/AITD. (This capability is also in 200 of FIG. 12).

Example Scenario of Some Current Problems at the Point-of-Sale (POS) Terminal and the Achievable Advantages of the Present Invention, "EucliBaba" and Present Inventive Device(s) or CCIRAF/AITD or EucliStar eGeeenie or Universal eGeeenie Currently, there are problems encountered in a scenario at the point-of-sale (POS) terminal. On numerous occasions, during direct face-to-face purchases while shopping at groceries, department stores or convenient stores, a customer may be left undecided as to which particular credit card or debit card to use, after he/she is quoted the total amount of money to pay. Simply because he/she may not know, exactly, the most current available balance on a specific debit card to use, nor does the customer know the real-time most current available amount of credit that is left on a particular credit card to use, he/she may decide to eliminate some merchandise, and retain others, or, just cancel out and leave without buying anything at all. Unless, of course, the customer has enough cash to cover the whole amount due, or to cover in cash the difference of the amount he/she decides to pay partly with what he/she may be guessing as a still safe amount that can yet be covered by a particular credit card or debit card he/she has to use, without going overboard.

This confusing scenario can be prevented with the use of the present invention, by providing an instant-response mobile provision for wirelessly and conveniently checking the most current balances of either or both credit cards and debit cards to be used. It is to be clarified here that there are other problematic scenarios not mentioned above, where fraud and identity-theft cannot yet be solved by the prior art.

Gratuity or Tip Added to Restaurant Bill and Pre-Sent by Authorized Customer/User Through his/her Registered CCIRAF/AITD to the Bank Before Credit/Debit Card is Swiped by Restaurants' Terminal In block 162 of FIG. 12, in addition to making a transaction using the CCIRAF/AITD, it has an option for setting the gratuity or the tip for the service rendered to an authorized customer and owner of a properly registered CCIRAF/AITD. The authorized customer/user has a provision to select the gratuity in the form of the percentage of the bill, or the direct tip amount added to the amount of the bill. If percentage amount is entered, then, when properly prompted and responded, the present inventive device calculates the total amount by adding the resultant percentage amount of tip to the original amount of the bill without the tip. If the actual gratuity amount is entered by the authorized customer/user, the exact amount of tip will directly be added by the CCIRAF/AITD to compute the total amount to be charged in case of a credit card, or to be debited (in case of a debit card) being used by the authorized customer/user. This total amount will be used for the specific transaction to be pre-sent to the respective bank or credit card company to be exactly matched when the credit/debit card is swiped for payment charge in the restaurant's terminal, and then instantly reported to the corresponding CCIRAF/AITD before instant approval for the charge in the corresponding CCIRAF/AITD as programmed. If there is an error or mismatch between the CCIRAF/AITD's pre-sent approved amount and the charge made with the swiping of the credit/debit card at the restaurant' terminal, then the charge will automatically be rejected by the corresponding CCIRAF/AITD, with an alert/message signaling the wrongful charge and will be recorded in the CCIRAF/AITD's memory. This way the authorized customer/user will not be cheated by fraudulent charging or errors in the particular restaurant. All instantly approved transactions and rejected transactions or payments will be recorded in the digital memory of the CCIRAF/AITD as well as in the specific bank or credit card institution's database for future reference. This is also applicable during international travel with GPS location tag (if desired).

In block 162 of FIG. 12, there is a currency converter capability so that the exact current conversion currency rate will be made and pre-sent to the respective bank account of the registered authorized customer/user for matching purposes with the charges made at that point in-time with possibly with the actual GPS location tag for recording into the memory of the respective registered CCIRAF/AITD as well as in the registered customer's/user's bank account in order to be used for evidence references, to avoid cheating or misrepresentations.

Provision to Pay Bills Even without First Swiping the Physical Credit Card or Debit Card of the Authorized Customer or his/her Authorized User Through the Registered CCIRAF/AITD After starting the CCIRAF/AITD or EucliStar eGeeenie, and entering the proper required PIN or Password and/or Finger Biometrics Data into the inventive device, and the respective proper identity of the authorized customer or his/her authorized user is correctly authenticated, he/she, then, activates the interactive LCD TOUCH-SCREEN of the CCIRAF/AITD or EucliStar eGeeenie, and he/she can authorize the CCIRAF/AITD or EucliStar eGeeenie to start the process of paying bills online or by phone, or at the point-of-sale (POS) terminal, even though he or she does not have the physical credit card or credit card present. He or she just taps on the "Non-Card-Present Virtual Image Retrieval Icon" on the interactive LCD display of the EucliStar eGeeenie, after activating the MENU BUTTON or MENU ICON, and, then scroll the different images of his/her credit/debit card that have been pre-loaded in the memory of the CCIRAF/AITD, and then select by tapping on the specific virtual card image of the specific card which he or she likes to use. The respective information on the front of the selected card will appear on its virtual image, together with other relevant information of the chosen virtual card. (This is in capability 206 of FIG. 12).

Then, he or she selects by tapping on either the Credit Card Icon or the Debit Card Icon, when prompted by the audio-visual LCD display. Then, he/she chooses the Icon for Card balance when prompted, then activate by tapping on the SEND ICON. Instantly, the account balance on the specific card is sent by the respective bank or lending company through secured wireless, wired and optical means through the interconnecting link of the Customer's Credit/Debit Card Means with the respective bank or lending company and its associated authenticating and authorizing links. By properly following the procedures and proper data entry for payments for either online or telephonic merchandise or service ordering, as interlinked with the specific merchant or vendor online or telephonic authenticating and authorizing and settlement networked centers and associated sub-centers, the various specific online or telephonic transactions can be completed giving secretly coded security protection receipts and recorded in the memory of the respective registered CCIRAF/AITD or EucliStar eGeeenie.

In case of telephonic transaction, the whole telephonic transactional conversation between the respective authorized customer or his or her authorized customer/user side, and the merchant or vendor side, is recorded by the activated digital audio-recording of the CCIRAF/AITD, and stored in CCIRAF/AITD's or EucliStar eGeeenie's memory for future retrieval, evidentiary reference or review.

The procedures for online or telephonic ordering can be done by interactive LCD touch-screen method of activation or by voice command method of activation or the combination of both methods, according to the audio-visual interactivity of the LCD display and speaker system of CCIRAF/AITD or EucliStar eGeeenie.

Provision for the Itemized Breakdown of Bills, as Well as Pertaining to the Monetary Deposits and Holds and their Respective Relevant Release Dates The CCIRAF/AITD also provides a programmed itemized breakdown of payments and monetary holds or deposits in the electronic invoices for hotel or motel reservations, car rentals, equipment rentals, etc., with instant alarms and audio-visual reports as to when to release the respective monetary deposits or holds, as soon as the respective hotel or motel, car rental and equipment rental bills, etc. are fully paid. Instant audio-visual reports are provided to the respective CCIRAF/AITD of the itemized breakdown of these bills from the onset of charge till the bills are all settled, and, when the monetary holds or deposits are released to the authorized customer's/user's bank account, including all phases of transactions are recorded in the CCIRAF/AITD's memory for future references.

Electronically Placing a Hold on Credit Cards/Debit Cards Until the Correctly Ordered Merchandise and Service(s) have been Authentically Deliver The present invention has also the programmable capabilities to hold credit card or debit card deduction amounts until the ordered merchandises and/or services are properly received at the designated address given by the authorized customers/users, and the correct ordered merchandise or services have been authenticated by the authorized customers/users. The required signatures and/or biometrics of the customers/users at the time of merchandise or service(s) deliveries will tie-in and authenticate and authorize the particular credit card or debit card of the authorized customers/users for funds transfer settlements to then be transferred from the authorized customers/users bank account into the merchant's bank account. In this way, both the authorized customers/users the particular merchants will be satisfied and will not be cheated in any of the proper deliveries of the correct merchandise or service(s), with the corresponding payments to the correct merchant, thus limiting immensely the complaints by relevant trusting authorized customers/users, as well as limiting complaints by the correct trusting merchants. Each step of the transactions can be programmed to be correctly executed and recorded in both the memories of each respective CCIRAD/AITD or EucliStar eGeeenie, as well as in the databank of the relevant merchant(s) and also of the authorized customers/users bank accounts, including all for future authenticated references when needed for recall and review.

Provision of Wireless Transfer of Funds

The present invention is also provided with the programmable capability for the authorized customer or his/her authorized user to directly wirelessly transmit via secured transmission channels, any one or more specific amounts of cash from the respective registered CCIRAF/AFITD through the Customer's Credit/Debit Card Processing Means to deduct from his/her debit card or credit card in his/her respective bank's or credit company's account (s) and be credited instantly into the particular bank account of a named recipient, and, to receive relevant specific acknowledgement alert and display in his/her respective registered CCIRAF/AITD when the relevant cash has been properly deposited into the respectively named recipient's specific bank account. If the GPS is in the active ON mode, then the GPS tag can be associated with the transaction for memory storage and recall.

Reminder of Respective Credit Card Late Fees Charges Per Transaction or Per Billing Cycle or Other Penalty Fees and Charges, Percentage Rates Changes and Dates, Etc.

The present invention, inclusive of the present device(s) also provide effective, coherence in the programmable instant-alarm or timely reminder of the various different applicable fees to be paid by the authorized customer or authorized user per transaction or per billing cycle, and, when the respective deduction from his/her particularly used credit card or debit card will happen and has occurred, including dates and times, and any change of percentages in fee charges, in case of credit cards/debit cards or checks (cheques).

Provision of Instant—Alert of Direct Deposits of Checks and Salaries

The present invention, inclusive of the present device or EucliStar eGeeenie, can be properly registered wirelessly or through online or telephonic registration in order to establish direct connectivity links to various relevant organizations, such as specific employers, or government agencies, or other relevant organizations. So that, according to the correct applications, the present inventive device or EucliStar eGeeenie can be programmed by the respective authorized customer or authorized user of the inventive device, through manual means or through interactive touch-screen or voice commands, following a sequence of audio-visual prompts, to allow the respective registered EucliStar eGeeenie to receive instant audio-visual alerts or alarms, when each specific direct deposit (according to designated dates and times) are made to their respective bank accounts.

For example, the direct deposits coming from the respective employers, direct deposits for monthly social security payments, unemployment benefit payments, and from any other direct deposits, made to the respective authorized customer's or his/her authorized user's particular bank account, including income tax refunds, social welfare payments, altogether, utilizable for instant-knowledge by the respective authorized customers/users with proper correct memory storage in each respective registered CCIRAD/AITD or Universal eGeeenie for authentic evidentiary reference and review purposes.

Also, the EucliStar eGeeenie can also be programmed to receive instant alerts and recordings of all earned points or credits to the respective authorized customer and/or his authorized user(s) of the registered present inventive device or EucliStar eGeeenie, in case of repeat purchases or orders or bonuses, as well as earned incentive points or rewards, monetary or other bonus gifts from specific merchants or banks or credit card companies due to the contribution of the individual authorized customer or authorized user of the CCIRAF/AITD or EucliStar eGeeenie, in helping save the relevant merchants or banks or credit card companies and merchants from incurring potential losses as a result of the respective authorized customer's/user's direct participation in fraud prevention due to the registered customer's usage of his/her respective CCIAF/AITD or EucliStar eGeeenie.

Provision to Wirelessly Freeze and Reactivate Credit/Debit Cards

The authorized customer or authorized user can easily wirelessly freeze his or her particular credit card or debit card through the wireless use of his/her respective CCIRAF/AITD. All he or she has to do is to select his or her particular credit card or debit card, and then select the Freeze Icon displayed on the interactive LCD display, and then when a prompt Icon appears stating "Time Frame", then enter the starting date and time until the chosen designated end date and time, either by using the keypad or by voice command phrases like "start freeze date at 7:00 A.M. on Jul. 12, 2010 till 11:00 P.M. on Aug. 15, 2010", then activate the Accept and send Icon or vocally command "Accept and Send." The respective detailed information about the particular credit card or debit card is wirelessly routed to the authorized Customer's Credit/Debit Processing Means, and gets automatically routed to the respective authorized customer's bank account.

One or two days before the particular Freeze Time Frame expires, the respective bank or lending company automatically sends an alarm message to the respective CCIRAF/

AITD of the respective authorized customer about it, and then can appropriately respond accordingly of his/her chosen decision. If the GPS is in the active ON mode, then the GPS tag can be associated with the transaction for memory storage and recall. If the authorized customer or authorized user of the particular credit card or debit card wants to reactivate the Freeze, then, he or she can just instantly respond by entering a new "Freeze Time Frame" and commands the Send New Freeze Time Frame to the respective bank account through the Customer's Credit/Debit Card Processing Means. Or else, just by ignoring the alarm of original freeze time frame, the freeze on the particular credit card or debit card continues indefinitely, until it is deactivated to be unfrozen by the authorized customer or authorized user. This feature is an important security protection for the authorized customer or authorized user of credit cards or debit cards to be sure that no other person can use his or her credit cards or debit cards if he plans not to use them for certain lengths of time as he or she desires to do so, in order that he/she can prevent fraudulent activities against his or her cards during the relevant freeze time frames. If the GPS is in the active ON mode, then the GPS tag can be associated with the transaction for memory storage and recall.

Special Applications Designed for Military Uses

In the battlefronts especially, it is of utmost importance for soldiers and various ranking officers to be able to instantly know where they are located with coded GPS signals, and to be able to instantly and secretly establish contacts to whom they should report and coordinate with. When they are scattered in various places during combat, it is likewise very helpful for them to instantly and accurately know and distinguish whether next to them is an enemy or enemies, or they are next to an ally or allies; if next to them is an ally or allies, in order to enable them to secretly, accurately and instantly determine as to which unit, platoon, battalion, division and branch of service they belong to. Therefore, wider uses in the military for instant-personnel identification (with secret codes) during active battle, especially in the frontlines wherein the possibility of random mix-up or scattering of soldiers and commanders can happen day or night, so as to enable the instant secret recognition of the true-personnel military identities, ranks and assigned units or battalions or divisions, and so on, as have already been mentioned, or to instantly distinguish whether some soldiers nearby are friends, allies or foes; if friends or allies to provide them to instantly give or receive secret orders for rendezvous points; if foe or enemies, to instantly obtain or give evasive maneuvers or guidance for further tactical confrontations and timing; or, in case of emergency situations or disasters, to provide them with the best routes and advices to follow for the best guidance toward safety, security and coherent effectiveness with coded commands or assignments. Relying on the shape of helmets and uniforms are no longer enough in this age of electronic warfare. The CCIRAF/AITD or EucliStar eGeeenies or Universal eGeeenies can be effectively programmed for much more effective and coherent instant-response applications for wider military uses. For example, the CCIRAF/AITDs or EucliStar eGeeenies or Universal eGeeenies can be equipped with a program, method and system to send bursts of changing radio frequencies at random with various coded secret messages that can be confusing for the enemy to pick up and decipher. Most of the secret messages are false messages, and only some are correct messages and arranged in different coded sequential or non-sequential orders. Only the correct programmed targeted allied personnel equipped with the corresponding CCIRAF/AITD or EucliStar eGeeenie can correctly receive the right messages and respond accordingly to the coded message. If there is no response within several bursts of coded messages, which means that the possibility of the soldier or commander is an enemy or foe. The program can also be set so that if the soldier or commander is injured or disabled, there is a default setting in the program to automatically respond (within certain time frame with enhanced audio or audio means, with certain coded messages) so that the one sending the signals or messages can immediately know about the status of the injured soldier(s) or commander next to him or near him.

Importance of the CCIRAF/AITDs or EucliStar eGeeenies or Universal eGeeenies Against Kidnappers or Rapists and Other Thieves It is very important to have an instant delivery warning and safety precautionary guidance to children, teens, adults and the elderly and the responsible person, relevant agency or organization with a multi-party instant security check and advices to prevent them from being lost or kidnapped by intruding criminals or rapists, on a local, state, national and global basis, using the GPS location system as allied or linked to the respective properly registered CCIRAF/AITDs of EucliStar eGeeenies or Universal eGeeenies.

Programs can be set and made operative for uses with a multi-party communication link between the responsible party for the kids, teens, elderly and with the third party or parties who is/are the authenticated and allowed party or parties to meet or pick them up, while disallowing or rejecting those others who cannot instantly be authenticated as the correct third party or parties consented to pick them up.

(E) Other Important Capabilities and Advantages of the Present Invention (EucliBaba), Inclusive of the Present Inventive Device(s) or CCIRAFT/AITD or EucliStar eGeeenie Features and Functions of GPS Coordination with Personal or Business or Medical/Health Insurance-Related Transactions The functionalities of the GPS that is integrated with the present invention, EucliBaba, inclusive of the present inventive device or CCIRAF/AITD or EucliStar eGeeenie are not only for navigational purposes for travelers and trackers. They are also useful in order provide definite GPS tags of the nearest location of the point-of-origin where specific purchase(s) or rental(s) or lease(s) of merchandises or services are made or have been made in each one or groups of personal and/or business transactions, so that specific evidences are clearly defined in recalling or identifying from the stored memory of the correct registered CCIRAF/AITD or EucliStar eGeeenie which items have been or are purchased or leased or rented or which services have been or are ordered in any part of the world. Each GPS location tags are automatically paired together with each brief or detailed electronic bills of sales or rentals or leases or borrowed or lend items, and stored in the storage memory of each corresponding correct registered CCIRAF/AITD or EucliStar eGeeenie, as long as the respective authorized customer or authorized user of the correctly registered CCIRAF/AITD or EucliStar eGeeenie has the GPS function of the device in the active On mode.

The authorized customer or authorized user must activate the GPS function in the ON mode, and command his or her respective registered CCIRAF/AITD or EucliStar eGeeenie to pair the specific transaction(s) with the GPS function while making real-time transaction(s) in any part of the world. This particular feature and function of the EucliBaba, inclusive of the corresponding correct registered CCIRAF/AITD or EucliStar eGeeenie, can definitely provide the millions of authorized customers and/or authorized users of the invention, EucliBaba, inclusive of the inventive device(s) or CCIRAF/AITD(s) or EucliStar eGeeenie(s) the conveniences of easier recollections and solid evidences as to the nearest location where each specific transactions are made or have been made, according to the dates, times, places or locations, in any part of the world, since the GPS function is also tied in or programmed (according to default setting) with the automatically adjustable calendar and time functions of the CCIRAF/AITD(s) or Universal eGeeenie(s). The GPS feature, function and capability are benefiting factors for applications for statewide, nationwide and international foreign purchases protections for the authorized customer/user of correctly registered CCIRAF/AITD or EucliStar eGeeenie or Universal eGeeenie. Also, the GPS transaction tagging features, functions and capabilities are applicable for effective GPS pairing tagging between the insured patient's correctly registered CCIRAF/AITD with the GPS-equipped device of the relevant medical/health facility, in order to match the GPS acceptable proximity-range between the two devices, as an effective means or corroborating means of proving the actual real physical presence of the correct insured patient near or at the spot where the specific medical/health facility claiming for the relevant valid insurance payments from the patient's Medicare/Medicaid and/or private medical/health insurance companies, as authenticating evidence that will lead to the relevant proper insurance payments by the Medicare/Medicaid and/or relevant private medical/health insurance companies to the claiming relevant medical/health facilities rendering service and/or providing the insured patients with the proper required or approved or prescribed medical/health devices or equipments.

Importance of the USB Provision

The CCIRAF/AITD or Universal eGeeenie has a USB provision, so that it can be connected to a secured computer for the temporary or permanent secured copy of the desired relevant information data. The provision can also be used for storing non-sensitive cellular and/or satellite communication. With proper security, the provision can also be used for transferring information data for secured printing on secured printers or for secured viewing on larger LCD or plasma monitors or screens of safely secured computers and monitors for viewing the anti-fraud and anti-identity theft secured applications data, as well as for viewing the Near Field (NFC) applications data for evidentiary and elucidative reviews, references and clarity inspect-ions and analysis. Just follow the audio-visual prompts for whatever is or are the relevant desired motives or objectives of the respective registered authorized customers/ users, using voice commands or touch-screen or manual methods of operations.

Use of Anti-Loss Provision Functions of the Present Invention, Inclusive of the Present Inventive Device(s) in Order to Prevent Losing the Inventive Device(s) and to Deactivate and/or Erase or Later Restore the Personal and Business Data Stored in Present Inventive(s) Device(s)

The present invention or EucliBaba, inclusive of the present inventive device(s) or CCIRAF/AITD(s) or Universal eGeeenie(s) or eGeeenie(s) is/are provided with anti-device loss and anti-data loss features and functions, by allowing them to be paired and to respond with the functionalities of other RF-enabled and/or Bluetooth-enabled devices (not included or not part of this present patent application and specifications). The anti-device loss and anti-data loss features of the present invention, inclusive of the CCIRAF/ AITD(s) or EucliStar eGeeenie(s) or eGeeenie(s), make them electronically receptive and responsive to the ringing, reminding, speaker-controlled, message-controlled, manual-controlled, or voice-controlled commands of the specific frequency-paired programmed RF-enabled and/or Bluetooth-enabled devices (merely mentioned here in this present patent application and specification, but covered and explained in full details in other patent application(s) and specifications), with the function so as to remind the respective authorized customer/user that their respectively owned registered CCIRAF/AITD(s) are being left behind or being forgotten to be picked up or brought into their possession once the respective CCIRAF/AITD(s) or Universal eGeeenie(s) is/are separated from within a programmed default setting of a pre-determined or pre-programmed distance away from the RF-enabled or Bluetooth-enabled paired device(s).

Therefore, the respectively owned correct registered CCIRAF/AITD(s) or Universal eGeeenie(s) or eGeeenie(s) will be prevented from being lost or left behind by the respective authorized customer-owner or authorized user, in the first place, farther than the allowable range of pre-determined programmed set distance(s). The respective registered Universal eGeeenie or CCIRAF/AITD or EucliStar eGeeenie or eGeeenie will also be programmed to be responsive to directly controlled deactivation or reactivation of encrypted data/information erasure electronic commands of these correspondingly paired RF-enabled or Bluetooth-enabled device(s) (which is/are subjects of a separate or a series of separate patent applications and specifications).

But, the built-in anti-loss components and functionalities of the respective registered CCIRAD/AITD or Universal eGeeenie or eGeeenie are part of the functionality of the present invention, inclusive of the present inventive device(s) or CCIRAF/AITD(s) or Universal eGeeenie(s) or eGeeenie(s) as explained and illustrated in the present patent provisional application (mentioned as capability 210 of FIG. 12).

The pairing-ready accurate electronic programmable features of sensitive receptivity and responsiveness functionalities of the EucliBaba, inclusive of the CCIRAF/AITD(s) or Universal eGeeenie(s) make them far superior than any of the prior art applications and devices currently in the market, as far as immediate or instant-response data/information-savings and anti-device-loss savings are concerned. The present inventive device or CCIRAF/AITD or EucliStar eGeeenie or Universal eGeeenie or eGeeenie is equipped with a distance sensor in block 340 found in the electronic block diagrams of FIGS. 31, 31A, 31, 32A, 33 and 33A. The distance sensor allows the present inventive device or CCIRAF/AITD or EucliStar eGeeenie or eGeeenie to be programmed to be distance-sensitive, which means that once the present inventive device or CCIRAF/AITD or EucliStar eGeeenie or eGeeenie is separated farther than the allowable range of pre-determined programmed set distance(s) away from a distance-sensitive pairing-ready anti-loss programmable alerting device, the present inventive device or CCIRAF/AITD or EucliStar eGeeenie or Universal eGeeenie or eGeeenie as pre-programmed to be distance sensitive, will then be activated to sound and text an audio-visual alert or alarm message that will be heard through its built-in speaker and interactive LCD display (2D). The alerting or alarming audio-visual message may be in the context of "Don't Forget Me—Your Cell Phone, My Friend," or in a funnier way, the audio-visual alerting or alarming message may be in the context of "Don't lose your cell phone, Idiot . . . . I'm expensive!" This function, capability and feature of the present inventive device or CCIRAF/AITD or EucliStar eGeeenie or Universal eGeeenie or eGeeenie are shown in the electronic block diagrams in FIGS. 31, 31A, 32, 32A, 33 and 33A by tracing the routing connections and inter-linkages from the distance sensor in block 256 connecting to the application interface in block 256 to the application processor in block 254 of the CPU 25 to the audio-video codec 278 to speaker in block 288 and head set jack in block 286 (as connected to the head set (if being worn by the user), and, from the application processor 254 of CPU 250 the relevant data/information is routed to the 2D/3D LCD controller in block 274 to the 2D/3D LCD display in block 280. Of course, the interactive LCD display will be programmed to automatically display the alerting or alarming text message in 2D in block 280 as controlled by the 2D/3D controller 274. If it is not possible to retrieve the present inventive device or CCIRAF/AITD or EucliStar eGeeenie or Universal eGeeenie or eGeeenie, for reasons such as it is immediately snatched by somebody or left in a moving vehicle or that it is left in a stationary place by the authorized registered customer/owner/user of the present inventive device while he or she just left aboard a moving vehicle, there is the option that can be executed by the authorized registered customer/owner/user of the present inventive device, and that is; he or she can deactivate the present inventive device by means of a default setting programmed in his/her registered CCIRAF/AITD or EucliStar eGeeenie or Universal eGeeenie or eGeeenie after it has been separated from him or her away from the set programmed range of distance. Or, he or she can use an interactive voice command reciting her secret PIN or pass code, in combination with a secret voice command, or just merely commanding a secret vocal phrase like "Deactivate My Cell Phone called Rabbit" or any secret voice command phrase that he or she has programmed as a command to deactivate his/her registered CCIRAF/AITD or EucliStar eGeeenie or Universal eGeeenie or eGeeenie, through the use of the same corresponding pairing-ready distance-sensitive alerting device that is also equipped by a distance-sensor, and that is also capable of service as a pairing-ready cell phone. It is also a good thing that the present inventive device cannot just be used by anyone else without the proper re-input of the required biometric data to be compared with the previously stored biometric data that has been stored in the digital memory of the present inventive device, unless the present inventive device is set to its default deactivation screen, which is described further below, on its interactive LCD display, which gives a limited usage of the CCIRAF/AITD or EucliStar eGeeenie or Universal eGeeenie or eGeeenie.

Another application of the distance sensor block 340 as found in FIGS. 31, 31A, 32, 32A, 33 and 33A and located in the present inventive device is to alert the authorized registered customer/user when he/she is separated farther than a pre-programmed range of distances, providing that the authorized registered customer/user is in possession of a previously-mentioned pairing-ready distance-sensitive alerting device that is also equipped by a distance-sensor. In this case, the paired distance-sensitive alerting device will alert the authorized registered customer/user when he/she is separated from the present inventive device by a distance greater than a pre-programmed distance d1, but lesser than a pre-programmed distance d2. The alerting method in this instance will consist of a user-defined alarm ringtone and message that will appear on the distance-sensitive alerting device that is paired with the registered CCIRAF/AITD or EucliStar eGeeenie or Universal eGeeenie or eGeeenie. If the authorized registered customer/user chooses to ignore the alert, or is not aware of the alert, and continues to separate further from the present inventive device, once he/she reaches a separation distance greater than the pre-programmed distance d2, the registered CCIRAF/AITD or EucliStar eGeeenie or Universal eGeeenie or eGeeenie will automatically deactivate and will display the default deactivation screen described below on its interactive LCD display.

The default deactivation screen of the CCIRAF/AITD or EucliStar eGeeenie or Universal eGeeenie or eGeeenie is displayed on the interactive LCD display of the present inventive device and is divided into 2 parts. The main part of the default deactivation screen consists of a message explaining that the present inventive device is deactivated and must be returned to its owner, for example: "Device is not activated. Property of Antony. Please call either number below to return it to its owner." This message will be translated into several languages (French, German, Spanish, Chinese, Tagalog, etc.) using the Language Translation Processor block 298 and Translation File Database block 296 in FIGS. 31, 31A, 32, 32A, 33 and 33A, and the default deactivation screen will show each translation of the message through a pre-defined cycle (for example, every 5 seconds). The second part of the default deactivation screen of the CCIRAF/AITD or EucliStar eGeeenie or Universal eGeeenie or eGeeenie consists of 2 "Call" LCD-projected buttons, with the phone numbers as pre-programmed by the authorized registered customer/user (for example, the authorized registered customer's/user's work phone number, or his/her spouse's phone number, or his/her GreeetWatz phone number, etc.). Therefore, the finder of the present inventive device can contact its authorized registered customer/user to return the lost or left behind present inventive device.

When the CCIRAF/AITD or EucliStar eGeeenie or Universal eGeeenie or eGeeenie is displaying the default deactivation screen, all of its features, functionalities, capabilities, inputs and outputs are locked out and cannot be used, with the exception of the interactive LCD display (to display the default deactivation screen messages and phone numbers) and the ability to make outgoing phone calls to either phone numbers displayed on the default deactivation screen (but only to these 2 numbers). Once the CCIRAF/AITD or EucliStar eGeeenie or Universal eGeeenie or eGeeenie has been returned to its rightful owner, the authorized registered customer/user can reactivate the present inventive device by using the Biometric Scanner and re-inputting the required biometric data to be compared with the previously stored biometric data that has been stored in the digital memory of the present inventive device.

Provision of Shopping Lists and Items Bought, being Bought or to be Bought

The present inventive device or EucliStar eGeeenie also provides the programmed functionality of recording into the respective registered CCIRAF/AITD or EucliStar eGeeenie about the shopping lists for purchases of merchandise and/or services with voice commands, and recording and displaying of each item or groups of items to buy, and, then recording each item or groups of items bought, to be bought and have been bought, for review in the interactive audio-visual LCD display of the inventive device, according to the date and time; the data can remain stored in the inventive device's memory until any and/or all of the data are selectively erased as desired.

Provisions of Safe Photo Storage and Tagged Secret Locations as Reminders for Fast Retrieval and Evidence of Personal and Business Profiles and Affairs of the Authenticity of the Authorized Customer (with Authentic Stored Images of Important Possessions, Certificates, Diplomas, Licenses, Passports, Foreign Visas, Association Memberships as Well as Other Organizational Affiliations, Medical and Family History, Insurance Papers, Schools and Special Skills and Talents Training Academies or Centers Attended, Religion, Baptism, Marriage(s) and/or Divorce(s), Friends and Other Important Documents) for Evidentiary Purposes to Correctly Identify the Authorized Customer's Authentic Real Existence, Against any Identity Theft Impersonators The present invention, inclusive of the present device or CCIRAF/AITD or EucliStar eGeeenie or Universal eGeeenie, also are programmable to enable the registered customers/users with the capability of taking digital photos of properties, important documents like driver's license, membership cards in various organizations with which the customer are affiliated; also capable of taking digital photos of diplomas, certificates, loans papers, important receipts, birth and marriage certificates for pertinent organized filings in the memory of inventive device (mentioned as function/feature 154 of FIG. 12); the photos can be tagged with specific dates and times and locations, as well as the relevant vocal recording and vocal command recall (mentioned as function/feature 156 of FIG. 12) made by the relevant person, which are so necessary for future or later fast retrieval of these references, and for backups in secured flash drives or other secured computers or secured external hard drives, and, also for future hard copy printing for evidence purposes, and designating the photos on pertinent relevant files according to dates and times and locations.

These are the present inventive device's or CCIRAF/AITD's or EucliStar eGeeenie's or Universal eGeeenie's important features and capabilities, which can and will prove to be very convenient in our busy world of affairs and dealings, because most people in general forget on numerous occasions where to find and locate their important papers and other possessions in the course of their reorganization and placements of these things because many people transfer their places of residences and transport these numerous things along with them, or are sometimes left in other places with their relatives or friends or spouses. Since each registered CCIRAF/AITD or EucliStar eGeeenie or Universal eGeeenie is also equipped and programmed with GPS (mentioned partly as function/feature in 158 of FIG. 12) correct location tagging with dates and time tagging, while taking the relevant corresponding digital photos of these important things; the relevant corresponding photos being enabled to be stored in each of the registered CCIRAF/AITD's or EucliStar eGeeenie's or Universal eGeeenie's memory storage, it will be easy to recall the relevant stored digital photos by tagging the relevant item photos with item voice-commands (also as a function and feature in block 168 for voice recognition, control and command in FIG. 12) according to dates and times, for convenient fast retrieval. For example, I can take a digital photo of my U.S. passport, and also take the photo of the place I stored or filed or hid my U.S. passport, and I can tag the paired photos with a vocal recording of "my garage at 2512 Capistrano Ave." Automatically, since my GPS is ON and my calendar is always ON, therefore, the digital photo of my U.S. passport and the digital photo of the filing cabinet in my garage where I stored or hid my passport, along with my recorded voice, plus the GPS and time and specific date when I hid my passport will all be saved in the permanent memory of my registered CCIRAF/AITD or EucliStar eGeeenie. In the future, when I need to retrieve my U.S. passport, I can just command my registered CCIRAF/AITD or EucliStar eGeeenie with "Recall my U.S. passport" and the latest digital photo of my passport and the photo of the filing cabinet at the garage will appear at the interactive LCD display and I will hear my corresponding digital recording of "my garage at 2512 Capistrano Ave." through the speaker system of my registered CCIRAF/AITD or EucliStar eGeeenie. The GPS locator and the time and date I took the digital paired photos will also be displayed at the interactive LCD display of my registered CCIRAF/AITD or EucliStar eGeeenie.

Without these features and capabilities of the present inventive device or CCIRAF/AITD or EucliStar eGeeenie, millions of people will have difficulties in accurately remembering where they hid or kept their important papers or personal and business and educational and organizational documents and other possessions, so most will just waste so much time in searching batches of files and paperwork and other possessions and locations, because many people are so disorganized in their managements of things due to the many responsibilities they encounter in day to day basis within certain time frames. These features will also help properly identify the authenticity of each owner/user of the registered CCIRAF/AITD or EucliStar eGeeenie, against any impersonator who does not possess the cumulative files and dates of storage of the relevant connecting evidentiary personal and business and educational and membership and possessions and other pertinent important documents.

Provision of Photos of Authorized Customers on Visited Places

The authorized customer or his/her authorized user can take digital photos of himself or herself in front of stores, restaurants, bars, or other places where he or she went to shop, eat or drink, or, of particular gas stations, after having gas or diesel oil fillings to back up receipts, and, to show that the authorized customer/user has his/her physical presence there, according to the dates and times for evidentiary purposes, so that there will be solid proof, in case there arises any potential controversy against any impersonators. Photos of himself or herself can also be taken in front of certain pharmacies, doctor's offices and urgent cares center, according to dates and times to give physical evidence of the actual presence of the authorized customer/user (if he or she is a patient) during doctors consultations, prescription drug fillings; the photos being necessary in case there will develop allergic reactions to medicines, or wrong medications given by a particular pharmacy, And also, in order to show his/her real presence there. Digital photos of the authorized customers or family members or friends (as patients) together with specific health care workers such as physical therapists treating any one of them, according to specific dates and times of treatments, are very important; the digital photos can be wirelessly sent through the registered CCIRAF/AITD to the specific insurance companies as direct real-time vital evidence that specific treatments and related medical events really took place there, in order to prevent the presentation of illegitimate insurance claims and illegal billings claimed or made to insurance companies or the Medicare or Medicaid system, without the authorized individual patient's knowledge. These kind of fraudulent medical insurance claims of multiple billing charges are now rampant, and, can be prevented by the use of the present invention, the CCIRAF/AITD or Universal eGeeenie.

The above functionalities and capability of the registered CCIRAF/AITD can be programmed according to the program applications installed, and interactively sequentially prompted by the authorized customer/user, if desired. These are preventable kinds of fraud being committed by numerous fraudulent health care centers, with their collaborating fraudulent workers who falsify the signatures of patients without their knowledge; the fraudulent workers may not, in reality, be present for each particular health care treatment of the authorized customers (as patients), while the corresponding insurance companies or Medicare/Medicaid insurance or other government agencies are being illegally billed for. These medical/health care fraud exists in tremendous numbers which really skyrocket the medical/health care costs that negatively affect our economy.

Therefore, the adaptation for the imperative uses of millions of these properly registered CCIRAF/AITDs or EucliStar eGeeenies can be sponsored by the insurance companies, as well as the Medicare or Medicaid insurance system, as well as by numerous legitimate private insurance companies, in order to enormously save them from the tremendous costs and losses due to the rampant medical/health care fraud that are still not yet being effectively and coherently solved by the prior art.

Capabilities of the CCIRAF/AITD or EucliStar eGeeenie for VOICE Recognition and Voice Command The CCIRAF/AITD or EucliStar eGeeenie has the capability to recognize the speech pattern of each of the millions of authorized customers or authorized users (as function/feature 168 of FIG. 12). The main objective of the voice recognition capability of CCIRAF/AITD is to train and understand the input speech of each respective authorized customer or authorized user to respond to the succeeding input speech of the respective authorized customer or authorized user, and make the necessary changes in the system settings as per the authorized customer's or authorized user's requirements. The input speech from the authorized customer or authorized user is fed into the respective CCIRAF/AITD's system in the form of selected keywords or phrases, rather than sentences, so that the CCIRAF/AITD's system will be enabled not to get overwhelmed and confused for the different users. The CCIRAF/AITD's system with voice recognition capability consists of a microphone, speech processor unit, speech pattern recognition system or controller, Amplifier, Digital to Analog converter, Low pass filter, and a loud speaker. The microphone accepts the authorized customer's or authorized user's speech utterances, and the Digital to Analog converter converts digital signals into the equivalent analog electrical signal. The speech processor unit converts the electrical analog signals into digital information, and extracts the features which characterize the input utterances to facilitate recognition. The speech controller system recognizes the spoken utterances based in the features extracted by speech processor unit. This speech pattern recognition system should be trained and tested for different authorized customer's or authorized user's utterances. The utterances may come in response to step by step prompts conveyed to the authorized customer or authorized user through the interface system via a loud speaker and interactive LCD displays.

The voice or speech recognition and the manual entering of the required data can be simultaneously or alternatively performed in the CCIRAF/AITD. The inventive device can automatically shut down the Anti-fraud/Anti-Identity-Theft application, after some set specified amount of idle time for each transaction for security purposes, and be reactivated again, automatically or manually to commence functioning for receiving input alarms or messages and outputting response to be made by the respective authorized customer or authorized user for the continuing succeeding operations of the anti-fraud/anti-identity-theft applications and/or other functions and capabilities of the CCIRAF/AITD or EucliStar eGeeenie.

Language Translation Provision for Travelers and Bi-Lingual or Multi-Lingual Communications For the operation of the language translation capabilities (mentioned partly as function/feature in block 158 of FIG. 12), with the anti-fraud and anti-identity theft with true-personal identity verification applications of the CCIRAF/AITD or the EucliStar eGeeenie or Universal eGeeenie, (refer to FIGS. 31, 31A 32, 32A 33 and 33A), the authorized customer/user activates the Voice record processor 300, and chooses the language to be translated and the resultant language translation desired to be heard and/or displayed by commanding or prompting either through the LCD touch-screen keypad 284, or by voice command means, speaking directly into the microphone 290, or into the head set via head set jack 286. Both the head set jack and the microphone are connected to the AudioNideo CODEC 278, which is connected to the application processor 254, and linked to the Language Translation Processor 298 that extracts the selected two languages from the Translation file database 296. The language translation processor 298 processes the inputted language to be translated and converts it into the desired language translation that is outputted through the speaker 288 or head set jack 286 via the application Processor 254 and through the AudioNideo CODEC 278.

Further, his/her voice message or vocal utterances are spoken into the microphone 290 or head set through head set jack 286, passing through the audio/video codec 278 and application processor 254, and through the voice record processor 300 into the voice recorder 302, which connects to the language translator processor 298 for processing the translation from one language into another, utilizing the corresponding needed chosen languages from the Translation File Database 296.

The Translation File Database 296 provides the various languages, such as English, French, Spanish, Italian, German, Russian, Chinese, Japanese, etc. to the Language Translation Processor 298. If the requirement needs the language translation to be converted from English to French, the customer/user simply must prompt the present inventive device or CCIRAF/AITD or EucliStar eGeeenie or eGeeenie to select English to French or vice versa, via voice command from microphone 290, via the audio/video codec 278 to the application processor 254 to the language translation processor 298, so that the selected language translation can be made between the two selected languages as supplied from the Translation File Database 296 to the language translation processor 298. In this situation, if the vocal recorded utterances to be translated via the language translation processor 298 is from English into French, and the input into the voice recorder 302 is in English, via the microphone 290, the audio/video codec 278, the application processor 254 and the voice record processor 300, then the equivalent output translation will be outputted in translated French and heard in French at speaker 288 or head set through head set jack 286, via the language translation processor 298, and will be outputted and heard in translated French through speaker 288 or head set through head set jack 286. If the input vocal utterances fed into the voice recorder 302 is in French, through microphone 290, audio/video codec 278 and application processor 254, then the output of the English translation equivalent as supplied from the Translation File Database 296 via the language translation processor 298 and the application processor 254, to the audio/video codec 278, and will be heard in English at speaker 288 or head through head set jack 286, and also recorded in the memory of the respective registered CCIRAF/AITD or EucliStar eGeeenie for the anti-fraud and anti-identity theft with true-personal identity verification applications for evidentiary purposes or for future retrievals and reviews.

Access and Editing of Publications and Illustrations

The tablet embodiment of the present inventive device of CCIRAF/AITD or EucliStar eGeeenie or Universal eGeeenie or eGeeenie can be used by its authorized registered customer/user as a means to download any type of publication (books, newspapers, magazines, etc.) in any language. The authorized registered customer/user can then edit the publication and/or add vocal tags to certain sections or the entirety of the publication. The publication will be displayed on the present inventive device's LCD display and the speakers will replay the vocal tags as the publication is being reviewed by the authorized registered customer/user.

The authorized registered customer/user will also have the ability to draw, compose, and edit graphical illustrations that can be stored in the memory of the tablet embodiment of the present inventive device and can also be transmitted to other compatible devices through wireless means or, when applicable, through the Near-Field Communication (NFC) component and system. Pictures and videos that are already stored in the memory of the present inventive device can also be edited and transmitted to other compatible devices through wireless means or, when applicable, through the Near-Field Communication (NFC) component and system.

Travel Situations and Immigration

The present inventive device of CCIRAF/AITD or EucliStar eGeeenie or Universal eGeeenie or eGeeenie can be used by its authorized registered customer/user as a substitute for their travel documents through its features, functionalities, and capabilities of taking digital pictures of documents and render them on the present inventive device's LCD screen. Thus all the information/data from boarding passes, passport, driver's license, etc. can be retrieved at once by the authorized registered customer/user and be presented to airport/aircraft security, border security agencies, customs officers, etc. for security clearance and safe travel or entry/re-entry into a country through land, sea and air. The Near-Field Communication (NFC) component and system of the CCIRAF or EucliStar eGeeenie or Universal eGeeenie or eGeeenie can be used to project the pictures of the relevant travel and identification documents onto an NFC-enabled monitor or device at these various locations for clearer legibility.

Management of Cash

The present inventive device of CCIRAF/AITD or EucliStar eGeeenie or Universal eGeeenie or eGeeenie is capable of managing available cash, systematically by programming a per time frame log of the amount of available cash within certain time frames. Whenever additional cash are saved in the memory according to the progressive date, the amount of additional cash money or monies are registered in its digital memory according to the specific date, and also the total amount of cash money or monies are automatically totaled at the specific date. And every time cash money or monies are spent per specific date, the specific cash amount of cash money or monies spent at that specific date is/are automatically deducted from the total available cash money stored in the digital memory of the present inventive device or CCIRAF/AITD or EucliStar eGeeenie or Universal eGeeenie or eGeeenie. Therefore, with this method, a track record of the available cash, the cash money or monies spent, and the amount of cash money or monies added are recallable for display at the present inventive device's interactive LCD display, according to what the authorized customer/user of his/her registered CCIRAF/AITD commands to be displayed according to the specific dates and time frames being retrieved for revealing the amount of the availability of cash money or monies. This is part of the feature and functions and capabilities of the CCIRAF/AITD as shown in block 202 of FIG. 12.

It is to be understood that, although the present invention, inclusive of the present inventive devices, methods and systems, have been described and explained with the various embodiments, functions, features and capabilities as illustrated in the accompanying drawings, parts, components, inter-linkages, charts and diagrams, the scope, applications, modifications and ramifications of the present invention, inclusive of the present inventive devices, methods and systems are not limited to such accompanying illustrations, descriptions, clarifications, explanations and appended claims, as long as the spirit and purposes of the present invention, inclusive of the present inventive devices, methods and systems are applicable:

While the present invention, inclusive of the relevant various embodiments of the present inventive devices, methods and systems, having been described above in terms of specific and modified embodiments, features, functions and capabilities, it is to be understood that the present invention is not limited to the disclosed and explained matters. Moreover, therefore, the present invention is intended to cover various other further modifications and equivalent structures, features and functions as long as they are within the spirit and scope of the appended claims.

I claim:

1. Devices for electronic multi-functional telecommunications, specially dedicated as customer-controlled instant-response anti-fraud and anti-identity theft wireless mobile phones or tablets or PDAs with secured accurate true-personal identity verification, having built-in integrated internal and external components, electrical power supplies with voltage control and electrical power distribution means, data/information reception, and transmission means, recording, storage, retrieval and audio-visual display means, input and output means and controls, analyzer means, language translation interactive means, time and calendar and timer means, data/information audio-visual display means, alert or alarm means, messaging means, monitoring means, GPS means, accelerator means, and with or without built-in NFC means, magnetic card swiping means, and magnetic stripe reader means, audio and audio-visual capture means, data/information input, and output means, means for PIN/password and biometric scanning and capture and input and output, storage and retrieval means, data/information analytical matching and comparator means, imaging means, microphone and speaker means, microprocessor means for processing data/information and program applications; the present inventive devices being made operationally capable of programming, receiving, pre-transmitting, transmitting and instantly responding to any and all correct personal, business, professional and organizational transactions and events, and, also said devices capable of being programmed to instantly receive and respond to any and all audio-visual alerts and alarms and messages pertaining to any and all transactional errors, fraudulent claims and identity-theft activities, in order to halt, control, prevent, thwart and minimize the commitment of transactional and event errors made by any and all person or persons and machines, as well as in order to halt, prevent, thwart and minimize the commitment of transactional and event fraud and identity-theft activities attempted and made by any and all fraudulent persons and fraudulently programmed machines, apparatuses and malware programs, fraudulent groups, fraudulent organizations, any of which relevant fraudulent and error practices or activities aforementioned above can victimize any and/or numerous legitimate customers, consumers, businesses, merchants, banks and credit card companies, private medical/health care insurance companies, government medical/health care insurance agencies, and institutions such as Medicare and Medicaid, and any and many other relevant legitimate organizations, agencies or departments, and any other relevant party or parties; said devices implementable within local, state, national and global scale and coordinated with inter-linking compatible tamper-proof secured operational, verifiable and authenticating networks, processing means and relevant protected secured databases, and, specially made possible by providing a major shift of control to relevant mass-people-power, internationally, through the expansive and secured coordinated instant-response and interactivity participation of each one of the millions of individual respective registered authorized users of each respective registered said devices; said devices involving and comprising of at-least a plurality of any and a plurality of combinations of the following:

(a) means for securely and accurately registering and electronically linking each of the respective said devices with each of the respective registered authorized user of each of the respective said devices in secured communications with any and all relevant respective organization or organizations, such as bank or banks, credit card company or companies, medical/health insurance company or companies, and any other relevant membership organization or organizations, such as health club or clubs, school or schools or agency or agencies, such as the Transportation Security Agency, and any and numerous relevant travel agency or agencies, and services such as the Immigration and Naturalization Services, departments such as, Social Security Department, Department of Homeland Security, Department of Motor Vehicles, labor union or unions, and any and many relevant police department or departments, and any and many other relevant communication organizations such as phone companies and internet providers, with which the respective authorized registered user of each of the respective registered said devices is dealing, and allowing secured access, reception, transmission, storage and retrieval of any and all relevant data/information, so as to ensure instant-secured two-way or multi-way communications between each of the respective authorized user of the respective registered said devices, including any and all other party or multi-parties with which the respective authorized registered user of the respective registered said devices is dealing, and allowing secured access, reception, transmission, storage and retrieval of any and all respective relevant data/information, and, in order to ensure definite and accurate verifiable tie-in, and correct and verifiable accurate link between the respective authorized registered user of the respective registered said devices, thereby establishing who is the respective authenticated real respective authorized registered user of the respective said devices, through the secured use of each of the respective registered said devices, and through the use of other relevant secured means for the accurate secured registration of each of the respective authorized registered user of each of the respective registered said devices, and, also to correctly assure that each of the respective authorized registered user of each of the respective registered said devices is really the true and verifiable authorized registered user of each of the respective registered said devices, as can be instantly and securely and safely stored and retrievable and provable in the corresponding electronic verifiable and accurate tamper-proof secured corresponding relevant database or databases of each of the relevant organization or organizations or agency or agencies or department or departments and their respective secured networks and providers with which each of the respective authorized registered user of each of the respective registered said devices is dealing, and allowing secured access, reception, transmission, storage and retrieval of any and all relevant data/information, as well as verifying the accurate corresponding secured storage of any and all relevant secured data/information as concurrently stored also in the internal storage memory of each of the respective registered said devices for past, present and future further real-time transactional uses or event usage by either/or both any and all relevant respective organization or organizations or agency or agencies or department or departments, and any other party or parties, such as merchants, with which each of the respective authorized registered user of each of the respective registered said devices, is dealing, and allowing secured access, reception, transmission, storage and retrieval of any and all relevant data/information during any and all transactional and telecommunication events;

(b) means for securely authorizing or pre-authorizing and validating and authenticating the respective kind and/or the respective monetary amount or amounts of specific transactional event or events or any and all other relevant activity event or events in real-time and date, made or initiated and mainly controlled by each of the respective registered authorized user of each of the respective registered said devices through the use of each of the respective registered said devices, with any and all relevant organization or organizations or agency or agencies, or department or departments or any and all other party or multi-parties, with which each of the respective registered authorized user of each of the respective registered said devices is dealing, and allowing any and all relevant data/information secured access, reception, transmission and storage;

(c) means for securely electronically authenticating and validating the verifiable secured true-personal identity of the each of the respective authorized user of each respective registered said devices to and from any and all relevant organization or organizations, agency or agencies, department or departments or to and from any other party or parties, through the use of each of the respective registered said devices, by means of encrypted code or password and/or biometric identification means, such as the use of safely protected secured true-personal photo or photos or image or images, fingerprints or palm-prints or iris or voice biometrics of each of the respective authorized registered user of each of the respective registered said devices, as stored and retrievable and verifiable from the internal storage memory or memories of each of the respective registered said devices, and also, as stored and retrievable from the accurate relevant secured databases of each of the relevant organization or organizations, agency or agencies or department or departments or any and all other party or parties with which each of the respective authorized registered user of each of the respective registered said devices is dealing, and allowing relevant data/information secured access, reception, transmission, storage and retrieval, according to the relevant desires and needs of each of the respective authorized registered user of each of the respective registered said devices, and as electronically communicated securely through relevant electronic communication networks, through secured wireless or wired or optical transmission means or the combination of any relevant secured transmission means;

(d) means for accurately electronically concluding or completing, through secured ways and means, any and all secured personal, business and professional transaction or transactions and any and all other relevant event or events and data/information content communication or communications, verification or verifications, reporting and approval or approvals and secured storage or storages of any and all legitimate monetary transaction or transactions, or automatic or manual and recordable rejection or rejections of any and all anomaly or anomalies or non-verifiable or non-validated or non-authenticated enquiry or enquiries and any and all suspicious fraudulent claim or claims, any and all suspicious private identity intrusion or intrusions, through the secured use of each of the respective registered said devices being used by each of the respective authorized registered user of each of the respective registered said devices;

(e) means for effectively and automatically using the built-in GPS component and system of each of the respective registered said devices operated or used by each of the respective authorized registered user of each of the respective registered said devices, to determine and record the close proximity of each of the respective authorized registered user of each of the respective registered said devices to each of the respective registered said devices, and, also to determine and record also the joint close proximity or proximities of both each of the respective authorized registered user of each of the respective registered said devices to each respective registered said devices, so important in coordinating and establishing, accordingly, with the close proximity of the respective registered user of each respective said devices and the respective registered said devices in relation to the respective registered device or devices of any and all other relevant respective registered GPS-responsive device or devices of any and all relevant singular second party or multi-parties claimant or claimants, and recordable in real-time and date and geographical location, if desired, and also retrievable as recorded from the internal storage memory or memories of each of the respective registered said devices of each of the respective authorized registered user of each of the respective registered said devices, and, also retrievable as recorded from the internal storage memory or memories of each of the respective GPS-responsive registered device or devices of any and all respective registered singular second or multi-parties claimant or claimants, and, also retrievable as recorded from the storage memory or memories of each of the corresponding database or databases of each of any and all relevant organizations, such as banks, or credit card companies or insurance companies or any other relevant organization or organizations, agency or agencies, department or departments with which each of the respective authorized registered user of each of the respective registered said devices is dealing, and allowing any and all relevant data/information secured access and verification and authentication and authorization transmissions, reception, storage and retrieval, in order to effectively prevent, halt, thwart and curtail or minimize the occurrence of fraudulent transactional event or events or charges or billing claims as may be in cases of false insurance patient-not-present billings or charges or fraudulent-on-the-spot transactions or not-on-the-spot transaction or fraudulent privacy event intrusion or intrusions;

(f) means for concurrently validating or authenticating and authorizing, through secured ways and means, the true and accurate physical presence of each of the respective registered authorized said user of each of the respective registered said devices in certain restricted locations, such as in airports, airplanes, or in other sensitive restricted areas, recordable in real-time at specific geographical locations, or denying and halting the physical entry and/or continued presence of suspicious characters or persons at relevant certain restricted areas, as definite effective ways and means for enforcing more stringent and secured means or deterrent in combating terroristic threat or potential crimes before any and all acts of terrorism or other crimes can be committed within airports, planes and other restricted tight-security areas or danger-laden places;

(g) means for securely and accurately controlling, managing, alerting or alarming, composing and editing of communications and messages made in each of the respective registered said devices by each respective authorized registered user of each respective registered said devices, through the use of anti-fraud and anti-identity-theft programs installed and activated within each of the respective registered said devices operated by each of the respective registered authorized user of each of the respective registered said devices;

(h) means for securely transmitting electronic communication data/information contents and messages made from each of the respective registered said devices by each of the respective registered authorized user of each of the respective registered said devices, to any and all relevant targeted organization or organizations, agency or agencies or department or departments or to any and all other second or multi-parties with which each of the respective registered authorized user of each of the respective registered said devices is dealing with, and has allowed secured access, reception, transmission, storage and retrieval of any and all relevant data/information, according to specific real-time time and date as set or pre-set by each of the respective registered authorized user of each one of the respective registered said devices, to any and all respective relevant targeted organization or organizations or agency or agencies or department or departments or any and all other relevant second multi-parties with which each of the respective registered authorized user of each of the respective registered said devices is dealing, and has allowed any and all relevant secured data/information access, transmission and storage;

(i) means for effectively and securely receiving accurate communications and data/information contents and messages into each of the respective registered said devices of each of the respective registered authorized user of each of the respective registered said devices, as sent from any and all or some of the respective relevant organization or organizations or agency or agencies or department or departments, or from any and all other relevant second or multi-parties with which each of the respective registered authorized said user of each of the respective registered said devices is dealing, and has allowed secured access, transmission and storage of any and all relevant data/information access, reception, transmission, storage and retrieval;

(j) means for effectively and accurately and legibly visually displaying any and all composed, transmitted, pre-transmitted, received and retrieved relevant contents of data/information, icons, graphics, messages and alerts, and other objects or images, such as personal photos, sceneries, virtual membership cards, virtual passports, virtual credit cards, virtual bank cards, virtual school IDs, virtual driver's license, virtual access cards, virtual airline tickets, travel itineraries, relevant airlines for travel itineraries, according to relevant scheduled times and dates of arrivals and departures, virtual tagged luggage, photos or videos of places or locations of hidden things, lists of things, reminders and other photos or images of pertinent things, according to the desired needs of each of the respective registered authorized user of each of the respective registered said devices, or, according to any and all of the requested relevant items as required by any and all relevant legitimate inspectors, and as allowed by each of the respective registered authorized user of each of the respective registered said devices;

(k) means for effectively and accurately hearing and recording any and all relevant audible communications or messages from and received into each of the respective registered said devices of each of the respective registered authorized user of each of the respective registered said devices, and, also hearing and recording of any and all relevant composed, transmitted, received and retrieved relevant contents of secured data/information, messages and alerts and other pertinent audibly perceptible reminders of things, according to real-time and date and place, or as set or pre-set in chronological order or at random order or in any desired order of times, dates and places as recorded and retrieved from the internal storage memory or memories of each of the respective registered said devices of each of the respective registered authorized user of each of the respective registered said devices, or as a response or responses by each respective registered authorized said user of each of the respective registered said devices to any and all relevant organization or organizations, or agency or agencies or department or departments or to any and all other second or multi-parties with which each of the respective registered authorized user of each of the respective registered said devices is dealing, and has allowed secured access, reception, transmission, storage and retrieval of any and all relevant data/information;

(l) means for accurate internal communications between relevant components and systems within each of the respective registered said devices, according to the desired tasks as determined or pre-determined by each of the respective registered authorized user of each one of the respective registered said devices, and, according to the relevant program or programs and set programming activated through the built-in microprocessor or microprocessors and its/their internal networks and linkages of each of the respective registered said devices;

(m) means for securely, correctly and accurately processing any and all desired relevant tasks or data/information transmission and reception of any and all relevant data/information through the effective capacities and capabilities of the microprocessor or microprocessor means and any and all the desired activated programs installed within each of the respective registered said devices of each one of the respective registered authorized user of each one of the respective registered said devices;

(n) means for alerting and alarming each of the respective registered authorized user of each of the respective registered said devices, to prevent, halt, thwart or curtail or minimize any and all attempted fraudulent activities that are aimed against the respective registered authorized user of each of the respective registered said devices, and, the respective automatic recording of such fraudulent event or events into the internal storage memory or memories of each of the respective registered said devices of each of the respective registered authorized user of each of the respective registered said devices, and, also the concurrent recording of any and all respective fraudulent event or events in the internal database storage memory or memories of each of the relevant organization or organizations or agency or agencies or department or departments or any other party or multi-parties with which each of the respective registered authorized user of each of the respective registered said devices is dealing, and has allowed secured access, reception, transmission, storage and retrieval of relevant data/information;

(o) means for electronically and instantly securely responding by each of the respective registered authorized user of each of the respective registered said devices to any and all fraudulent alert and alarm activities or warnings, through the use of each of the respective registered said devices;

(p) means for setting an automatic rejection initiated by each of the respective registered authorized user of each one of the respective registered said devices, pertaining to any and all fraudulent transaction or group-transactions or fraudulent event or events not authorized or pre-authorized by each of the respective registered authorized said user of each one of the respective registered said devices, through the use of each of the respective registered said devices;

(q) means for alerting each of the respective registered authorized user of each of the respective registered said devices pertaining to any and all relevant personal, business and professional identity intrusion or intrusions that attempt to breach the privacy of each of the respective registered authorized user of each of the respective registered said devices, without the consent and knowledge of each of the respective registered authorized user of each of the respective registered said devices, through the use each of the respective registered said devices;

(r) means for securely pre-transmitting or transmitting the authorization and authentication of deducting the precise amount of money of each particular transaction or group-transactions to be executed in real-time and date, with or without the GPS location or locations of each relevant respective transaction or group-transactions, as initiated or activated and set wirelessly and securely by each of the respective registered authorized user of each one of the respective registered said devices, through the use of each of the respective registered said devices, and directed to the respective relevant bank or banks or credit card company or companies, before a relevant merchant or a place of business can debit or deduct the relevant respective authorized exact amount of monetary value or exact amount of money specifically submitted or pre-submitted as authorized by the respective owner of the respective credit card or ATM card from where the debiting or deducting of the respective exact submitted or pre-submitted monetary value or exact amount of money can be successfully completed and paid to the relevant respective merchant or place of business, specific to the relevant respective transaction or group transactions as first initiated by the respective registered user;

(s) means for transaction amount and ownership identity matching of the pre-transmitted exact transaction amount and relevant ownership identity of the specific credit card or ATM bank card data/information as pre-transmitted by each of the respective registered authorized user of each one of the respective registered said devices, using each of the respective registered said devices, and matching the transaction amount and relevant ownership identity of the specific credit card or ATM bank card data/information extracted from the respective authorized database, within allowable proximity to real-time and date as electronically submitted by a merchant or a place of business that can result into a completion of a particular transaction or group-transactions, in case there is an optimum transaction match, or else resulting in an automatic or manual or automatic rejection of a particular transaction or group-transactions, in case there is a suspicious or non-tolerable anomalous mismatch of transaction or group-transactions and data/information during comparative data/information matching processes;

(t) means for alerting and alarming each of the relevant respective authorized user of each of the respective registered said devices regarding the respective credit card or ATM bank card, as associated with means of rejecting any mismatched transaction or group-transactions, in case of any misuse or mismatched transaction or group-transaction, coordinated with means of recording the relevant respective misuse or mismatched transaction event or events, through the use of each of the relevant respective registered said devices;

(u) means for recording any and all completed legitimate transaction or transactions or group transactions initiated electronically and/or received by the respective registered authorized said user of each of the respective registered said devices, through the use of the respective registered said devices;

(v) means for inputting into the interactive LCD display window and/or microphone system and recording system of any and all relevant data/information into each of the respective registered said devices of each one of the respective registered authorized user of each of the respective registered said devices, by manual or touch-screen or voice-command manipulations, and to result in interactive visual display and/or audio and/or audio-visual and/or audio-video display of any and all desired secured data/information, iconic symbols, graphics, pictures, scenes, illustrations, drawings, photos, videos, texts, transactions, alerts or messages or any other relevant displayable and audible outgoing relevant data/information, retrieved, and transmitted relevant items;

(w) means for outputting into the interactive LCD display window and/or speaker system of each of the respective registered said devices of any and all desired relevant secured data/information, iconic symbols, graphics, pictures, scenes, illustrations, drawings, photos, videos, texts, transactions, alerts and messages that is or are being worked on, or received by or stored and retrieved from each of the respective registered said devices' internal storage memory or memories and any other relevant displayable electronically transmittable items, and outputting any and all desired audible outgoing, retrieved and transmitted relevant items, which can be audibly perceptible through the speaker means or earphone-transmitting means of each of the respective registered said devices, as properly initiated by each of the respective registered authorized user of each of the respective registered said devices, and as set or pre-set according to the relevant program installed therein, and according to the set programming of each of the respective registered said devices;

(x) means for creating and displaying clearly and legibly on the LCD display window of each of the respective registered said devices of each of the respective registered authorized user of each of the respective registered said devices, showing the specific identifying virtual personal identification card in the exact likeness of the corresponding actual physical personal identification card of the respective person who owns the specific actual personal identification card or organizational membership card, and, also creating and displaying on the same LCD display window the respective specific scan-readable bar-code that respectively represents the same identifying data/information of who owns the actual physical personal identification card or organizational membership card;

(y) means for creating and displaying clearly and legibly on the LCD display window of each of the respective registered said devices of each of the respective registered authorized user of each of the respective registered said devices, showing the respective specific identifying virtual personal or business credit card or virtual ATM bank card and respective specific scan-readable displayed identifying virtual bar-code that represents the respective actual physical credit card or ATM bank card of the respective owner of said personal or business card;

(z) means for photographing the incoming physical personal, business or professional checks to be recorded into the internal memory of each of the respective registered said devices of each of the respective registered authorized user of each of the respective registered said devices, and also means for photographing and transmitting the outgoing signed respective relevant personal or business or professional check or checks with the respective exact assigned amount of monetary value with the specific name to whom said outgoing signed respective relevant personal or business or professional check or checks is or are written for, and then directly transmitting said outgoing signed respective relevant personal or business or professional check or checks to the respective relevant bank or banks, and, means for recording the respective photograph or photograph of said outgoing signed respective relevant personal or business or professional check or checks into the internal storage memory of each of the respective registered said devices, and, the encrypted secured transmission of the exact image of said outgoing signed respective relevant personal or business or professional check or checks of each of the respective registered authorized user of each of the respective registered said devices, in order to prevent check forgery by thieves or unlawful individuals, and also to prevent potential identity thefts;

(aa) means for correctly and properly inputting, recording, displaying and retrieving and encrypting and securely transmitting the personal fingerprints or palm-prints biometrics or iris biometrics or voice biometrics and secret PIN or password of each of the respective registered authorized user of each of the respective registered said devices, including any and all relevant secured data/information of relevant respective credit cards or ATM bank cards or organizational membership cards transmitted to any and all relevant credit card company or companies or bank or banks or to any and all other trusted party or parties allowed by each of the respective registered authorized user of each of the respective registered said devices, and with whom the respective registered authorized user of each of the respective registered said devices is legitimately dealing and has allowed the relevant secured access, reception, transmission, storage and retrieval of any and all relevant data/information;

(bb) means for securely coordinating in transferring any controlled desired amount of money from any chosen legitimate credit card or ATM bank card to the respective built-in Near-Field-Communication, NFC component in each of the respective registered said devices of each of the respective registered authorized user of each of the respective registered said devices, and, means of transferring definite controlled desired amount of monetary value from each of the respective registered said devices to any specific relevant respective responsive NFC-enabled collecting device or devices for direct payments of any and all relevant fees required in fast-lane transportation facilities and to any other relevant respective fast-lane place of business equipped with compatible relevant respective NFC-enabled fee-collection device or devices, and, coordinating the respective relevant recording of any and all accurate corresponding deducted fees or relevant amount of monetary value taken out from each of the respective registered said device's built-in NFC component of each of the respective registered said devices, through the respective internal recorder means and saved into the internal storage memory of each of the respective registered said devices for future retrieval and evidentiary checking or comparing purposes;

(cc) means for swiping and reading any and all compatible physical credit card, ATM bank card, and any other relevant compatible physical membership card into the built-in card swiping slot and magnetic stripe reader of each of the respective registered said devices, so as to obtain the proper desired amount of monetary value from the respectively swiped physical credit card, ATM bank card and any other relevant compatible physical membership card, through accurately reading the proper respective relevant card's correct identification secured data/information imbedded in each of the respective relevant physical card's magnetic stripe, and then inputting the respective correct identification data/information from each of the respective relevant physical card's magnetic stripe into the respective registered said device, the desired amount of monetary value to be deducted from the selected pre-swiped physical credit card or ATM bank card or relevant compatible physical membership card and the corresponding secured wirelessly pre-transmitted amount of funds or amount of monetary value as initiated and sent by each of the respective owner of any and all relevant respective physical ATM bank card, credit card or other specific relevant physical membership card or cards, transmitted to the relevant bank or credit card company or relevant card membership company, before the chosen relevant respective physical credit card or ATM bank card or relevant physical membership card is handed by the respective owner of said respective physical credit card or ATM bank card or relevant physical membership card to the relevant respective merchant or to any other respective relevant place of business, and then further swiped into the respective relevant merchant's or business' transaction swiping device, so that only the respective relevant deduction of the respective exact monetary value or amount can be properly and accurately taken from said chosen and pre-swiped physical credit card or ATM bank card or any other relevant respective physical membership card, thereby ensuring that only the exact amount of monetary value can be deducted by the corresponding respective relevant collecting device or devices of the relevant respective merchant or other place of business from said respective chosen pre-swiped physical credit card or ATM bank card or any other relevant physical membership card, per specific transaction at certain allowable set time and date and place;

(dd) means for using each of the respective registered said devices for securely tagging and verifying each of the respective registered authorized user of each of the respective registered said devices for said respective registered authorized user to achieve easier, convenient and faster entry through the respective airport entry gates and airplanes, if the carrier of each of the respective authorized said devices has/have been pre-approved for clearance for such said entry by the TSA; said each of the respective registered said devices containing within its internal memory the required verifiable virtual documents, such as virtual passports and virtual visas, when required for international travel, virtual driver's license or other virtual identification cards, verifiable photos, personal approved biometrics, flight history and approved flight itineraries, required approved airline tickets, each of which being accessible from within each of the respective registered said device's internal memory, that are each projectable and comparable and verifiable when passing through NFC-installed airport passenger electronic clearance machine or machines with LCD-coordinated electronic visual display comparator means, and checkable on-the spot by the respective authorized assigned airport inspectors or guards;

(ee) means for using each of the respective registered said devices by the respective military personnel and law enforcement agents during military deployment or war or during rescue mission operations, or, utilizable by any and all respective civilian or civilians as means for instant micro-second-to-micro-second, second-to-second, minute-to-minute, hour-to-hour, day-to-day, week-to-week, month-to-month geo-positional and area-to-area guidance toward safety zones and avoidance of dangerous areas, especially during civilian evacuation in case of storms, hurricanes, floods, tsunamis, tornadoes, earthquakes, fires or terrorist threats and other dangerous incidents, and means for utilizing said devices in order to prevent and diminish the occurrence and commitments of school bullying and other potential criminal activities such as rape and hold-ups and kidnappings and car-napping, hostage taking and home and business robberies or privacy invasions;

(ff) means for supplying and controlling routing of electronic and energy flow from a main electrical power source to any and all relevant components and systems for the proper functioning of the various tasks needed and desired by each respective registered authorized user of each respective registered said devices;

(gg) means for supplying and controlling supplementary electrical power in said devices for proper functioning of said devices;

(hh) means for controlling and supplying the various required optimal voltages of electrical power to the corresponding requirements of relevant various components within each respective registered said devices;

(ii) means for translating, recording and transmitting and retrieving messages or data/information from one language to another from text to voice and vice versa from voice to text.

2. Devices as defined in claim 1, wherein the at-least said plurality of any said combination is a minority of said combination.

3. Devices as defined in claim 1, wherein the at-least said plurality of any said combination is a majority of said combination.

4. Devices as defined in claim 1, wherein each of said devices operating with a coordinating system, can also compatibly coordinate with any other compatible system or systems and/or sub-systems through Bluetooth means or infrared means.

5. Devices according to claim 1, wherein said devices mainly operate by manual push-button means and/or by voice-command means.

6. Devices according to claim 1, wherein said devices operate by a combination of manual push-button means, touch-screen means and voice activation means.

7. Devices according to claim 1, wherein each of said devices has a built-in anti-device-loss alarm and messaging operating means made possible through the use of activated built-in distance-sensor in each respective said devices in coordination with paired compatible distance-sensor or distance-sensors of any and all cooperating wirelessly linked compatible paired distance-sensor equipped devices.

8. Devices according to claim 1, wherein each of said devices can be used as a remote control for locking and unlocking cars, triggering or starting the ignition system or temperature control system of wirelessly compatible inter-linked cars, homes or offices, or can be used as a remote control to add more parking time for a cooperating wirelessly linked compatible parking meters or operating as a remote control for activating or deactivating and controlling any and all other wirelessly linked compatible electronic devices, such as television sets, home speaker systems, ovens, microwave cookers, stoves, and refrigerators, whether located at home, office or located at any other relevant wirelessly linked facilities in any geographical locations in the world.

9. Devices according to claim 1, wherein each of said devices can be used to automatically ring an alarming sound or trigger vocal message or messages to enable each of the respective registered user of each respective registered said devices to answer a wired home phone or office telephones, whether located within immediate range, intermediate range or located in a remote range.

10. Devices according to claim 1, wherein each of said devices can operate as an immediate or instant access for the quick retrieval of various selected or required data/information or photo or image of where hidden things such as documents and relevant other items which are needed to be instantly found can be located immediately, by revealing through the LCD display window and speaker system of each respective registered said devices, by command means such as by voice-command or touch screen command or manual command, in order to retrieve from each of the respective registered said device's internal storage memory the relevant data/information previously stored therein, according to the dates and times and GPS location or name of the place where such said data/information or photo or image has/have been previously taken and stored into the specific internal storage memory of each of the respective registered said devices, and retrievable from each of said devices.

11. A method inclusive of sub-methods providing effective applicability for electronic multi-functional telecommunication devices to function as dedicated customer-controlled instant-response anti-fraud and anti-identity theft wireless mobile devices with true-personal identity verifications, and, providing effective coherent compatible coordination with any other relevant devices, methods and systems, allowing for the effective programming, receiving, pre-transmitting, transmitting and communicating of any and all legitimate secured data/information transactions, messages and interactive telephonic and internet activities and events of said electronic multi-functional telecommunication devices; said method inclusive of sub-methods also providing said electronic multi-functional communication devices to achieve effective and accurate instant-reception, instant-response and instant-transmission pertaining to any and all audio-visual alerts or alarms and messages relevant to any and all transactional errors, fraudulent claims and identity-theft activities, in order to halt, thwart, control, prevent and minimize the commitment of transactional errors or event error entries and erroneous operations, transactional fraud and event fraud and identity-theft activities attempted or made by any and all fraudulent persons, fraudulently programmed machines or fraudulent devices or malware programs, fraudulent groups or fraudulent organizations, aimed against any and all legitimate customers, consumers, businesses, merchants, banks and credit card companies, private and public insurance companies, government and private medical health care insurance agencies or institutions, and any other relevant legitimate organizations, agencies or departments, using said method inclusive of said specific sub-methods; said method inclusive of sub-methods implementable within local, state, national and worldwide scale with inter-linking coordinated tamper-proof secured operational apparatuses, relaying means and verifiable and authenticating and authorizing networks and securely protected databases; and, said method inclusive of sub-methods especially made effectively possible by providing a major shift of control to any and all relevant participating mass-people-power, internationally, through the expansive and secured coordinated instant-response and interactivity participations of each one of the millions of individual respective registered authorized users of each one of the respective said electronic multi-functional telecommunication devices, involving a plurality of any and all combinations of the following sub-methods, comprising of the following:

(a) a sub-method for securely and accurately registering and electronically linking each one of the respective said electronic multi-functional telecommunication devices with each one of the respective registered authorized users of each one of the respective said devices in secured communications with any relevant respective organization or organizations, such as bank or banks, credit card company or companies, medical/health insurance company or companies, home and vehicle insurance companies, home mortgage companies, and any and all other relevant legitimate membership organization or organizations, such as health club or clubs, school or schools or agency or agencies, such as the Transportation Security Agency, and any other relevant travel agency or agencies, or department or departments, such as Department of Motor Vehicles, Immigration and Naturalization Services, Social Security Department, Department of Homeland Security, labor union or unions, and any police department or departments, and any other relevant communication organizations, such as phone company or companies and internet provider or providers, with which each respective authorized registered users of each respective registered said devices is dealing, and allowing secured access, transmission and storage of relevant data/information, using said sub-method, so as to ensure instant-secured two-way or multi-way communication or communications between each one of the respective authorized users of each one of the respective registered said devices, including any other party or multi-parties which each respective authorized registered users of each one of the respective registered said devices is dealing, and allowing secured access, transmission and storage of respective relevant secured data/information, and, in order to ensure definite verifiable tie-in and correct and accurate link between each one of the respective authorized registered user of each one of the respective registered said devices that is authenticated and authorized as the real respective authorized registered user of each one of the respective said devices, through the secured use of each one of the respective registered said devices, and through the use of other relevant secured means, methods and systems for the accurate secured registration of each one of the respective authorized registered user of each one of the respective registered said devices, and, also, said sub-method providing the correct and accurate assurance that each one of the respective authorized registered user of each one of the respective registered said devices is really the true and verifiable authorized and authenticated registered user of each one of the respective registered said devices, as can be instantly and securely and safely stored and retrievable and provable in the corresponding electronic verifiable and accurate tamper-proof secured corresponding relevant database or databases of each relevant respective organization or organizations or agency or agencies or department or departments and their respective secured networks and providers, with which each one of the respective authorized registered user of each one of the respective registered said devices is dealing and allowing secured access, transmission and storage of any and all relevant data/information, as well as verifying the accurate corresponding secured storage of any and all relevant secured data/information as concurrently stored also in the internal storage memory of each one of the respective registered said devices for further real-time transactional uses or event usage by either/or both any and all relevant respective organization or organizations or agency or agencies or department or departments, and any other party or multi-parties, such as merchants, with which each respective authorized registered said user of each one of the respective registered said devices is dealing and allowing secured access, transmission and storage of any and all relevant data/information during any and all transactional and communication events;

(b) a sub-method for authorizing or pre-authorizing and validating and authenticating the respective kind and the respective monetary amount or amounts of specific transactional event or events or any and all other relevant activity event or events happening in real-time and date or happening in scheduled relevant times and dates, made or initiated and controlled by the respective registered authorized said user of each one of the respective registered said devices through the use of each one of the respective registered said devices, with any relevant organization or organizations or agency or agencies, or department or departments or any other party or parties, with which each one of the respective registered authorized said user of each one of the respective registered said devices is dealing, and allowing relevant secured data/information access, transmission and storage;

(c) a sub-method for electronically authenticating to any and all relevant organization or organizations, agency or agencies, department or departments or any other party or parties, the verifiable true-personal identity of the respective authorized said user of each one of the respective registered said devices, through the use of each one of the respective registered said devices, by means of encrypted code or password and/or biometric identification means, such as the use of safely protected secured true-personal photo or photos or image or images, fingerprints or iris or voice biometrics of each one of the respective authorized registered said user of each one of the respective registered said devices as stored and retrievable and verifiable from the internal storage memory or memories of each one of the respective registered said devices, and also, as stored and retrievable from the accurate relevant secured databases of the relevant organization or organizations, agency or agencies or department or departments or any other party or parties with which each one of the respective authorized registered said user of each one of the respective registered said devices is dealing, and allowing relevant data/information access, transmission and storage, according to the desires and needs of each one of the respective authorized registered said user of each of the respective registered said devices, and as electronically communicated securely through relevant electronic communication secured networks, through secured wireless or wired or optical transmission means, methods and systems or the combination of relevant said secured transmission means, methods and systems;

(d) a sub-method for accurately electronically concluding or completing any and all secured personal and business and professional transaction or transactions and other relevant event or events and content communication or communications, verification or verifications, reporting and approval or approvals and secured storage or storages of any and all legitimate monetary transaction or transactions or automatic and recordable rejection or rejections of any and all anomaly or anomalies or non-verifiable enquiry or enquiries and any and all suspicious fraudulent claim or claims and private identity intrusion or intrusions, through the use of each one of the respective registered said devices being used by each one of the respective authorized registered user of each one of the respective registered said devices, relevant methods, sub-methods and systems;

(e) a sub-method for effectively and automatically using the built-in GPS component, and timer and clock and calendar means of the each one of the respective registered said devices operated or used by each the respective authorized registered user of each one of the respective registered said devices, to determine and record both the close proximity or proximities and times and dates and geographical locations of each one of the respective authorized registered user of each one of the respective registered said devices, with each one of the respective registered said devices, and, also to determine and record the close proximity or proximities and times and dates and geographical locations of both each one of the respective authorized registered user of each one of the registered said devices to each one of the respective registered said devices, in coordinating accordingly with the close proximity or proximities of any and all relevant respective registered GPS-responsive device or devices of any relevant second or multi-parties claimant or claimants, and, recordable in real-times and dates and geographical locations, if desired, and recorded to and retrievable from both the internal storage memory or memories of each one of the respective registered said devices of each one of the respective authorized registered user of each one of the respective registered said devices, and, recorded, also into and retrievable from the internal memory or memories storage or storages of the relevant respective GPS-responsive registered device or devices of any and all respective registered second or multi-parties claimant or claimants, and, also recorded in the storage memory or memories of the corresponding respective database or databases of the relevant organizations, such as banks, or credit card companies or insurance companies, mortgage companies or other relevant organization or organizations, agency or agencies, department or departments with which each one of the respective authorized registered user of each one of the respective registered said devices is dealing, or allowing relevant secured data/information access and verification or authentication and authorization of transmission and storage, in order to effectively prevent, halt, thwart and curtail or minimize the occurrence of fraudulent transactions and fraudulent event or events and charge or charges and all illegal fraudulent billing claims as may be in cases of false insurance patient-not-present billings or fraudulent insurance claims such as false charges of services and items charges or billing charges not given or rendered to the respective insured patients, and fraudulent-on-the-spot transaction or transactions and fraudulent privacy event intrusion or intrusions;

(f) a sub-method for also using the built-in GPS, timer and clock and calendar means in concurrently validating or authenticating the true and accurate physical presence each one of the respective registered authorized user of each one of the respective registered said devices in certain restricted locations, such as in airports, airplanes, or other sensitive restricted areas, recordable in real-time or times and date or dates at specific geographical location or locations, and, denying and halting the physical entry and continued presence of any and all suspicious character or characters at relevant certain restricted areas, to effectively enforce more stringent and secured ways or deterrents in combating terroristic threat or threats or potential crimes before acts of terrorism and other crime or crimes can be committed within airports, planes and other restricted tight-security areas and danger-laden places or zones;

(g) a sub-method for accurately controlling, managing, composing, alerting and alarming and editing of communications and messages received or made from each one of the respective registered said devices by each one of the respective authorized registered user of each one of the respective registered said devices, through the use of anti-fraud and anti-identity-theft programs installed and activated within each one of the respective registered said devices, operated by each one of the respective registered authorized user of each one of the respective registered said devices;

(h) a sub-method for securely transmitting and/or pre-transmitting electronic communication secured data/information contents and messages made from each one of the respective registered said devices by each one of the respective registered authorized user of each one of the respective registered said devices, directed to any and all relevant targeted organization or organizations, agency or agencies or department or departments or any and all other second or multi-parties with which each one of the respective registered authorized said user of each one of the respective registered said devices is dealing, and has allowed secured access, transmission and storage of secured relevant data/information, according to specific real-time time or times and date or dates as set or pre-set by each one of the respective registered authorized user of each one of the respective registered said devices, as directed to relevant said targeted organization or organizations or agency or agencies or department or departments or to any other relevant second or multi-parties with which each one of the respective registered authorized user of each one of the respective registered said devices is dealing, and has allowed relevant secured data/information access, transmission and storage;

(i) a sub-method for effectively and securely receiving accurate secured communications and secured data/information contents and messages into each one of the respective registered said devices of each one of the respective registered authorized user of each one of the respective registered said devices, as sent from any and all or some of the relevant organization or organizations or agency or agencies or department or departments, or from any other relevant second or multi-parties with which each one of the respective registered authorized user of each one of the respective registered said devices is dealing, and has allowed secured access, transmission and storage of relevant secured data/information access and transmission and storage;

(j) a sub-method for effectively and accurately and legibly visually displaying on the LCD display window of each respective registered said device of each respective registered authorized user of each respective registered said devices, of any and all composed, transmitted, pre-transmitted, received and retrieved relevant contents of data/information, alerts and alarms and messages, icons, graphics, and other objects or images, such as personal photos, videos, sceneries, virtual membership cards, virtual passports, virtual credit cards, virtual bank cards, virtual school IDs, virtual driver's license, virtual access cards, virtual airline tickets, travel itineraries, relevant airlines for travel itineraries, according to relevant scheduled times and dates of arrivals and departures, tagged luggage, places or locations of hidden things, lists of things, reminders of things and events and other pertinent things or events, according to the desired needs of each one of the respective registered authorized said user of each one of the respective registered said devices, and/or, according to the requested relevant items required by any and all relevant legitimate inspectors as imposed to, according to relevant official regulations or as allowed by each one of the respective registered authorized user of each one of the respective registered said devices;

(k) a sub-method for effectively and accurately hearing and recording any and all relevant audible communications or messages from and into each one of the respective registered said devices of each one of the respective registered authorized user of each one of the respective registered said devices, and, also for effectively and accurately hearing and recording any and all relevant composed, transmitted, pre-transmitted, received and retrieved relevant contents of data/information, messages and alerts and alarms and other pertinent audibly perceptible reminders of important things or events, according to real-time or times and date or dates and place or places, or, as set or pre-set in chronological order or at selected time or times and date or dates and place or places as recorded and retrieved from either or both the internal storage memory or memories of each one of the respective registered said devices of each one of the respective registered authorized user of each one of the respective registered said devices, or, as a response or responses to the request of each one of the respective registered authorized user of each one of the respective registered said devices, received from any and all relevant organization or organizations, or agency or agencies, or department or departments, or any and all other second or multi-parties with which each one of the respective registered authorized user of each one of the respective registered said devices is dealing, and has allowed secured access, transmission and storage of relevant data/information;

(l) a sub-method for accurate internal and external communications between relevant components within each one of the respective registered said devices, according to the desired tasks as determined or pre-determined by each one of the respective registered authorized user of each one of the respective registered said devices, and, according to the relevant program or programs and set programming activated through each one of the built-in micro-processor or microprocessors and internal and external networks and linkages of each one of the respective registered said devices;

(m) a sub-method for correctly and accurately processing whatever relevant desired specific and/or general relevant tasks and data/information transmission and reception of any and all relevant secured data/information through the effective capacities and capabilities of the microprocessor means and any and/or the desired activated programs installed within each one of the respective registered said devices of each one of the respective registered authorized user of each one of the respective registered said devices;

(n) a sub-method for alerting each one of the respective registered authorized said user of each one of the respective registered said devices, to prevent, halt, thwart or curtail and minimize any and all attempted fraudulent activities aimed against each one of the respective registered authorized user of each one of the respective registered said devices, and the respective automatic recording of such fraudulent events into the internal storage memory or memories of each one of the respective registered said devices of each one of the respective registered authorized user of each one of the respective registered said devices, and, also the concurrent recording of the respective fraudulent event or events in the internal storage memory or memories of the relevant organization or organizations or agency or agencies or department or departments or any other party or multi-parties with which each one of the respective registered authorized said user of each one of the respective registered said devices is dealing, and has allowed secured access, transmission and storage of relevant data/information;

(o) a sub-method for electronically instantly responding by each one of the respective registered authorized user of each one of the respective registered said devices, to any and all fraudulent alert activity or activities or warning or warnings through the use of each one of the respective registered said devices;

(p) a sub-method for setting an automatic rejection initiated by each one of the respective registered authorized user of each one of the respective registered said devices, pertaining to any and all fraudulent transaction or transactions or fraudulent event or events not authorized or pre-authorized by each one of the respective registered authorized user of each one the respective registered said devices, through the use of each one of the respective registered said devices;

(q) a sub-method for alerting or alarming each one of the respective registered authorized user of each one of the respective registered said devices, pertaining to any and all relevant personal, business, professional identity intrusions that attempt to breach the privacy of each one of the respective registered authorized user of each one of the respective registered said devices, without the consent and knowledge of each one of the respective registered authorized user of each one of the respective registered said devices, through the use each one of the respective registered said devices;

(r) a sub-method for securely pre-transmitting or transmitting the precise amount of money of each particular transaction or transactions in real-time or times and date or dates or in scheduled or pre-scheduled time or time and date or dates, with or without the GPS location or locations of each transaction or group-transactions as initiated or activated by each one of the respective registered authorized user of each one of the respective registered said devices, through the use of each one of the respective registered said devices, wirelessly and securely directed to any and all relevant bank(s) or credit card company or companies, before any and all relevant merchant or merchants or place or places of business can debit or deduct the corresponding respective authorized amount of monetary value specifically submitted by each one of the respective owner or user of each respective relevant credit card or ATM card from where the debiting or deducting of the corresponding respective exact monetary value or amount of money can be successfully consummated by the relevant merchant or merchants or place or places of business, as specific to each relevant respective transaction or transactions;

(s) a sub-method for transaction matching between the pre-transmitted transaction amount, relevant true-personal identity and credit card or ATM bank card data/information ownership as pre-transmitted by each one of the respective registered authorized user of each one of the respective registered said devices, using each one of the respective registered said devices, and the transaction amount, relevant true-personal identity and credit card or ATM bank card data/information ownership, within allowable proximity to real-time or times and date or dates, with or without GPS location or locations as electronically submitted by a merchant or merchants or a place or places of business that can result into a consummation or completion of each particular transaction or group transactions in case there is an optimum transaction match, or, resulting in an automatic or manual rejection of any and all particular transaction or transactions, in case there is suspicious or non-tolerable mismatch of transaction or group transactions and data/information mismatch;

(t) a sub-method for alerting or alarming each one of the relevant respective authorized user of each one of the respective registered said devices regarding the respective relevant credit card or ATM bank card as associated with relevant means, methods and processes of rejecting any and all mismatched transactions or group transactions, in case there is any misuse or transaction mismatch, coordinated with relevant means, methods and processes of recording such said relevant misuse or misuses or mismatch transaction or transactions or mismatch event or events, through the use of each one of the relevant respective registered said devices;

(u) a sub-method for recording any and all consummated legitimate transactions made or initiated electronically by each one of the respective registered authorized user of each one of the respective registered said devices, though the use of each one of the respective registered said device or devices;

(v) a sub-method for inputting into the interactive LCD display window of the respective registered said device, of any and all relevant data/information, by manual or touch-screen or voice-command activities, and, to result in interactive visual display or displays and/or audio and/or audio-visual and/or video display or displays of whatever desired data/information, iconic symbols, graphics, pictures, scenes, illustrations, drawings, photos, videos, text, transactions, alerts or messages or any other relevant other displayable and or audible received, outgoing, retrieved or transmittable or transmitted or pre-transmitted relevant items, events or other relevant items;

(w) a sub-method for outputting into the interactive LCD display window of each one of the respective registered said devices of any and all desired relevant data/information, iconic symbols, graphics, pictures, scenes, illustrations, drawings, photos, videos, text, transactions, alerts or messages that is/are being worked on, or received or retrieved from each one of the respective registered said devices' internal storage memory or memories or any other relevant displayable electronically transmittable items, events or other pertinent items and/or outputting any desired audible outgoing, retrieved or transmittable or transmitted or pre-transmitted relevant items, events or things which can be audibly perceptible through the speaker means or earphone-transmitting means of each one of the respective registered said devices, as properly initiated by each one of the respective registered authorized user of each one of the respective registered said devices, and as set or pre-set according to the relevant program or programs installed therein each respective registered said devices, and according to the set programming of each one of the respective registered said devices;

(x) a sub-method for creating and displaying clearly and legibly on the LCD display window of each one of the respective registered said devices of each one of the respective registered authorized user of each one of the respective registered said devices, showing the specific identifying virtual personal identification card in the exact likeness of the corresponding actual physical personal identification card of the respective person who owns the specific actual personal identification card or organizational membership card, and, also creating and displaying on the same LCD display window the specific scan-readable bar-code that respectively represents the same identifying accurate data/information of who owns the actual physical personal identification card or organizational membership card;

(y) a sub-method for creating and displaying clearly and legibly on the LCD display window of each one of the respective registered said devices of each one of the respective registered authorized user of each one of the respective registered said devices, showing the specific identifying virtual personal or business credit card or virtual ATM bank card and the respective specific scan-readable displayed identifying virtual bar-code that represents the respective actual physical credit card or ATM bank card of each one of the respective owner of said personal or business card;

(z) a sub-method for photographing the incoming physical personal and/or business check or checks to be recorded into the internal memory of each one of the respective registered said devices of each one of the respective registered authorized user of each one of the respective registered said devices, and/or photographing and transmitting each one of the relevant outgoing signed respective check or checks with the respective exact assigned monetary amount and to whom said signed respective relevant check or checks is written for, and, then directly transmitting to the respective relevant bank or banks, with relevant means, methods and processes for recording each one of the respective photograph or photographs of the signed respective relevant outgoing check or checks into the internal storage memory of each one of the respective registered said devices, and, the encrypted secured transmission of the exact image of said signed respective relevant outgoing personal or business checks of each one of the respective registered authorized user of each one of the respective registered said devices, in order to prevent check forgery by thieves or unlawful individuals, and also to prevent identity theft;

(aa) a sub-method for correctly and properly inputting, recording, displaying and retrieving and encrypting and securely transmitting the personal fingerprint biometrics or iris biometrics and/or secret password and/or voice-print biometrics of each one of the respective registered authorized user of each one of the respective registered said devices, including any and all relevant secured data/information of relevant credit cards or ATM bank cards or organizational membership cards transmitted to any and all relevant credit card company or companies or banks or any other trusted party or parties allowed by each one of the respective registered authorized user of each one of the respective registered said devices, and with whom each one of the respective registered authorized user of each one of the respective registered said devices is legitimately dealing, and has allowed the secured relevant transmission, access and storage of any and all relevant data/information;

(bb) a sub-method for securely coordinating in transferring any controlled desired amount or amounts of money from any chosen legitimate credit card or ATM bank card to the respective built-in Near-Field-Communication (NFC) component in each one of the respective registered said devices of each one of the respective registered authorized said user of each one of the respective registered said devices, and, involving any and selected relevant means, methods and processes of transferring definite controlled desired amount or amounts of money from each one of the respective registered said devices to any specific relevant respective responsive NFC-collecting device or devices for direct payments of any and all relevant fees required in fast-lane transportation facilities or to any other relevant fast-lane place or places of business equipped with compatible relevant respective NFC-enabled fee-collection device or devices, and, coordinating the respective relevant recording of any and all accurate corresponding deducted fees or relevant amount or amounts of money taken out from each one of the respective registered said device's built-in NFC component of each one of the respective registered said devices through the respective internal recorder relevant means, methods and processes, and saved into the corresponding internal storage memory or memories of each one of the respective registered said devices for future retrieval and checking and reviewing and for accurate evidentiary purposes;

(cc) a sub-method for swiping and reading any compatible credit card or ATM bank card or any other relevant membership card or rewards card, as engaged into each one of the built-in card swiping slot and magnetic stripe reader of each one of the respective registered said devices, so as to obtain the proper desired amount of money from the respectively swiped credit card or ATM bank card or from any other relevant membership card or rewards card, through accurately reading the proper respective relevant card's correct identification data/information encoded in the respective relevant card's magnetic stripe, and then inputting the respective correct identification data/information from each one of the respective relevant card's magnetic stripe into each one of the involved respective registered said devices, including the entered desired amount of money to be deducted from the respective relevant selected pre-swiped credit card of ATM bank card or other relevant membership card or rewards card, and then followed by the wireless secured pre-transmission of the exact amount or amounts of funds or amount or amounts of money as initiated by each one of the respective owner of any and all relevant respective ATM bank card or other specific relevant membership card or rewards cards and then pre-transmitted to the relevant bank or credit card company or relevant membership company or other relevant entities, before the chosen relevant respective credit card or ATM bank card or relevant membership card or rewards card is directly handed by each one of the respective owner of each one of the respective credit card or ATM bank card or relevant membership card or rewards card, to the relevant respective merchant or merchants or to any other respective relevant place or places of business, and then further swiped into the respective relevant merchant's or business' transaction swiping device, in order to ensure that only the specified pre-transmitted respective exact monetary amount can be properly and accurately deducted from said selected customer/owner pre-swiped credit card or ATM bank card or relevant respective membership card or rewards card, to be taken by the corresponding respective relevant merchant's or place of business' collecting device or devices of the relevant respective merchant or place of business, as per the specific transaction within whatever programmed allowable relevant nearest approximate time, date and place when and where the exact relevant monetary deduction is to be consummated;

(dd) a sub-method for using each one of the respective registered said devices for securely tagging and verifying each one of the registered authorized said user of each one of the respective registered said devices for his or her easy and faster entry through the respective airport entry gates and airplanes, if the carrier of each one of the respective authorized said devices has been pre-approved for clearance for such said entry by the TSA; each one of the respective registered said devices containing within its internal memory the required verifiable virtual documents, such as virtual passports and visas when required for international travel, virtual driver's license or other virtual identification cards, verifiable virtual photos, personal approved biometrics, verifiable exact copies of flight history or approved flight itineraries, required copies of approved airline tickets, which are accessible from within each one of the respective registered said device's internal memory, and that are and can be conveniently and instantly projectable and comparable and verifiable when passing through NFC-installed airport passenger electronic clearance machine or machines with LCD coordinated electronic visual display comparator, checkable on-the spot by the respective relevant assigned airport and airline inspectors and/or assigned registered airport and airline guards;

(ee) a sub-method for using each one of the respective registered said devices by the military and law enforcement agents during military deployment or war or during rescue mission operations, or, used by the civilian population as safety means, sub-method and processes for instant minute-to-minute geo-positional and area-to-area guidance to safety and avoidance of danger zones especially during civilian evacuation in case of storms, hurricanes, floods, tsunamis, tornadoes, earthquakes, fires or terrorist threats and other dangerous incidents.

12. A method inclusive of relevant sub-methods as defined in claim 11, wherein the at-least a plurality of any combination of said sub-methods total into a minority of said any combination of sub-methods.

13. A method inclusive of relevant sub-methods as defined in claim 11, wherein the at-least a plurality of any combination of said sub-methods, total into a majority of said any combination of said sub-methods.

14. A method inclusive of relevant sub-methods as defined in claim 11, wherein a relevant selected sub-method or sub-methods can operate effectively with other coordinating compatible other methods, systems and devices such those equipped with Bluetooth or infra-red components.

15. A method inclusive of relevant sub-methods according to claim 11, wherein a relevant selected sub-method or sub-methods can mainly operate by manual means and/or by voice-command means, methods and processes.

16. A method inclusive of relevant sub-methods according to claim 11, wherein a relevant selected sub-method or sub-methods can operate by a combination of manual push-button, touch-screen and voice activation means, methods and processes.

17. A method inclusive of relevant sub-methods according to claim 11, wherein a relevant selected sub-method or sub-methods can operate with any and all compatible anti-device-loss alarm and messaging operations and capabilities activated by distance-sensor means, methods and processes.

18. A method inclusive of relevant sub-methods according to claim 11, wherein a relevant selected sub-method or sub-methods can be used to activate effective remote control operations applicable for locking and unlocking cars, triggering or starting the ignition system and/or temperature control systems of cars or can be used as for wirelessly remote controlling and wirelessly adding more wirelessly transmittable fees to be able to add additional parking time for relevant compatibly linked parking meters; said method inclusive of relevant selected sub-method or sub-methods can be also be used in effectively operating as to enable the respective registered authorized said user of each respective registered said devices for effectively remote controlling the activation or deactivation of any other wirelessly linked compatible electronic devices, whether located at home, in the office or offices or at any other relevant wirelessly compatible linked facilities in any other wirelessly accessible geographical locations in the world.

19. A method inclusive of relevant sub-methods according to claim 11, wherein a relevant selected sub-method or sub-methods can be effective in automatically causing a variety of ringing sounds in order to enable a registered user of said sub-method and respective registered said device to answer a wired home or office telephones, or another wireless phone or phones, whether located within immediate range or intermediate range or at some operational remote range.

20. A method having sub-methods according to claim 11, wherein a relevant selected sub-method or sub-methods can cause the operation of instantly inputting into as well as accessing from a relevant respectively registered device to effectuate for the quick data/information inputting and retrieval display of any desired internally memory-stored photo or photos of image or images, and in relation to the specific immediate surroundings of where the respective things are hidden or stored, such as where certain desired documents and/or relevant other items that are immediately needed to be found or located can be instantly revealed through the LCD display and speaker system of each respective registered said devices, through certain command means such as by voice-command or touch screen command or manual command, in order to retrieve from each one of said respective registered said devices' internal storage memory or memories the relevant data/information previously stored therein, according to the dates and times, with or without GPS location or name of place where such important desired documents or data/information or photo or image has/have been previously taken and stored into the internal storage memory of each one of the respective registered said devices and retrievable from the respective registered said devices.

21. Methods for effective and coherent implementation to any and all customer-controlled instant-response anti-fraud and anti-identity theft devices and systems, equipped with true-personal identity verification applications, aimed to prevent and halt and curtail the commitment of transactional fraud, identity fraud, communication fraud, identity theft, bank account and credit card theft and fraud, illegal insurance claims fraud, school bullying, airport and airline mishaps, terroristic threats and activities, and erroneous transactional entries, in order to securely and immediately protect and safeguard each respective authorized registered user of each respective registered said devices; said methods providing for effective implementation to initiate, coordinate and consummate any and all wireless, secured and accurate inter-linking reception, transmission, pre-transmission, memory storage and retrieval of any and all data/information contents and exchange between each respective authorized registered said user of each respective registered said devices, and any and all legitimate relevant specific bank or banks and/or credit card company or companies or any other relevant legitimate organization or organizations, agency or agencies, company or companies, department or departments, as officially, legally and accurately associated, linked and coordinated with each respective registered authorized user of each respective registered said devices and each respective registered said devices, utilizing said methods that utilize instant-alarm and instant-response functionalities, and providing also the relevant functional effective methods to enable each of the respective registered said devices to input, store, retrieve, visually display and audibly output whatever required and secured true-personal identity verification of each respective authorized registered said user through each of the respective registered said devices, and, moreover providing methods for verifying, validating and authenticating virtual personal, business or organizational documents, and biometrics of each respective authorized registered said user of each respective registered said devices, and, including further relevant methods to achieve instant and constant advisory precautions, safety and security guidance to each respective authorized registered user of each respective registered devices, during any and all forms or types of dangerous conditions or situations; said methods capable of coordinating effectively with any and all relevant processing means, transmission means, reception means, value representation means, audio-visual interactive means, micro-processing means and both personal and machine readable means; said methods comprising of:

(a) initially registering a specific user of each respective specific device and concurrently initially registering also said respective specific device to said specific user to establish an accurate tie-in or link accurately and directly associating both the registered specific user to the respective registered specific device, and then associating both said respective registered user and the respective registered specific device, to any and all relevant selected specific bank or banks or credit card company or companies, or any other relevant specific organization or organizations, agency or agencies companies, department or departments or any other relevant second and third party or parties;

(b) establishing certain secured transmission method or methods with any and all relevant effective compatible processing means, coordinating with any and all relevant networking means, database referral and storage means and data/information retrieval means between the specific registered user and the respective registered specific device with any and all relevant specific bank or banks or credit card company or companies or any other relevant organization or organizations, agency or agencies companies, department or departments or any other relevant second or third party or parties as associated or coordinated with said specific registered user of said respective registered specific device;

(c) establishing certain instant-response interactive alerting or alarming and messaging method or methods with secured reception and transmission methods and means between said specific registered device and said specific registered user of said specific registered device, coordinating responsibly and accurately with the relevant respective specific bank or banks or credit card company or companies or any other relevant organization or organizations, agency or agencies companies, department or departments, or any and all other relevant second or third parties associated or coordinated with said specific registered user of said specific registered device;

(d) processing accurately an ongoing transaction or group transactions, and also accurately processing and managing of future pre-set transactions, and also accurately processing past transactions when retrieved;

(e) validating and authenticating of any and all relevant data/information contents and exchange;

(f) confirming a validated and authenticated transaction, whether presently occurring or occurring in the future or having occurred in the past;

(g) rejecting automatically by said respective registered specific device or by the respective registered user of said respective registered specific device using said respective registered specific device pertaining to any and all invalid transaction or transactions or event or events, data/information and transaction error entry or error entries, fraudulent transaction or transactions, fraudulent claim or claims, fraudulent event or events, and recording of said rejecting or rejection of any and all relevant invalid transaction or transactions or event or events, fraudulent transaction or transactions, fraudulent claim or claims or fraudulent event or events in said specific registered device' memory;

(h) finalizing and completing any and all legitimate and authenticated and validated legitimate transaction or transactions or event or events;

(i) storing any and all validated and authenticated transaction or transactions or event or events, and recording such said validated and authenticated legitimate transaction or transactions or event or events in said respective registered specific device's memory, as well as recording said validated and authenticated legitimate transaction or transactions or event or events in relevant databases of each relevant respective organization or organizations, institution or institutions, agency or agencies, department or departments and/or in the databases of any and all other relevant second and third party or parties which each respective registered user of each respective registered specific device is dealing with and has allowed access, transmission, messaging, alerting, inter-communications, recording, retrieval and display of any or all pertinent relevant secured data/information.

22. A method having a first initial preparatory sub-method, and having also other specific sub-methods applicable for smart telecommunication devices coordinating with internal and external systems, integrated components, software programs and data/information and command processors, electronic relaying and control and distribution links, electrical power supplies power, input, output, storage, retrieval, and audio-visual display, providing secured protection to each one of the registered real owner/user of each one of the respective registered said smart telecommunication devices, equipped with secured instant-response anti-fraud and anti-identity theft programs, functions and capabilities, in order to halt, prevent and minimize fraud, identity theft and transactional errors that threaten to victimize any one or more of the respective registered real owner/user of each one of the respective registered smart telecommunication devices, and also providing secured true-personal identity verifications of each one of the respective registered said real owner/user of each one of the respective registered smart telecommunication devices, through the use of secret PIN or PINs or password or passwords and/or encrypted personal biometrics such as fingerprints, palm prints, voice prints or iris biometrics, and, showing authenticated ownership of certain specific true virtual documents, such as true virtual membership card or cards, true virtual bank card or cards, true virtual credit card or cards, true virtual driver's license, true virtual passport, true virtual visas, true virtual insurance card or cards, true virtual Medicare card, true virtual Medicaid card, true virtual social security card, true virtual automobile insurance card or cards, true virtual home insurance card or cards, or true virtual birth certificate or other true virtual certificates, true virtual property ownership card or cards or certificate or certificates, true virtual employee card or cards, true virtual employer card or cards, true virtual diploma or diplomas, true virtual restricted area entry and exit card or cards, true virtual ticket or tickets, such as true virtual airline ticket or tickets, true flight travel itineraries, true virtual family photos, true virtual photos of associates, friends or relatives of each of the respective registered said real owner/user of each one of the respective registered smart telecommunication devices, and other true virtual items, in order to assist and empower each of the respective registered said real owner/user of each one of the respective registered said smart telecommunication devices during any and all required inspections and true verifications of the personal presence of each of the respective registered said real owner/user of each one of the respective registered smart telecommunication devices, in relevant gates or entries in certain restricted areas such as in specific airport or airports or aircraft or aircrafts, or entries into relevant countries or border zones, and, furthermore, providing sub-methods for instant-response precaution, advice, safety, security and guidance protections to each one of the respective registered said real owner/user of each of the respective registered said smart telecommunication devices, which can be very helpful and important to prevent harm or injuries to each one of the respective registered said real owner/user of each of the respective registered said smart telecommunication devices before, during and after emergencies, rescue operations, military deployments and war, law enforcement operations, natural calamities such as hurricanes, tornadoes, tsunamis, earthquakes, mass evacuations, terroristic and other hazardous situations, such as harmful explosions, shootings, robberies, rapes, hold-ups, kidnappings, car-napping, hijackings and school bullying; said specific sub-methods involving any of the following enumerated specific sub-methods, according to the selection and specific selected tasks as required by the respective registered owner/user of the respective registered said smart telecommunication devices belonging and specifically registered for his or her own use; said specific sub-methods comprising of:

(a) (FIG. 13) a first initial preparatory specific sub-method for the required preparation phase of operation before any further anti-fraud and anti-identity theft uses, with true-personal verification protective functions are implemented, as effective specific sub-method to support any and all customer-controlled functionalities of the instant-response anti-fraud/anti-identity theft device with true-personal identity verification, providing for effective and accurate applications and operations in personal and/or business e-banking and e-commerce secured transactions and activities, in order to properly and accurately prepare each respective registered said device in association or as directly linked with each one of the respective customer/owner/user of each respective one of the respective registered said device for initiating, carrying out, concluding, limiting, approving or rejecting, consummating and completing any and all succeeding transactions, whichever the case may be; and said first initial preparatory specific sub-method providing in directly linking each respective registered customer/owner/user with the respective registered said device to any and all legitimate organization or organizations, agency or agencies, institution or institutions, bank or banks, credit card company or companies, mortgage company or companies, private or government insurance company or companies, police department or departments, public security and safety administration or administrations, school or schools, immigration and naturalization agency, homeland security and transportation agencies, department of motor vehicles, law enforcement agencies or any and all other second or third party or parties, with whom the respective registered customer/owner/user of each one of the respective registered said device, is dealing and allowing transmission, reception, access, and storage, comparison and retrieval of any and all legitimate relevant data/information, aimed to reduce, halt and prevent the commitment and occurrence of fraud and identity theft activities and any and all errors in data/information input and output that can victimize the respective registered customer/owner/user of each respective registered said device, in any and all personal, business and organizational matters; said first initial preparatory specific sub-method also adequately preparing for providing safety, security and precautionary guidance to each one of the respective registered customer/owner/user of each respective registered said device, during stationary and mobile and travel conditions, and, during emergency situations and hazardous conditions, such as any and all mass evacuations due to natural disasters such as floods, hurricanes, tsunamis, tornadoes, rain and snow and freezing conditions, earthquakes, fires, biological and chemical disasters, harmful shootings, invasions, or terroristic activities, and during law enforcements or during military operations, whichever the case may be; said first specific sub-method being made to initially prepare for various categories of sub-methods; said first initial preparatory specific sub-method comprising of steps:
i. setting a required proper PIN for each respective customer-controlled anti-fraud/anti-identity theft device in order for said device to work and function furthermore, in preparation for connections and inter-linkages with specific banks or credit card companies or other relevant organizations, agencies, services, departments, merchants or any other second or thirst parties, to be made by the respective customer/owner/user of each respective said device to make the respective said device to function properly;
ii. loading the required initial biometrics data such as a selected finger biometrics or iris biometrics data of the respective customer/owner/user of each respective said device for further accurate future accessing into each respective said device, during any and all succeeding future use of each respective said device, necessary as a correct true-personal identity verification for the further execution of correct and proper biometric matching and true-personal identity verification;
iii. registering each respective said device by each respective bank and/or credit card company or companies or by any other relevant organizations, agencies, services, departments, merchants or any other second or third parties, into each respective relevant systems, networks, links and databases, while each of the respective bank and/or credit card company or companies or any other relevant organizations, agencies, services, departments, merchants or any other second or third party or parties, and providing the necessary required security for wireless, wired and/or optical communication networks & database(s) of any and all relevant information/data directed and transmitted to and received from each respective registered said device;
iv. loading the respective customer's/owner's/user's specific account(s) data/information and correct true-personal identification information by each respective bank and/or credit card company or companies or any other relevant organizations, agencies, services, departments, merchants or any other second or thirst parties into the internal memory of each respective registered said device;
v. linking the respective registered said device of the respective customer/owner/user to the bank server or other relevant servers to access the respective customer's/owners/user's bank and/or credit card companies account(s) data/information or transaction information and correct true-personal identification information, by each respective bank and/or credit card company or companies or any other relevant organizations, agencies, services, departments, merchants or any other second or thirst parties;
vi. setting the relevant required authorized pin/password and/or biometrics for the safe access to each of the customer's/owner's/user's respective account and transaction information and secured true-personal identity verification, by the relevant respective bank and/or credit card company or companies or any other relevant organizations, agencies, services, departments, merchants or any other second or third parties;
(b) (FIG. 15) a specific sub-method for processing an authorized customer's or authorized user's physical credit/debit card for the user's part of transaction, utilizing said device, and said specific sub-method comprising of steps:
i. switching on of respective registered said device, having true-personal identity verification application;
ii. entering the required passcode and/or scanning for the biometric data by the respective registered user of the respective registered said device to activate and unlock or activate the respective registered said device;
iii. verifying or validating if the inputted data/information is correct;
iv. if not verified or validated: locking the respective registered said device and stopping task processing for possible fraudulent use of the respective registered said device or possible error input of data/information;
v. if verified or validated: prompting the respective registered owner/user of the respective registered said device in swiping the selected physical credit/debit card into the swiping slot of the respective registered said device or manually entering said selected physical credit/debit card details;
vi. prompting the respective registered owner/user of the respective registered said device in selecting the type of card, either credit or debit;
vii. prompting the respective registered owner/user of the respective registered said device in entering PIN/security code for the specific selected physical bank credit/debit card;
viii. prompting the respective registered owner/user of the respective registered said device in entering the exact amount and currency to be transacted, and the access no. of the merchant, if available and needed;
ix. automatically generating a Transaction Identification Number (TIN) and displaying it to the respective registered customer/user using the respective registered said device;
x. connecting the respective registered customer's/user's selected physical credit/debit card bank account through the respective registered customer's/user's credit/debit card processing means, with needed transaction info;
xi. validating authentication and authorization of the particular or specific transaction;
xii. if not validated: recording of error/denial log and alarming the respective registered owner/user of the respective registered said device about fraudulent usage of the selected credit/debit card, and stopping task processing;
xiii. if validated: verifying the availability of funds in said selected physical bank card or credit card owner's account for the specific transaction;
xiv. if not verified or validated: recording of error/denial log and alarming the respective registered owner/user of the respective registered said device about insufficient funds in said selected account for said owner/user to remedy insufficiency of funds, and stopping task processing within a certain programmed allowable time to remedy insufficiency of funds in said selected account;
xv. if verified and validated: processing specific transaction by respective registered owner's/user's card processing means of the respective registered owner's/user's selected debit/credit card;
xvi. recording and saving the specific transaction in the buffer memory of said owner's/user's bank account;

xvii. placing a hold of respective registered owner's/user's specific transaction until time for merchant's legitimate claim, and then, task processing is completed;

(c) (FIG. 16) a specific sub-method for processing authorized transaction by merchants at the point-of-sale, comprising of steps;
  i. swiping the customer's credit/debit card or scanning the barcode of the virtual card using said device at the point-of-sale terminal;
  ii. prompting and selecting the type of card, either credit or debit;
  iii. prompting and entering the required proper PIN and/or validating the owner/user personal Identity;
  iv. prompting and entering the transaction identification number generated by said device at point-of-sale terminal, if available and needed;
  v. prompting and entering the amount and the currency to be transacted;
  vi. connecting to the customer's credit/debit card bank account through merchant's credit/debit card processing means for authorization and authentication;
  vii. validating for authentication & authorization;
  viii. if not validated: recording of error/denial log and alarming the respective registered owner/user about fraudulent usage of credit/debit card, in said device, and automatic stopping task processing;
  ix. if validated: verifying availability of the account funds to allow for the transaction;
  x. if funds are insufficient: recording denial log and alarming of insufficiency of funds in said device on the specific account of customer/owner/user of specific credit/debit card of error/denial log, and alarming the merchant of insufficient funds in selected account for said owner/user to remedy insufficiency of funds, and automatically stopping task processing;
  xi. if funds are available sufficiently: comparing buffer memory in the specific bank or credit card company for the customer part of transaction, if there is perfect match of amounts per specific transaction, with merchant's specific monetary claim;
  xii. if no match: recording and alerting of mismatch in said device, and reporting mismatch to the merchant terminal and automatically cancelling the specific transaction processing;
  xiii. if match: processing the merchant's specific transaction claim;
  xiv. crediting the exact monetary amount to the specific merchant's bank account;
  xv. saving the merchant's transaction in the buffer memory of the customer's bank account;
  xvi. recording of the transaction in the said device and notifying the owner/user of completed transaction, and task processing is completed;

(d) (FIG. 18) a specific sub-method for processing authorized transaction by merchants through telephonic or online means, comprising of steps:
  i. deciding to make a purchase or pay bill online or by telephone;
  ii. activating voice recording application in said device by the respective registered user/owner of the respective registered said device in order to record the exact specific telephonic transaction for accurate evidentiary protection and security pertaining to the specific said telephonic transaction with a merchant or business or another person or organization;
  iii. in case online transaction is chosen: prompting the respective registered owner/user of said respective registered device to authorize a telephonic transaction, starting by swiping a selected physical credit/debit card, or manually entering the chosen credit/debit card details in said respective registered device;
  iv. prompting respective registered owner/user of said respective registered device to select the type of card, either credit or debit;
  v. prompting said owner/user of said respective registered device to enter the respective secret PIN/security code for the particular selected bank credit/debit card;
  vi. prompting said respective registered owner/user of said respective registered device to enter the amount and currency to be transacted and the access no. of the merchant, if available and required;
  vii. automatically generating a transaction identification number and displaying it to said respective registered owner/user of said respective registered device, and also displaying who is the real customer/owner of a selected credit/debit card for the intended specific transaction;
  viii. connecting the specific customer's particular credit/debit card bank account through relevant customer's credit/debit card processing means with transaction info;
  ix. validating for authentication and authorization during processing of said specific transaction;
  x. if not validated: recording of error/denial log and alarming with message in said respective registered device on possible fraudulent usage of said selected credit/debit card, and stopping task processing;
  xi. if validated: verifying by the specific bank about the availability of the funds in specific customer's specific bank account for the proper execution of specific transaction;
  xii. checking by the specific bank if the funds are available sufficiently to cover the specific transaction;
  xiii. alarming and recording in said respective registered said device if funds in specific account in the specific bank is insufficient to cover the specific transaction, and giving opportunity to the customer/user to remedy insufficiency in the specific bank account, and stopping task processing until the insufficiency of funds in specific account is solved;
  xiv. if verified that funds are sufficiently available in specific bank account, relevant processing means processing specific transaction with customer's/owner's/user's selected specific debit/credit card;
  xv. recording and saving specific transaction in the buffer memory of said respective registered customer's/owner's/user's specific bank account and placing a hold on said specific transaction until specific merchant legitimately claims the exact amount of money on hold as per the specific transaction, and so said respective registered customer/owner/user pre-authorization task processing is completed;
  xvi. if online transaction is desired: prompting said customer/owner/user to choose from the payment options and select for online internet transaction;
  xvii. prompting said customer/owner/user in entering bank details online: name of the account holder, type of card, card number, expiration date, the amount to be transacted and currency;

xviii. sending transaction details along with the generated transaction information number to the web server means to process the specific transaction;
xix. validating by web server the details of the particular given credit/debit card with the bank;
xx. if authorization and authentication is not validated: recording and alerting in said device of possible error/denial or fraudulent usage of the particular credit/debit card, stopping task processing;
xxi. if validated: verifying by the specific bank pertaining to the availability of funds in specific customer's/owner's/user's specific bank account for the specific transaction;
xxii. alarming and messaging and recording in said device if funds are insufficient in the specific bank account, and processing of transaction is halted until specific customer/owner/user can immediately remedy insufficiency of funds, or else further stopping of task processing;
xxiii. if verified or validated for sufficiency of funds in the specific bank account: comparing if the buffer memory for said customer/owner/user part of transaction matches with merchant's claim;
xxiv. if no match: alarming and recording of mismatch in the respective registered said device, and reporting mismatch information to the particular merchant or business or person or organization, and cancelling the specific transaction, unable to process said specific transaction;
xxv. if there is perfect match: processing merchant's transaction through web server means;
xxvi. crediting the exact amount of money according to the specific transaction to the merchant's bank account;
xxvii. saving the merchant's specific transaction in the buffer memory of the specific customer's/owner's/user's specific bank account;
xxviii. reporting and recording of specific transaction in the respective registered said device, and notifying said respective registered customer/owner/user of completed transaction, and task processing is completed;

(e) (FIG. 19) a specific sub-method for checking the balance of a specific debit/credit card prior to a transaction being performed by the card's and device's owner, comprising of steps:
i. switching on the respective registered device by the registered owner/user of the respective registered device;
ii. entering the passcode and/or scanning for the biometrics data of the registered owner/user of said respective registered device to activate and unlock said device;
iii. verifying and validating the newly inputted password and/or biometrics data by electronically comparing them with the initially inputted data previously accepted and stored in the internal memory of said respective registered device;
iv. if not verified or validated: locking said respective registered device and stopping task processing due to possible fraudulent use of said respective registered device or due to error in the newly inputted password and/or newly inputted biometrics data;
v. if verified or validated: prompting registered owner/user of said respective registered device for swiping the selected physical credit/debit card to be used through the built-in swiping slot of said respective registered device or manually entering the selected credit/debit card details;
vi. prompting said respective registered owner/user of said respective registered device to select the type of card to be used, either credit or debit;
vii. prompting said respective registered owner/user of said respective registered device in entering the secret PIN/security passcode for the particular selected bank credit/debit card;
viii. prompting if authorization and authentication is validated;
ix. if not validated: recording of error/denial log and alarming said respective registered owner/user of possible fraudulent usage of said selected credit/debit card, stopping task processing, through the recording and alarming means of said respective registered device, and then stopping the processing of request of specific account's fund balance;
x. if validated: connecting the customer's/owner's/user's selected credit/debit card bank account through customer's credit/debit card processing means, through the secured mobile connectivity of said respective registered device;
xi. processing the request by the relevant processing means and reporting balance of funds information in the specified account;
xii. displaying account balance on the screen of said respective registered device, task processing complete;

(f) (FIG. 20) a specific sub-method for processing a transaction initiated by a merchant, and accepting or rejecting a transaction; said specific sub-method comprising of steps:
i. swiping a selected physical credit/debit card at any point-of-sale terminal, ATM or entering the details of selected physical credit/debit card manually to initiate a transaction;
ii. selecting the type of card, either credit or debit card, if required;
iii. entering the secret PIN/security code or validating the customer's/owner's/user's personal Identity for the selected physical bank debit/credit card transactions, if required;
iv. entering the amount and currency, the access no. of the merchant, optionally, if available and required, for the specific transaction;
v. connecting to the customer's/owner's/user's credit/debit card bank account through merchant's credit/debit card processing means;
vi. validating for authentication and authorization;
vii. if not validated: recording of error/denial log and alarming the respective registered owner/user of possible fraudulent usage of said credit/debit card, stopping task processing;
viii. if validated and there is also no previously inputted customer part of transaction in the buffer memory of the particular customer's bank account, displaying in the LCD screen and/or sounding alarm through the speaker system of said respective registered device for the respective customer's/owner's/user's approval or rejection of the specific transaction;
ix. if rejected by the specific customer/owner/user: cancelling of the specific transaction, and reporting to the specific bank about the rejected or possibly fraudulent transaction, and recording of error/denial log in said respective registered device, stopping task processing;

x. if approved: processing of specific transaction through relevant correct credit/debit card processing means;

xi. recording and saving of specific transaction in the said respective registered device, and notifying said respective registered owner/user of said respective registered device of completed transaction, task processing complete;

(g) (FIG. 21) a specific sub-method for pre-authorizing future transactions to be automatically deducted from the respective registered device's/owner's credit card, using said respective registered device to pre-approve a future upcoming transaction, comprising of steps:

i. switching on the respective registered device;

ii. entering the secret PIN or passcode and/or scanning for the biometrics data of the respective registered owner/user of said respective registered device to activate and unlock said respective registered device;

iii. verifying or validating the newly inputted data for matching and electronically comparing them with the previously accepted inputted data stored in the internal storage memory of said respective registered device;

iv. if not verified or validated: locking said respective registered device, and automatically stopping task processing while sounding an alarm in said respective registered device for possible fraudulent use of said device, and said device will not work further;

v. if verified or validated: prompting said respective registered owner/user of said respective registered device in swiping selected physical credit/debit card through said respective registered device's swiping slot to enable reading of read-only data/information stored in the just-swiped credit/debit card's magnetic stripe, or manually entering the selected credit/debit card details;

vi. prompting said respective registered owner/user in selecting the type of card, either for credit or debit;

vii. prompting said respective registered owner/user in entering the secret PIN/security code for the selected bank credit/debit card;

viii. prompting said respective registered owner/user in selecting "pre-authorize a transaction" from the options;

ix. prompting said respective registered owner/user in entering the amount and currency to be transacted, and the access no. of the merchant, if available and needed, as well as the description and date when the pre-authorized transaction is to be made;

x. connecting said respective registered customer's/owner's/user's credit/debit card bank account through customer's credit/debit card processing means with transaction info;

xi. validating authentication & authorization;

xii. if not validated: recording of error/denial log and alarming said respective registered owner/user of said respective registered device, through said respective registered device of possible fraudulent usage of specific credit/debit card, stopping task processing;

xiii. if validated: storing the specific transaction details in customer's/owner's/user's bank account database memory, as well as in memory storage of said respective registered device for the future pre-authorized transaction;

xiv. verifying if adequate funds are available a day or more in advance, by the respective bank for the specific pre-authorized transaction;

xv. if not verified of available sufficient funds in specific bank account: alarming said respective registered owner/user of said respective registered device at regular intervals of time about the insufficient funds in selected account for said respective registered owner/user to remedy insufficiency of funds, offering said respective registered owner/user the possibility to cancel transaction;

xvi. if transaction must be cancelled: reporting cancellation to the specific bank, and recording error/denial log in the said respective registered device, stopping task processing;

xvii. if transaction is not cancelled and funds are sufficient: recording of specific transaction in said respective registered device, and notifying said respective owner/user about processing the pre-authorized transaction and recording in said respective registered device when said pre-authorized transaction is completed, task processing complete;

(h) (FIG. 22) a specific sub-method for using a virtual bank card instead of a physical bank card or physical credit card to make personal monetary and/or commercial transactions by storing and retrieving the images of each of the physical bank cards and physical credit cards, and projecting the respective virtual images representing the respective said physical bank card or physical credit card into the LCD display window of the respective registered said device accompanied by specific respective barcodes, respectively representing the required data/information of the respective virtual bank card or virtual credit card in order to proceed, carry out and accomplish a completed monetary or commercial transaction or transactions; said specific sub-method comprising of steps:

i. step A: switching on the anti-fraud and anti-identity theft with true-personal identity verification applications of the respective registered said device or CCIRAF/AITD belonging to the respective registered customer/user, then inputting again the required PIN or passcode and/or biometrics of said respective registered customer/user for electronically validating the newly inputted required PIN or passcode and/or biometrics data/information as electronically compared with the relevant pre-loaded correct PIN or passcode and/or biometrics data/information as previously set in the respective registered said device for matching accuracy, and in order to access the already pre-loaded relevant correct bank account or credit card data/information in the respective registered said device, and then prompting said device to display on the LCD display window all the available projectable virtual bank account cards or credit cards that have been pre-loaded into said device, and then scrolling through the LCD touch-screen of said device the various displayed virtual credit/debit bank cards, feeding from the pre-loaded virtual images of the respective bank account cards or credit account cards stored in the internal memory of the respective registered said device or CCIRAF/AITD, and then selecting which specific projected virtual bank account card or credit account card to use for the intended transaction or transactions, before proceeding further with any transaction or transactions;

ii. step B: entering in said device by the respective registered customer/user, the required transaction information like card details, PIN, amount, currency and any other relevant data/information required to process the specific transaction, and, submitting the chosen virtual credit/debit card transaction details to the customer's credit card processing means via secured connections;

iii. step C: routing to the customer's credit card processing network the transaction data/information and to the customer's bank account or credit card account with correct authorization;

iv. step D: approving or declining the specific transaction based on the validation details of the selected virtual bank card, PIN and customer's available funds; and then sending the transaction results back to the customer's credit card processing means, about the transaction approval or decline or denial made at the specific customer's bank account or credit card account, and is left recorded into the customer's specific bank account's buffer memory of the respective credit/debit card bank account's database;

v. step E: notifying to said device of the transaction results of approval or denial via the customer's credit/debit card processing means, and thus completes the customer part of the transaction; and then displaying to the respective registered customer a specific transaction identification number in said device, when programmed, after said device or bank generates said specific transaction identification number; wherein the generated transaction identification number, signifying that the customer/user-part of the specific transaction has been processed;

vi. step F: scanning the specific chosen projected virtual credit/debit card's barcode as displayed on said device's LCD display window; said scanning activated by a merchant's barcode reader at a merchant's point-of-sale terminal to execute the specific transaction for direct point-of-sale purchase, also, for revealing the respective registered customer's/user's credit/debit card data/information containing the specific transaction data/information, PIN, specific transaction amount, currency and transaction identification number;

vii. step G: sending the particular virtual credit/debit card transaction from the particular merchant's point-of-sale terminal through the merchant's credit/debit card processing means on behalf of the respective registered customer/user via secured electronic connections and networks;

viii. step H: routing from the merchant's credit/debit card processing means the specific transaction to the customer's bank account to obtain the needed authentication, validation, approval and authorization;

ix. step I: approving or denying said specific transaction as decided at the customer's bank account database with the proper credit/debit card issuing bank approving or declining said specific transaction based on respective registered customer's available funds, and the corresponding customer part of the transaction as stored in the buffer memory of the specific bank's secured database; and then, passing the specific transaction results back to the merchant's credit/debit card processing means; the criterion for approving the specific transaction is the comparison of the card PIN, data/information, transaction identification number, amounts, currency that the respective registered customer/user of the specific card had sent and authorized, including all relevant data/information sent or requested by the merchant's credit/debit card processing means and the exact amount requested by the merchant for the specific transaction along with the merchant Identification number, if needed; and then validating the specific transaction if all the data/information are perfectly matched;

x. step J: storing the specific transaction results by the merchant's credit/debit card processing means and sending them to the merchant's point-of sale terminal, and completing the authorization process;

xi. step K: sending from the customer's bank account processing database the appropriate amount of funds for the specific transaction to the merchant's credit/debit card processing means;

xii. step L: sending the exact approved amount of funds to the merchant's bank account for deposit, after passing through the merchant's credit/debit card processing means, and completing the settlement process of the specific transaction;

xiii. step M: reporting the processed and completed specific transaction to the respective registered customer's said device by the customer's bank account with its proper networking connections, and, including the exact approved amount of funds taken from said respective registered customer's user's specific bank account, and then saving the completed specific transaction details to the respective registered customer's said device's internal storage memory or respective registered CCIRAF/AITD's internal storage memory;

(i) (FIG. 23) a specific sub-method for using a respective registered anti-fraud and anti-identity theft device with true personal identity verification application as a substitute for the use of specific chosen physical credit or debit bank card at a merchant's point-of-sale terminal, by utilizing a corresponding LCD-displayed virtual images that represent the respective chosen specific virtual bank card, with its respective specific electronically generated displayed respective specific barcode identification projected in said device's LCD-display window, said respective barcode identification representing the chosen specific virtual bank card, said specific virtual barcode identification being made readable by an upgraded or improved adjustable corresponding optical LCD barcode reader at the merchant's point-of-sale terminal; said specific sub-method also allowing the use of the selected projected virtual bank card and the respective specific virtual barcode to be used for checking the respective registered customer/user of said device in checking relevant specific account balance, transaction history, and activating funds transfers from one account to another, and, also allowing provisions for executing authorization or pre-authorization of purchase and/or bill payments; said specific sub-method comprising of steps:

i. switching on the anti-fraud/anti-identity theft with true-personal identity verification application in said device;

ii. entering the password and/or scanning for the biometrics data to activate said device;

iii. if data is not validated: reporting fraudulent usage of said device or possible error entry of biometrics data, wherein repeating scanning again for the biometrics data is needed, and if still not validated, said device will not work;

iv. if data is validated: displaying and scrolling all virtual bank cards accounts and virtual ID of authorized user;
v. selecting the chosen bank virtual card and type of account to be used for specific transaction, including relevant barcodes displayed for scanning by merchant's appropriate barcode reader at point-of-sale terminal;
vi. connecting to the customer's respective bank account database through customer's credit/debit card processing means;
vii. choosing if balance is needed: reporting the balance of the specific account by correct processing means if account balance is requested;
viii. choosing if transaction history is needed;
ix. reporting the transaction/history of the specific account by correct processing means after processing the request displaying the transaction history in said device, if account transaction history is requested;
x. displaying the account balance/history in said device; and then choosing if transfer of funds is desired;
xi. selecting the amount and bank account where funds will be taken from and account where funds will be transferred into;
xii. generating and displaying a transaction identification number in said device;
xiii. sending the funds transfer request by said device to the correct processing means;
xiv. validating if authentication and funds transfer request is correct;
xv. if not validated as correct, end;
xvi. if there is correct validation: processing the specific transaction and crediting the exact amount of funds into the relevant respective account or into the built-in NFC in said device, initiated by the correct processing means, and end;
xvii. if the option to authorize a point-of-sale transaction or pre-authorize bill payment is chosen, then further comprising of the following steps;
xviii. entering the amount and currency to be transacted, and optionally the access number of the merchant, if available and required;
xix. generating and displaying the transaction identification number in the said device; connecting the respective registered customer's/owner's/user's specific credit/debit card bank account through the correct customer's credit/debit card processing means, with the specific transaction info;
xx. validating if the authorization and authentication data is accurate;
xxi. if not validated: alarming and recording into said device for possible fraudulent usage of the specific credit/debit card, and processing is halted and unable to process specific transaction;
xxii. if validation of data/information on authorization or pre-authorization and authentication is accurate: checking by the specific bank for the availability of funds in the specific customer's bank account for the specific transaction;
xxiii. if funds are available sufficiently in specific customer's specific bank account, then processing specific transaction by the specific customer's credit/debit processing means;
xxiv. saving the specific transaction in the buffer memory of the specific customer's specific bank account;
xxv. holding the specific exact amount of funds in for the specific transaction in the respective registered customer's bank account's buffer memory until legitimately claimed by the specific merchant through relevant processing means, then recording the consummated transaction in said device;
xxvi. if funds are not sufficiently available in the specific customer's specific bank account, then alarming and recording of insufficiency of funds in specific bank account in said device, and processing further of specific transaction is halted until remedy is done to make specific bank account funds sufficiently available;
(j) (FIG. 25) a specific sub-method for the legitimate processing of an authorized customer's or authorized user's Medicare or Medicaid and/or private medical/health insurance as can be correctly and rightfully claimed from the respective medical/health insurance companies by medical/health doctors and specialists, medical/health facilities, laboratories, pharmacies, medical clinics, hospitals, etc., and utilizing the interactive instant participation and response capabilities of the correct respective registered devices with the participation of the respective insured authorized customers or patients, so as to ascertain the validity and correctness of any and all relevant medical/health insurance claim or claims, in order to prevent the commitment of fraudulent medical/health insurance claim or claims; said specific sub-method comprising of steps:
i. swiping a patient's medical/health insurance card having correct data/information embedded in said card's magnetic stripe, through the card swiping terminal of a relevant medical/health facility, laboratory, pharmacy, doctor's office, or entering the details of said card at said relevant medical/health facility, laboratory, pharmacy, doctor's office;
ii. sending through the relevant medical organization the patient's insurance details along with the supporting data/information to the relevant insurance company or companies via the relevant medical/health insurance processing means for claiming the insurance payment;
iii. forwarding the relevant medical/health insurance claim or claims details for any and all rendered relevant medical/health consultation, medical/health laboratory work, performed medical/health procedures or clinical laboratory tests, operations, medical/health services, diagnostics, surgeries, hospitalizations and/or any and all relevant medical-related equipment or equipments given to the specific insured patient who is the respective rightfully authorized owner of each relevant Medicare or Medicaid or other medical/health insurance card or cards, through submission of the specific relevant insurance claims via the relevant medical/health insurance processing means to the relevant Medicare or Medicaid or other relevant medical/health insurance agency or agencies or company or companies;
iv. processing of the relevant insurance claim or claims by the relevant insurance company or companies, and contacting the respective insured patient's respective registered device for the respective insured patient or the respective responsible party to the respective insured patient to confirm the correctness or accuracy of the kind of medical/health consultation, tests, procedures, and frequency of the respective relevant medical/health items rendered or given to the respective registered insured patient as being claimed by the relevant medical/health facilities and supply entities, according to the dates and times, as made and claimed by the relevant medical/health facilities or facilities, through the use of respective customer's/patient's registered device, via or through the relevant secured medical/health insurance information processing means;

v. swiping by the patient the medical insurance card into the respective said device or entering the required details of said card to correctly and reliably access the relevant medical insurance info and alerts received through the respective registered said device;

vi. rejecting or confirming by the respective registered patient in response to the insurance company's request received from the respective registered said device within the specified time through relevant processing means for authentication or rejection of any and all relevant relayed or transmitted insurance claim or claims;

vii. validating if the medical/health insurance claim or claims is or are authenticated as correct by the respective registered insured patient through the use of the respective registered said device;

viii. if approved by the respective registered insured patient: relevant Medicare or Medicaid or any other medical/health insurance company or companies reporting the authenticity of the respective relevant claim or claims to the correct medical organization based on the respective registered said device's response, and then paying the claimed insurance money to the relevant respective medical/health facility or facilities;

ix. if not approved by the respective registered insured patient as correct: rejecting by the respective Medicare or Medicaid or any other relevant insurance company or companies of the specific insurance claim or claims and reports to the respective correct medical organization and to the respective registered said device regarding the possible fraudulent claim or claims;

(k) (FIG. 26) a sub-method for implementing safety and security in airports and aircrafts while accomplishing effective rapid confirmable secured true-personal identification of real passengers during airport and aircraft check-in, boarding, check-out, and coordinated with effective corresponding fast-lane accurate comprehensive flight ticketing, luggage check-in, airport gate entry, airport true passenger presence guarantee, luggage claim check-in and check-out by TSA-pre-approved passengers using correspondingly TSA-approved wireless registered instant-response anti-fraud and anti-identity theft device with true personal verification device or CCIRAF/AITD that is correctly linked to a corresponding TSA-registered passenger; said specific sub-method comprising of steps:

i. registering together said device or CCIRAF/AITD and the authorized user of said device with the TSA, and providing all needed information requested by TSA for registration, as required;

ii. confirming if said device and authorized user of said device are already TSA-registered together;

iii. if said device and said authorized user of said are not yet registered: unable to use said device by said authorized user of said device for airport and aircraft security ticketing, check-in and aircraft boarding;

iv. if yes: planning the air travel and purchasing the airline ticket or tickets online in the name of authorized user of said device, or purchasing personally the airline ticket or tickets from any other relevant travel agency or from airline ticket counter at airport;

v. linking and downloading the purchased airline ticket or tickets, and the luggage barcodes, if required or desired, to the respective registered device of said authorized user of said device, at airline ticket counter through airline service provider and TSA databases every time said authorized registered user/passenger checks in at designated airport(s);

vi. proceeding to security check-in and boarding gates of said registered authorized user/passenger using the respective registered said device;

vii. waving of the NFC-enabled respective registered said device by the respective registered passenger/user at airport-based TSA's NFC reader, and the relevant coordinated TSA security inspection device automatically extracting the respective registered passenger's/user's data/information from TSA database to display on flat screen monitor, comparing the data/information from said respective registered said device and those data/information extracted from the TSA database regarding the respective registered passenger/user of the respective registered said device as previously linked during the registration process of the respective registered said device to said respective registered passenger/user of said device;

viii. capturing instantly by the TSA security camera of the facial picture and the iris biometrics of the incoming respective registered passenger/user, then displaying and matching said facial picture and iris biometrics with the originally filed picture ID and iris scan extracted from the TSA database;

ix. validating if TSA-extracted ID pictures and Iris biometrics of incoming respective registered passenger/user of the respective registered said device match with the data/information extracted from said device;

x. if there is any mismatch of data/information: tagging incoming passenger/user of said device pertaining to mismatched pictures Ds and iris biometrics and he or she must undergo more elaborate special security screening;

xi. confirming if the respective passenger/user of said device has passed the special security screening;

xii. if there is any mismatch: reporting instantly of mismatch incident to TSA and airport & aircraft security, and if risky anomalies and data mismatch are found in the last moments, TSA and airport and aircraft will be alerted to enforce more strict cross-matching for fingerprint, palm-print, voice print, gait, signature investigation, as required, and interrogating of the specific tagged passenger/user ensues to stop potential security risks and prevent mishaps;

xiii. if there is a validation of allowable match in facial pictures and captured iris biometrics between the newly extracted facial pictures and newly scanned iris biometrics of the respective incoming passenger/user with those respective passenger/user facial pictures and iris biometrics extracted from previously approved files at the TSA database; proceeding of incoming respective registered passenger/user of said device to further TSA security checks, if still necessary, in case there happens to be detected some recent up-to-the second instant emergency suspicious report of risky anomalies and data mismatch, then TSA and airport and aircraft will be alerted to enforce more stringent cross-matching of fingerprint, palm-print, voice print, gait, signature investigation and further interrogation ensues to stop potential security risks and prevent mishaps; until said passenger/user is finally approved to board the specific aircraft.

23. Multi-functional telecommunication devices, systems and methods dedicated for achieving effective instant-response anti-fraud and anti-identity theft activities with true-personal identity verifications, benefiting any and all registered authorized customers/users of said devices, systems and methods; said devices, systems and methods having secured operational interactivity capabilities, features and functionalities which are respectively and selectively capable of receiving, transmitting, recording, memory storing, retrieving, visually displaying and audibly perceiving any and all relevant data/information such as, but not limited to, in the form of text and vocal contents, communications, guidance, geographical directions, graphics, icons, messages, alerts, documents, photos, videos, images, instructions, illustrations, warnings, greetings advices and any other relevant items, affording secured protections for any and all registered authorized customers/users of said devices, systems and methods; said devices, comprising of various effective means such as: means for secured customer-controlled instant-response interactivity capabilities, features and functionalities for any and all point-of-sale secured credit/debit card and bank card purchase protections, means for instant-response anti-fraud and anti-identity-theft protections for online and telephonic orderings, means for secured authorized credit/debit card and bank card purchases, means for instant-response alarm, rejection, recording and evidentiary retrieval of any and all unauthorized accesses of specific bank accounts of any and all registered authorized customers/users of said devices and systems, means for accurate photographic anti-forgery electronic protections of bank cheque transactions, means for fraud protections on foreign purchases, means for secured wireless accesses, storage and retrieval of specific bank account balances, and funds transfers, means for pre-transmitting by any and all of the respective registered authorized customers/users of said devices and systems of any and all specific transaction amounts and other relevant data/information to the relevant respective specific respective bank account or accounts in the respective bank or credit/debit card company's database' buffer memory for accurate comparative matching with the relevant respective merchant's or business' claim of payment as per specific transaction or transactions with the respective authorized customer/user of said devices and systems, to determine whether to execute or not to execute a denial/rejection or acceptance of the relevant specific transaction with the exact amount of monetary value as claimed by the respective merchant or business, regarding the relevant specific transaction or transactions, means for wireless secured management and monitoring of available cash and expenses, means for monetary management and bill payment due date alerts and messaging to avoid being victimized by insufficiency of funds bank fee charges, means for creating, storing and displaying virtual credit/debit cards and bank cards and true-personal identity cards and membership cards, means for transaction activation, control, limitations and completion of transaction or transactions, means for instant alarming and messaging of denials or rejections of specific fraudulent transactions and the corresponding recordings of said fraudulent transactions, means for creating secured virtual barcodes representing each respective virtual bank card or virtual credit/debit cards and virtual true-personal identity verification cards and virtual membership cards and other virtual identification documents of each of the respective registered authorized customers/users of said devices and systems, means of generating and displaying any and all verifiable virtual images of relevant important documents, such as each respective customer's/user's individual driver's license, passport, visas, diplomas, birth certificate, social security card with the specific name and number, and other membership cards of the respective registered authorized customer/user of each respective registered said devices and systems, means for electronically freezing or deactivating any and all selected specific inactive bank accounts and/or credit/debit cards with corresponding electronic reactivation of the same specific inactive bank accounts and/or credit/debit cards according to the desired times and dates set by the respective registered authorized customer/user of said devices and systems, means for warning each respective registered authorized customer/user of any and all changes in bank policies, such as hikes or waivers on the respective specific bank accounts or credit/debit card accounts, means for instant alerting and messaging of specific dates and times and amounts of direct deposits, refunds, awards, monetary holds and credits made to the relevant respective specific bank accounts and/or credit/debit cards belonging to the respective registered authorized customer/user of each of the respective registered said devices and systems, means for activating, displaying and storing certain instant alarm and messaging to attain effective anti-device loss of paired distance-sensor-equipped compatible devices to prevent unwanted forgetting and losing said devices and other compatibly paired distance-sensor-equipped other devices, means for remote control deactivation and reactivation of paired compatible devices, means for memory erase and restoration of memory of any or some selected or all stored, received and transmitted and pre-transmitted and post-transmitted relevant data/information, means for secured cellular/satellite mobile applications, means for camera and video and voice recording, memory storage and play back, GPS means coordinated with any and all personal, business and professional transactions and other relevant activities during travel and stationary conditions, language translation means for travelers and for ease of transactions involving multi-lingual transactions, means for internet and/or communications and research and games applications, means for instant currency conversion and gratuity calculations, means for biometric scanning and biometrics data/information readings, means for personal identification number and password generation and protections, means for voice recognition for said devices' and systems' input and output, control and command, means for image recognition and instant item search means, secured means for wireless reception, transmission, control, storage and retrieval of relevant data/information, built-in swiping and magnetic stripe reading means for physical bank cards and debit/credit cards and medical/health insurance and other relevant magnetic-stripe-laden membership cards of each respective registered customer/user of said devices and systems, USB provision means, means for interactive LCD display and touch-screen data/information input, and output manipulations, and keypad data/information input and manipulation means, built-in microphone means and speaker means and output jack means, temporary memory access, storage and retrieval means, near-field communication NFC means, instant locator of hidden items means, 2D to 3D and 3D to 2D visual displays and conversion means, vehicle remote control means such as: means for remotely and wirelessly locking and unlocking doors, and means for wirelessly and remotely deactivating, and pre-reactivating and activating of the respective automobile ignition or heater or air-conditioning systems, means for secured mobile and stationary interactive protection and security for multi-level education, research and inventions advancements and enhancements activities, means for Medicare and Medicaid and private medical/health care insurance accuracy checking, authentication, authorization and validation for achieving effective instantaneous money-saving operations, with means for preventing, halting and minimizing fraudulent insurance claims, means for electronic stopping and minimizing school bullying, means for electronic instant-response safety and security alerts and warnings and guidance advisories for effective implementations pertaining to evacuation of civilians and other organizational personnel away from danger zones to safer places before, during and after harmful shootings, chemical and biological hazards and fires, or disasters or calamities such as before, during and after earthquakes, hurricanes, tornadoes, storms, floods, tsunamis, snows, blizzards and avalanches, and alerting and messaging means for electronic instant guidance and safety during military deployment, reporting, command and accurate instant-response military personnel identification to prevent and curtail the occurrence of friendly fire and instant encrypted warnings of enemy presence and locations and directions, and tactical movements, instant-response means for electronic law enforcement activities to achieve better and faster civilian rescue operations, means for instant-response electronic effective anti-terroristic security for airports and aircraft flights, and instant response true-personal identity verifications means for faster clearing and passage of true-airplane passengers and crews, means for electronic tagging, input, memory storage and retrieval and display of correct true-passenger flight tickets, air-travel travel routes and destinations with correct true-passenger boarding passes, and means for instant accurate electronic secured tagging and verifications to achieve accurate and provable true-passenger's luggage, electronic means for instant-image capture, storage, recall, and display for the instant locator means to display and/or announce where hidden documents and other important items can instantly be found with GPS and time-line dates and calendar tagging means, and means for timely reminder of important things to do; said systems comprising of said devices cooperating with any and all relevant stored value instruments such as physical or virtual credit or debit cards of specific banks or credit card companies, or cooperating with any and all other respective physical or virtual membership cards, rightfully belonging to the respective authorized customer/user of the respective registered said devices, so that, along with the respective registered said devices, capable of selectively interacting with the respective internal built-in systems and sub-systems and components and micro-processors and various installed software programs within the respective registered said devices, and said devices and the respective said stored value instruments being securely linked electronically to interactively, systematically and accurately coordinate with the respective relevant external systems, programs and devices of any and all respective relevant external sources such as service providers, banks, credit card companies, medical/health insurance agencies or companies, schools, law enforcement agencies, TSA, police departments, military agencies, motor vehicle departments, travel agencies, homeland security agencies or departments, immigration and naturalization department, medical facilities, mobile units, rescue operations agencies, public safety agencies, merchants, vendors and other business establishments, and any other relevant second or multi-parties, pertaining to the reception, transmission, communication, storage and retrieval, and as well as pertaining to response or responses to alert and messages and communications to any and all relevant data/information transmissions received from and transmitted to any and all of the relevant said external sources, and regarding to any and all pertinent respective relevant instant rejection of any and all transactional errors and events and also in response with capabilities of said systems to halting any and all activities of fraudulent party or parties or malwares and illegal and fraudulent programs and machines, in order to prevent, thwart and minimized the occurrence of fraud and identity theft and illegal privacy intrusions of thieves and other malevolent entities with relevant respective receptions, transmissions, alerts, messages and responding and transmitting respectively to the relevant external systems, components or devices and programs of the relevant said external sources including any and all relevant external processing systems, means and methods and respective relevant databases of any and all relevant said external sources, in order to halt, prevent and minimize the occurrence of fraud and identity theft that threaten to victimize any and all registered authorized customers/users of said anti-fraud and anti-identity theft devices with true personal-identity verification, and in order to coherently and effectively execute and complete any and all legitimate personal or business or professional transactions and communications using said registered devices; said methods for effective and coherent implementation to any and all customer-controlled instant-response anti-fraud and anti-identity theft devices and systems, equipped with true-personal identity verification applications, aimed to prevent and halt and curtail the commitment of transactional fraud, identity fraud, communication fraud, identity theft, bank account and credit card theft and fraud, illegal insurance claims fraud, school bullying, airport and airline mishaps, terroristic threats and activities, and erroneous transactional entries, in order to securely, immediately protect and safeguard each respective authorized registered user of each respective registered said devices; said methods providing for effective implementation to initiate, coordinate and consummate any and all wireless, wired or optically linked, Bluetooth or infrared-linked secured and accurate inter-linking reception, transmission, pre-transmission, memory storage and retrieval of any and all data/information contents and exchange between each respective authorized registered said user of each respective registered said devices, and any and all legitimate relevant specific bank or banks and/or credit card company or companies or any other relevant legitimate organization or organizations, agency or agencies, company or companies, department or departments, as officially, legally and accurately associated, linked and coordinated with each respective registered authorized user of each respective registered said devices and each respective registered said devices, utilizing said methods that utilize instant-alarm and instant-response functionalities, and providing also the relevant functional effective methods to enable each of the respective registered said devices to input, store, retrieve, visually display and audibly output whatever required and secured true-personal identity verification of each respective authorized registered said user through each of the respective registered said devices, and, moreover providing methods for verifying, validating and authenticating virtual personal, business or organizational documents, and biometrics of each respective authorized registered said user of each respective registered said devices, and, including further relevant methods to achieve instant and constant advisory precautions, safety and security guidance to each respective authorized registered user of each respective registered devices, during any and all forms or types of dangerous conditions or situations; said methods capable of coordinating effectively with any and all relevant processing means and systems, transmission means and systems, reception means and systems, value representation means and systems, audio-visual interactive means and systems, micro-processing means and systems, and both personal and machine readable means and systems; said methods comprising of:

(a) initially registering a specific user of each respective specific device and concurrently initially registering also said respective specific device to said specific user to establish an accurate tie-in or link accurately and directly associating both the registered specific user to the respective registered specific device, and then associating both said respective registered user and the respective registered specific device, to any and all relevant selected specific bank or banks or credit card company or companies, or any other relevant specific organization or organizations, agency or agencies companies, department or departments or any other relevant second and third party or parties;

(b) establishing certain secured transmission method or methods with any and all relevant effective compatible processing means, coordinating with any and all relevant networking means, database referral and storage means and data/information retrieval means between the specific registered user and the respective registered specific device with any and all relevant specific bank or banks or credit card company or companies or any other relevant organization or organizations, agency or agencies companies, department or departments or any other relevant second or third party or parties as associated or coordinated with said specific registered user of said respective registered specific device;

(c) establishing certain instant-response interactive alerting or alarming and messaging method or methods with secured reception and transmission methods and means between said specific registered device and said specific registered user of said specific registered device, coordinating responsibly and accurately with the relevant respective specific bank or banks or credit card company or companies or any other relevant organization or organizations, agency or agencies companies, department or departments, or any and all other relevant second or third parties associated or coordinated with said specific registered user of said specific registered device;

(d) processing accurately an ongoing transaction or group transactions, and also accurately processing and managing of future pre-set transactions, and also accurately processing past transactions when retrieved;

(e) validating and authenticating of any and all relevant data/information contents and exchange;

(f) confirming a validated and authenticated transaction, whether presently occurring or occurring in the future or having occurred in the past;

(g) rejecting automatically by said respective registered specific device or by the respective registered user of said respective registered specific device using said respective registered specific device pertaining to any and all invalid transaction or transactions or event or events, data/information and transaction error entry or error entries, fraudulent transaction or transactions, fraudulent claim or claims, fraudulent event or events, and recording of said rejecting or rejection of any and all relevant invalid transaction or transactions or event or events, fraudulent transaction or transactions, fraudulent claim or claims or fraudulent event or events in said specific registered device' memory;

(h) finalizing and completing any and all legitimate and authenticated and validated legitimate transaction or transactions or event or events;

(i) storing any and all validated and authenticated transaction or transactions or event or events, and recording such said validated and authenticated legitimate transaction or transactions or event or events in said respective registered specific device's memory, as well as recording said validated and authenticated legitimate transaction or transactions or event or events in relevant databases of each relevant respective organization or organizations, institution or institutions, agency or agencies, department or departments and/or in the databases of any and all other relevant second and third party or parties which each respective registered user of each respective registered specific device is dealing with and has allowed access, transmission, messaging, alerting, inter-communications, recording, retrieval and display of any or all pertinent relevant secured data/information.

* * * * *